US009667941B2

(12) United States Patent
Hattori et al.

(10) Patent No.: US 9,667,941 B2
(45) Date of Patent: May 30, 2017

(54) ENCODING DEVICE, ENCODING METHOD, DECODING DEVICE, AND DECODING METHOD

(75) Inventors: Shinobu Hattori, Tokyo (JP); Yoshitomo Takahashi, Kanagawa (JP)

(73) Assignee: SONY CORPORATION, Tokyo (JP)

(*) Notice: Subject to any disclaimer, the term of this patent is extended or adjusted under 35 U.S.C. 154(b) by 78 days.

(21) Appl. No.: 13/818,506

(22) PCT Filed: Aug. 31, 2011

(86) PCT No.: PCT/JP2011/069841
§ 371 (c)(1),
(2), (4) Date: Feb. 22, 2013

(87) PCT Pub. No.: WO2012/029884
PCT Pub. Date: Mar. 8, 2012

(65) Prior Publication Data
US 2013/0169751 A1    Jul. 4, 2013

(30) Foreign Application Priority Data

Sep. 3, 2010  (JP) .................... 2010-198351
Jun. 13, 2011 (JP) .................... 2011-131679

(51) Int. Cl.
*H04N 13/02*     (2006.01)
*H04N 13/00*     (2006.01)
*H04N 19/597*    (2014.01)

(52) U.S. Cl.
CPC ..... *H04N 13/0048* (2013.01); *H04N 13/0066* (2013.01); *H04N 19/597* (2014.11); *H04N 2213/003* (2013.01); *H04N 2213/005* (2013.01)

(58) Field of Classification Search
CPC . G06T 7/0075; G06T 7/0077; H04N 13/0271; H04N 21/8146; H04N 21/816; H04N 2213/003; H04N 2213/005
See application file for complete search history.

(56) References Cited

U.S. PATENT DOCUMENTS 8,780,999 B2 *   7/2014  Chen et al. ............. 375/240.25
2008/0123736 A1  5/2008  Sekiguchi et al.
(Continued)

FOREIGN PATENT DOCUMENTS

JP    2000 308089       11/2000
JP    2000-308089 A     11/2000
(Continued)

OTHER PUBLICATIONS

ITU-T Recommendation for H.264 Mar. 2009 (document E34363).*
(Continued)

*Primary Examiner* — Christopher Findley
(74) *Attorney, Agent, or Firm* — Oblon, McClelland, Maier & Neustadt, L.L.P.

(57) ABSTRACT

The present invention relates to an encoding device, an encoding method, a decoding device, and a decoding method capable of encoding and decoding multi-viewpoint images in accordance with a mode that is compatible with an existing mode.

A compatible encoder generates a compatible stream by encoding an image A1 that is a compatible image in units of access units. An auxiliary encoder generates an encoded stream of a multiplexed image of auxiliary images by encoding a multiplexed image of images B1 and C1 that are auxiliary images used when multi-viewpoint images are generated from the compatible image in units of access units. A multiplexing unit transmits the compatible stream, a 3DV Representation Delimiter representing a boundary of (Continued)

a unit, and an encoded stream of the multiplexed image of the auxiliary images. The present technology can be applied to, for example, an encoding device that encodes a 3D image of the multi-viewpoint mode.

12 Claims, 99 Drawing Sheets

(56) References Cited

U.S. PATENT DOCUMENTS

| | | | | |
|---|---|---|---|---|
| 2010/0215347 | A1* | 8/2010 | Ikeda et al. | 386/108 |
| 2011/0149049 | A1 | 6/2011 | Sasaki et al. | |
| 2011/0200302 | A1 | 8/2011 | Hattori et al. | |
| 2011/0298895 | A1* | 12/2011 | Tian | H04N 13/0022 348/46 |
| 2012/0113217 | A1 | 5/2012 | Hattori | |

FOREIGN PATENT DOCUMENTS

| | | |
|---|---|---|
| JP | 2005-510187 | 4/2005 |
| JP | 2005-510187 A | 4/2005 |
| JP | 2006-140618 | 6/2006 |
| JP | 2008-182669 A | 8/2008 |
| JP | 2009 290630 | 12/2009 |
| JP | 2009-290630 A | 12/2009 |
| JP | 2010 508752 | 3/2010 |
| JP | 2010-508752 A | 3/2010 |
| JP | 2010-157826 A | 7/2010 |
| JP | 2010-525724 A | 7/2010 |
| WO | 2007 034601 | 3/2007 |
| WO | WO 2009/081335 A1 | 7/2009 |
| WO | WO 2010/043773 A1 | 4/2010 |
| WO | 2010/095410 | 8/2010 |
| WO | WO 2010/098134 A1 | 9/2010 |

OTHER PUBLICATIONS

"A backward compatible 3D scene coding using residual prediction"; IEEE International Conference on Acoustics, Speech, and Signal Processing, 2008, pp. 1141-1144.*

Shimizu et al., "A backward compatible 3D scene coding using residual prediction"; IEEE International Conference on Acoustics, Speech, and Signal Processing, 2008, pp. 1141-1144.*

Suzuki, "Proposal to detect dependent view boundary in MVC"; ISO/IEC JTC1/SC29/WG11, Apr. 2009, pp. 1-3.*

Extended European Search Report issued Jul. 9, 2014 in Patent Application No. 11821899.9.

Alexis Michael Tourapis et al., "A Frame Compatible System for 3D Delivery", International Organization for Standardisation, ISO/IEC JTC1/SC29/WG11, MPEG2010/M17925, XP-030046515, Jul. 30, 2010, 9 pages.

Anthony Vetro, "MVC Profile/ Level Definitions for Stereo", Joint Video Team (JVT) of ISO/IEC MPEG & ITU-T VCEG (ISO/IEC JTC1/SC29/WG11 and ITU-T SG16 Q.6), Document: JVT - AB037-L, 28th Meeting, XP-030007423, Jul. 20-25, 2008, 4 pages.

International Search Report Issued Dec. 6, 2011 in PCT/JP11/69841 Filed Aug. 31, 2011.

U.S. Appl. No. 13/816,247, filed Feb. 11, 2013, Hattori, et al.

U.S. Appl. No. 13/816,249, filed Feb. 11, 2013, Hattori.

U.S. Appl. No. 13/816,591, filed Feb. 12, 2013, Hattori, et al.

Communication pursuant to Article 94(3) EPC issued Apr. 7, 2015 in European Patent Application No. 11 821 899.9.

Combined Chinese Office Action and Search Report issued May 14, 2015 in Patent Application No. 201180040905.6 (with English language translation).

Office Action (Summons to Attend Oral Proceedings) mailed Oct. 22, 2015 in European Patent Application No. 1182189.9.

Teruhiko Suzuki, "Proposal to Detect Dependent View Boundary in MVC", Sony Corporation, Apr. 2009, 3 pages.

Fons Bruls, et al., "Philips 3DV EE 1, 2, 3, 4 Results", Philips Electronics, Feb. 2009, 18 Pages.

Gary J. Sullivan, et al., "Editors' Draft Revision to ITU-T Rec. H 264 ISO/IEC 14496-10", Feb. 3, 2009, 683 Pages.

Notification of Reason(s) for Refusal issued Mar. 29, 2016 in Japanese Patent Application No. 2012-531951 (with English language translation).

Decision to Dismiss the Amendment issued on Jun. 9, 2016 in Japanese Patent Application No. 2012-531951, with English translation. (10 pages).

Japanese Office Action issued on Jun. 9, 2016 in Japanese Patent Application No. 2012-531951. (2 pages).

Sehoon Yea and Anthony Vetro, "View Synthesis Prediction for Rate-Overhead Reduction in FTV", Mitsubishi Electric Research Labs, IEEE, Istanbul, Turkey, May 28-30, 2008. (5 pages).

Office Action issued Sep. 20, 2016 in Japanese Patent Application No. 2015-183169 (with English language translation).

* cited by examiner

FIG. 42

```
sei_message() {
  ...
  else if(payloadType==xx) {
    3DV_view_synthesis_info(payloadSize)
  }
}
```

FIG. 43

```
3DV_view_synthesis_info() {
  depth_type
  is_normalized
  z_near, z_far
  max_disp, min_disp
  camera_mode
  interval_view_id
  num_cor_view_id
  cor_view_id[i]
  camera_parameters
  ...etc
}
```

FIG. 61

```
program_stream_map() {
   ...
   for (i=0; i<N; i++) {
      descriptor()
   }
   ...
   for (i=0; i<N; i++) {
   3DV_view_synthesis_descriptor()
   ...
     for (i=0; i<N2; i++) {
        descriptor()
     }
   }
}
```

*FIG. 63*

```
program_stream_map() {
  ...
  for(i=0; i<N; i++) {
    3DV_view_structure_descriptor()
  }
  ...
  for(i=0; i<N; i++) {
  ...
    for(i=0; i<N2; i++) {
      depth_map_structure_descriptor()
    }
  }
}
```

*FIG. 64*

```
depth_map_structure_descriptor() {
  descriptor_tag
  descriptor_length
  num_of_depth_map
  is_frame_packing;
  frame_packing_mode
  comb_frame_packing_views[L,R]
  ...
}
```

FIG. 65

```
sei_message() {
  ...
  else if(payloadType==xx) {
    3DV_view_structure(payloadSize)
  }
   else if(payloadType==yy) {
    depth_map_structure(payloadSize)
  }
}
```

FIG. 66

```
depth_map_structure() {
    ...
    num_of_depth_map     == NUMBER OF depth maps
    is_frame_packing     == FLAG REPRESENTING WHETHER BEING MULTIPLEXED
    frame_packing_mode   == MULTIPLEXING MODE(SBS, TOB, frame sequential, etc)
    comb_frame_packing_views[L, R] == DESIGNATE MULTIPLEXED PARALLAX IMAGE
    ...
}
```

FIG. 77

|   | COMPATIBILITY | IMAGE QUALITY | DATA AMOUNT |
|---|---|---|---|
| 1) | ◎ |  |  |
| 2) | ○ | ○ |  |
| 3) | ○ |  | ○ |
| 4) | ○ | ○ | ◎ |
| 5) | ○ |  | ○ |
| 6) | ○ | ○ |  |
| 7) | ○ |  | ○ |
| 8) | ○ | ○ | ◎ |

FIG. 86

```
subset_seq_parameter_set_rbsp() {
  seq_parameter_set_data()
  if(profile_idc==83 || profile_idc==86) {
    ---snip---
  }else if(profile_idc==118 || profile_idc==128) {
    ---snip---
  }else if(profile_idc==138) {
    bit_equal_to_one
    seq_parameter_set_depth_extension()
    depth_vui_parameters_present_flag
    if(depth_vui_parameters_present_flag==1 )
      depth_vui_parameters_extension()
  }
---snip---
}
```

FIG. 87

```
seq_parameter_set_depth_extension() {
  num_views_minus1
  for(i=0; i<=num_views_minus1; i++) {
    view_id[i]
    ref_view_id[i]
  }
  for(i=1; i<=num_views_minus1; i++) {
    num_anchor_refs_l0[i]
    for(j=0; j<num_anchor_refs_l0[i]; j++)
      anchor_ref_l0[i][j]
    num_anchor_refs_l1[i]
    for(j=0; j<num_anchor_refs_l1[i]; j++)
      anchor_ref_l1[i][j]
  }
  for(i=1; i<=num_views_minus1; i++) {
    num_non_anchor_refs_l0[i]
    for(j=0; j<num_non_anchor_refs_l0[i]; j++)
      non_anchor_ref_l0[i][j]
    num_non_anchor_refs_l1[i]
    for(j=0; j<num_non_anchor_refs_l1[i]; j++)
      non_anchor_ref_l1[i][j]
  }
  ...

...
num_level_values_signalled_minus1
  for(i=0; i<=num_level_values_signalled_minus1; i++) {
    level_idc[i]0 u(8)
    num_applicable_ops_minus1[i]
    for(j=0; j<=num_applicable_ops_minus1[i]; j++) {
      applicable_op_temporal_id[i][j]
      applicable_op_num_target_views_minus1[i][j]
      for(k=0;k<=applicable_op_num_target_views_minus1[i][j];k++)
        applicable_op_target_view_id[i][j][k]
        applicable_op_num_views_minus1[i][j]
    }
  }
}
```

FIG. 88

```
depth_vui_parameters_extension() {
  vui_depth_num_ops_minus1
  for(i=0; i<=vui_depth_num_ops_minus1; i++) {
    vui_depth_temporal_id[i]
    vui_depth_num_target_output_views_minus1[i]
    for(j=0; j<=vui_depth_num_target_output_views_minus1[i]; j++)
      vui_depth_view_id[i][j]
    vui_depth_timing_info_present_flag[i]
    if(vui_depth_timing_info_present_flag[i]) {
      vui_depth_num_units_in_tick[i]
      vui_depth_time_scale[i]
      vui_depth_fixed_frame_rate_flag[i]
    }
    vui_depth_nal_hrd_parameters_present_flag[i]
    if(vui_depth_nal_hrd_parameters_present_flag[i])
      hrd_parameters()
    vui_depth_vcl_hrd_parameters_present_flag[i]
    if(vui_depth_vcl_hrd_parameters_present_flag[i])
      hrd_parameters()
    if(vui_depth_nal_hrd_parameters_present_flag[i] ||
                    vui_depth_vcl_hrd_parameters_present_flag[i])
      vui_depth_low_delay_hrd_flag[i]
    vui_depth_pic_struct_present_flag[i]
...

depth_loc_info_present_flag
    if(depth_loc_info_present_flag) {
      depth_sample_loc_type_top_field
      depth_sample_loc_type_bottom_field
    }
    video_src_info_present_flag
    if(video_src_info_present_flag) {
      pic_width_in_mbs_minus1
      pic_height_in_mbs_minus1
      aspect_ratio_info_present_flag
      if(aspect_ratio_info_present_flag) {
        aspect_ratio_idc
        if(aspect_ratio_idc==Extended_SAR) {
          sar_width
          sar_height
        }
      }
    }
  }
}
```

FIG. 89

```
nal_unit(NumBytesInNALunit) {
   ...snip...
   If(nal_unit_type==21) {
     depth_extension_flag
     if(depth_extension_flag) {
        nal_unit_header_depth_extension()
     }else{
        nal_unit_header_mvc_extension()
     }
   }
   ...snip...
}
```

FIG. 90

```
nal_unit_header_depth_extension() {
   non_idr_flag
   priority_id
   view_id
   temporal_id
   anchor_pic_flag
   inter_view_flag
   ref_view_id
   reserved_one_bit
}
```

FIG. 91

```
3DV_scalable_nesting(payloadSize) {
  operation_point_flag
  if(!operation_point_flag) {
    all_view_components_in_au_flag
    if(!all_view_components_in_au_flag) {
      num_view_components_minus1
      for(i=0; i<= num_view_components_minus1; i++)
        sei_view_id[i]
    }
  }else{
  num_view_components_op_minus1
  for(i=0; i<=num_view_components_op_minus1; i++)
    sei_op_view_id[i]
    sei_op_temporal_id[i]
  }
  while(!byte_aligned())
    sei_nesting_zero_bit /* equal to 0 */
  sei_rbsp()
}
```

FIG. 93

```
subset_seq_parameter_set_rbsp() {
  seq_parameter_set_data()
  if(profile_idc==83 || profile_idc==86) {
    ---snip---
  }else if(profile_idc==118 || profile_idc==128) {
    ---snip---
  }else if(profile_idc==148) {
    bit_equal_to_one
    seq_parameter_set_mvc_extension()
    mvc_vui_parameters_present_flag
    if(mvc_vui_parameters_present_flag=1)
      mvc_vui_parameters_extension()
    }else if(profile_idc==138) {
      bit_equal_to_one
      seq_parameter_set_depth_extension()
      depth_vui_parameters_present_flag
      if(depth_vui_parameters_present_flag=1)
        depth_vui_parameters_extension()
    }
  ---snip---
}
```

FIG. 95

```
seq_parameter_set_data() {
   ...snip...
   subset_seq_present_flag
   if(subset_seq_present_flag) {
     num_subset_seq
     subset_seq_info_present_flag
     if(subset_seq_info_present_flag) {
       for (i=0; i<num_subset_seq; i++) {
         subset_seq_parameter_set_data()
       }
     }
   }
}
```

FIG. 96

```
subset_seq_parameter_set_data() {
  subset_seq_parameter_set_id
  num_subset_seq_views
  for(i=0; i<num_subset_seq_views; i++) {
    subset_seq_view_id[i]
    num_anchor_refs_l0[i]
    for (j=0; j<num_anchor_refs_l0[i]; j++)
      anchor_ref_l0[i][j]
    num_anchor_refs_l1[i]
    for (j=0; j< num_anchor_refs_l1[i]; j++)
      anchor_ref_l1[i][j]
    num_non_anchor_refs_l0[i]
    for (j=0; j<num_non_anchor_refs_l0[i]; j++)
      non_anchor_ref_l0[i][j]
    num_non_anchor_refs_l1[i]
    for (j=0; j<num_non_anchor_refs_l1[i]; j++)
      non_anchor_ref_l1[i][j]
    depth_extension_flag
    if(depth_extension_flag) {
      ref_view_id[i]
    }
  } seq_param_override_flag
  if(seq_param_override_flag) {
    subset_seq_profile_idc
    subseq_level_idc
    subset_seq_pic_width_in_mbs_minus1
    subset_seq_pic_height_in_map_units_minus1
    if(!frame_mbs_only_flag)
      subset_seq_mb_adaptive_frame_field_flag
  }
  subset_seq_frame_cropping_flag
  if(subset_seq_frame_cropping_flag) {
    subset_seq_frame_crop_left_offset
    subset_seq_frame_crop_right_offset
    subset_seq_frame_crop_top_offset
    subset_seq_frame_crop_bottom_offset
  }
  subset_seq_vui_parameters_present_flag
  if(subset_seq_vui_parameters_present_flag)
    subset_seq_vui_parameters()
}
```

FIG. 97

```
subset_seq_vui_parameters() {
  subset_seq_timing_info_present_flag
  if(subset_seq_timing_info_present_flag) {
    subset_seq_num_units_in_tick
    subset_seq_time_scale
    subset_seq_fixed_frame_rate_flag
  }
  subset_seq_vui_pic_struct_present_flag
  subset_seq_chroma_loc_info_present_flag
  if(chroma_loc_info_present_flag) {
    subset_seq_sample_loc_type_top_field
    subset_seq_sample_loc_type_bottom_field
  }
  subset_seq_vui_nal_hrd_parameters_present_flag
  if(subset_seq_vui_nal_hrd_parameters_present_flag)
    hrd_parameters()
  subset_seq_vui_vcl_hrd_parameters_present_flag
    if(subset_seq_vui_vcl_hrd_parameters_present_flag)
      hrd_parameters()
  if(subset_seq_vui_nal_hrd_parameters_present_flag ||
      subset_seq_vui_vcl_hrd_parameters_present_flag)
    subset_seq_vui_low_delay_hrd_flag
  video_src_info_present_flag
  if(video_src_info_present_flag) {
    src_pic_width_in_mbs_minus1
    src_pic_height_in_mbs_minus1
    src_aspect_ratio_info_present_flag
    if(src_aspect_ratio_info_present_flag) {
      src_aspect_ratio_idc
      if(aspect_ratio_idc==Extended_SAR) {
        sar_width
        sar_height
      }
    }
}
```

FIG. 98

```
nesting_sei_rbsp() {
    nesting_type=mvc, 3dv, user defined etc
    all_view_components_in_au_flag
    if(!all_view_components_in_au_flag) {
        num_view_components_minus1
        for(i=0; i<=num_view_components_minus1; i++) {
            nesting_sei_view_id[i]
        }
    }
    do
        sei_message()
    while(more_rbsp_data())
        rbsp_trailing_bits()
}
```

ENCODING DEVICE, ENCODING METHOD, DECODING DEVICE, AND DECODING METHOD

TECHNICAL FIELD

The present technology relates to an encoding device, an encoding method, a decoding device, and a decoding method, and more particularly, to an encoding device, an encoding method, a decoding device, and a decoding method capable of encoding and decoding multi-viewpoint images in accordance with a mode that is compatible with an existing mode.

BACKGROUND ART

Currently, as a 3D image viewing mode, generally, there is a mode (hereinafter, referred to as a two-viewpoint mode) in which two-viewpoint images alternately displayed are seen by wearing glasses of which a left-eye shutter is open at the time of displaying one image out of two-viewpoint images, and a right-eye shutter is open at the time of displaying the other image.

However, in such a two-viewpoint mode, a viewer needs to purchase glasses in addition to a 3D image display device, and accordingly, the viewer's willingness to buy reduces. In addition, since a viewer needs to wear glasses for viewing, it annoys the viewer. Accordingly, a demand for a viewing mode (hereinafter, referred to as a multi-viewpoint mode) increases in which a 3D image can be viewed without wearing glasses.

In the multi-viewpoint mode, multi-viewpoint images are displayed such that a viewable angle is different for each viewpoint, and, a 3D image can be seen by a viewer viewing images of arbitrary two viewpoints with left and right eyes without wearing glasses.

A display device that provides viewing of a multi-viewpoint mode, for example, generates multi-viewpoint images for a multi-viewpoint mode based on images of two viewpoints for a two-viewpoint mode and displays the generated multi-viewpoint images. More specifically, the display device acquires parallax (depth) of two-viewpoint images for a two-viewpoint mode using an image parallax estimating technology (Depth Estimation). Then, the display device generates a synthesized image of multi-viewpoint images adjacent to a viewpoint corresponding to the images of two viewpoints for a two-viewpoint mode using a multi-viewpoint image generating technology (View Generation) using the parallax between images of two viewpoints and a synthesis technology (View Synthesis) and displays the synthesized image.

Existing encoding modes include an advanced video coding (AVC) mode and a multi-view video coding (MVC) mode.

FIG. 1 is a diagram that illustrates an example of an encoding device that encodes two-viewpoint images in the MVC mode and multiplexes the encoded images.

The encoding device 10 illustrated in FIG. 1 is configured by an imaging unit 11A, an imaging unit 11B, an MVC encoder 12, and a multiplexing unit 13.

The imaging unit 11A captures an image A of a predetermined viewpoint and supplies the captured image to the MVC encoder 12. In addition, the imaging unit 11B captures an image B of a viewpoint that is different from that of the image A and supplies the captured image to the MVC encoder 12. The MVC encoder 12 performs encoding in accordance with the MVC mode with the image A supplied from the imaging unit 11A set as a base image and the image B supplied from the imaging unit 11B set as a dependent image. The MVC encoder 12 supplies the images A and B after the encoding to the multiplexing unit 13. The multiplexing unit 13 generates a first TS (transport stream) (hereinafter, referred to as TS1) based on the image A after the encoding, generates a second TS (hereinafter, referred to as TS2) based on the image B after the encoding, and multiplexes the TS1 and TS2.

The multiplexed TS1 and TS2 are separated by a decoding device, and the images A and B after the encoding are decoded in accordance with a mode that corresponds to the MVC mode. Then, the images A and B that are acquired as a result of the decoding are alternately displayed. At this time, a viewer, for example, wears glasses of which the left-eye shutter is open at the time of displaying the image A and of which the right-eye shutter is open at the time of displaying the image B, views the image A only with the left eye, and views the image B only with the right eye. In this way, the viewer can see a 3D image. In a case where a 2D image is desired to be displayed, only the image A is displayed.

Meanwhile, a mode for encoding a multi-viewpoint image has also been devised (for example, see Patent Document 1).

CITATION LIST

Patent Document

Patent Document 1: Japanese Patent Application Laid-Open No. 2008-182669

SUMMARY OF THE INVENTION

Problems to be Solved by the Invention

However, a mode, which encodes and decodes multi-viewpoint images, having compatibility with an existing mode for images of two viewpoints or less has not been considered.

The present technology has been contrived in view of such situations and enables encoding and decoding multi-viewpoint images according to a mode that is compatible with an existing mode.

Solutions to Problems

An encoding device according to a first aspect of the present technology includes: a compatible image encoding unit that generates a first encoded stream by designating a compatible image from among multi-viewpoint images and encoding the designated compatible image in units of access units; an auxiliary image encoding unit that generates a second encoded stream by encoding auxiliary images used when multi-viewpoint images are generated from the compatible image in units of the access units; a setting unit that sets boundary information representing a boundary of a unit; and a transmission unit that transmits the first encoded stream generated by the compatible image encoding unit, the boundary information set by the setting unit, and the second encoded stream encoded by the auxiliary image encoding unit.

An encoding method according to the first aspect of the present technology corresponds to the encoding device according to the first aspect of the present technology.

In the first aspect of the present technology, a first encoded stream is generated by designating a compatible image from among multi-viewpoint images and encoding the designated compatible image in units of access units, a second encoded stream is generated by encoding auxiliary images used when multi-viewpoint images are generated from the compatible image in units of the access units, boundary information representing a boundary of a unit is set, and the first encoded stream, the boundary information, and the second encoded stream are transmitted.

A decoding device according to a second aspect of the present technology includes: a separation unit that receives a first encoded stream that is acquired as a result of encoding a compatible image designated from multi-viewpoint images in units of access units, boundary information that represents a boundary of a unit, and a second encoded stream that is acquired as a result of encoding auxiliary images used at the time of generating the multi-viewpoint images from the compatible image in units of access units and separates the first encoded stream and the second encoded stream based on the boundary information; a compatible image decoding unit that decodes the first encoded stream separated by the separation unit; and an auxiliary image decoding unit that decodes the second encoded stream separated by the separation unit.

A decoding method according to the second aspect of the present technology corresponds to the decoding device according to the second aspect of the present technology.

In the second aspect of the present technology, a first encoded stream that is acquired as a result of encoding a compatible image designated from multi-viewpoint images in units of access units, boundary information that represents a boundary of a unit, and a second encoded stream that is acquired as a result of encoding auxiliary images used at the time of generating the multi-viewpoint images from the compatible image in units of access units are received, the first encoded stream and the second encoded stream are separated based on the boundary information; the separated first encoded stream is decoded, and the separated second encoded stream is decoded.

In addition, the encoding device according to the first aspect and the decoding device according to the second aspect may be realized by causing a computer to execute a program.

Furthermore, the program that is executed by a computer so as to realize the encoding device according to the first aspect and the decoding device according to the second aspect may be provided while being transmitted through a transmission medium or being recorded on a recording medium.

Effects of the Invention

According to the first aspect of the present technology, multi-viewpoint images can be encoded in a mode having compatibility with an existing mode.

In addition, according to the second aspect of the present technology, multi-viewpoint images that have been encoded in a mode having compatibility with an existing mode can be decoded.

BRIEF DESCRIPTION OF DRAWINGS

FIG. 42 is a diagram that illustrates a configuration example of SEI according to a 3DV mode.

FIG. 43 is a diagram that illustrates an example of the description of parallax information.

FIG. 61 is a diagram that illustrates an example of the description of parallax information.

FIG. 63 is a diagram that illustrates an example of the description of compatibility information and parallax image information.

FIG. 64 is a diagram that illustrates an example of detailed description of the parallax image information illustrated in FIG. 63.

FIG. 65 is a diagram that illustrates an example of the description of compatibility information and parallax image information included in an auxiliary stream.

FIG. 66 is a diagram that illustrates an example of the detailed description of the parallax image information illustrated in FIG. 65.

FIG. 77 is a diagram that illustrates features of the effect of multiplexing.

FIG. 86 is a diagram that illustrates an example of the description of Subset SPS according to a 3DV mode for a parallax image illustrated in FIG. 85.

FIG. 87 is a diagram that illustrates an example of the description of extension information for a parallax image that is illustrated in FIG. 86.

FIG. 88 is a diagram that illustrates an example of the description of VUI extension information for a parallax image illustrated in FIG. 86.

FIG. 89 is a diagram that illustrates an example of the description of an NAL header of encoded data according to the 3DV mode.

FIG. 90 is a diagram that illustrates an example of the description of parallax image header extension information illustrated in FIG. 89.

FIG. 91 is a diagram that illustrates an example of the description of SEI according to the 3DV mode that is illustrated in FIG. 85.

FIG. 93 is a diagram that illustrates an example of the description of Subset SPS according to the 3DV mode for an image that is illustrated in FIG. 92.

FIG. 95 is a diagram that illustrates an example of the description of an SPS illustrated in FIG. 94.

FIG. 96 is a diagram that illustrates an example of the description of the Subset SPS illustrated in FIG. 95.

FIG. 97 is a diagram that illustrates an example of the description of VUI information of the Subset SPS illustrated in FIG. 96.

FIG. 98 is a diagram that illustrates an example of the description of SEI according to the 3DV mode that is illustrated in FIG. 94.

MODE FOR CARRYING OUT THE INVENTION

First Embodiment

[Configuration Example of Encoding Device According to Embodiment]

Figure 1:
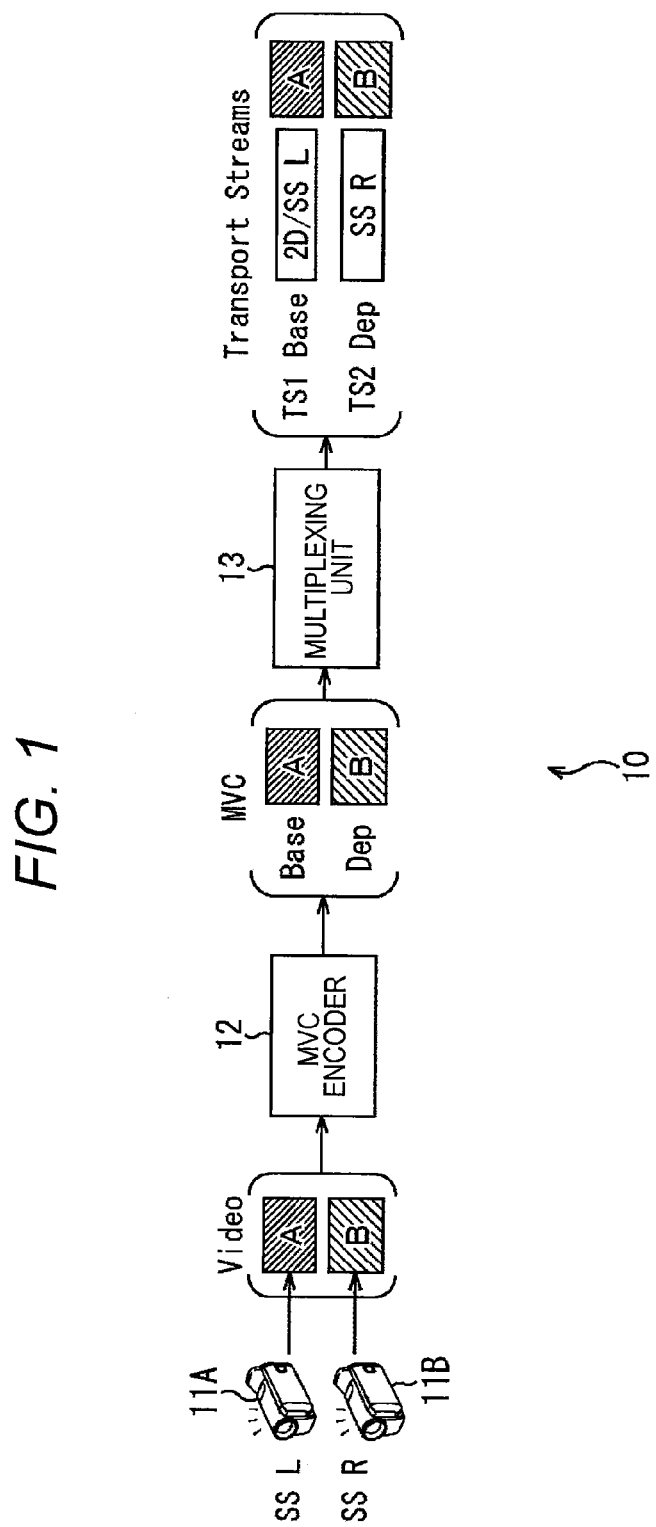
FIG. 1 is a diagram that illustrates an example of a conventional encoding device.
Figure 2:
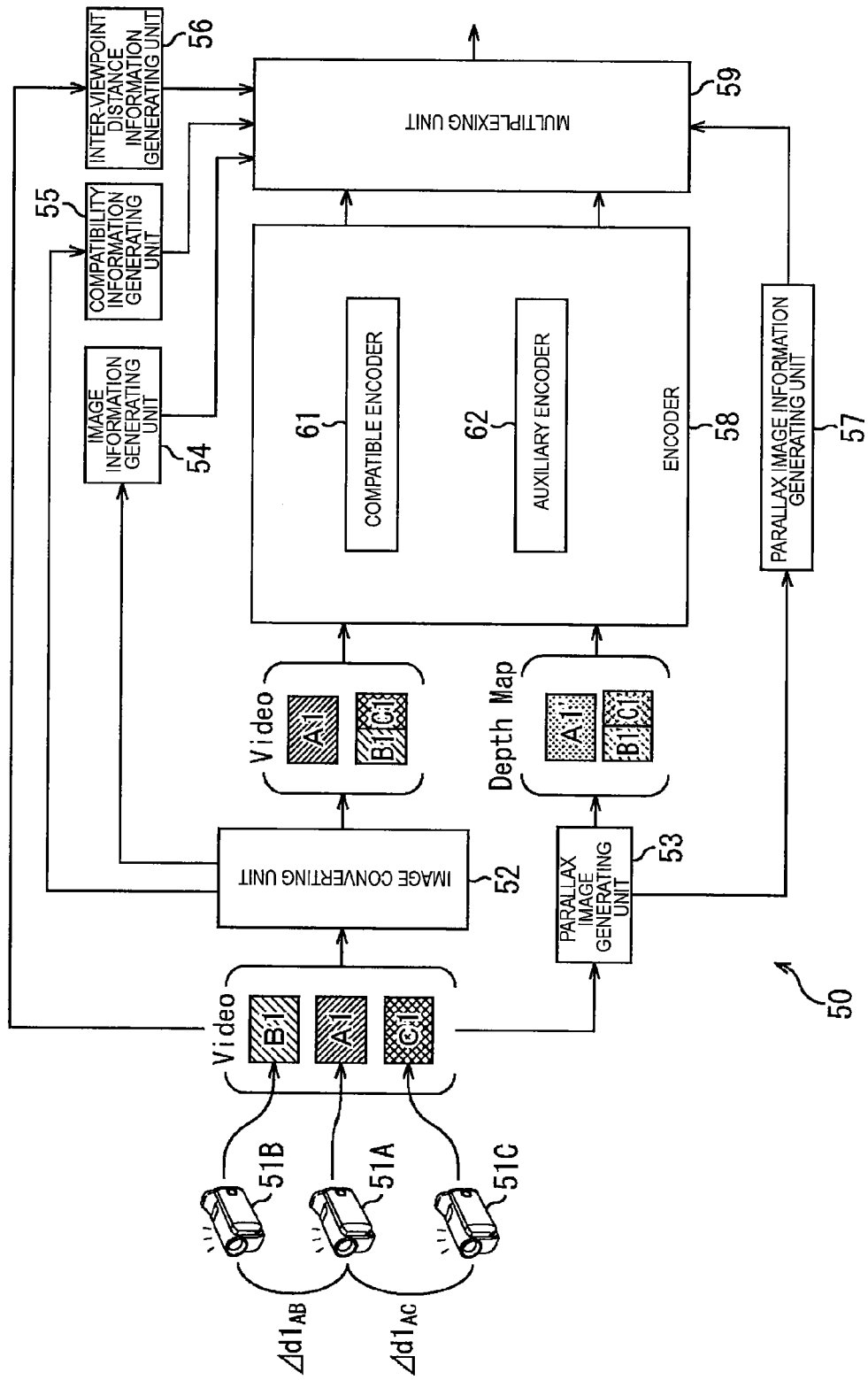
FIG. 2 is a block diagram that illustrates a configuration example of an encoding device according to a first embodiment of the present technology.

FIG. 2 is a block diagram that illustrates a configuration example of an encoding device according to a first embodiment of the present technology.

The encoding device 50 illustrated in FIG. 2 is configured by imaging units 51A to 51C, an image converting unit 52, a parallax image generating unit 53, an image information generating unit 54, a compatibility information generating unit 55, an inter-viewpoint distance information generating unit 56, a parallax image information generating unit 57, an encoder 58, and a multiplexing unit 59.

The encoding device 50 independently generates TSs by performing encoding with an image of one viewpoint out of multi-viewpoint images used as a 2D image in accordance with an existing encoding mode, thereby securing the compatibility with an existing encoding device that encodes a 2D image.

Hereinafter, out of multi-viewpoint images, an image that is encoded in an existing encoding mode so as to secure the compatibility with an existing encoding device will be referred to as a compatible image, and an image that is used for generating images of viewpoints more than the number of viewpoints of a compatible image using the compatible image will be referred to as an auxiliary image.

In the encoding device 50, the imaging unit 51A captures an HD (high definition) image of a predetermined viewpoint as an image A1 and supplies the captured image to the image converting unit 52, the parallax image generating unit 53, and the inter-viewpoint distance information generating unit 56. The imaging unit 51B captures an HD image of a viewpoint that is different from the viewpoint of the image A1 as an image B1 at a position that is separate from the imaging unit 51A by a distance $\Delta d1_{AB}$ in a horizontal direction, which has the same distance to a subject in the depth direction, and supplies the captured image to the image converting unit 52, the parallax image generating unit 53, and the inter-viewpoint distance information generating unit 56. The imaging unit 51C captures an HD image of a viewpoint different from the viewpoints of the images A1 and B1 as an image C1 at a position separate from the imaging unit 51A by a distance $\Delta d1_{AC}$ in the horizontal direction that is opposite to the imaging unit 51B and supplies the captured image to the image converting unit 52, the parallax image generating unit 53, and the inter-viewpoint distance information generating unit 56.

The viewpoints that correspond to the images B1 and C1 are viewpoints that are located on the outer side out of viewpoints of images that can be recognized as 3D images. In this way, a decoding device that corresponds to the encoding device 50 can generate multi-viewpoint images by interpolating images of viewpoints located on the further inner side than the viewpoints of the images B1 and C1 by using the images A1 to C1. As a result, the multi-viewpoint images can be generated with precision that is higher than that of a case where images of viewpoints located on the outer side are interpolated using images of viewpoints located on the inner side. The distances $\Delta d1_{AB}$ and $\Delta d1_{AC}$ may be configured to be either fixed or changed each time.

The image converting unit 52 determines the image A1, which is supplied from the imaging unit 51A of which the position in the horizontal direction is located on the inner side out of the imaging units 51A to 51C, as a compatible image. The image converting unit 52 supplies information that designates the image A1 as a compatible image to the compatibility information generating unit 55. Then, the image converting unit 52 directly supplies the image A1 that is the compatible image to the encoder 58.

In addition, the image converting unit 52 sets the images B1 and C1 other than the image A1 as auxiliary images and multiplexes the images B1 and C1 in accordance with a predetermined multiplexing mode. More specifically, for example, in a case where the multiplexing mode is a side-by-side mode, the image converting unit 52 halves the resolution of each one of the images B1 and C1. Then, the image converting unit 52 multiplexes the image B1 (hereinafter, referred to as a half-resolution image B1) of which the resolution has halved and the image C1 (hereinafter, referred to as a half-resolution image C1) of which the resolution has halved such that the half-resolution image B1 becomes a left-half image of the screen, and the half-resolution image C1 becomes a right-half image of the screen. The image converting unit 52 supplies a multiplexed image that is acquired as a result of the multiplexing process to the encoder 58 and supplies information that represents a multiplexing mode of the auxiliary images to the image information generating unit 54.

The parallax image generating unit 53 detects the disparity of each pixel of the images A1 to C1 using the images A1 to C1 that are supplied from the imaging units 51A to 51C. The parallax image generating unit 53 generates a parallax image A1' that represents the disparity of each pixel of the image A1 that is a compatible image and directly supplies the generated parallax image to the encoder 58. In addition, the parallax image generating unit 53 generates a parallax image B1' that represents the disparity of each pixel of the image B1 that is an auxiliary image and a parallax image C1' that represents the disparity of each pixel of the image C1 that is an auxiliary image and multiplexes the generated parallax images in accordance with a predetermined multiplexing mode. The parallax image generating unit 53 supplies a multiplexed image that is acquired as a result of the multiplexing process to the encoder 58. In addition, the parallax image generating unit 53 supplies information that represents the multiplexing mode of the parallax images of the auxiliary images to the parallax image information generating unit 57.

The image information generating unit 54 generates information that represents the multiplexing mode of the auxiliary images and the like as image information, which is information relating to a compatible image and auxiliary images, based on the information that is supplied from the image converting unit 52 and supplies the generated image information to the multiplexing unit 59.

The compatibility information generating unit 55 generates information designating the compatible image, a compatible mode, and the like as compatibility information, which is information relating to the compatibility, based on the information supplied from the image converting unit 52 and supplies the generated compatibility information to the multiplexing unit 59.

Here, the compatible mode is a mode that represents a method of encoding the compatible image. As examples of the compatible mode, there are a mono mode that represents an encoding method in which a compatible image of one viewpoint is encoded in accordance with the AVC mode, a frame packing mode that represents an encoding method in which compatible images of two viewpoints are multiplexed and encoded in accordance with the AVC mode, and a stereo mode that represents an encoding method in which compatible images of two viewpoints are encoded in accordance with the MVC mode.

The inter-viewpoint distance information generating unit 56 detects each inter-viewpoint distance (hereinafter, referred to as an inter-viewpoint distance) between two images out of the images A1 to C1 using the images A1 to C1 that are supplied from the imaging units 51A to 51C. For example, the inter-viewpoint distance information generating unit 56 detects the distance $\Delta d1_{AB}$ between the imaging units 51A and 51B in the horizontal direction and the distance $\Delta d1_{AC}$ between the imaging units 51A and 51C in the horizontal direction as inter-viewpoint distances. The inter-viewpoint distance information generating unit 56 generates information that represents the inter-viewpoint distances and the like as inter-viewpoint distance information, which is information relating to the inter-viewpoint distance information, and supplies the generated inter-viewpoint distance information to the multiplexing unit 59.

The parallax image information generating unit 57 generates information that represents the multiplexing mode of the parallax images of the auxiliary images and the like as parallax image information, which is information relating to the parallax images, based on the information that is supplied from the parallax image generating unit 53 and supplies the generated parallax image information to the multiplexing unit 59.

The encoder 58 is configured by a compatible encoder 61 and an auxiliary encoder 62. The compatible encoder 61 (compatible image encoding unit) designates the image A1 that is the compatible image from the multiplexed image of the compatible image and the auxiliary images supplied from the image converting unit 52 and encodes the image A1 in units of access units in accordance with the existing AVC mode. The compatible encoder 61 supplies an encoded stream that is acquired as a result thereof to the multiplexing unit 59 as a compatible stream (first encoded stream).

The auxiliary encoder 62 (auxiliary image encoding unit) encodes the multiplexed image of the auxiliary images that is supplied from the image converting unit 52 and the multiplexed images of the parallax images A1' of the compatible images and the parallax images of the auxiliary images that are supplied from the parallax image generating unit 53 in units of access units in accordance with a predetermined mode. The auxiliary encoder 62 supplies encoded streams (a second encoded stream, a first parallax encoded stream, and a second parallax encoded stream) acquired as a result thereof to the multiplexing unit 59 as auxiliary streams. As an encoding mode employed by the auxiliary encoder 62, the AVC mode, the MVC mode, an MPEG2 (Moving Picture Experts Group phase 2), or the like can be used.

The multiplexing unit 59 (a setting unit and a transmission unit) generates a TS using the compatible stream supplied from the compatible encoder 61, the auxiliary streams supplied from the auxiliary encoder 62, the image information supplied from the image information generating unit 54, the compatibility information supplied from compatibility information generating unit 55, the inter-viewpoint distance information supplied from the inter-viewpoint distance information generating unit 56, the parallax image information supplied from the parallax image information generating unit 57, and the like. The multiplexing unit 59 multiplexes the generated TS and transmits a multiplexed stream that is acquired as a result thereof.

Hereinafter, the image information, the compatibility information, the inter-viewpoint distance information, and the parallax image information will be collectively referred to as auxiliary information.

[Configuration Example of TS]

Figure 3:
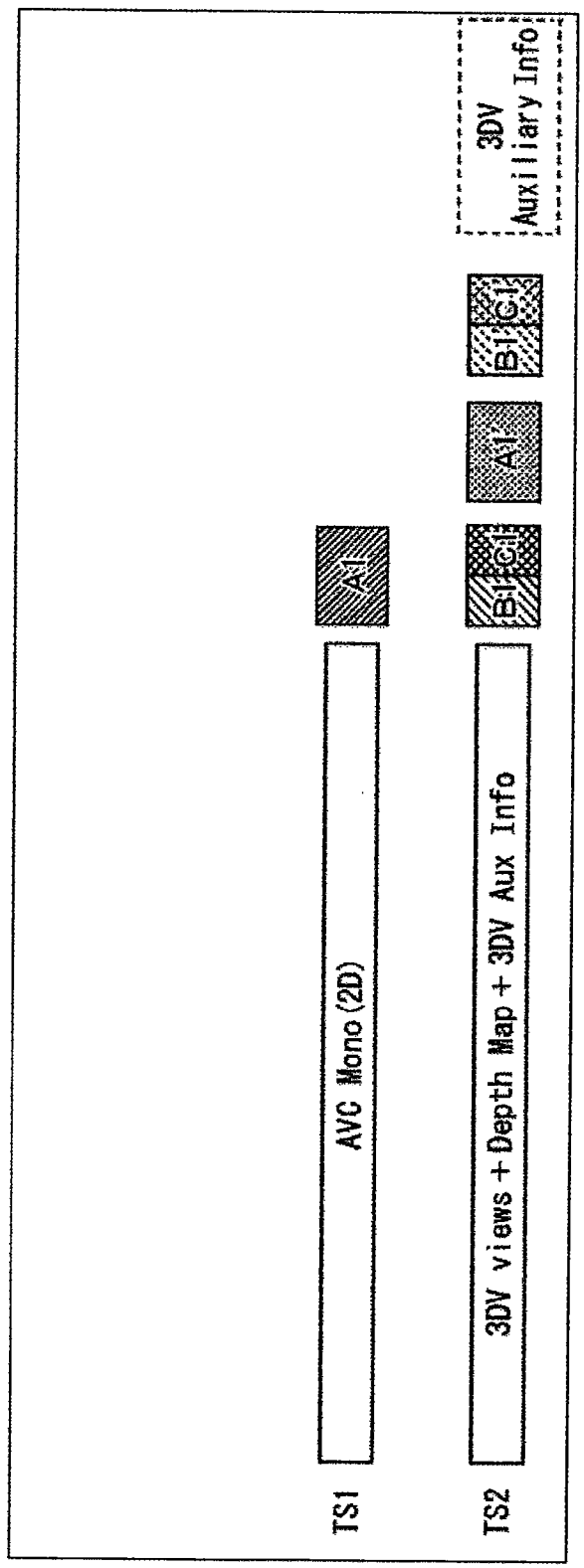
FIG. 3 is a diagram that illustrates a configuration example of a TSs that are generated by a multiplexing unit illustrated in FIG. 2.

FIG. 3 is a diagram that illustrates a configuration example of the TSs that are generated by the multiplexing unit 59 illustrated in FIG. 2.

In the example illustrated in FIG. 3, a TS1 is generated from the compatible stream by the multiplexing unit 59. In addition, a TS2 is generated from the auxiliary stream that includes the multiplexed image of the encoded auxiliary images, the parallax image A' of the compatible image, and the multiplexed image of the parallax images of the auxiliary images and the auxiliary information.

In the example illustrated in FIG. 3, since the compatible stream and the stream other than the compatible stream are stored in TSs different from each other, the amount of the information of the compatible stream does not need to be reduced. Accordingly, the image quality of the compatible image can be configured to be equal to the image quality of the 2D image that is encoded in accordance with the existing AVC method.

Figure 4:
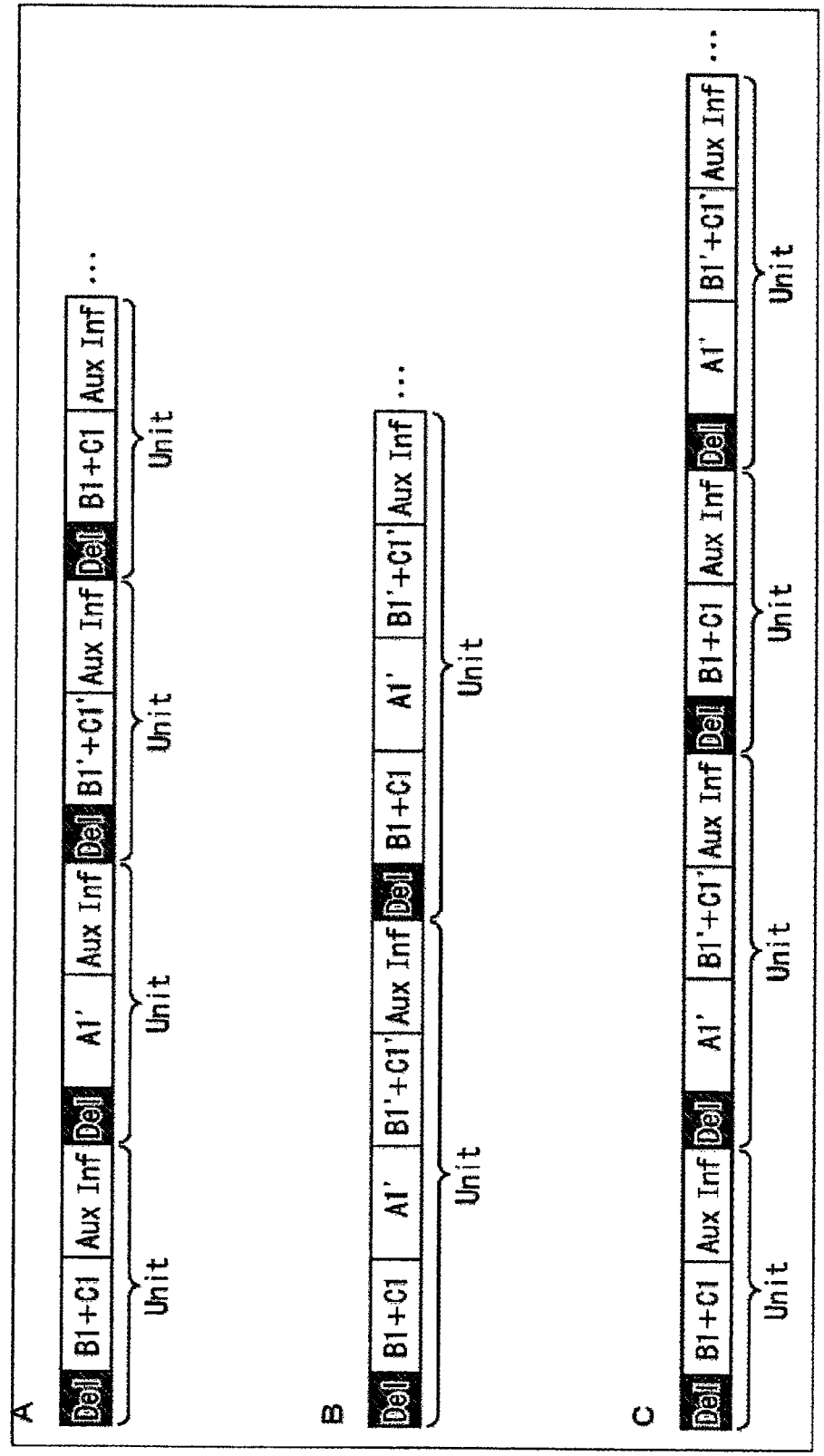
FIG. 4 is a diagram that illustrates a detailed configuration example of a TS2 illustrated in FIG. 3.

FIG. 4 is a diagram that illustrates a detailed configuration example of the TS2 illustrated in FIG. 3.

As illustrated in A of FIG. 4 to C of FIG. 4, in the TS2 illustrated in FIG. 3, data is arranged in units of units, and, at the head of each unit, a delimiter (Del) (boundary information) that represents the separation (boundary) of the unit is inserted.

In the example illustrated in A of FIG. 4, a multiplexed image (B1+C1) of encoded auxiliary images and auxiliary information (Aux Inf) of the multiplexed image of the auxiliary images, a parallax image (A1') of an encoded compatible image and auxiliary information of the parallax image of the compatible image, or a multiplexed image (B1'+C1') of parallax images of encoded auxiliary images and auxiliary information of the multiplexed image of the parallax images of the auxiliary images arranged in units of access units that are decoding units are arranged in each unit as data.

In such a case, a decoding device that receives the TS2 can independently extract the multiplexed image of the encoded auxiliary images, the parallax image of the compatible image, and the multiplexed image of the parallax images of the auxiliary images, which are arranged in units of access units, by extracting data in units of the units. As a result, for example, in a case where the decoding device generates multi-viewpoint images using only the compatible image and the parallax image of the compatible image, images that are used for generating multi-viewpoint images can be easily extracted. In addition, since each image of the multiplexed image of the auxiliary images, the parallax image of the compatible image, and the multiplexed image of the parallax images of the auxiliary images and the auxiliary information of the image are arranged in the same unit, an image that is arranged in each unit can be independently processed in an easy manner.

In the example illustrated in B of FIG. 4, a multiplexed image of encoded auxiliary images, a parallax image of a compatible image, a multiplexed image of parallax images of the auxiliary images, and auxiliary information, which are arranged in units of access units, are arranged altogether in each unit. In such a case, a decoding device that receives the TS2 can extract the multiplexed image of the encoded auxiliary images, the parallax image of the compatible image, the multiplexed image of the parallax images of the auxiliary images, and the auxiliary information, which are arranged in units of access units, altogether by extracting data in units of units.

In the example illustrated in C of FIG. 4, a multiplexed image of encoded auxiliary images and auxiliary information of the multiplexed image of the auxiliary images or a parallax image of an encoded compatible image, a multiplexed image of parallax images of the auxiliary images, and auxiliary information of the parallax image of the compatible image and the parallax image of the auxiliary images, which are arranged in units of access units, are arranged in each unit.

In such a case, the decoding device that receives the TS2 can independently extract the multiplexed image of the encoded auxiliary images, the parallax image of the compatible image, and the multiplexed image of the parallax images of the auxiliary images, which are arranged in units of access units, by extracting data in units of the units. As a result, for example, in a case where the decoder for the image and the decoder for the parallax image are separately prepared in the decoding device, data can be efficiently supplied to each decoder Furthermore, an image and a parallax image can be independently processed by the decoding device in an easy manner.

[Description of Multiplexing Method]

Figure 5:
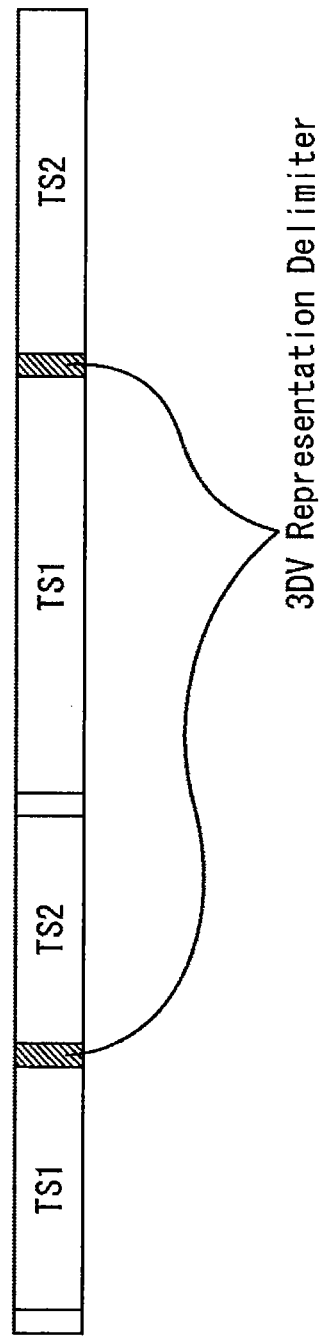
FIG. 5 is a diagram that illustrates an example of a method of multiplexing the TS1 and TS2.

FIG. 5 is a diagram that illustrates an example of the method of multiplexing the TS1 and the TS2.

As illustrated in FIG. 5, the TS1 and TS2 are multiplexed by being arranged from the head in order of the TS2 and the TS1 in units of access units. In addition, a 3DV representation delimiter (boundary information) representing the head of the TS that includes information other than a compatible stream is set and added to the head of the TS2. In other words, the 3DV representation delimiter is arranged on the boundary between a TS2 of a specific access unit and a TS1 of the previous access unit. Accordingly, a decoding device that corresponds to the encoding device 50 can easily recognize a compatible stream, and an auxiliary stream and an auxiliary image synchronized therewith by extracting data from a specific 3DV representation delimiter to a next 3DV representation delimiter.

[Description of Process of Encoding Device]

Figure 6:
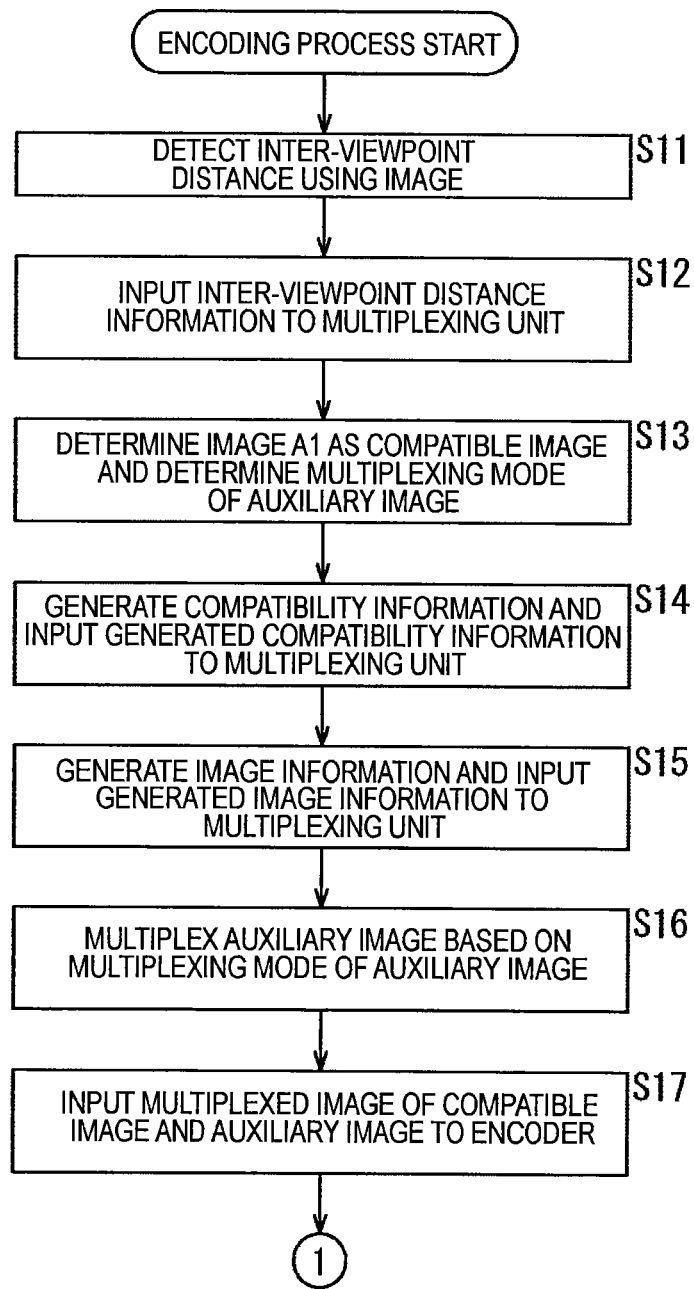
FIG. 6 is a flowchart that illustrates an encoding process performed by the encoding device illustrated in FIG. 2.
Figure 7:
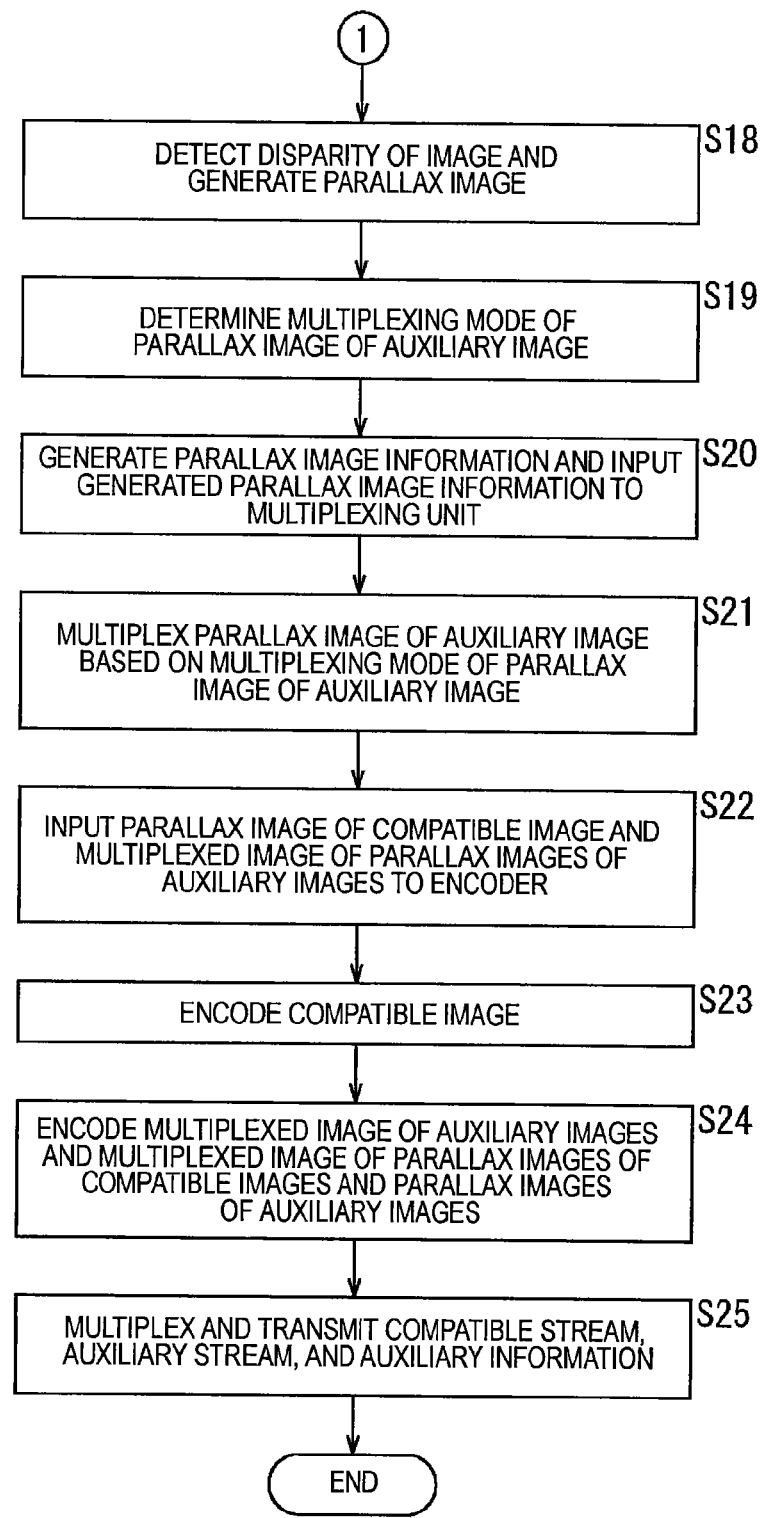
FIG. 7 is a flowchart that illustrates the encoding process performed by the encoding device illustrated in FIG. 2.

FIGS. 6 and 7 are flowcharts that illustrate an encoding process that is performed by the encoding device 50 illustrated in FIG. 2. This encoding process, for example, is started when the images A1 to C1 are output from the imaging units 51A to 51C.

In Step S11 illustrated in FIG. 6, the inter-viewpoint distance information generating unit 56 detects distances $\Delta d1_{AB}$ and $\Delta d1_{AC}$ as inter-viewpoint distances using the images A1 to C1 that are supplied from the imaging units 51A to 51C.

In Step S12, the inter-viewpoint distance information generating unit 56 generates information that represents the inter-viewpoint distances detected in Step S11 and the like as inter-viewpoint distance information and inputs the generated inter-viewpoint distance information to the multiplexing unit 59.

In Step S13, the image converting unit 52 determines the image A1 that is supplied from the imaging unit 51A, of which the position in the horizontal direction is located on the inner side out of the imaging units 51A to 51C, as a compatible image and determines a multiplexing mode of auxiliary images. The image converting unit 52 supplies information that designates the image A1 as a compatible image to the compatibility information generating unit 55 and supplies the multiplexing mode of the auxiliary images to the image information generating unit 54.

In Step S14, the compatibility information generating unit 55 generates the information designating the image A1 as a compatible image, a mono mode as a compatible mode, and the like as compatible information based on the information that is supplied from the image converting unit 52 and inputs the generated compatibility information to the multiplexing unit 59.

In Step S15, the image information generating unit 54 generates information that represents the multiplexing mode of auxiliary images and the like as image information based on the information that is supplied from the image converting unit 52 and inputs the generated image information to the multiplexing unit 59.

In Step S16, the image converting unit 52 sets images B1 and C1 other than the image A1 as auxiliary images and multiplexes the auxiliary images based on the multiplexing mode of auxiliary images that is determined in Step S13, thereby acquiring a multiplexed image of the auxiliary images.

In Step S17, the image converting unit 52 inputs the multiplexed image of the image A1, which is a compatible image, and the auxiliary image to the encoder 58.

In Step S18 illustrated in FIG. 7, the parallax image generating unit 53 detects the disparity of each pixel of the images A1 to C1 using the images A1 to C1 that are supplied from the imaging units 51A to 51C and generates parallax images A1' to C1'.

In Step S19, the parallax image generating unit 53 determines a multiplexing mode of the parallax images of auxiliary images and supplies information that represents the multiplexing mode to the parallax image information generating unit 57.

In Step S20, the parallax image information generating unit 57 generates information that represents the multiplexing mode of the parallax images of auxiliary images and the like as parallax image information based on the information that is supplied from the parallax image generating unit 53 and inputs the generated parallax image information to the multiplexing unit 59.

In Step S21, the parallax image generating unit 53 multiplexes the parallax images of the auxiliary images based on the multiplexing mode of the parallax images of the auxiliary images that is determined in Step S19, thereby acquiring a multiplexed image of the parallax images of the auxiliary images.

In Step S22, the parallax image generating unit 53 inputs the parallax image A1' of the compatible image and the multiplexed image of the parallax images of the auxiliary images to the encoder 58.

In Step S23, the compatible encoder 61 of the encoder 58 encodes the image A1 that is a compatible image supplied from the image converting unit 52 in accordance with the existing AVC mode and supplies an encoded stream acquired as a result thereof to the multiplexing unit 59 as a compatible stream.

In Step S24, the auxiliary encoder 62 encodes the multiplexed image of the auxiliary images that is supplied from the image converting unit 52, the parallax image A1' of the compatible image that is supplied from the parallax image generating unit 53, and the multiplexed image of the parallax images of the auxiliary images in accordance with a predetermined mode. The auxiliary encoder 62 supplies an encoded stream acquired as a result of the encoding process to the multiplexing unit 59 as an auxiliary stream.

In Step S25, the multiplexing unit 59 generates a TS1 from the compatible stream that is supplied from the compatible encoder 61, generates a TS2 from the auxiliary stream and the auxiliary information supplied from the auxiliary encoder 62, performs a multiplexing process, and transmits a multiplexed stream acquired as a result thereof. This multiplexed stream, for example, is recorded on a BD (Blu-Ray (registered trademark) Disc) or the like or is transmitted as a broadcast stream. Then, the process ends.

As above, since the encoding device 50 performs the multiplexing process with the compatible stream and the auxiliary stream and the auxiliary information being stored in TSs different from each another, the compatibility with an encoding device that encodes an existing 2D image in multiplexing can be secured. In other words, the encoding device 50 can perform a multiplexing process for multi-viewpoint images in accordance with a mode that has the compatibility with an existing mode.

In addition, since the encoding device 50 encodes an image of one viewpoint out of multi-viewpoint images as a compatible image in accordance with an existing encoding mode, the compatibility with an existing encoding device that encodes a 2D image in the encoding process can be secured. In other words, the encoding device 50 can perform encoding for multi-viewpoint images in accordance with a mode that has compatibility with an existing encoding mode.

Furthermore, since the encoding device 50 encodes the images A1 to C1 of three viewpoints, a decoding device that corresponds to the encoding device 50 can generate multi-viewpoint images from the images A1 to C1 of three viewpoints. In this way, according to the decoding device, compared to a case where multi-viewpoint images are generated from images of two viewpoints, the viewpoints of images that can be generated are not limited, and multi-viewpoint images having relatively high precision can be generated.

In addition, since the encoding device 50 encodes images with the resolution of the auxiliary images being lowered, the processing cost of the encoding process and the decoding process is lower than that of a case where encoding is performed without lowering the resolution. For example, in a case where auxiliary images of two viewpoints are encoded without lowering the resolution thereof, while the processing cost of the encoding process and the decoding process is the same as that of an encoding process and a decoding process for two HD images, the processing cost of the encoding process for auxiliary images of two viewpoints, which is performed by the encoding device 50, is the same as the processing cost of the encoding process or the decoding process for one HD image. As a result, it can be prevented that the performance of the decoding process performed by the decoding device greatly affects the image quality of multi-viewpoint images.

Furthermore, when multi-viewpoint images are synthesized, as will be described later, a decoding device that corresponds to the encoding device 50 lowers the resolution at the rate of the reciprocal of the number of viewpoints of the multi-viewpoint images, whereby the lowering of the resolution of the auxiliary images that is performed by the encoding device 50 does not affect the image quality of the multi-viewpoint images after the synthesis.

In addition, since the encoding device 50 performs encoding with the resolution of auxiliary images being halved and encodes the parallax images of the auxiliary images while being halved, the amount of information of an encoding target can be configured to be approximately an amount that corresponds to 4 HD images (1080i×4) in the AVC mode.

Here, in comprehensive view of the processing speed, the processing performance with respect to power consumption, a transmission data rate, a transmission bandwidth, a bandwidth of a memory, a memory access speed, and the like of a current display device that displays multi-viewpoint images and a decoding device according thereto, a value that is adequate as the amount of information that can be processed by the decoding device is considered to be about two times an amount that corresponds to an HD image in the current state of the MVC mode, that is, an amount that corresponds to 4 HD images in the AVC mode. Accordingly, a decoding device (decoding method) that corresponds to the encoding device 50 of which the amount of information of the encoding target is about an amount that corresponds to 4 HD images (1080i×4) in the AVC mode can be realized at a reasonable processing cost by a reasonable approach.

In addition, according to the encoding device 50, the amount of information of the encoding target is reduced to an amount that corresponds to about 4 HD images (1080i×4) in the AVC mode, and accordingly, the encoding device can be easily operated as a BD or a broadcast application that has a limitation of a usable bandwidth.

Furthermore, since the encoding device 50 generates parallax images and transmits the parallax images while being included in an encoded stream, a decoding device that corresponds to the encoding device 50 does not need to generate a parallax image for generating multi-viewpoint images, and accordingly, the processing load of the decoding device can be reduced. As a result, the manufacturing cost of the decoding device can be reduced. In addition, it can be prevented that the parallax detecting performance of the decoding device greatly affects the image quality of multi-viewpoint images.

[Configuration Example of Decoding Device]

Figure 8:
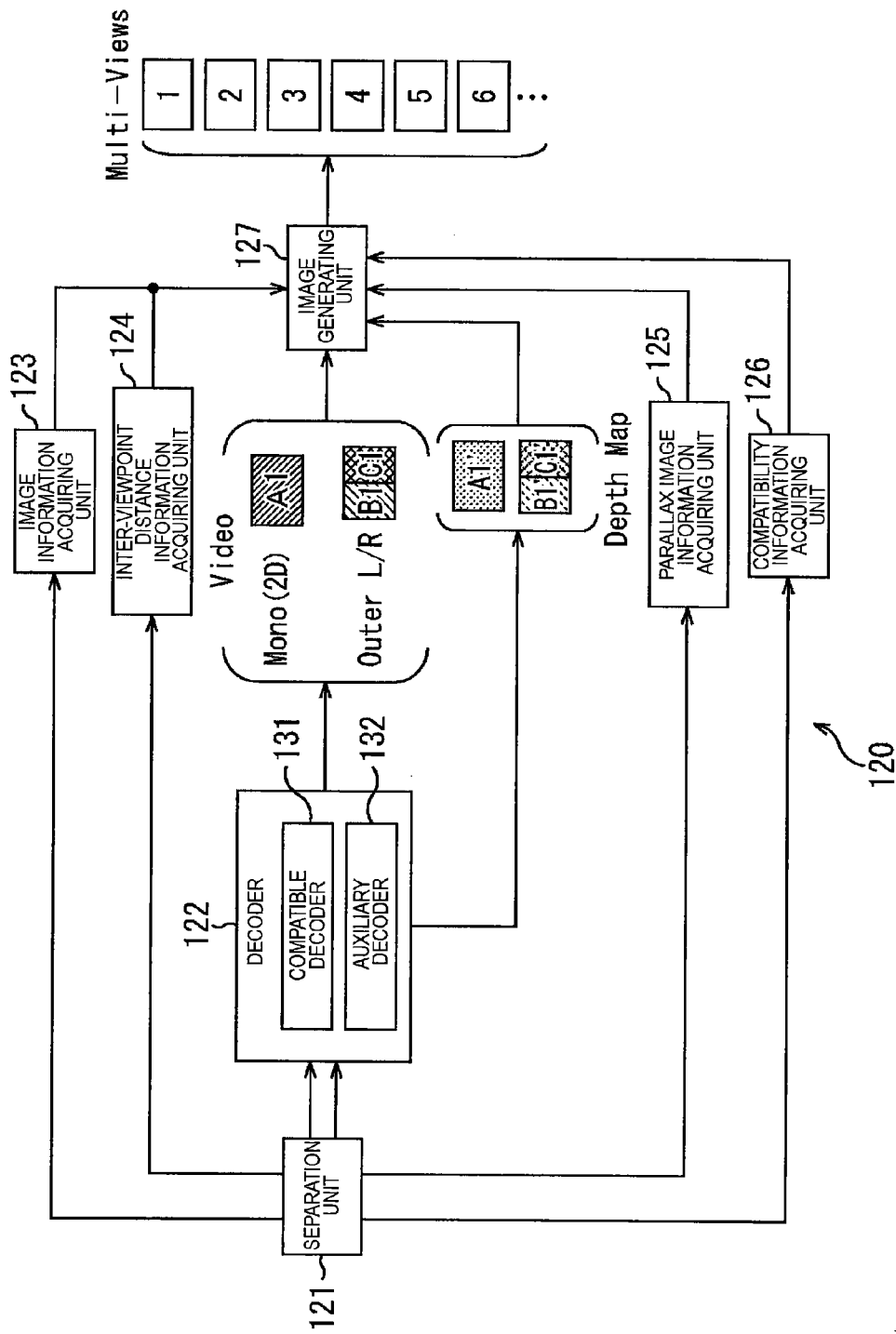
FIG. 8 is a diagram that illustrates a configuration example of a decoding device that corresponds to the encoding device illustrated in FIG. 2.

FIG. 8 is a diagram that illustrates a configuration example of a decoding device that decodes a multiplexed stream that is transmitted from the encoding device 50 illustrated in FIG. 2.

The decoding device 120 illustrated in FIG. 8 is configured by a separation unit 121, a decoder 122, an image information acquiring unit 123, an inter-viewpoint distance information acquiring unit 124, a parallax image information acquiring unit 125, a compatibility information acquiring unit 126, and an image generating unit 127. The decoding device 120 separates and decodes a multiplexed stream that is transmitted from the encoding device 50, generates an image of one viewpoint or multi-viewpoint images, and displays the generated image on a display device that is not illustrated in the figure.

More specifically, the separation unit 121 (separation unit) of the decoding device 120 receives a multiplexed stream that is transmitted from the encoding device 50 and separates each TS. The separation unit 121 extracts a compatible stream included in the TS and an auxiliary stream included in the TS and supplies extracted streams to the decoder 122. In addition, the separation unit 121 extracts auxiliary information included in the TS, supplies image information included in the auxiliary information to the image information acquiring unit 123, and supplies viewpoint distance information to the inter-viewpoint distance information acquiring unit 124. Furthermore, the separation unit 121 supplies parallax image information included in the auxiliary information to the parallax image information acquiring unit 125 and supplies compatibility information to the compatibility information acquiring unit 126.

The decoder 122 is configured by a compatible decoder 131 and an auxiliary decoder 132. The compatible decoder 131 (compatible image decoding unit) of the decoder 122 decodes a encoded compatible image that is included in the compatible stream supplied from the separation unit 121 in accordance with a mode that corresponds to the AVC mode and supplies the decoded compatible image to the image generating unit 127.

The auxiliary decoder 132 (auxiliary image decoding unit) decodes a multiplexed image of auxiliary images included in the auxiliary stream that is supplied from the separation unit 121, a parallax image of a compatible image, and a multiplexed image of parallax images of the auxiliary images in accordance with a mode that corresponds to the auxiliary encoder 62 illustrated in FIG. 2. The auxiliary decoder 132 supplies the multiplexed image of the auxiliary images, the parallax image A' of the compatible image, and the multiplexed image of the parallax images of the auxiliary images, which are acquired as a result of the decoding process, to the image generating unit 127.

The image information acquiring unit 123 acquires the image information that is supplied from the separation unit 121 and supplies the acquired image information to the image generating unit 127. The inter-viewpoint distance information acquiring unit 124 acquires the inter-viewpoint distance information that is supplied from the separation unit 121 and supplies the acquired inter-viewpoint distance information to the image generating unit 127.

The parallax image information acquiring unit 125 acquires the parallax image information that is supplied from the separation unit 121 and supplies the acquired parallax image information to the image generating unit 127. The compatibility information acquiring unit 126 acquires the compatibility information that is supplied from the separation unit 121 and supplies the acquired compatibility information to the image generating unit 127.

The image generating unit 127 outputs an image in accordance with an instruction supplied from a viewer and displays the image on a display device not illustrated in the figure. More specifically, the image generating unit 127 (generation unit) generates images of three or more viewpoints, which correspond to a display device not illustrated in the figure, each having the resolution that is a half of the resolution of the compatible image or the auxiliary image by using the compatible image, the multiplexed image of the auxiliary images, the parallax image of the compatible image, and the multiplexed image of the parallax images of the auxiliary images in accordance with a viewer's instruction for displaying a 3D image of multi-viewpoints based on the image information supplied from the image information acquiring unit 123, the inter-viewpoint distance information supplied from the inter-viewpoint distance information acquiring unit 124, the parallax image information supplied from the parallax image information acquiring unit 125, the compatibility information supplied from the compatibility information acquiring unit 126, and the like.

More specifically, the image generating unit 127 separates the parallax image of each auxiliary image from the multiplexed image of the parallax images of the auxiliary images based on the information that represents a multiplexing mode of the parallax images of the auxiliary images that is included in the parallax image information supplied from the parallax image information acquiring unit 125. In addition, the image generating unit 127 separates each auxiliary image from the multiplexed image of the auxiliary images based on the information that represents a multiplexing mode of auxiliary images that is included in the image information supplied from the image information acquiring unit 123.

Furthermore, the image generating unit 127 determines the position of each viewpoint of the multi-viewpoint images to be generated based on the inter-viewpoint distance information and the number of viewpoints that corresponds to a display device not illustrated in the figure. Then, the image generating unit 127 generates the image of each viewpoint of which the position is determined by using the compatible image, each auxiliary image, the parallax image of the compatible image, and the parallax image of each auxiliary images. Then, the image generating unit 127 converts the resolution of the generated image of each viewpoint into resolution that is "1/the number of viewpoints" of the resolution of the compatible image or the auxiliary image, synthesizes the images, and displays the synthesized image on a display device not illustrated in the figure.

At this time, the multi-viewpoint images after the synthesis are displayed such that the viewing angles are different for each viewpoint, and a viewer can view a 3D image without wearing glasses by seeing images of arbitrary two viewpoints with his left and right eyes.

In addition, the image generating unit 127 outputs the image A1 that is the compatible image supplied from the compatible decoder 131 of the decoder 122 in accordance with a viewer's instruction for displaying a 2D image, thereby displaying the image on a display device not illustrated in the figure. Accordingly, the viewer can view the 2D image.

[Description of Process of Decoding Device]

Figure 9:
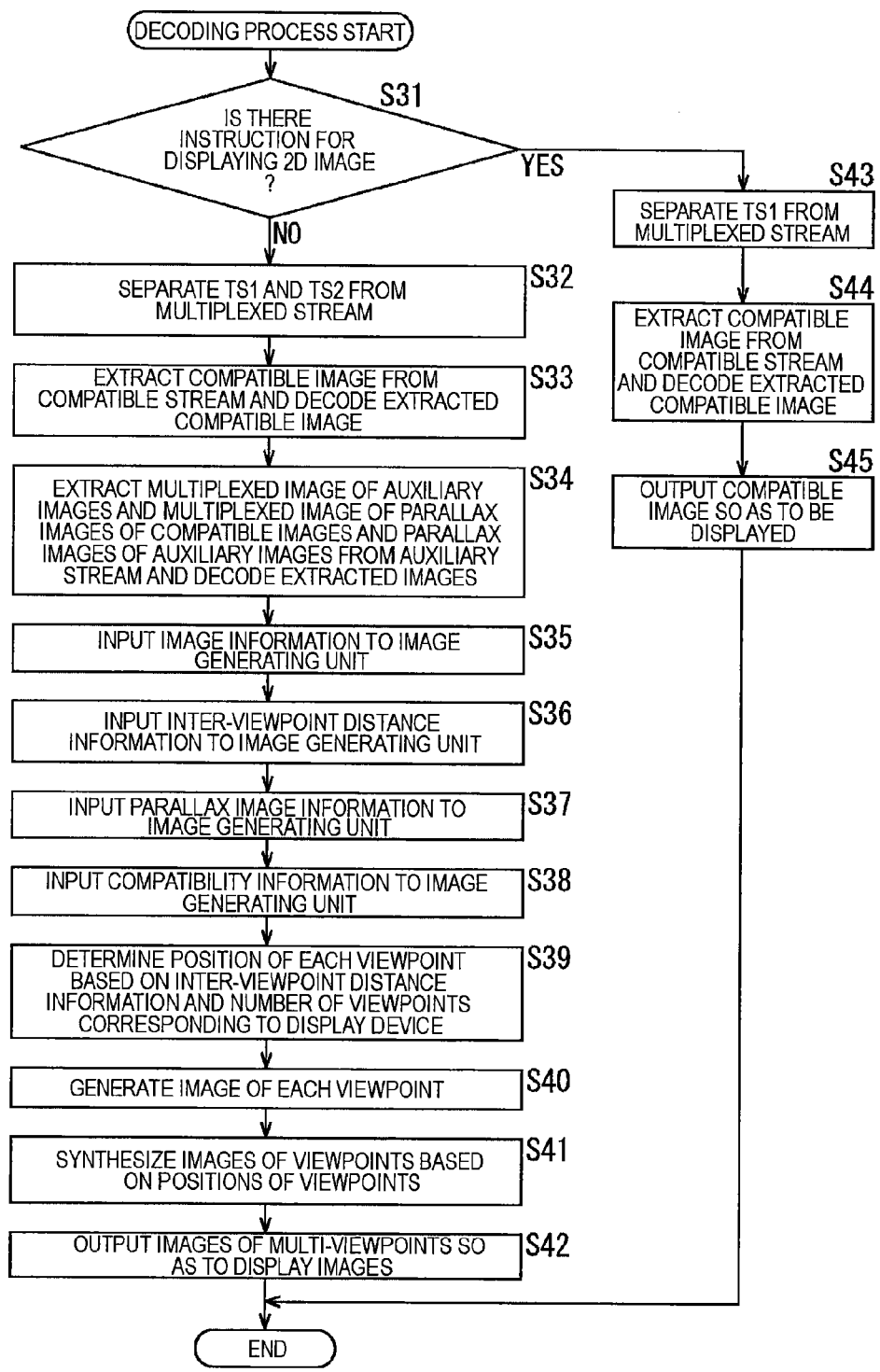
FIG. 9 is a flowchart that illustrates a decoding process performed by the decoding device illustrated in FIG. 8.

FIG. 9 is a flowchart that illustrates a decoding process performed by the decoding device 120 illustrated in FIG. 8. This decoding process, for example, is started when a multiplexed stream that is transmitted from the encoding device 50 illustrated in FIG. 2 is input to the decoding device 120.

In Step S31 illustrated in FIG. 9, the image generating unit 127 of the decoding device 120 determines whether or not an instruction for displaying a 2D image has been made by a viewer. In a case where it is determined that the instruction for displaying a 2D image has not been made by the viewer in Step S31, in other words, in a case where an instruction for displaying a 3D image of the multi-viewpoint mode has been made by the viewer, the process proceeds to Step S32.

In Step S32, the separation unit 121 receives the multiplexed stream that is transmitted from the encoding device 50 and separates TS1 and TS2 from the multiplexed stream. The separation unit 121 extracts a compatible stream included in the TS1 and an auxiliary stream included in the TS2 by referring a delimiter and the like and supplies the extracted streams to the decoder 122. In addition, the separation unit 121 extracts auxiliary information included in the TS2 by referring to the delimiter and the like, supplies image information that is included in the auxiliary information to the image information acquiring unit 123, and supplies viewpoint distance information to the inter-viewpoint distance information acquiring unit 124. In addition, the separation unit 121 supplies parallax image information that is included in the auxiliary information to the parallax image information acquiring unit 125 and supplies compatibility information to the compatibility information acquiring unit 126.

In Step S33, the compatible decoder 131 of the decoder 122 extracts an encoded compatible image from the compatible stream that is supplied from the separation unit 121 and decodes the compatible image in accordance with a mode that corresponds to the AVC mode. Then, the compatible decoder 131 supplies an image A1 that is acquired as a result of the decoding process to the image generating unit 127.

In Step S34, the auxiliary decoder 132 extracts an encoded multiplexed image of auxiliary images, a parallax image A' of the compatible image, and a multiplexed image of the parallax images of the auxiliary images from the auxiliary stream and decodes the extracted images in accordance with a mode that corresponds to the auxiliary encoder 62 illustrated in FIG. 2. The auxiliary decoder 132 supplies the multiplexed image of the auxiliary images, the parallax image A' of the compatible image, and the multiplexed image of the parallax images of the auxiliary images that are acquired as a result of the decoding process to the image generating unit 127.

In Step S35, the image information acquiring unit 123 acquires the image information that is supplied from the separation unit 121 and inputs the image information to the image generating unit 127. In Step S36, the inter-viewpoint distance information acquiring unit 124 acquires the inter-viewpoint distance information that is supplied from the separation unit 121 and inputs the inter-viewpoint distance information to the image generating unit 127.

In Step S37, the parallax image information acquiring unit 125 acquires the parallax image information that is supplied from the separation unit 121 and inputs the parallax image information to the image generating unit 127. In Step S38, the compatibility information acquiring unit 126 acquires the compatibility information that is supplied from the separation unit 121 and supplies the compatibility information to the image generating unit 127.

In Step S39, the image generating unit 127 determines the position of each viewpoint of a multi-viewpoint image to be generated based on the inter-viewpoint distance information supplied from the inter-viewpoint distance information acquiring unit 124 and the number of viewpoints that corresponds to a display device not illustrated in the figure. For example, in a case where an inter-viewpoint distance that is included in the inter-viewpoint distance information is short, the image generating unit 127 also determines the position of a viewpoint that is located on the outer side of the viewpoints of images B1 and C1 as the position of a viewpoint of the multi-viewpoint 3D image to be generated. On the other hand, in a case where the inter-viewpoint distance that is included in the inter-viewpoint distance information is long, the image generating unit 127 determines only positions of viewpoints located on the inner side of the images B1 and C1 as the positions of viewpoints of the multi-viewpoint 3D image to be generated.

In Step S40, the image generating unit 127 generates images of the viewpoints each having the resolution that is a half of the resolution of the compatible image or the auxiliary image based on the position of each viewpoint determined in Step S39, the image information supplied from the image information acquiring unit 123, the parallax image information supplied from the parallax image information acquiring unit 125, the compatibility information supplied from the compatibility information acquiring unit 126, and the like by using the compatible image, the multiplexed image of the auxiliary images, the parallax image of the compatible image, and the multiplexed image of the parallax images of the auxiliary images.

In Step S41, the image generating unit 127 converts the resolution of the image of each viewpoint that is generated in Step S40 into resolution that is "1/the number of viewpoints" of the resolution of the compatible image or the auxiliary image and synthesizes the images of each viewpoint after the conversion based on the positions of the viewpoints.

In Step S42, the image generating unit 127 outputs the multi-viewpoint image after the synthesis that is acquired by the process of Step S41 to a display device that is not illustrated in the figure, thereby displaying the multi-viewpoint image such that viewing angles are different for each viewpoint. Then, the process ends.

On the other hand, in a case where it is determined that an instruction for displaying a 2D image has been made by a viewer in Step S31, the separation unit 121 separates a TS1 from the multiplexed stream in Step S43. More specifically, the separation unit 121 acquires the TS1 other than a TS2, to which a 3DV representation delimiter NAL unit is added, from the multiplexed stream. Then, the separation unit 121 extracts a compatible stream that is included in the TS1 by referring to the delimiter and the like and supplies the extracted stream to the decoder 122.

In Step S44, the compatible decoder 131 of the decoder 122 extracts an encoded compatible image from the compatible stream that is supplied from the separation unit 121 and decodes the encoded compatible image in accordance with a mode that corresponds to the AVC mode. The compatible decoder 131 supplies an image A that is the compatible image acquired as a result of the decoding process to the image generating unit 127.

In Step S45, the image generating unit 127 outputs an image A1 that is a compatible image supplied from the compatible decoder 131 to a display device not illustrated in the figure, thereby displaying the image. Then, the process ends.

In a decoding device that can decode only a compatible stream that has compatibility with the decoding device 120, a TS2 to which the 3DV representation delimiter NAL unit is added is ignored, and the process of Steps S44 and S45 is performed.

As above, the decoding device 120 can separate a multiplexed stream that is multiplexed by the encoding device 50 in accordance with a mode that has compatibility with an existing mode. In addition, the decoding device 120 can decode a compatible stream and an auxiliary stream that are encoded in accordance with a mode, which has compatibility with an existing mode and requires relatively low process cost, by the encoding device 50.

Furthermore, since the decoding device 120 generates a multi-viewpoint image using a compatible image of one viewpoint and an auxiliary image of two viewpoints, the encoding device 50 may prepare only two imaging units 51B and 51C in addition to the existing imaging unit 51A that captures a compatible image of one viewpoint as imaging units that generate multi-viewpoint images. Accordingly, the installation of the imaging units for generating multi-viewpoint images can be performed in an easy manner at a low cost.

[Another Configuration Example of TS]

Figure 10:
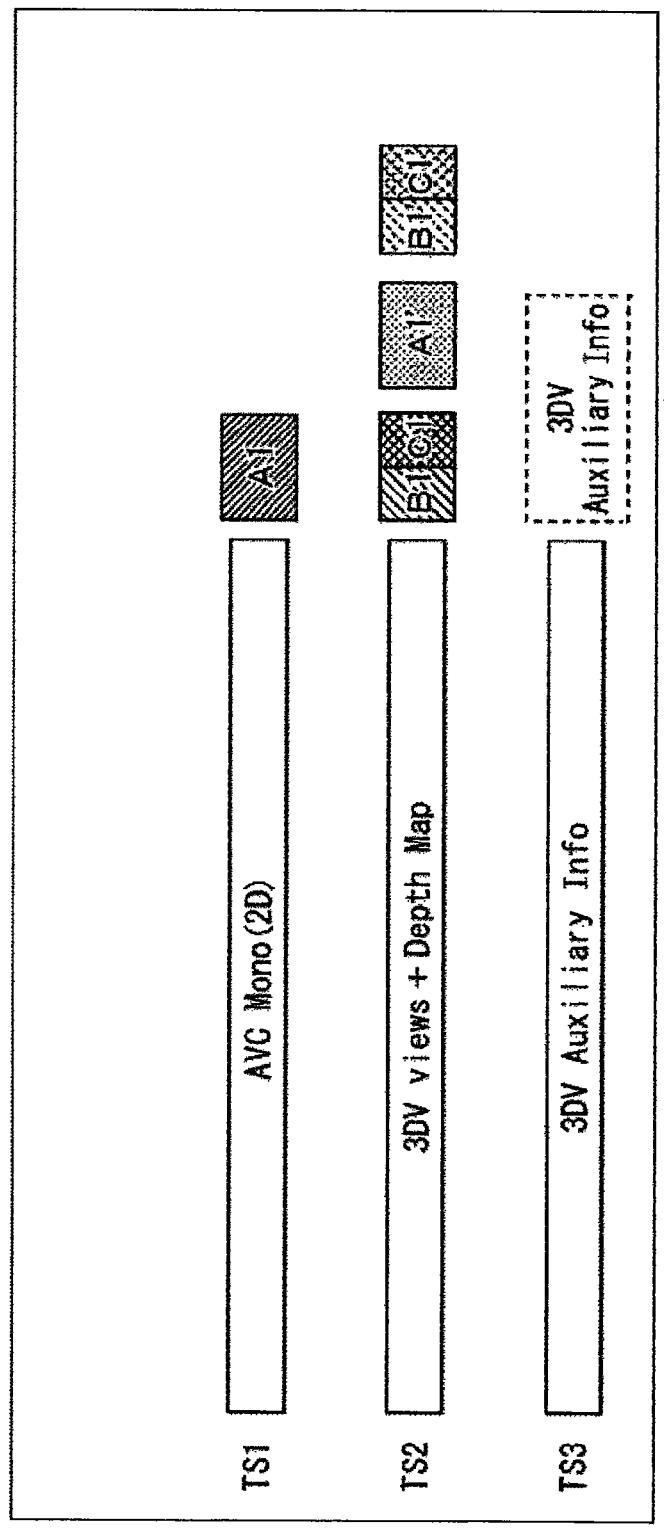
FIG. 10 is a diagram that illustrates another configuration example of the TSs that are generated by the multiplexing unit illustrated in FIG. 2.

FIG. 10 is a diagram that illustrates another configuration example of the TSs that are generated by the multiplexing unit 59 illustrated in FIG. 2.

In the example illustrated in FIG. 10, three TSs are generated by the multiplexing unit 59, and an auxiliary stream and auxiliary information are included in TSs that are different from each other. More specifically, a TS1 is generated from the compatible stream, a TS2 is generated from the auxiliary stream, and a TS3 is generated from the auxiliary information.

In the example illustrated in FIG. 10, the TS3 is independently generated only from the auxiliary information of which the amount of information is relatively small. Accordingly, a decoding device that executes an application, in which there is a limitation on the number of TSs that can be simultaneously processed, such as a BD application can reproduce the TS1 and the TS2 in synchronization with each other by preloading the TS3 of which the amount of information is relatively small.

In addition, at the heads of the TS2 that is formed from the auxiliary stream and the TS3 that is formed from the auxiliary information, similarly to a case where the auxiliary stream and the auxiliary information are included in the same TS, a 3DV representation delimiter illustrated in FIG. 5 is arranged.

Figure 11:
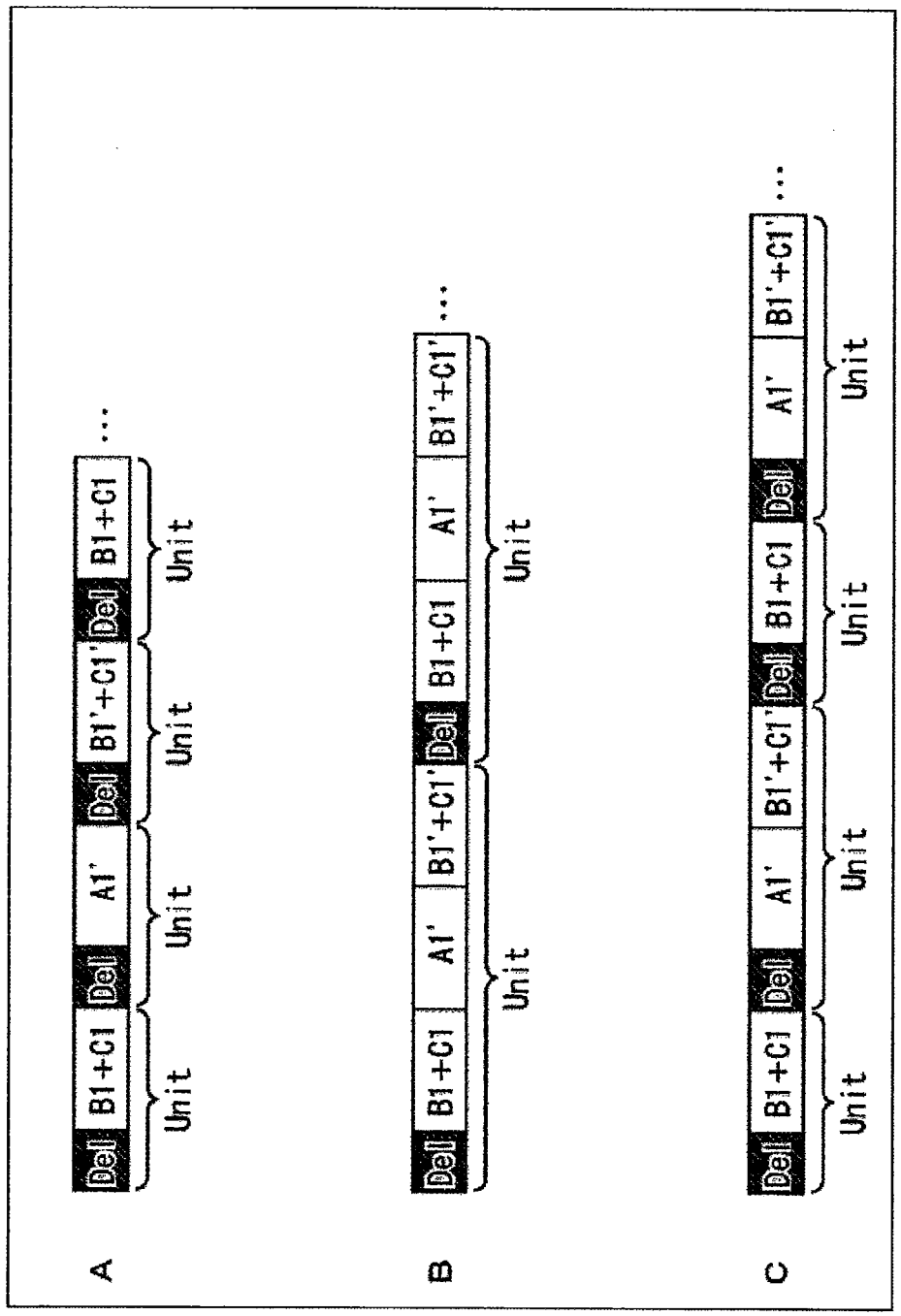
FIG. 11 is a diagram that illustrates a detailed configuration example of the TS2 illustrated in FIG. 10.

FIG. 11 is a diagram that illustrates a detailed configuration example of the TS2 illustrated in FIG. 10.

As illustrated in A of FIG. 11 to C of FIG. 11, data is arranged in units of units in the TS2 illustrated in FIG. 10, and, at the head of each unit, a delimiter that represents the separation of the unit is inserted.

In the example illustrated in A of FIG. 11, in each unit, a multiplexed image (B+C) of encoded auxiliary images, a parallax image (A') of a compatible image, or a multiplexed image (B'+C') of parallax images of auxiliary images is arranged as data in units of access units.

In such a case, a decoding device that receives the TS2 can independently extract the multiplexed image of the encoded auxiliary image, the parallax image of the compatible image, and the multiplexed image of the parallax images of the auxiliary images that are arranged in units of access units by extracting data in units of the units. As a result, for example, in a case where the decoding device generates a multi-viewpoint image using only a compatible image and a parallax image of the compatible image, images used for generating the multi-viewpoint image can be easily extracted.

In the example illustrated in B of FIG. 11, in each unit, a multiplexed image of encoded auxiliary images, a parallax image of a compatible image, and a multiplexed image of parallax images of the auxiliary images are arranged together in units of access units. In such a case, a decoding device that receives the TS2 can extract the multiplexed image of the encoded auxiliary images, the parallax image of the compatible image, and the multiplexed image of the parallax images of the auxiliary images together that are arranged in units of access units by extracting data in units of the units.

In the example illustrated in C of FIG. 11, in each unit, a multiplexed image of encoded auxiliary images or a parallax image of an encoded compatible image and a multiplexed image of parallax images of auxiliary images are arranged together in units of access units.

In such a case, a decoding device that receives the TS2 can independently extract the multiplexed image of the encoded auxiliary images, the parallax image of the compatible image, and the multiplexed image of the parallax images of the auxiliary images that are arranged in units of access units by extracting data in units of the units. As a result, for example, in a case where a decoder used for an image and a decoder used for a parallax image are separately prepared in the decoding device, data can be efficiently supplied to each decoder. In addition, an image and a parallax image can be independently processed by the decoding device in an easy manner.

Figure 12:
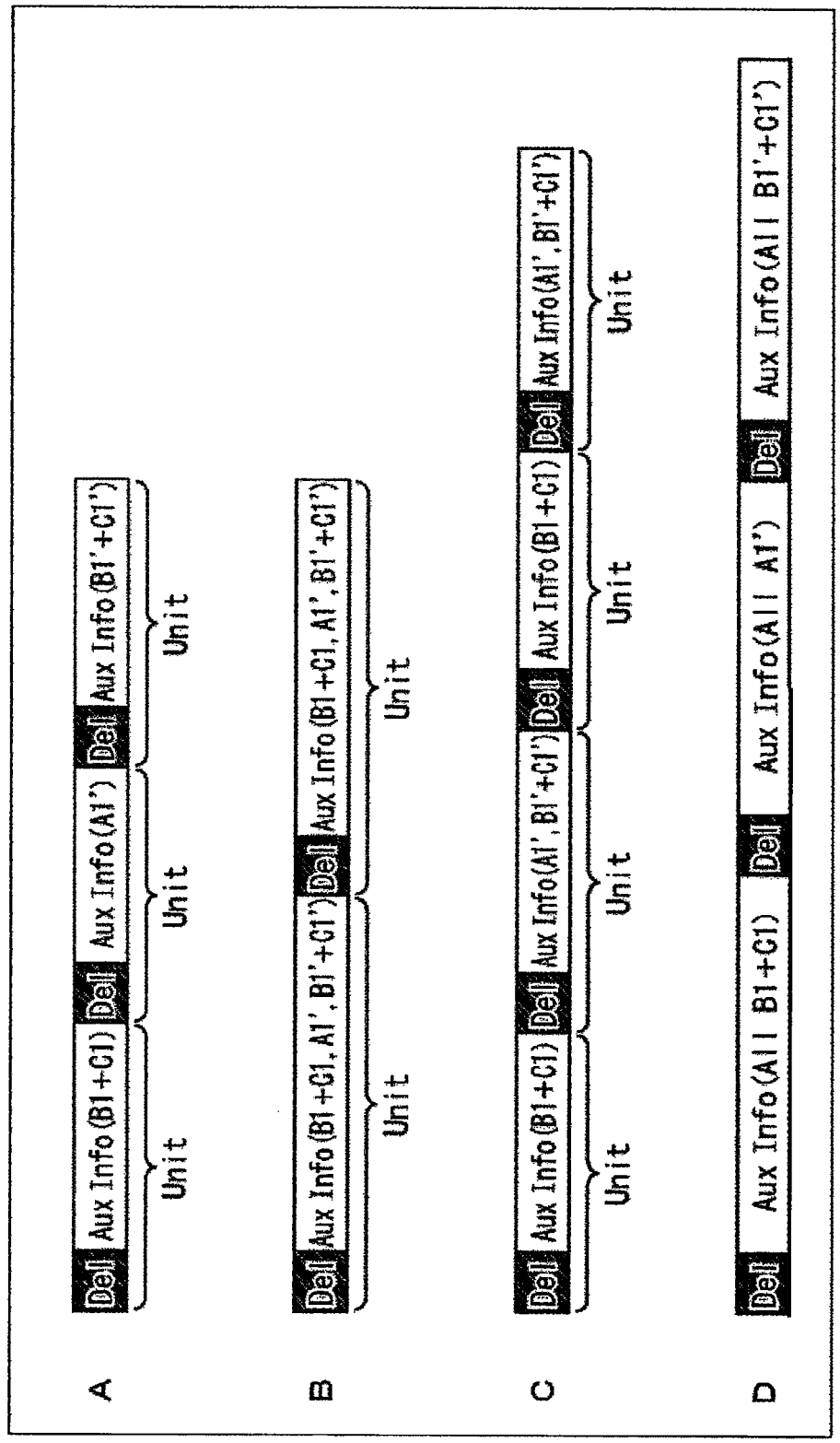
FIG. 12 is a diagram that illustrates a detailed example of a TS3 illustrated in FIG. 10.

FIG. 12 is a diagram that illustrates a detailed configuration example of the TS3 illustrated in FIG. 10.

As illustrated in A of FIG. 12 to D of FIG. 12, in the TS3 illustrated in FIG. 10, data is arranged in units of units, and, at the head of each unit, a delimiter that represents the separation of the unit is inserted.

In the example illustrated in A of FIG. 12, in each unit, auxiliary information (Aux Info(B+C)) of a multiplexed image of auxiliary images, auxiliary information (Aux Info (A')) of a parallax image of a compatible image, or auxiliary information (Aux Info(B'+C')) of a multiplexed image of parallax images of auxiliary images is arranged as data in units of access units.

In such a case, a decoding device that receives the TS2 can independently extract the auxiliary information of the multiplexed image of the auxiliary images, the auxiliary information of the parallax image of the compatible image, and the auxiliary information of the multiplexed image of the parallax images of the auxiliary images, which are arranged in units of access units, by extracting data in units of the units. As a result, the multiplexed image of the encoded auxiliary images, the parallax image of the compatible image, and the multiplexed image of the parallax images of the auxiliary images, which are arranged in units of the access units, can be independently processed in an easy manner.

In the example illustrated in B of FIG. 12, a multiplexed image of auxiliary images, a parallax image of a compatible image, and auxiliary information (Aux Info(B+C, A', B'+C')) of a multiplexed image of parallax images of auxiliary images, which are arranged in units of access units, are arranged altogether in each unit. In such a case, a decoding device that receives the TS2 can extract the multiplexed image of the auxiliary images, the parallax image of the compatible image, and the auxiliary information of the multiplexed image of the parallax images of the auxiliary images altogether which are arranged in units of access units by extracting data in units of units.

In the example illustrated in C of FIG. 12, auxiliary information (Aux Info(B+C)) of a multiplexed image of an auxiliary image or a parallax image of a compatible image and auxiliary information (Aux Info(A', B'+C')) of a multiplexed image of parallax images of auxiliary images are arranged in each unit in units of access units.

In such a case, a decoding device that receives the TS3 can independently extract the auxiliary information of the multiplexed image of the auxiliary image, the parallax image of the compatible image, and the auxiliary information of the multiplexed image of the parallax images of the auxiliary images, which are arranged in units of access units, by extracting data in units of the units. As a result, for example, in a case where a decoder used for an image and a decoder used for a parallax image are separately prepared in the decoding device, the auxiliary information can be efficiently supplied in synchronization with a decoding result.

In the example illustrated in D of FIG. 12, auxiliary information (Aux Info(All B+C)) of a multiplexed image of auxiliary images corresponding to a predetermined time (for example, two hours), auxiliary information (Aux Info(All A')) of a parallax image of a compatible image, and auxiliary information (Aux Info(All B'+C')) of a multiplexed image of parallax images of auxiliary images are arranged in each unit. In such a case, a decoding device that receives the TS3 can extract and maintain the auxiliary information of the multiplexed image of the auxiliary image corresponding to the predetermined time, the auxiliary information of the parallax image of the compatible image, and the auxiliary information of the multiplexed image of the parallax images of the auxiliary images together by extracting data in units of units when the auxiliary information is preloaded.

[Description of Another Encoding Process]

The encoding process performed by the encoding device 50 in a case where the TSs having the configurations described with reference to FIGS. 10 to 12 are generated is the same as the encoding process illustrated in FIGS. 6 and 7 except that, in Step S25 illustrated in FIG. 7, a TS1 is generated from a compatible stream, a TS2 is generated from an auxiliary stream, a TS3 is generated from auxiliary information, and multiplexing is performed, and thus, the description thereof will not be presented.

[Description of Another Decoding Process]

Figure 13:
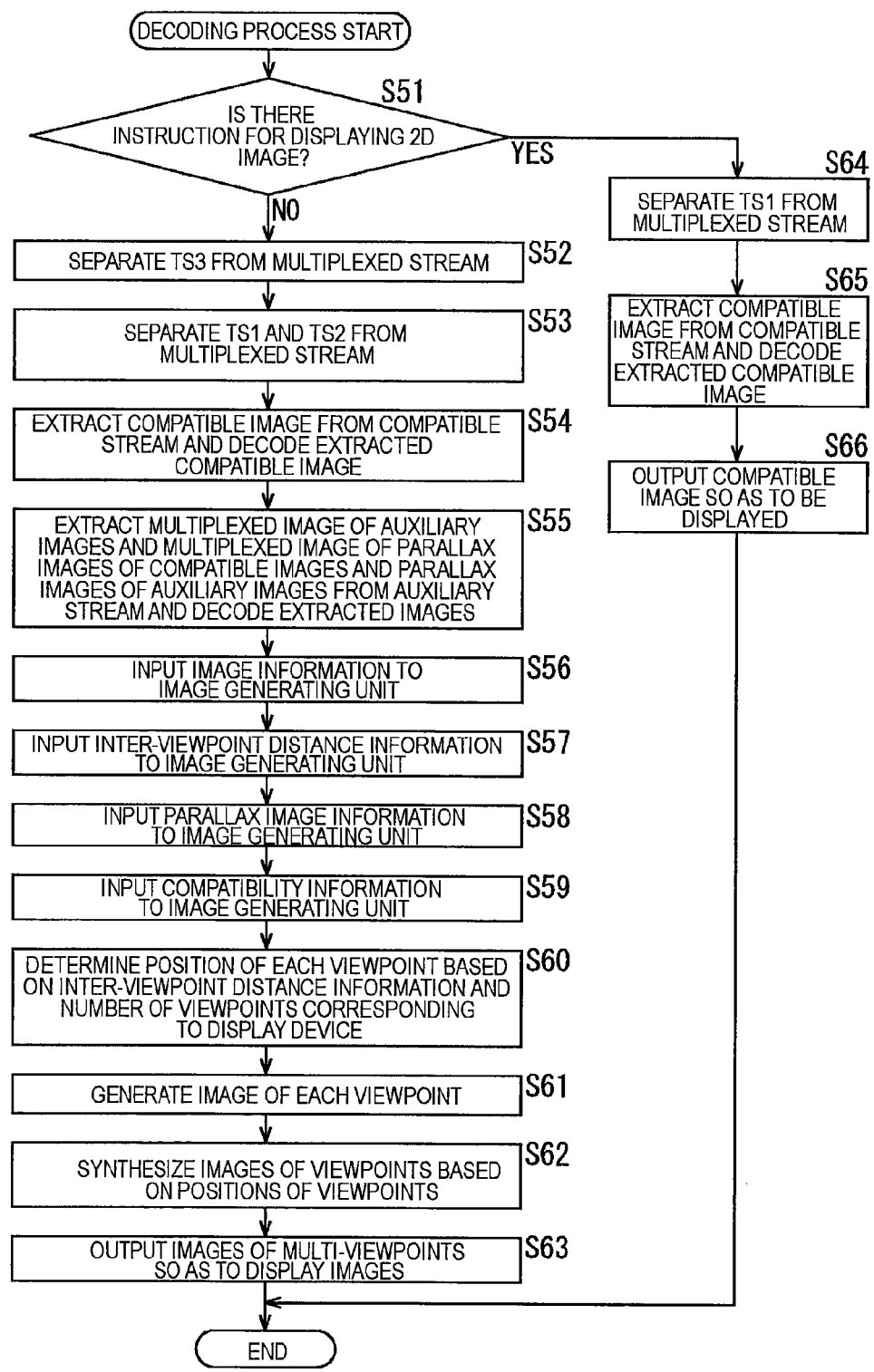
FIG. 13 is a flowchart that illustrates another decoding process performed by the decoding device illustrated in FIG. 8.

FIG. 13 is a flowchart that illustrates a decoding process performed by the decoding device 120 illustrated in FIG. 8 in a case where the configurations of the TSs, which are multiplexed in a multiplexed stream, are the configurations described with reference to FIGS. 10 to 12. This decoding process, for example, is started when a multiplexed stream that is transmitted from the encoding device 50 illustrated in FIG. 2 is input to the decoding device 120.

In Step S51 illustrated in FIG. 13, the image generating unit 127 of the decoding device 120 determines whether or not an instruction for displaying a 2D image has been made by a viewer. In a case where it is determined that the instruction for displaying a 2D image has not been made by the viewer in Step S31, in other words, in a case where an instruction for displaying a 3D image of the multi-viewpoint mode has been made by the viewer, the process proceeds to Step S52.

In Step S52, the separation unit 121 acquires the multiplexed stream that is transmitted from the encoding device 50 and separates a TS3 from the multiplexed stream. Then, the separation unit 121 extracts auxiliary information included in the TS3 by referring to the delimiter and the like, supplies image information that is included in the auxiliary information to the image information acquiring unit 123 for the maintenance thereof, and supplies viewpoint distance information to the inter-viewpoint distance information acquiring unit 124 for the maintenance thereof. In addition, the separation unit 121 supplies parallax image information that is included in the auxiliary information to the parallax image information acquiring unit 125 for the maintenance thereof and supplies compatibility information to the compatibility information acquiring unit 126 for the maintenance thereof. Then, the process proceeds to Step S53.

The process of Steps S53 to S66 is similar to that of Steps S32 to S45 illustrated in FIG. 9, and thus, the description thereof will not be presented.

In a decoding device that can decode only a compatible stream that has compatibility with the decoding device 120, the TS2 and TS3 are ignored, and the process of Steps S65 and S66 is performed.

Second Embodiment

[Configuration Example of Encoding Device According to Second Embodiment]

Figure 14:
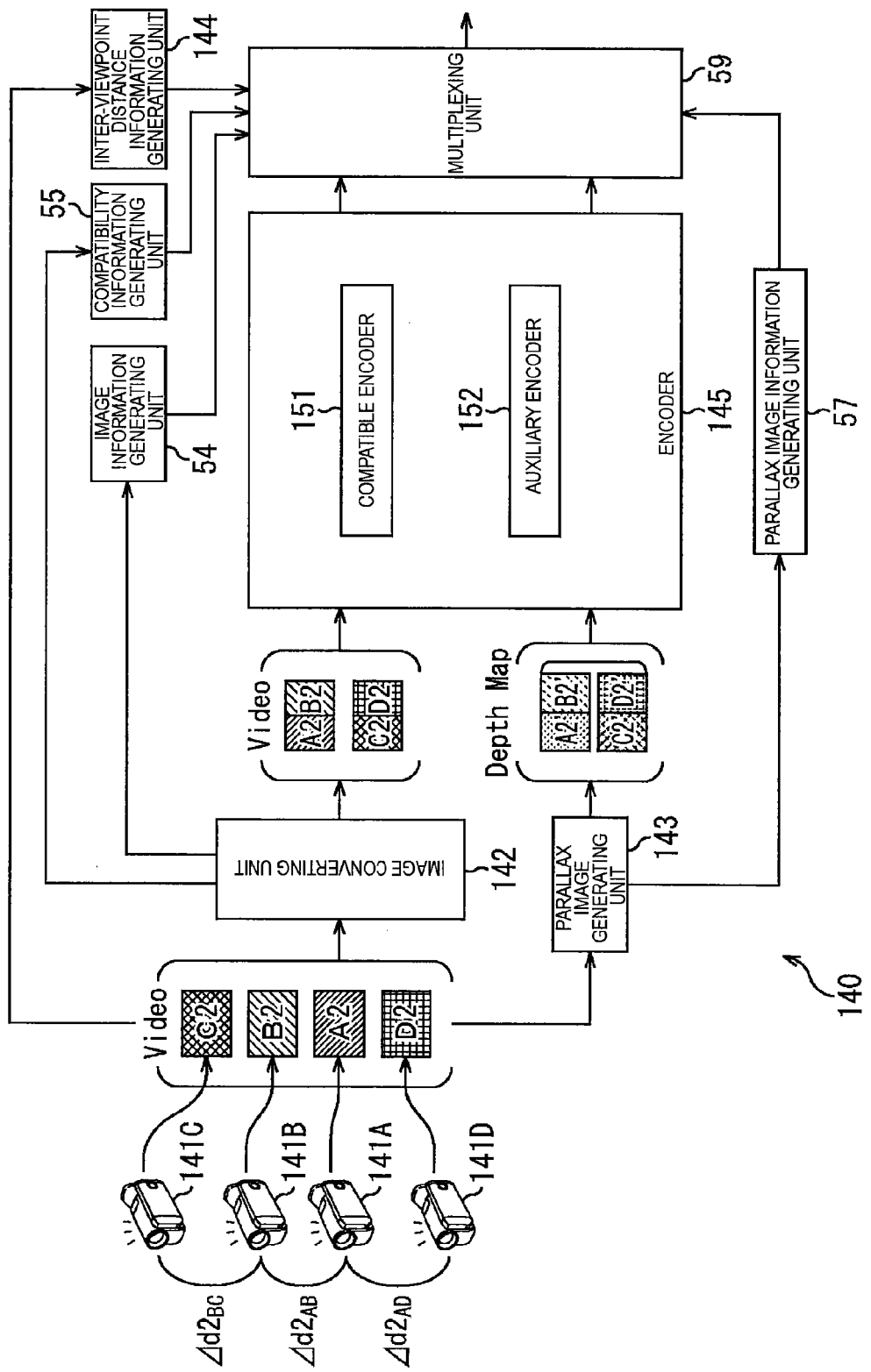
FIG. 14 is a block diagram that illustrates a configuration example of an encoding device according to a second embodiment of the present technology.

FIG. 14 is a block diagram that illustrates a configuration example of an encoding device according to a second embodiment of the present technology.

In the configuration illustrated in FIG. 14, the same reference numeral is assigned to a configuration that is the same as that illustrated in FIG. 2. Duplicate description will not be presented as is appropriate.

The configuration of the encoding device 140 illustrated in FIG. 14 is mainly different from the configuration illustrated in FIG. 2 in that imaging units 141A to 141D, an image converting unit 142, a parallax image generating unit 143, an inter-viewpoint distance information generating unit 144, and an encoder 145 are disposed instead of the imaging units 51A to 51C, the image converting unit 52, the parallax image generating unit 53, the inter-viewpoint distance information generating unit 56, and the encoder 58.

The encoding device 140 independently generates TSs by performing encoding in accordance with the AVC mode with images of two viewpoints out of multi-viewpoint images used as compatible images, thereby securing the compatibility with an existing encoding device that encodes a 3D image of a two view-point mode in accordance with the AVC mode.

More specifically, the imaging unit 141A of the encoding device 140 captures an HD image of a predetermined viewpoint as an image A2 and supplies the captured image to the image converting unit 142, the parallax image generating unit 143, and the inter-viewpoint distance information generating unit 144. The imaging unit 141B captures an HD image of a viewpoint that is different from the viewpoint of the image A2 as an image B2 at a position that is separate from the imaging unit 141A by a distance $\Delta d2_{AB}$ in a horizontal direction and supplies the captured image to the image converting unit 142, the parallax image generating unit 143, and the inter-viewpoint distance information generating unit 144.

The imaging unit 141C captures an HD image of a viewpoint different from the viewpoints of the images A2 and B2 as an image C2 at a position separate from the imaging unit 141B by a distance $\Delta d2_{BC}$ in the horizontal direction that is opposite to the imaging unit 141A and supplies the captured image to the image converting unit 142, the parallax image generating unit 143, and the inter-viewpoint distance information generating unit 144. The imaging unit 141D captures an HD image of a viewpoint different from the viewpoints of the images A2 to C2 as an image D2 at a position separate from the imaging unit 141A by a distance $\Delta d2_{AB}$ in the horizontal direction that is opposite to the imaging unit 141B and supplies the captured image to the image converting unit 142, the parallax image generating unit 143, and the inter-viewpoint distance information generating unit 144.

The viewpoints that correspond to the images C2 and D2 are viewpoints that are located on the outer side out of viewpoints of images that can be recognized as 3D images. In this way, a decoding device that corresponds to the encoding device 140 can generate multi-viewpoint images by interpolating images of viewpoints located on the further inner side than the viewpoints of the images C2 and D2 by using the images A2 to D2. As a result, the multi-viewpoint images can be generated with precision that is higher than that of a case where images of viewpoints located on the outer side are interpolated using images of viewpoints located on the inner side. The distances $\Delta d2_{AB}$, $\Delta d2_{BC}$, and $\Delta d2_{AD}$ may be configured to be either fixed or changed each time.

The image converting unit 142 determines the image A2 that is supplied from the imaging unit 141A of which the position in the horizontal direction is located on the inner side out of the imaging units 141A to 141D and the image B2 that is supplied from the imaging unit 141B as compatible images. Then, the image converting unit 142 multiplexes the images A2 and B2 that are the compatible images in accordance with a predetermined multiplexing mode and supplies the multiplexed image to the encoder 145. In addition, the image converting unit 142 supplies information that designates the images A2 and B2 as compatible images to the compatibility information generating unit 55.

In addition, the image converting unit 142 sets the images C2 and D2 other than the images A2 and B2 as auxiliary images and multiplexes the images C2 and D2 in accordance with a predetermined multiplexing mode. The image converting unit 142 supplies a multiplexed image that is acquired as a result of the multiplexing process to the encoder 145. The image converting unit 142 supplies information that represents a multiplexing mode of compatible images and auxiliary images to the image information generating unit 54.

The parallax image generating unit 143 detects the disparity of each pixel of the images A2 to D2 using the images A2 to D2 that are supplied from the imaging units 141A to 141D. The parallax image generating unit 143 generates a parallax image A2' that represents the disparity of each pixel of the image A2 that is a compatible image and a parallax image B2' that represents the disparity of each pixel of the image B2 and multiplexes the parallax images A2' and B2' in accordance with a predetermined multiplexing mode. The parallax image generating unit 143 supplies a multiplexed image that is acquired as a result thereof to the encoder 145.

In addition, the parallax image generating unit 143 generates a parallax image C2' that represents the disparity of each pixel of the image C2 that is an auxiliary image and a parallax image D2' that represents the disparity of each pixel of the image D2 that is an auxiliary image and multiplexes the parallax images C2' and D2' in accordance with a predetermined multiplexing mode. The parallax image generating unit 143 supplies a multiplexed image that is acquired as a result thereof to the encoder 145. The parallax image generating unit 143 supplies information that represents the multiplexing mode of parallax images of compatible images and auxiliary images to the parallax image information generating unit 57.

The inter-viewpoint distance information generating unit 144 detects each inter-viewpoint distance between the images A2 to D2 using the images A2 to D2 that are supplied from the imaging units 141A to 141D. For example, the inter-viewpoint distance information generating unit 144 detects a distance $\Delta d2_{AB}$ between the imaging units 141A and 141B in the horizontal direction, a distance $\Delta d2_{BC}$ between the imaging units 141B and 141C in the horizontal direction, and a distance $\Delta d2_{AB}$ between the imaging units 141A and 141D in the horizontal direction as inter-viewpoint distances. The inter-viewpoint distance information generating unit 144 generates information that represents the inter-viewpoint distances and the like as inter-viewpoint distance information and supplies the generated inter-viewpoint distance information to the multiplexing unit 59.

The encoder 145 is configured by a compatible encoder 151 and an auxiliary encoder 152. The compatible encoder 151 designates a multiplexed image of the compatible images out of the multiplexed image of the compatible images and the multiplexed image of the auxiliary images that are supplied from the image converting unit 142 and encodes the multiplexed image of the compatible images in units of access units in accordance with the existing AVC mode. The encoder 145 supplies an encoded stream that is acquired as a result thereof to the multiplexing unit 59 as a compatible stream.

The auxiliary encoder 152 encodes the multiplexed image of the auxiliary images that is supplied from the image converting unit 142 and the multiplexed image of the parallax images of the compatible images and the multiplexed image of the parallax images of the auxiliary images that are supplied from the parallax image generating unit 143 in units of access units in accordance with a predetermined mode. The auxiliary encoder 152 supplies encoded streams acquired as a result thereof to the multiplexing unit 59 as auxiliary streams. As the encoding mode employed by the auxiliary encoder 152, for example, the AVC mode, the MVC mode, or the like can be used.

[Configuration Example of TS]

Figure 15:
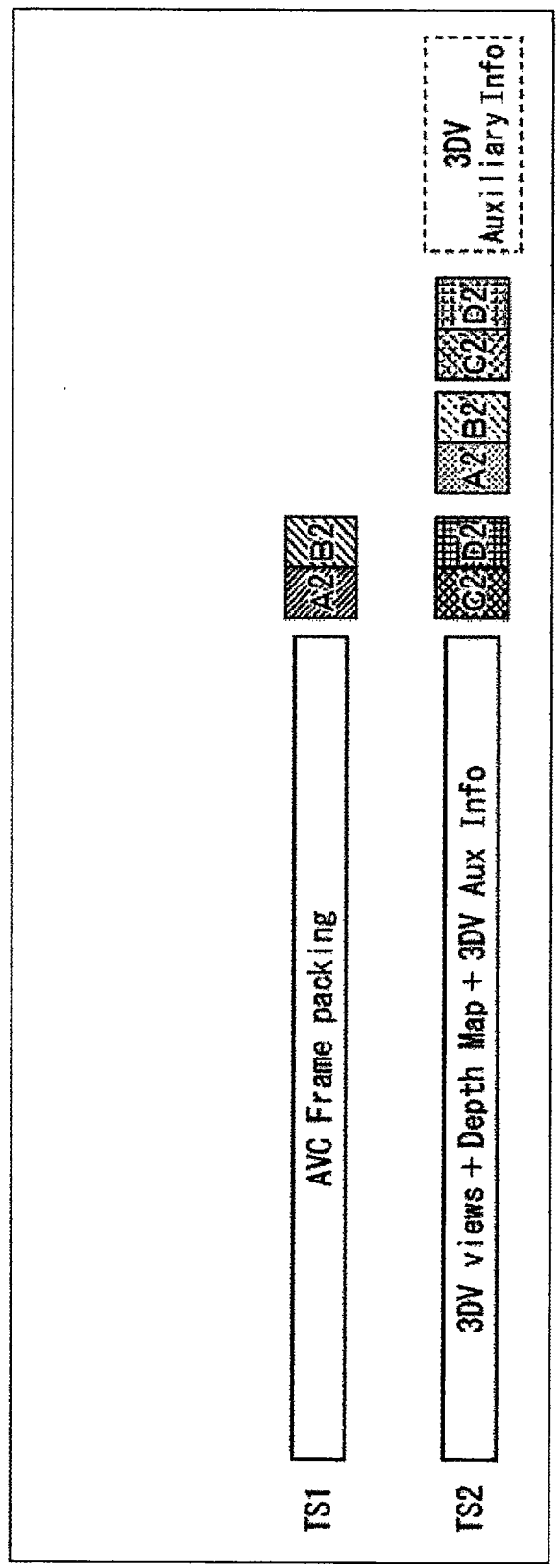
FIG. 15 is a diagram that illustrates a configuration example of TSs that are generated by a multiplexing unit illustrated in FIG. 14.

FIG. 15 is a diagram that illustrates a configuration example of TSs that are generated by the multiplexing unit 59 illustrated in FIG. 14.

In the example illustrated in FIG. 15, in the multiplexing unit 59, a TS1 is generated from the compatible stream, and a TS2 is generated from the auxiliary stream and the auxiliary information.

Although not illustrated in the figure, the configuration of the TS2 illustrated in FIG. 15 is the same as the configuration described with reference to FIG. 4 except that a multiplexed image of the parallax images of the compatible images is arranged instead of the parallax image of the compatible image.

[Description of Process of Encoding Device]

Figure 16:
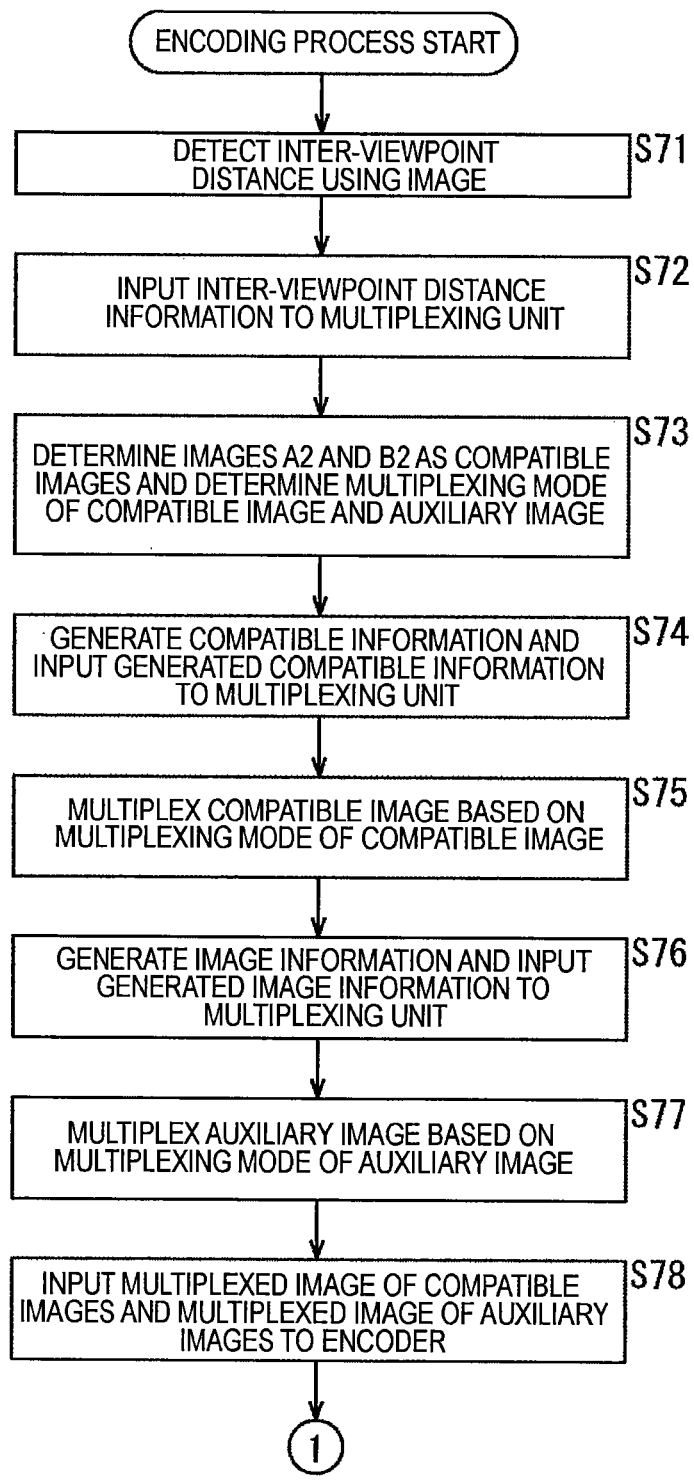
FIG. 16 is a flowchart that illustrates an encoding process performed by the encoding device illustrated in FIG. 14.
Figure 17:
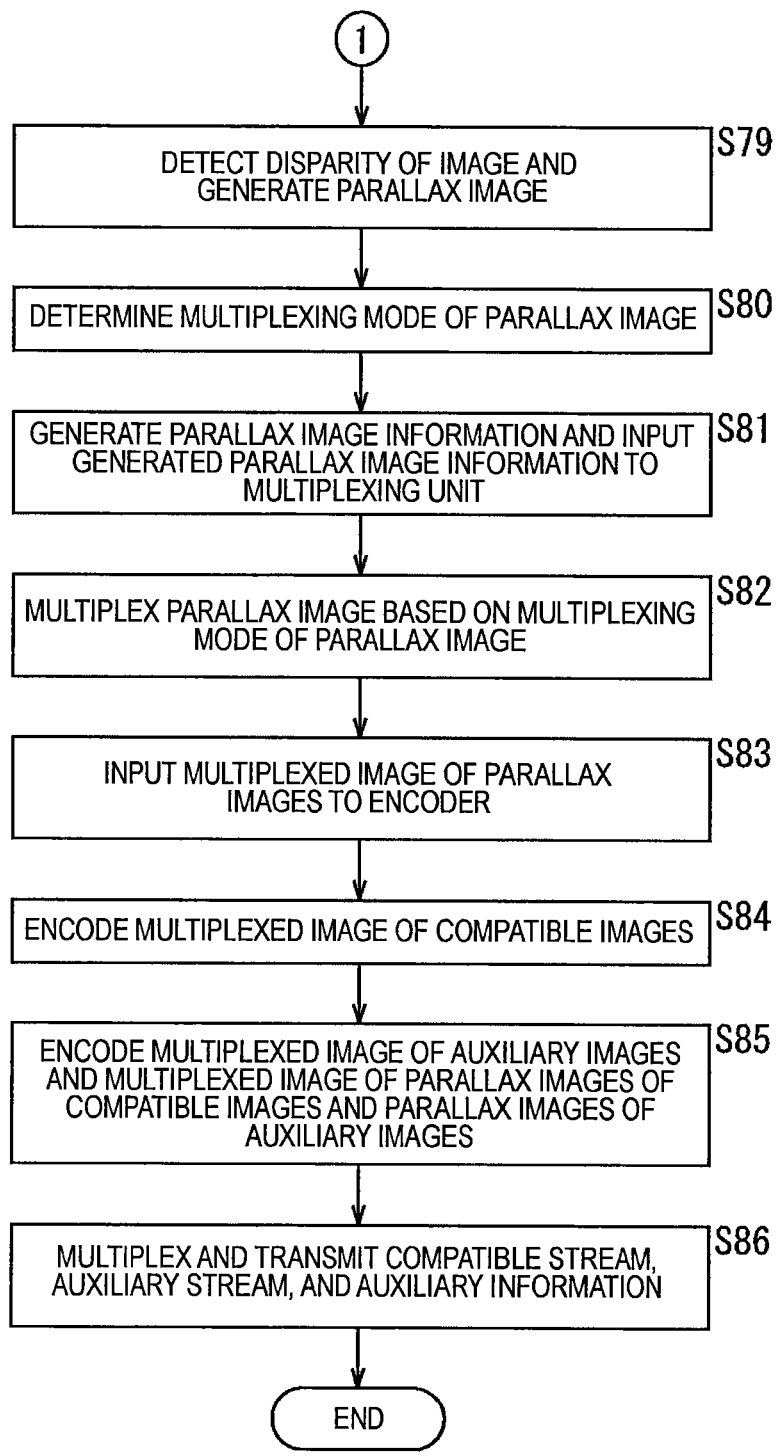
FIG. 17 is a flowchart that illustrates the encoding process performed by the encoding device illustrated in FIG. 14.

FIGS. 16 and 17 represent a flowchart that illustrates an encoding process that is performed by the encoding device 140 illustrated in FIG. 14. This encoding process, for example, is started when the images A2 to D2 are output from the imaging units 141A to 141D.

In Step S71 illustrated in FIG. 16, the inter-viewpoint distance information generating unit 144 detects distances $\Delta d2_{AB}$, $\Delta d2_{BC}$, and $\Delta d2_{AD}$ as inter-viewpoint distances using the images A2 to D2 that are supplied from the imaging units 141A to 141D.

In Step S72, the inter-viewpoint distance information generating unit 144 generates information that represents the inter-viewpoint distances detected in Step S71 and the like as inter-viewpoint distance information and inputs the generated inter-viewpoint distance information to the multiplexing unit 59.

In Step S73, the image converting unit 142 determines the image A2 that is supplied from the imaging unit 141A, of which the position in the horizontal direction is located on the inner side out of the imaging units 141A to 141D, and the image B2 that is supplied from the imaging unit 141B as compatible images and determines multiplexing modes of the compatible images and the auxiliary images. The image converting unit 142 supplies information that designates the images A2 and B2 as compatible images to the compatibility information generating unit 55 and supplies the multiplexing modes of the compatible images and the auxiliary images to the image information generating unit 54.

In Step S74, the compatibility information generating unit 55 generates the information designating the images A2 and B2 as compatible images, a frame packing mode as a compatible mode, and the like as compatibility information based on the information that is supplied from the image converting unit 142 and inputs the generated compatibility information to the multiplexing unit 59.

In Step S75, the image converting unit 142 multiplexes the images A2 and B2 that are compatible images based on the multiplexing mode of compatible images that is determined in Step S73 and supplies the multiplexed image to the encoder 145.

In Step S76, the image information generating unit 54 generates information that represents the multiplexing modes of compatible images ad auxiliary images and the like as image information based on the information that is supplied from the image converting unit 142 and inputs the generated image information to the multiplexing unit 59.

In Step S77, the image converting unit 142 sets images C2 and D2 other than the images A2 and B2 as auxiliary images and multiplexes the auxiliary images based on the multiplexing mode of auxiliary images that is determined in Step S73, thereby acquiring a multiplexed image of the auxiliary images.

In Step S78, the image converting unit 142 inputs the multiplexed image of the compatible images and the multiplexed image of the auxiliary images to the encoder 145.

In Step S79 illustrated in FIG. 17, the parallax image generating unit 143 detects the disparity of each pixel of the images A2 to D2 using the images A2 to D2 that are supplied from the imaging units 141A to 141D and generates parallax images A2' to D2'.

In Step S80, the parallax image generating unit 143 determines multiplexing modes of the parallax images of the compatible images and the parallax images of the auxiliary images and supplies information that represents the multiplexing modes to the parallax image information generating unit 57.

In Step S81, the parallax image information generating unit 57 generates information that represents the multiplexing modes of the parallax images of the compatible images and the parallax images of the auxiliary images and the like as parallax image information based on the information that is supplied from the parallax image generating unit 143 and inputs the generated parallax image information to the multiplexing unit 59.

In Step S82, the parallax image generating unit 143 multiplexes the parallax images A2' and B2' of the compatible images based on the multiplexing mode of the parallax images of compatible images that is determined in Step S80 and multiplexes the parallax images C2' and D2' of the auxiliary images based on the multiplexing mode of the parallax images of auxiliary images.

In Step S83, the parallax image generating unit 143 inputs the multiplexed image of the parallax images of the compatible images and the multiplexed image of the parallax images of the auxiliary images that are acquired as a result of the multiplexing process illustrated in Step S82 to the encoder 145.

In Step S84, the compatible encoder 151 of the encoder 145 encodes the multiplexed image of the compatible images that is supplied from the image converting unit 142 in accordance with the existing AVC mode and supplies an encoded stream acquired as a result thereof to the multiplexing unit 59 as a compatible stream.

In Step S85, the auxiliary encoder 152 encodes the multiplexed image of the auxiliary images that is supplied from the image converting unit 142 and the multiplexed image of the parallax images of the compatible images and the multiplexed image of the parallax images of the auxiliary images that are supplied from the parallax image generating unit 143 in accordance with a predetermined mode. The auxiliary encoder 152 supplies an encoded stream acquired as a result of the encoding process to the multiplexing unit 59 as an auxiliary stream.

In Step S86, the multiplexing unit 59 generates a TS1 from the compatible stream that is supplied from the compatible encoder 151, generates a TS2 from the auxiliary stream and the auxiliary information supplied from the auxiliary encoder 152, performs a multiplexing process, and transmits a multiplexed stream acquired as a result thereof.

This multiplexed stream, for example, is recorded on a BD or the like or is transmitted as a broadcast stream. Then, the process ends.

As above, since the encoding device 140 performs the multiplexing process with the compatible stream and the auxiliary stream and the auxiliary information being stored in TSs different from each another, the compatibility with an existing encoding device that encodes a 3D image of two-viewpoint mode in accordance with the AVC mode in multiplexing can be secured. In other words, the encoding device 140 can perform a multiplexing process for multi-viewpoint images in accordance with a mode that has the compatibility with an existing mode.

In addition, since the encoding device 140 encodes images of two viewpoints out of multi-viewpoint images as compatible image in accordance with an existing encoding mode, the compatibility with an existing encoding device that encodes a 3D image of the two-viewpoint mode in the encoding process can be secured.

Furthermore, since the encoding device 140 encodes the images A2 to D2 of four viewpoints, a decoding device that corresponds to the encoding device 140 can generate multi-viewpoint images from the images A2 to D2 of four viewpoints. In this way, according to the decoding device, compared to a case where multi-viewpoint images are generated from images of two viewpoints, the viewpoints of images that can be generated are not limited, and multi-viewpoint images having relatively high precision can be generated.

[Configuration Example of Decoding Device]

Figure 18:
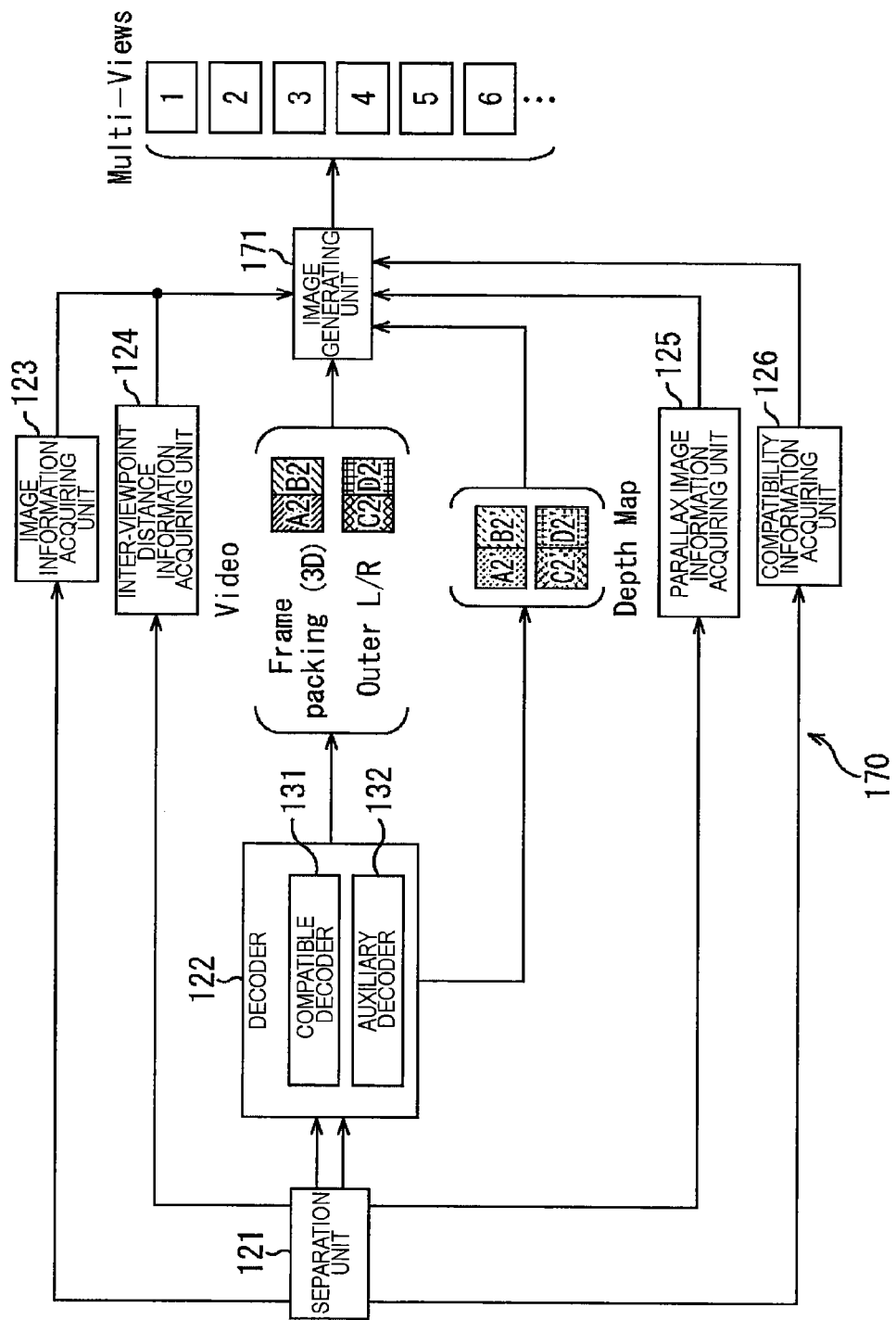
FIG. 18 is a diagram that illustrates a configuration example of a decoding device that corresponds to the encoding device illustrated in FIG. 14.

FIG. 18 is a diagram that illustrates a configuration example of a decoding device that decodes the multiplexed stream transmitted from the encoding device 140 illustrated in FIG. 14.

In the configuration illustrated in FIG. 18, the same reference numeral is assigned to a configuration that is the same as that illustrated in FIG. 8. Duplicate description will not be presented as is appropriate.

The configuration of the decoding device 170 illustrated in FIG. 18 is mainly different from the configuration illustrated in FIG. 8 in that an image generating unit 171 is disposed instead of the image generating unit 127. The decoding device 170 generates images of two viewpoints or multi-viewpoint images by decoding the multiplexed stream that is transmitted from the encoding device 140 and displays the generated images on a display device not illustrated in the figure.

More specifically, the image generating unit 171 of the decoding device 170 outputs images in accordance with a display instruction supplied from a viewer, thereby displaying the images on a display device (not illustrated). When described in more detail, the image generating unit 171 generates images of three or more viewpoints, which correspond to a display device (not illustrated), each having the resolution that is a half of the resolution of the compatible image or the auxiliary image by using the multiplexed image of the compatible images, the multiplexed image of the auxiliary images, the multiplexed image of the parallax images of the compatible images, and the multiplexed image of the parallax images of the auxiliary images in accordance with a viewer's instruction for displaying a 3D image of multi-viewpoint mode based on the image information supplied from the image information acquiring unit 123, the inter-viewpoint distance information supplied from the inter-viewpoint distance information acquiring unit 124, the parallax image information supplied from the parallax image information acquiring unit 125, the compatibility information supplied from the compatibility information acquiring unit 126, and the like.

More specifically, the image generating unit 171 separates the parallax image of each auxiliary image from the multiplexed image of the parallax images of the auxiliary images based on the information that represents a multiplexing mode of the parallax images of the auxiliary images that is included in the parallax image information supplied from the parallax image information acquiring unit 125. In addition, the image generating unit 171 separates the parallax image of each compatible image from the multiplexed image of the parallax images of the compatible images based on the information, which represents the multiplexing mode of the parallax images of the compatible images, included in the parallax image information.

Furthermore, the image generating unit 171 separates each auxiliary image from the multiplexed image of the auxiliary images based on the information that represents a multiplexing mode of the auxiliary images that is included in the image information supplied from the image information acquiring unit 123. In addition, the image generating unit 171 separates each compatible image from the multiplexed image of the compatible images based on the information that represents a multiplexing mode of the compatible images that is included in the image information.

Furthermore, the image generating unit 171 determines the position of each viewpoint of the multi-viewpoint images to be generated based on the inter-viewpoint distance information and the number of viewpoints that corresponds to a display device not illustrated in the figure. Then, the image generating unit 171 generates the image of each viewpoint of which the position is determined by using each compatible image, each auxiliary image, the parallax image of each compatible image, and the parallax image of each auxiliary image. Then, the image generating unit 171 converts the resolution of the generated multi-viewpoint images into resolution that is "1/the number of viewpoints" of the resolution of the compatible image or the auxiliary image, synthesizes the images, and displays the synthesized image on a display device not illustrated in the figure.

At this time, the multi-viewpoint images after the synthesis are displayed such that the viewing angles are different for each viewpoint, and a viewer can view a 3D image without wearing glasses by seeing images of arbitrary two viewpoints with his left and right eyes.

In addition, the image generating unit 171 separates the multiplexed image of the compatible images that is supplied from the decoder 122 into images A2 and B2 of which the resolution is a half of the resolution of the compatible image based on the image information supplied from the image information acquiring unit 123 in accordance with an instruction for displaying a 3D image of the two-viewpoint mode that is supplied from a viewer. Then, the image generating unit 171 alternately outputs the separated images A2 and B2 of which the resolution is a half of the resolution of the compatible image, thereby displaying the separated images on a display device not illustrated in the figure. At this time, the viewer can view a 3D image by wearing glasses in which one of a left-eye shutter and a right-eye shutter is open at the time of displaying the image A2, and the other is open at the time of displaying the image B2 and viewing the images A2 and B2 that are alternately displayed on the display device.

[Description of Process of Decoding Device]

Figure 19:
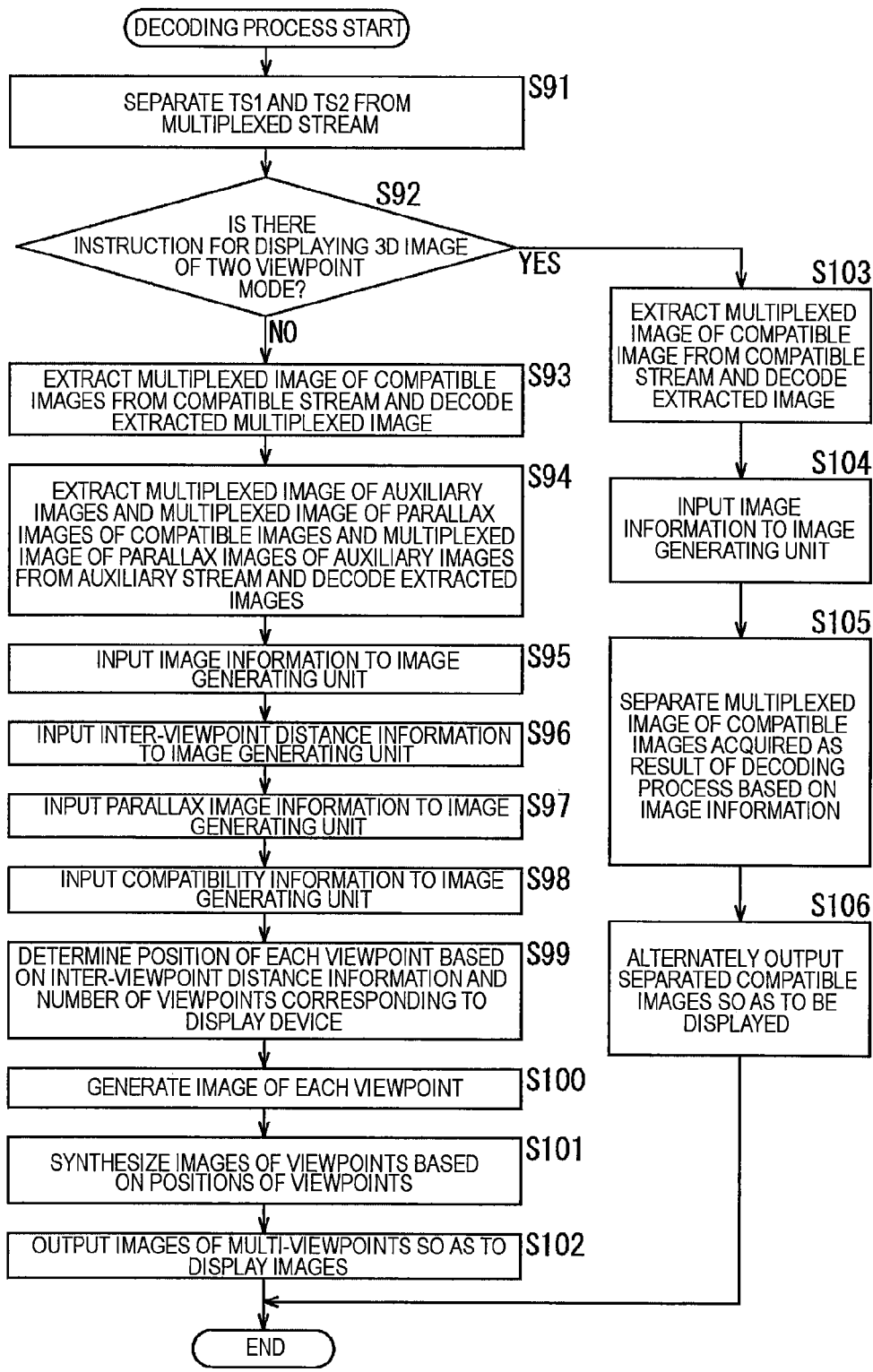
FIG. 19 is a flowchart that illustrates a decoding process performed by the decoding device illustrated in FIG. 18.

FIG. 19 is a flowchart that illustrates a decoding process performed by the decoding device 170 illustrated in FIG. 18.

This decoding process, for example, is started when a multiplexed stream that is transmitted from the encoding device 140 illustrated in FIG. 14 is input to the decoding device 170.

In Step S91 illustrated in FIG. 19, the separation unit 121 of the decoding device 170 receives the multiplexed stream that is transmitted from the encoding device 50 and separates TS1 and TS2 from the multiplexed stream. The separation unit 121 extracts a compatible stream included in the TS1 and an auxiliary stream included in the TS2 by referring a delimiter and the like and supplies the extracted streams to the decoder 122. In addition, the separation unit 121 extracts auxiliary information included in the TS2 by referring to the delimiter and the like, supplies image information that is included in the auxiliary information to the image information acquiring unit 123, and supplies viewpoint distance information to the inter-viewpoint distance information acquiring unit 124. In addition, the separation unit 121 supplies parallax image information that is included in the auxiliary information to the parallax image information acquiring unit 125 and supplies compatibility information to the compatibility information acquiring unit 126.

In Step S92, the image generating unit 171 determines whether or not an instruction for displaying a 3D image of the two-viewpoint mode has been made by a viewer. In a case where it is determined that the instruction for displaying a 3D image of the two-viewpoint mode has not been made by the viewer in Step S92, in other words, in a case where an instruction for displaying a 3D image of the multi-viewpoint mode has been made, the process proceeds to Step S93.

The process of Steps S93 to S102 is the same as that of Steps S33 to S42 illustrated in FIG. 9 except that the compatible image is a multiplexed image of compatible images, and the parallax image of the compatible image is a multiplexed image of parallax images of compatible images, and thus description thereof will not be presented.

On the other hand, in a case where it is determined that the instruction for displaying a 3D image of the two-viewpoint mode has been made by the viewer in Step S92, the process proceeds to Step S103.

In Step S103, the compatible decoder 131 of the decoder 122 extracts a multiplexed image of encoded compatible images from the compatible stream that is supplied from the separation unit 121 and decodes the encoded compatible image in accordance with a mode that corresponds to the AVC mode. The compatible decoder 131 supplies the multiplexed image of the compatible image that is acquired as a result of the decoding process to the image generating unit 171.

In Step S104, the image information acquiring unit 123 inputs the image information that is supplied from the separation unit 121 to the image generating unit 171.

In Step S105, the image generating unit 171 separates the multiplexed image of the compatible images that is acquired as result of the decoding process performed by the compatible decoder 131 based on the information that represents a multiplexing mode of the compatible image that is included in the image information supplied from the image information acquiring unit 123.

In Step S106, the image generating unit 171 alternately outputs the compatible images A2 and B2 of which the resolution is a half of the resolution of the separated compatible image to a display device not illustrated in the figure, thereby displaying the images. Then, the process ends.

In addition, in a decoding device that can decode only a compatible stream that has compatibility with the decoding device 170, a TS2 to which a 3DV Representation Delimiter NAL unit is attached is ignored, and the process of Steps S103, S105, and S106 is performed. However, in this case, in the process of Step S105, a multiplexed image of compatible images is separated based on the multiplexing mode determined in advance.

As above, the decoding device 170 can separate a multiplexed stream that is multiplexed by the encoding device 140 in accordance with a mode that has compatibility with an existing mode. In addition, the decoding device 170 can decode a compatible stream and an auxiliary stream that are encoded by the encoding device 140 in accordance with a mode that has compatibility with an existing mode and has a relative low processing cost.

In addition, since the decoding device 170 generates multi-viewpoint images using compatible images of two viewpoints and auxiliary images of two viewpoints, the encoding device 140 may prepare only two imaging units 141C and 141D other than the existing imaging units 141A and 141B that capture compatible images of two viewpoints as imaging units used for generating multi-viewpoint images. Accordingly, the installation of the imaging units for generating multi-viewpoint images can be easily performed at a low cost.

[Another Configuration Example of TS]

Figure 20:
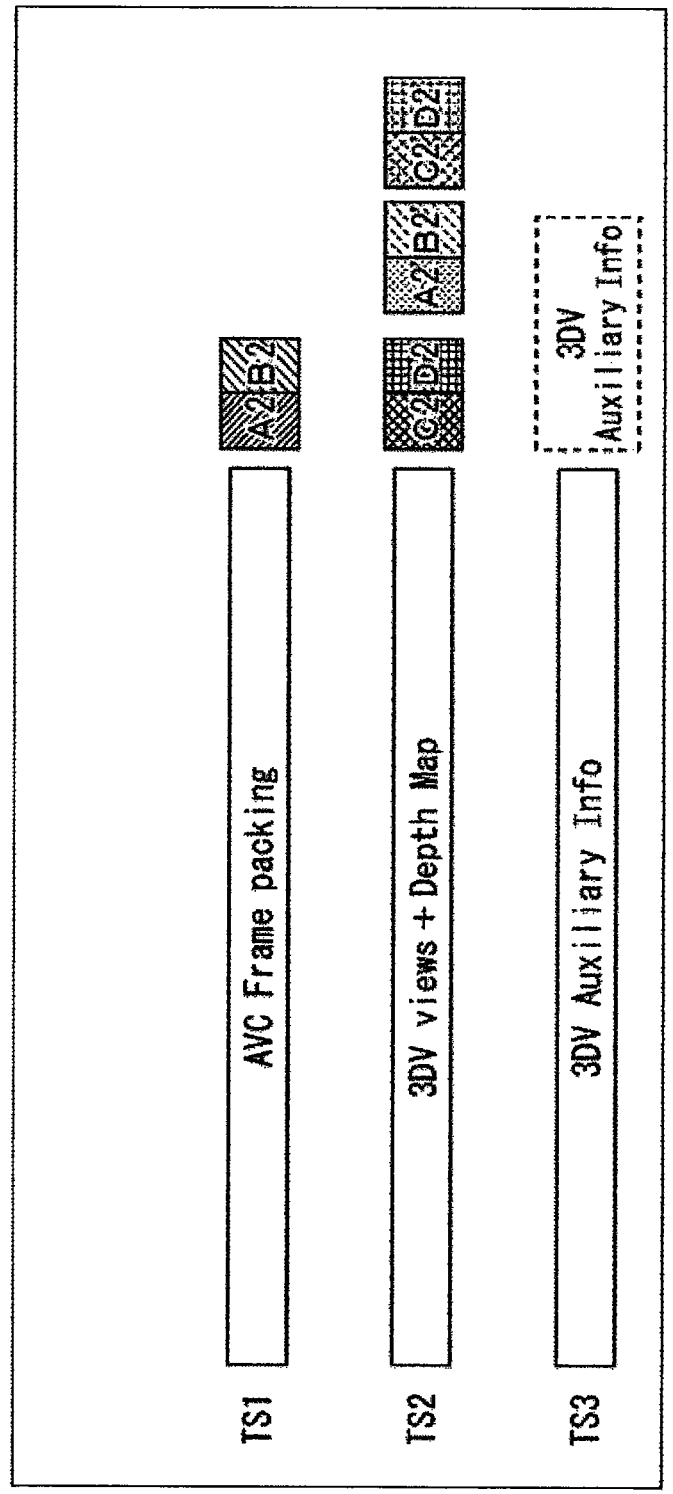
FIG. 20 is a diagram that illustrates another configuration example of the TSs that are generated by the multiplexing unit illustrated in FIG. 14.

FIG. 20 is a diagram that illustrates another configuration example of the TSs that are generated by the multiplexing unit 59 illustrated in FIG. 14.

In the example illustrated in FIG. 20, three TSs are generated by the multiplexing unit 59, and an auxiliary stream and auxiliary information are included in TSs that are different from each other. More specifically, a TS1 is generated from the compatible stream, a TS2 is generated from the auxiliary stream, and a TS3 is generated from the auxiliary information.

In the example illustrated in FIG. 20, the TS3 is independently generated only from the auxiliary information of which the amount of information is relatively small. Accordingly, a decoding device that executes an application, in which there is a limitation on the number of TSs that can be simultaneously processed, such as a BD application can reproduce the TS1 and the TS2 in synchronization with each other by preloading the TS3 of which the amount of information is relatively small.

In addition, although not illustrated in the figure, the configuration of the TS2 illustrated in FIG. 20 is the same as the configuration described with reference to FIG. 11 except that a multiplexed image of parallax images of compatible images is arranged instead of the parallax image of the compatible image. Furthermore, the configuration of the TS3 is the same as the configuration described with reference to FIG. 12 except that an auxiliary image of the multiplexed image of the parallax images of the compatible images is arranged instead of the auxiliary image of the parallax image of the compatible image.

[Description of Another Encoding Process]

The encoding process performed by the encoding device 140 in a case where the TSs having the configurations described with reference to FIG. 20 are generated is the same as the encoding process illustrated in FIGS. 16 and 17 except that, in Step S86 illustrated in FIG. 17, a TS1 is generated from a compatible stream, a TS2 is generated from an auxiliary stream, a TS3 is generated from auxiliary information, and multiplexing is performed, and thus, the description thereof will not be presented.

[Description of Another Decoding Process]

Figure 21:
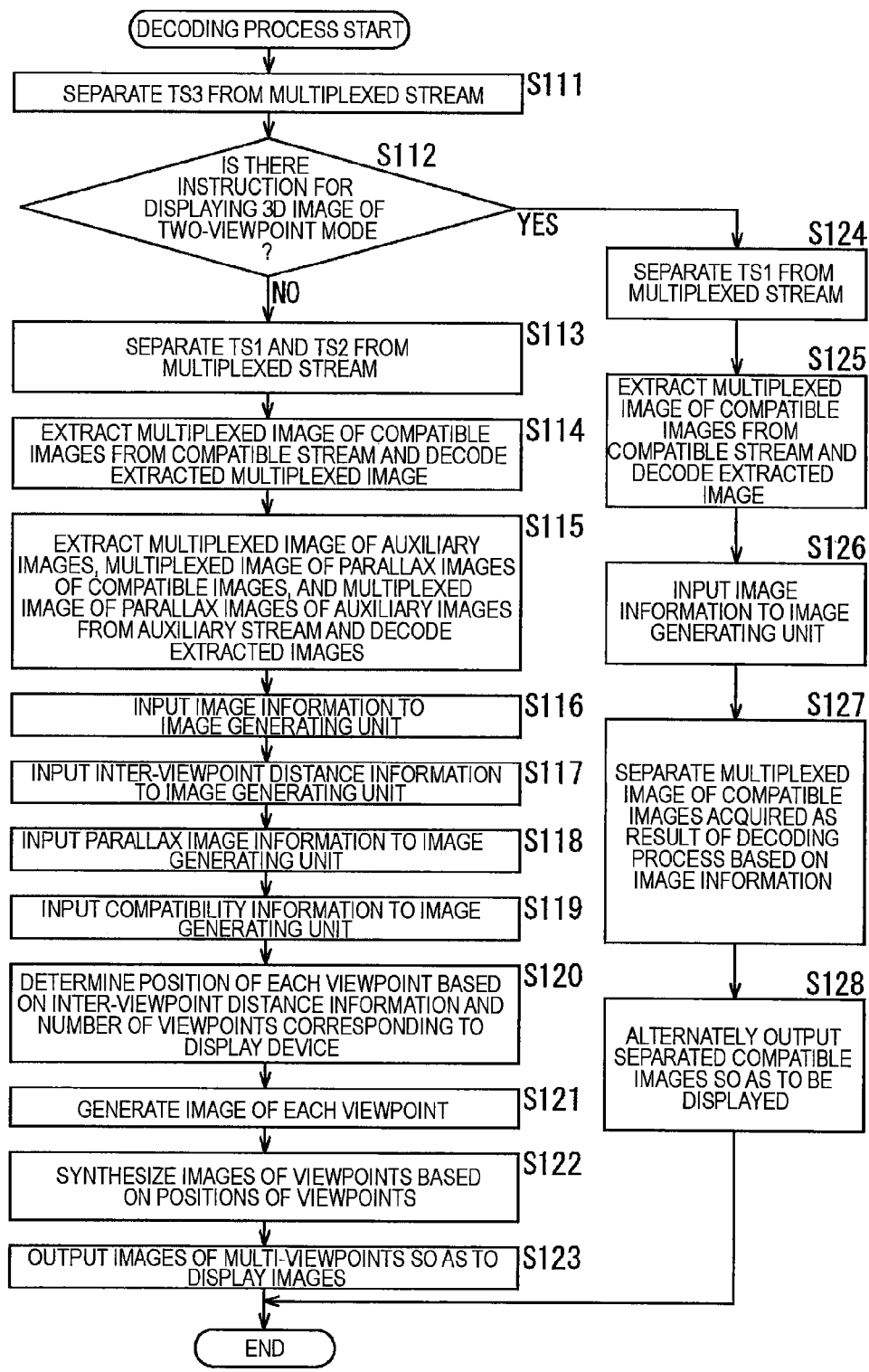
FIG. 21 is a flowchart that illustrates another decoding process performed by the decoding device illustrated in FIG. 18.

FIG. 21 is a flowchart that illustrates a decoding process performed by the decoding device 170 illustrated in FIG. 18 in a case where the configurations of the TSs, which are multiplexed in a multiplexed stream, are the configurations described with reference to FIG. 20. This decoding process, for example, is started when a multiplexed stream that is transmitted from the encoding device 140 illustrated in FIG. 14 is input to the decoding device 170.

In Step S111 illustrated in FIG. 21, the separation unit 121 of the decoding device 120 acquires the multiplexed stream that is transmitted from the encoding device 50 and separates a TS3 from the multiplexed stream. Then, the separation unit 121 extracts auxiliary information included in the TS3 by referring to the delimiter and the like. In addition, the separation unit 121 supplies image information that is included in the auxiliary information to the image information acquiring unit 123 for the maintenance thereof and supplies viewpoint distance information to the inter-viewpoint distance information acquiring unit 124 for the maintenance thereof. Furthermore, the separation unit 121 supplies parallax image information included in the auxiliary information to the parallax image information acquiring unit 125 for the maintenance thereof and supplies compatibility information to the compatibility information acquiring unit 126 for the maintenance thereof. Then, the process proceeds to Step S112.

In Step S112, the image generating unit 127 determines whether or not an instruction for displaying a 3D image of the two-viewpoint mode has been made by a viewer. In a case where it is determined that the instruction for displaying a 3D image of the two-viewpoint mode has not been made by the viewer in Step S112, in other words, in a case where an instruction for displaying a 3D image of the multi-viewpoint mode has been made, the process proceeds to Step S113.

In Step S113, the separation unit 121 separates the TS1 and the TS2 from the multiplexed stream. The separation unit 121 extracts a compatible stream included in the TS1 and an auxiliary stream included in the TS2 by referring to the delimiter and the like and supplies the extracted streams to the decoder 122. Then, the process proceeds to Step S114.

The process of Steps S114 to S123 is the same as the process of Steps S93 to S102 illustrated in FIG. 19, and thus the description thereof will not be presented.

On the other hand, in a case where it is determined that an instruction for displaying a 3D image of the two-viewpoint mode has been made by the viewer in Step S112, the separation unit 121 separates the TS1 from the multiplexed stream in Step S124. Then, the separation unit 121 supplies a compatible stream that is included in the TS1 to the decoder 122 by referring to the delimiter and the like, and the process proceeds to Step S125.

The process of Steps S125 to S128 is the same as the process of Steps S103 to S106 illustrated in FIG. 19, and thus the description thereof will not be presented.

Third Embodiment

[Configuration Example of Encoding Device According to Third Embodiment]

Figure 22:
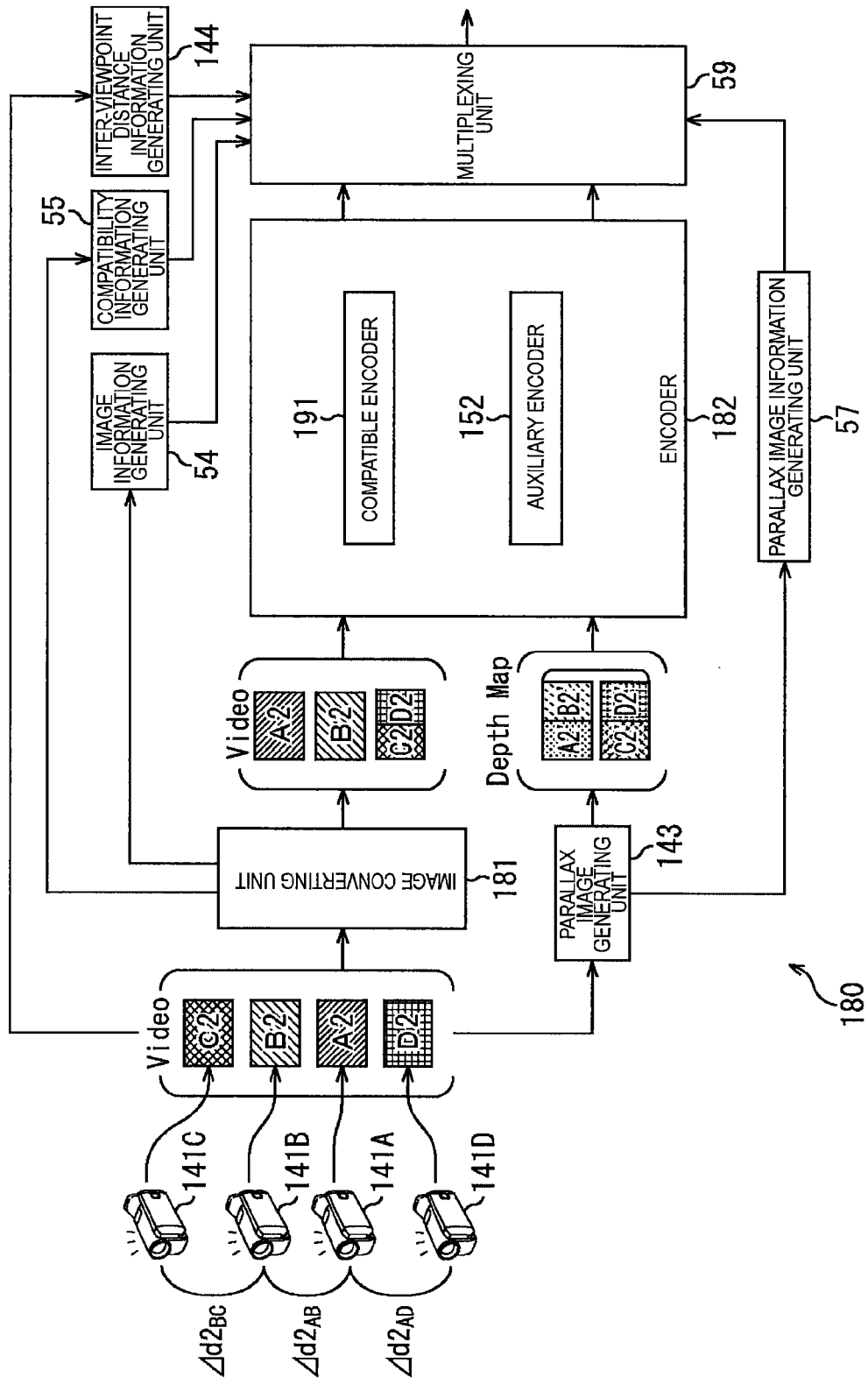
FIG. 22 is a block diagram that illustrates a configuration example of an encoding device according to a third embodiment of the present technology.

FIG. 22 is a block diagram that illustrates a configuration example of an encoding device according to a third embodiment of the present technology.

In the configuration illustrated in FIG. 22, the same reference numeral is assigned to a configuration that is the same as that illustrated in FIG. 2 or 14. Duplicate description will not be presented as is appropriate.

The configuration of the encoding device 180 illustrated in FIG. 22 is mainly different from the configuration illustrated in FIG. 14 in that an image converting unit 181 and an encoder 182 are disposed instead of the image converting unit 142 and the encoder 145. The encoding device 180 secures compatibility with an existing encoding device that encodes a 3D image of two viewpoints in accordance with the MVC mode by encoding images of two viewpoints out of multi-viewpoint images in accordance with the MVC mode as compatible images and storing the images altogether in one TS or storing the images in TSs that are different for each viewpoint.

More specifically, the image converting unit 181 of the encoding device 180, similarly to the image converting unit 142 illustrated in FIG. 14, determines an image A2 that is supplied from the imaging unit 141A, of which the position in the horizontal direction is located on the inner side out of the imaging units 141A to 141D, and an image B2 that is supplied from the imaging unit 141B as compatible images. Then, the image converting unit 181 directly supplies the images A2 and B2 that are compatible images to the encoder 182. In addition, the image converting unit 181, similarly to the image converting unit 142, supplies information that designates the images A2 and B2 as compatible images to the compatibility information generating unit 55.

In addition, the image converting unit 181, similarly to the image converting unit 142, sets images C2 and D2 other that the images A2 and B2 as auxiliary images and multiplexes the auxiliary images in accordance with a predetermined multiplexing mode. The image converting unit 181 supplies a multiplexed image that is acquired as a result of the multiplexing process to the encoder 182 and supplies information that represents the multiplexing mode of the auxiliary images to the image information generating unit 54.

The encoder 182 is configured by a compatible encoder 191 and an auxiliary encoder 152. The compatible encoder 191 of the encoder 182 designates compatible images from among the compatible images and the multiplexed image of the auxiliary images that are supplied from the image converting unit 181, encodes the image A2 out of the compatible images as a base image in accordance with the existing AVC mode in units of access units, and encodes the image B2 as a dependent image in accordance with the existing MVC mode in units of the access units. The compatible encoder 191 supplies an encoded stream that is acquired as a result thereof to the multiplexing unit 59 as a compatible stream.

[First Configuration Example of TS]

Figure 23:
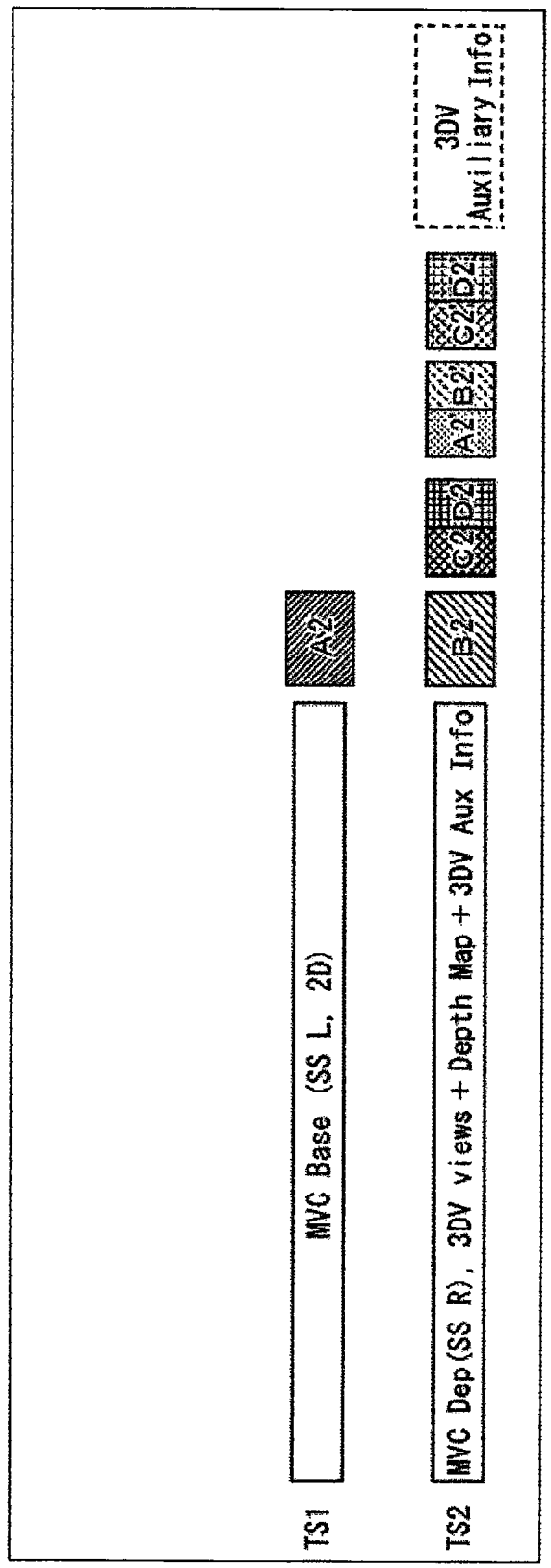
FIG. 23 is a diagram that illustrates a first configuration example of TSs that are generated by a multiplexing unit illustrated in FIG. 22.

FIG. 23 is a diagram that illustrates a first configuration example of the TSs that are generated by the multiplexing unit 59 illustrated in FIG. 22.

In the example illustrated in FIG. 23, in the multiplexing unit 59, a TS1 is generated from the image A2 after encoding which is included in the compatible stream, and a TS2 is generated from the image B2 after encoding, the auxiliary stream, and the auxiliary information.

[Description of Process of Encoding Device]

Figure 24:
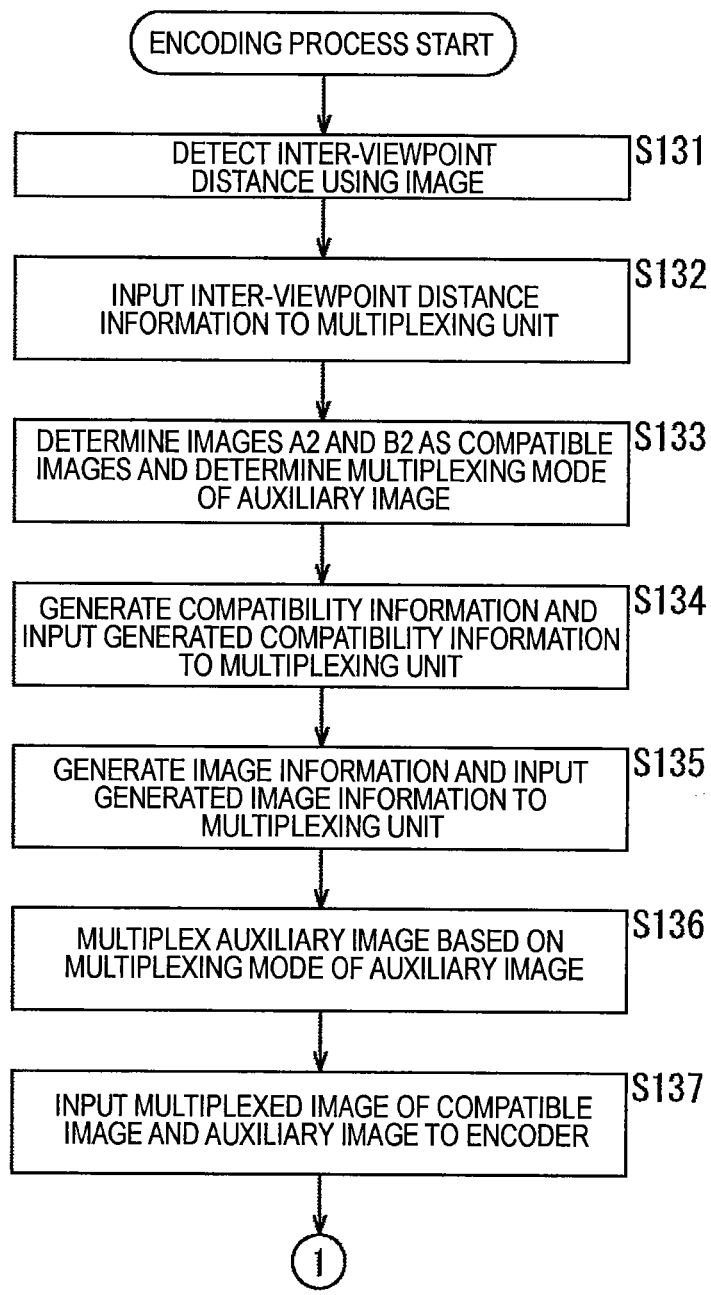
FIG. 24 is a flowchart that illustrates an encoding process performed by the encoding device illustrated in FIG. 22.
Figure 25:
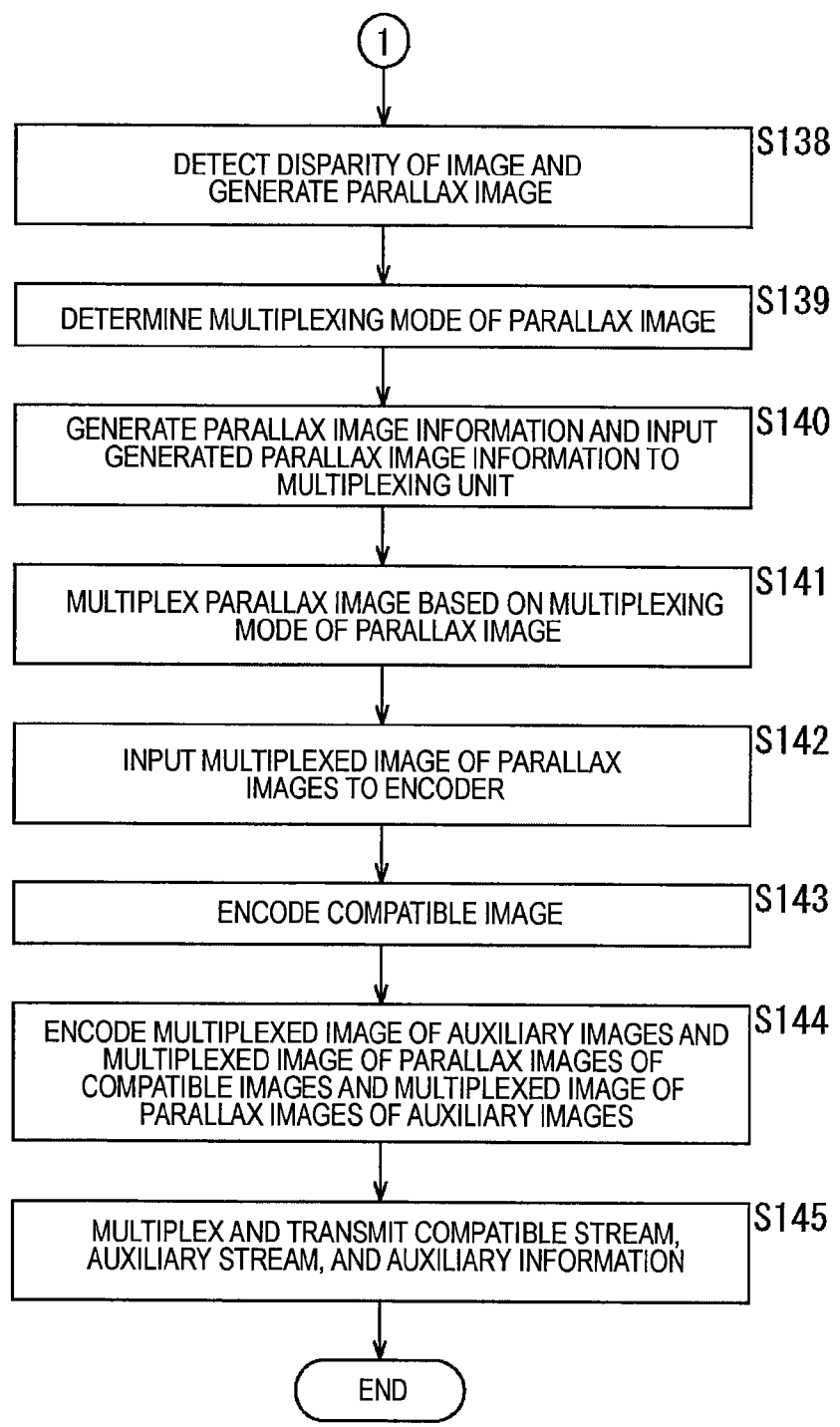
FIG. 25 is a flowchart that illustrates the encoding process performed by the encoding device illustrated in FIG. 22.

FIGS. 24 and 25 are flowcharts that illustrate an encoding process that is performed by the encoding device 180 illustrated in FIG. 22. This encoding process, for example, is started when the images A2 to D2 are output from the imaging units 141A to 141D.

The process of Steps S131 and S132 illustrated in FIG. 24 is the same as the process of Steps S71 and S72 illustrated in FIG. 16, and thus the description thereof will not be presented.

After the process of Step S132, in Step S133, the image converting unit 181 determines the image A2 that is supplied from the imaging unit 141A, of which the position in the horizontal direction is located on the inner side out of the imaging units 141A to 141D, and the image B2 that is supplied from the imaging unit 141B as compatible images and determines a multiplexing mode of the auxiliary images. The image converting unit 181 supplies information that designates the images A2 and B2 as compatible images to the compatibility information generating unit 55 and supplies the multiplexing mode of the auxiliary images to the image information generating unit 54. Then, the process proceeds to Step S134.

The process of Steps S134 to S137 is the same as the process of Steps S14 to S17 illustrated in FIG. 6, and thus the description thereof will not be presented. The process of Steps S138 to S142 is the same as the process of Steps S79 to S83 illustrated in FIG. 17, and thus the description thereof will not be presented.

After the process of Step S142, in Step S143, the compatible encoder 191 of the encoder 182 encodes the image A2 out of the compatible images supplied from the image converting unit 181 as a base image in accordance with the existing AVC mode and encodes the image B2 as a dependent image in accordance with the existing MVC mode. The compatible encoder 191 supplies an encoded stream that is acquired as a result thereof to the multiplexing unit 59 as a compatible stream.

In Step S144, the auxiliary encoder 152 encodes the multiplexed image of the auxiliary images that is supplied from the image converting unit 142 and the multiplexed image of the parallax images of the compatible images and the multiplexed images of the parallax images of the auxiliary images that are supplied from the parallax image generating unit 53 in accordance with a predetermined mode. The auxiliary encoder 152 supplies an encoded stream that is acquired as a result of the encoding process to the multiplexing unit 59 as an auxiliary stream.

In Step S145, the multiplexing unit 59 generates a TS1 from the image A after encoding which is included in the compatible steam, generates a TS2 from the image B after encoding, the auxiliary stream, and the auxiliary information, performs a multiplexing process, and transmits a multiplexed stream that is acquired as a result thereof. This multiplexed stream, for example, is recorded on a BD or the like or is transmitted as a broadcast stream. Then, the process ends.

As above, the encoding device 180 performs multiplexing with one of the compatible images after encoding and the other being stored in TSs different from each other, and accordingly, the compatibility with an existing encoding device can be secured which encodes 3D images of the two-viewpoint mode in accordance with the MVC mode and stores the images in two TSs in multiplexing.

In addition, since the encoding device 180 encodes images of two viewpoints out of multi-viewpoint images as compatible images in accordance with an existing encoding mode, the compatibility with an existing encoding device can be secured in encoding which encodes 3D images of the two-viewpoint mode.

[Configuration Example of Decoding Device]

Figure 26:
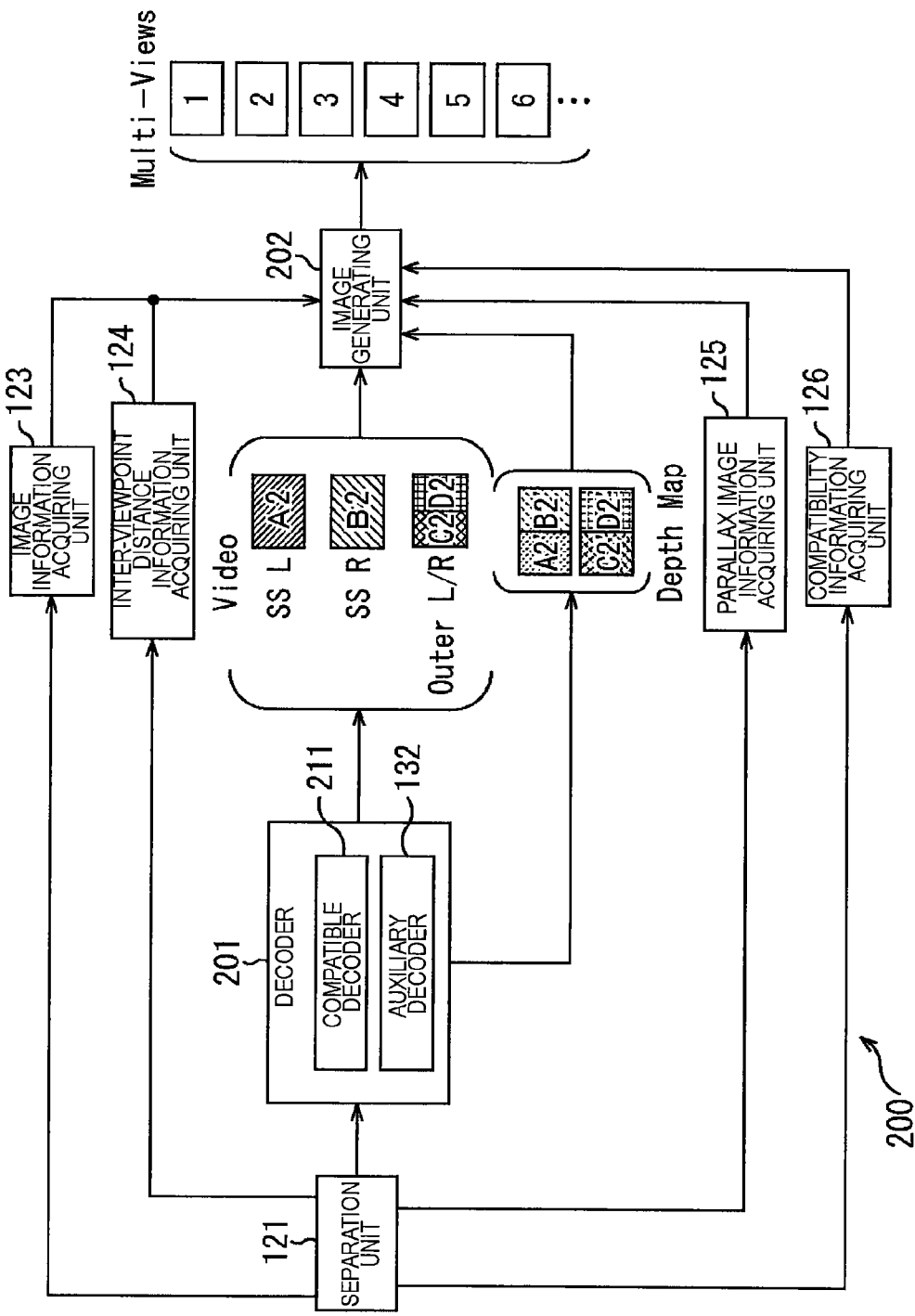
FIG. 26 is a diagram that illustrates a configuration example of a decoding device that corresponds to the encoding device illustrated in FIG. 22.

FIG. 26 is a diagram that illustrates a configuration example of a decoding device that decodes the multiplexed stream transmitted from the encoding device 180 illustrated in FIG. 22.

In the configuration illustrated in FIG. 26, the same reference numeral is assigned to a configuration that is the same as that illustrated in FIG. 18. Duplicate description will not be presented as is appropriate.

The configuration of the decoding device 200 illustrated in FIG. 26 is mainly different from the configuration illustrated in FIG. 18 in that a decoder 201 and an image generating unit 202 are disposed instead of the decoder 122 and the image generating unit 171. The decoding device 200 generates an image of one viewpoint, images of two viewpoints, or multi-viewpoint images by decoding the multiplexed stream that is transmitted from the encoding device 180 and displays the generated images on a display device not illustrated in the figure.

More specifically, the decoder 201 of the decoding device 200 is configured by a compatible decoder 211 and an auxiliary decoder 132. The compatible decoder 211 of the decoder 201 decodes an encoded compatible image that is included in the compatible stream supplied from the separation unit 121 in accordance with a mode that corresponds to the MVC mode and supplies the decoded compatible image to the image generating unit 202.

The image generating unit 202 outputs the image in accordance with a display instruction supplied from a viewer, thereby displaying the image on a display device not illustrated in the figure. More specifically, the image generating unit 202 generates images of three or more viewpoints, which correspond to a display device not illustrated in the figure, each having the resolution that is a half of the resolution of the compatible image or the auxiliary image by using the compatible image, the multiplexed image of the auxiliary images, the multiplexed image of the parallax images of the compatible images, and the multiplexed image of the parallax images of the auxiliary images in accordance with a viewer's instruction for displaying a 3D image of multi-viewpoints based on the image information supplied from the image information acquiring unit 123, the inter-viewpoint distance information supplied from the inter-viewpoint distance information acquiring unit 124, the parallax image information supplied from the parallax image information acquiring unit 125, the compatibility information supplied from the compatibility information acquiring unit 126, and the like.

More specifically, the image generating unit 202 separates the parallax image of each auxiliary image from the multiplexed image of the parallax images of the auxiliary images based on the information that represents a multiplexing mode of the parallax images of the auxiliary images that is included in the parallax image information supplied from the parallax image information acquiring unit 125. In addition, the image generating unit 202 separates the parallax image of each compatible image from the multiplexed image of the parallax images of the compatible images based on the information that represents a multiplexing mode of the parallax images of the compatible images that is included in the parallax image information.

Furthermore, the image generating unit 202 separates each auxiliary image from the multiplexed image of the auxiliary images based on the information that represents a multiplexing mode of the auxiliary images that is included in the image information supplied from the image information acquiring unit 123. In addition, the image generating unit 202 determines the positions of viewpoints of multi-viewpoint images to be generated based on the inter-viewpoint distance information and the number of viewpoints that corresponds to a display device not illustrated in the figure. Then, the image generating unit 202 generates an image of each viewpoint of which the position is determined by using each compatible image, each auxiliary image, the parallax image of each compatible image, and the parallax image of each auxiliary image. Then, the image generating unit 202, similarly to the image generating unit 127, converts the resolution of the generated multi-viewpoint images into the resolution that is "1/the number of viewpoints" of the resolution of the compatible image or the auxiliary image, synthesizes the converted images, and displays the synthesized image on a display device not illustrated in the figure.

At this time, the multi-viewpoint images after the synthesis are displayed such that the viewing angles are different for each viewpoint, and a viewer can view a 3D image without wearing glasses by seeing images of arbitrary two viewpoints with his/her left and right eyes.

In addition, the image generating unit 202 alternately outputs the images A2 and B2 as compatible images supplied from the decoder 122 in accordance with an instruction for displaying a 3D image of the two-viewpoint mode that is supplied from a viewer, thereby displaying the images on a display device not illustrated in the figure. At this time, the viewer can view a 3D image by wearing glasses in which one of a left-eye shutter and a right-eye shutter is open at the time of displaying the image A2, and the other is open at the time of displaying the image B2 and viewing the images A2 and B2 that are alternately displayed on the display device.

Furthermore, the image generating unit 202 outputs the image A2 out of the compatible images supplied from the decoder 122 in accordance with an instruction for displaying a 2D image that is supplied from a viewer, thereby displaying the image on a display device not illustrated in the figure. Accordingly, the viewer can view the 2D image.

[Description of Process of Decoding Device]

Figure 27:
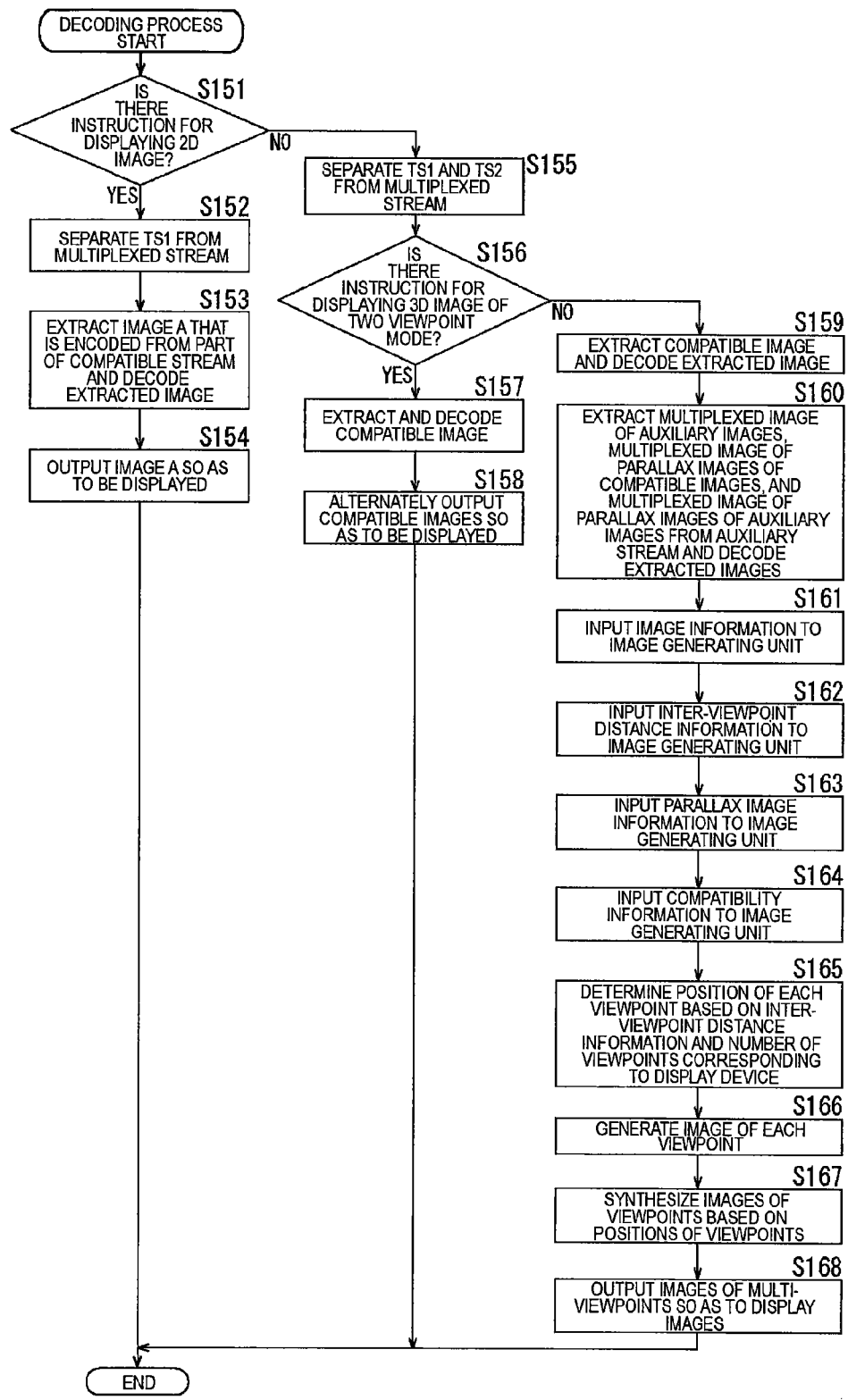
FIG. 27 is a flowchart that illustrates a decoding process performed by the decoding device illustrated in FIG. 26.

FIG. 27 is a flowchart that illustrates a decoding process performed by the decoding device 200 illustrated in FIG. 26. This decoding process, for example, is started when a multiplexed stream that is transmitted from the encoding device 180 illustrated in FIG. 22 is input to the decoding device 200.

In Step S151 illustrated in FIG. 27, the image generating unit 202 of the decoding device 200 determines whether or not an instruction for displaying a 2D image has been made by a viewer. In a case where it is determined that the instruction for displaying a 2D image has been made by the viewer in Step S151, the process proceeds to Step S152.

In Step S152, the separation unit 121 receives the multiplexed stream that is transmitted from the encoding device 180 and separates a TS1 from the multiplexed stream. Then, the separation unit 121 extracts a part of the compatible stream that is included in the TS1 by referring to the delimiter and the like and supplies the extracted stream to the decoder 201.

In Step S153, the compatible decoder 211 of the decoder 201 extracts an image A2, which is a base image out of encoded compatible images, from a part of the compatible stream that is supplied from the separation unit 121 and decodes the extracted image in accordance with a mode that corresponds to the AVC mode. The compatible decoder 211 supplies the image A2 that is acquired as a result of the decoding process to the image generating unit 202.

In Step S154, the image generating unit 202 outputs the image A2 that is supplied from the compatible decoder 211 to a display device not illustrated in the figure, thereby displaying the image. Then, the process ends.

On the other hand, in a case where it is determined that an instruction for displaying a 2D image has not been made by the viewer in Step S151, the separation unit 121 separates TS1 and TS2 from the multiplexed stream in Step S155. Then, the separation unit 121 extracts a part of the compatible stream that is included in the TS1 by referring to the delimiter and the like and supplies the extracted stream to the decoder 122. In addition, the separation unit 121 extracts another part of the compatible stream included in the TS2 and the auxiliary stream and supplies the extracted streams to the decoder 122. In addition, the separation unit 121 extracts the auxiliary information that is included in the TS2 by referring to the delimiter and the like, supplies the image information that is included in the auxiliary information to the image information acquiring unit 123, and supplies the viewpoint distance information to the inter-viewpoint distance information acquiring unit 124. Furthermore, the separation unit 121 supplies the parallax image information that is included in the auxiliary information to the parallax image information acquiring unit 125 and supplies the compatibility information to the compatibility information acquiring unit 126.

In Step S156, the image generating unit 202 determines whether or not an instruction for displaying a 3D image of the two-viewpoint mode has been made by a viewer. In a case where it is determined that the instruction for displaying a 3D image of the two-viewpoint mode has been made by the viewer in Step S156, the process proceeds to Step S157.

In Step S157, the compatible decoder 211 of the decoder 122 extracts an encoded compatible image from the compatible stream that is supplied from the separation unit 121 and decodes the extracted compatible image. More specifically, the compatible decoder 211 extracts an encoded image A from a part of the compatible stream that is supplied from the separation unit 121 and extracts an encoded image B from another part of the compatible stream. Then, the compatible decoder 211 decodes the encoded image A as an encoded base image in accordance with a mode that corresponds to the AVC mode and decodes the encoded image B as an encoded dependent image in accordance with a mode that corresponds to the MVC mode. The compatible decoder 211 supplies the images A and B that are compatible images acquired as a result of the decoding process to the image generating unit 202.

In Step S158, the image generating unit 202 alternately outputs images A1 and B1 out of the compatible images that are supplied from the compatible decoder 211, thereby displaying the images A1 and B1 on a display device not illustrated in the figure. Then, the process ends.

On the other hand, in a case where it is determined that the instruction for displaying a 3D image of the two-viewpoint mode has not been made by the viewer in Step S156, in other words, in a case where an instruction for displaying a 3D image of the multi-viewpoint mode has been made by the viewer, the process proceeds to Step S159.

In Step S159, the compatible decoder 211, similarly to the process of Step S157, extracts an encoded compatible image from the compatible stream that is supplied from the separation unit 121 and decodes the extracted compatible image in accordance with a mode that corresponds to the MVC mode. The compatible decoder 211 supplies images A and B that are the compatible images acquired as a result of the decoding process to the image generating unit 202.

In Step S160, the auxiliary decoder 132 extracts the encoded multiplexed image of the auxiliary images, the multiplexed image of the parallax images of the compatible images, and the multiplexed image of the parallax images of the auxiliary images from the auxiliary stream and decodes the extracted images in accordance with a mode that corresponds to the auxiliary encoder 152 illustrated in FIG. 22. The auxiliary decoder 132 supplies the multiplexed image of the auxiliary images, the multiplexed image of the parallax images of the compatible images, and the multiplexed image of the parallax images of the auxiliary images, which are acquired as a result of the decoding process, to the image generating unit 202.

The process of Steps S161 to S168 is the same as the process of Steps S35 to S42 illustrated in FIG. 9 except that the parallax image of the compatible image is a multiplexed image of the parallax images of the compatible images, and thus the description thereof will not be presented.

In a decoding device that can decode only a compatible stream that has compatibility with the decoding device 200, the auxiliary stream and the auxiliary information included in the TS2 are ignored, and the process of Steps S151 to S155, S157, and S158 is performed.

As above, the decoding device 200 can separate the multiplexed stream that is multiplexed by the encoding device 180 in accordance with a mode that has compatibility with an existing mode. In addition, the decoding device 200 can decode a compatible stream and an auxiliary stream that are encoded in accordance with a mode, which has compatibility with an existing mode and requires relatively low process cost, by the encoding device 180.

[Second Configuration Example of TS]

Figure 28:
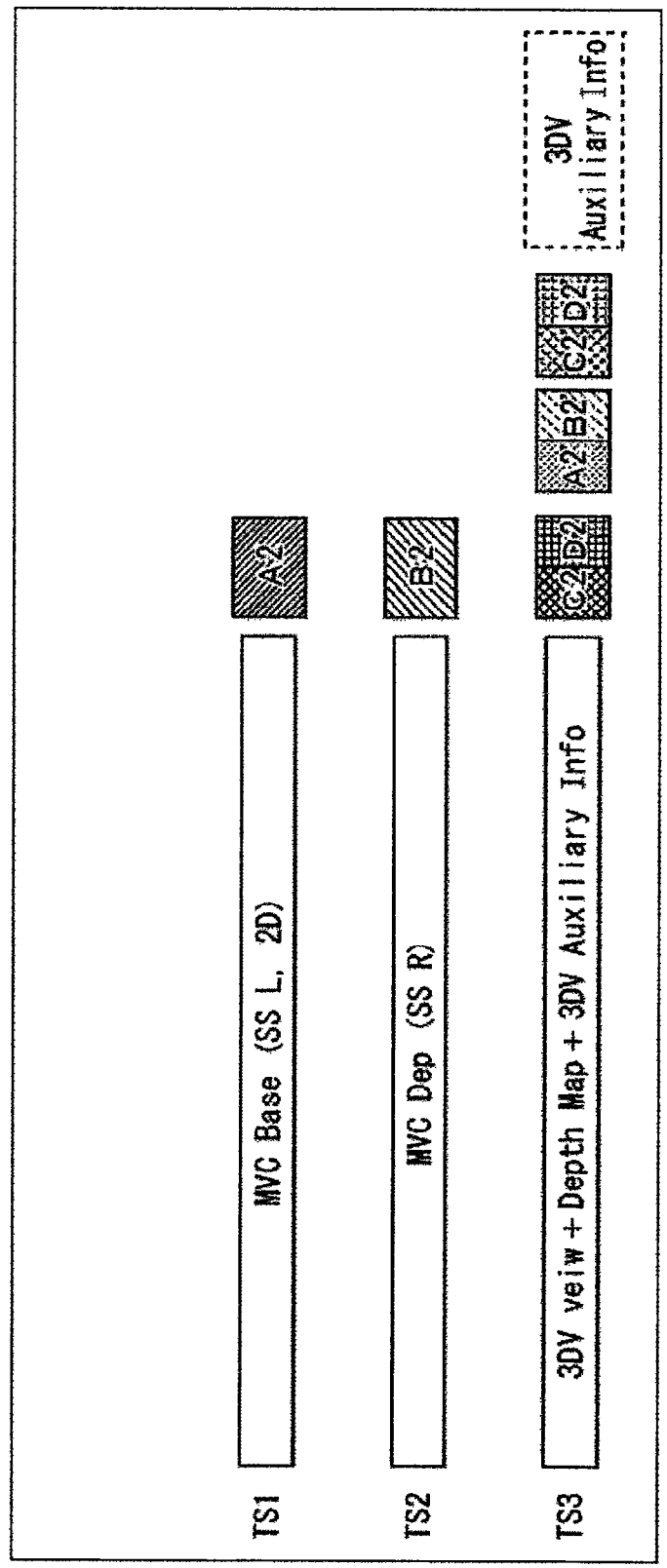
FIG. 28 is a diagram that illustrates a second configuration example of the TSs that are generated by the multiplexing unit illustrated in FIG. 22.

FIG. 28 is a diagram that illustrates a second configuration example of the TSs that are generated by the multiplexing unit 59 illustrated in FIG. 22.

In the example illustrated in FIG. 28, three TSs are generated by the multiplexing unit 59, and an image B2 that is one of encoded compatible images included in the compatible stream and an auxiliary stream and auxiliary information are included in TSs that are different from each other. More specifically, a TS1 is generated from an image A2 that is one of encoded compatible images included in the compatible stream, a TS2 is generated from the other image B2, and a TS3 is generated from an auxiliary stream and auxiliary information.

In the example illustrated in FIG. 28, since each one of the images A1 and B2 after encoding, which are included in the compatible stream, is stored in one TS, the amount of information of the compatible stream does not need to be decreased. Accordingly, the image quality of the compatible image can be configured to be the same as the image quality of the images of two viewpoints that are encoded in accordance with the existing MVC mode.

[Description of Multiplexing Method]

Figure 29:
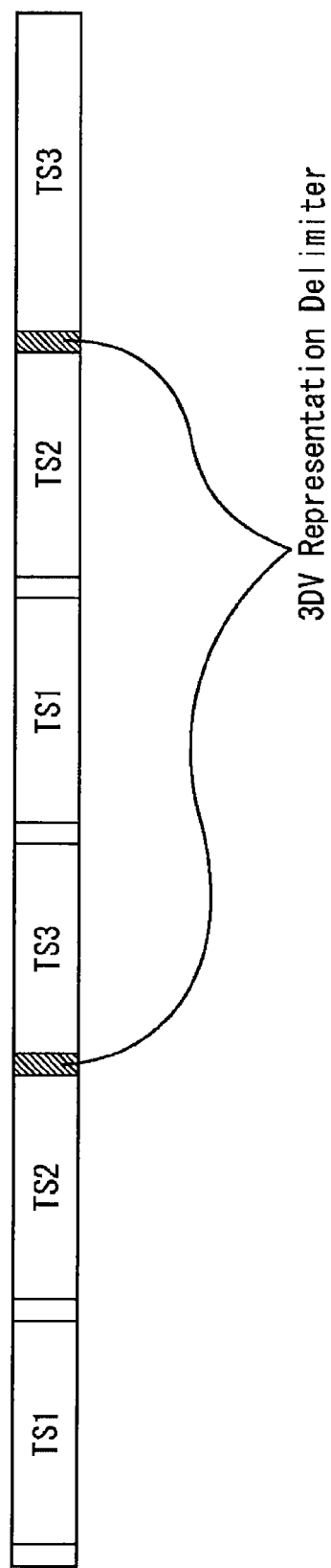
FIG. 29 is a diagram that illustrates an example of a method of multiplexing the TS1 to TS3 illustrated in FIG. 28.

FIG. 29 is a diagram that illustrates an example of the method of multiplexing the TS1 to the TS3 illustrated in FIG. 28.

As illustrated in FIG. 29, the TS1 to TS3 are multiplexed by being arranged from the head in order of the TS3, TS1, and the TS2 in units of access units. In addition, a 3DV representation delimiter representing the head of the TS that includes information other than a compatible stream is added to the head of the TS3. In other words, the 3DV representation delimiter is arranged on the boundary between a TS3 of a specific access unit and a TS2 of the previous access unit. Accordingly, the decoding device 200 can easily recognize a compatible stream and an auxiliary stream and an auxiliary image synchronized therewith by extracting data from a specific 3DV representation delimiter to a next 3DV representation delimiter.

[Description of Second Encoding Process]

An encoding process that is performed by the encoding device 180 in a case where the TSs having the configurations described with reference to FIG. 28 is the same as the encoding process described with reference to FIGS. 24 and 25 except that the TS1 is generated from an image A after encoding that is included in the compatible stream, and a TS2 is generated from an image B after encoding, and a TS3 is generated from the auxiliary stream and the auxiliary information in Step S145 illustrated in FIG. 25, and the description thereof will not be presented.

[Description of Second Decoding Process]

Figure 30:
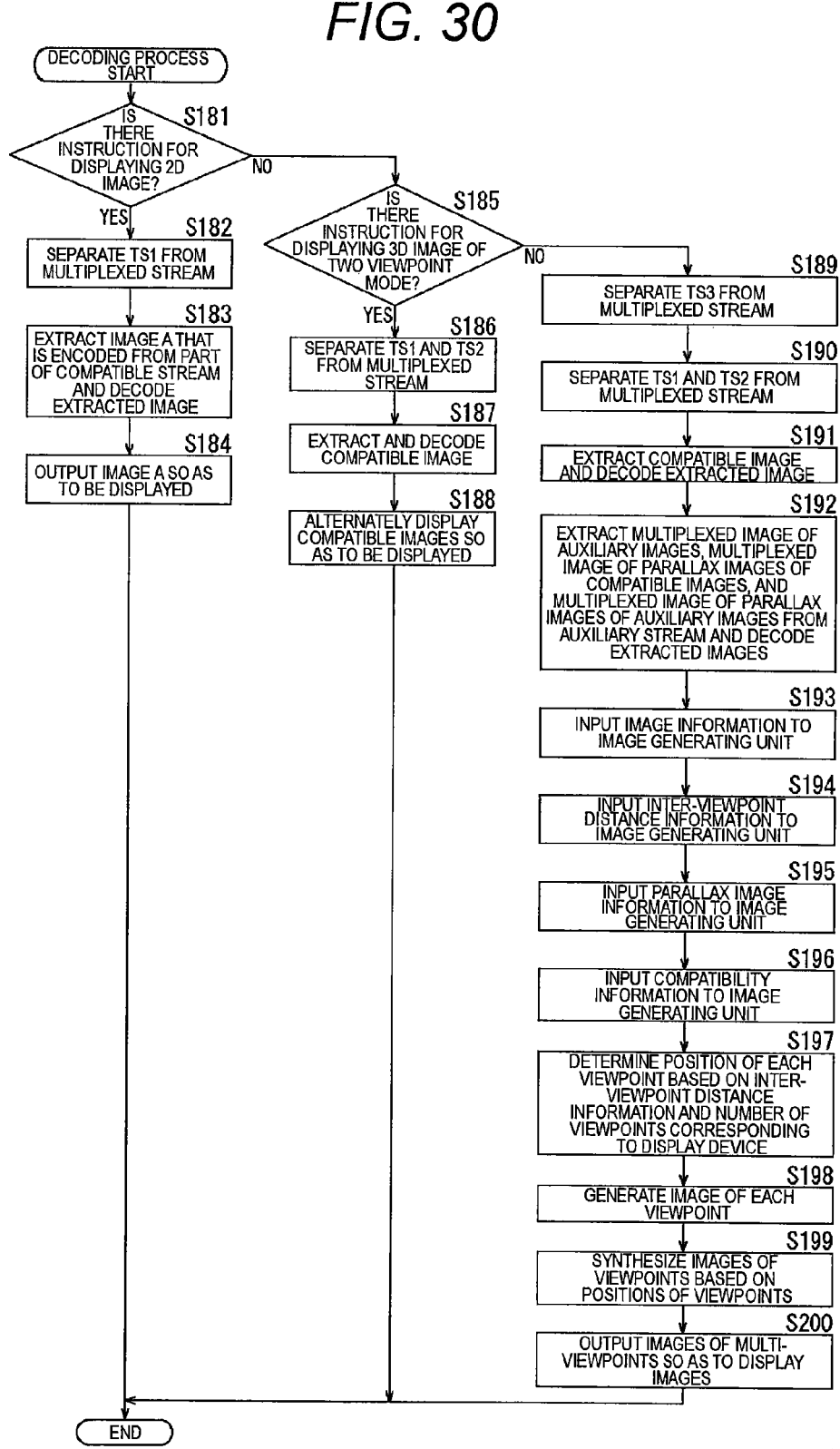
FIG. 30 is a flowchart that illustrates a second decoding process performed by the decoding device illustrated in FIG. 26.

FIG. 30 is a flowchart that illustrates a decoding process performed by the decoding device 200 illustrated in FIG. 26 in a case where the configurations of the TSs, which are multiplexed in a multiplexed stream, are the configurations described with reference to FIG. 28. This decoding process, for example, is started when a multiplexed stream that is transmitted from the encoding device 180 illustrated in FIG. 22 is input to the decoding device 200.

The process of Steps S181 to S184 illustrated in FIG. 30 is the same as the process of Steps S151 to S154 illustrated in FIG. 27, and thus the description thereof will not be presented.

In a case where it is determined that the instruction for displaying a 2D image has not been made by the viewer in Step S181, the image generating unit 202, similarly to the process of Step S156 illustrated in FIG. 30, determines whether or not an instruction for displaying a 3D image of the two-viewpoint mode has been made by the viewer in Step S185. In a case where it is determined that there is the instruction for displaying a 3D image of the two-viewpoint mode has been made by the viewer in Step S185, the process proceeds to Step S186.

In Step S186, the separation unit 121, similarly to the process of Step S155 illustrated in FIG. 27, separates the TS1 and the TS2 from the multiplexed stream. Then, the separation unit 121 extracts a part of the compatible stream that is included in the TS1 and a part other than the compatible stream that is included in the TS2 and supplies the extracted parts to the decoder 122. Then, the process proceeds to Step S187.

The process of Steps S187 and S188 is the same as the process of Steps S157 and S158 illustrated in FIG. 27, and thus the description thereof will not be presented.

On the other hand, in a case where it is determined that the instruction for displaying a 3D image of the two-viewpoint mode has not been made by the viewer in Step S185, in other words, in a case where an instruction for displaying a 3D image of the multi-viewpoint mode has been made by the viewer, the process proceeds to Step S189.

In Step S189, the separation unit 121 separates the TS3 from the multiplexed stream. Then, the separation unit 121 extracts the auxiliary information included in the TS3 by referring to the delimiter and the like, supplies the image information included in the auxiliary information to the image information acquiring unit 123 for the maintenance thereof, and supplies the viewpoint distance information to the inter-viewpoint distance information acquiring unit 124 for the maintenance thereof. In addition, the separation unit 121 supplies the parallax image information included in the auxiliary information to the parallax image information acquiring unit 125 for the maintenance thereof and supplies the compatibility information to the compatibility information acquiring unit 126 for the maintenance thereof. Furthermore, the separation unit 121 extracts the auxiliary stream included in the TS3 by referring to the delimiter and the like and supplies the extracted auxiliary stream to the decoder 122.

In Step S190, the separation unit 121, similarly to the process of Step S186, separates the TS1 and the TS2 from the multiplexed stream. Then, the separation unit 121 extracts a part of the compatible stream that is included in the TS1 and a part other than the compatible stream that is included in the TS2 and supplies the extracted parts to the decoder 122.

The process of Steps S191 to S200 is the same as the process of Steps S159 to S168 illustrated in FIG. 27, and thus the description thereof will not be presented.

In a decoding device that can decode only a compatible stream that has compatibility with the decoding device 200, the TS3 is ignored, and the process of Steps S181 to S188 is performed.

As above, the decoding device 200 can separate the multiplexed stream that is multiplexed by the encoding device 180 in accordance with a mode that has compatibility with an existing mode.

[Third Configuration Example of TS]

Figure 31:
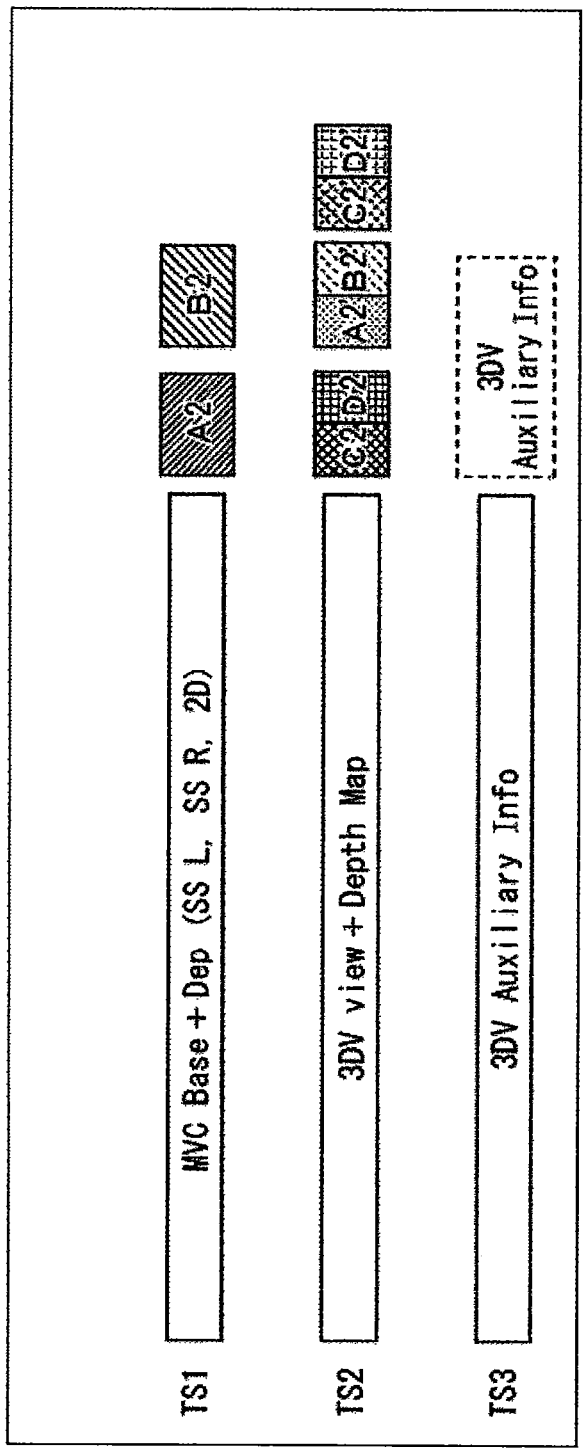
FIG. 31 is a diagram that illustrates a third configuration example of the TSs that are generated by the multiplexing unit illustrated in FIG. 22.

FIG. 31 is a diagram that illustrates a third configuration example of the TSs that are generated by the multiplexing unit 59 illustrated in FIG. 22.

In the example illustrated in FIG. 31, three TSs are generated by the multiplexing unit 59, and a compatible stream, an auxiliary stream, and auxiliary information are included in TSs that are different from each other. More specifically, a TS1 is generated from the compatible stream, a TS2 is generated from the auxiliary stream, and a TS3 is generated from the auxiliary information.

In the example illustrated in FIG. 31, the TS3 is independently generated only from the auxiliary information of which the amount of information is relatively small. Accordingly, a decoding device that executes an application, in which there is a limitation on the number of TSs that can be simultaneously processed, such as a BD application can reproduce the TS1 and the TS2 in synchronization with each other by preloading the TS3 of which the amount of information is relatively small.

In addition, in the example illustrated in FIG. 31, since the compatible stream is stored in the TS that is different from the TSs in which the auxiliary stream and the auxiliary information are stored, the encoding device can acquire the auxiliary stream and the auxiliary information by downloading them from another device and generate a multiplexed stream after the compatible stream is generated.

In addition, since the compatible stream is stored in one TS, the encoding device 180 can secure the compatibility with an encoding device that encodes a 3D image of the existing two-viewpoint mode in accordance with the MVC mode and stores the encoded image in one TS in multiplexing.

[Description of Third Encoding Process]

An encoding process that is performed by the encoding device 180 in a case where the TSs having the configurations described with reference to FIG. 31 is the same as the encoding process described with reference to FIGS. 24 and 25 except that the TS1 is generated from the compatible stream, the TS2 is generated from the auxiliary stream, and the TS3 is generated from the auxiliary information in Step S145 illustrated in FIG. 25, and thus the description thereof will not be presented.

[Description of Third Decoding Process]

Figure 32:
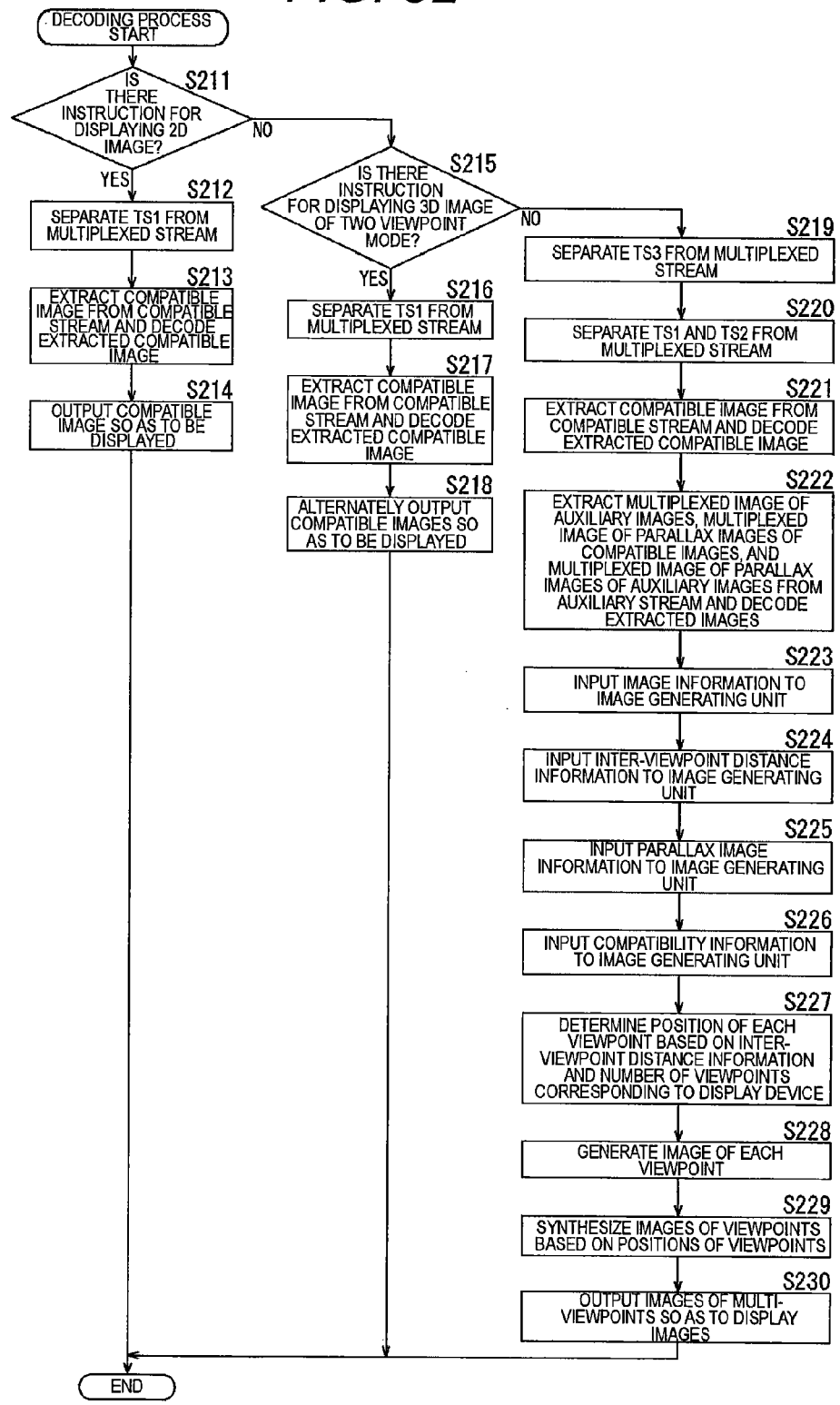
FIG. 32 is a flowchart that illustrates a third decoding process performed by the decoding device 200 illustrated in FIG. 26.

FIG. 32 is a flowchart that illustrates a decoding process performed by the decoding device 200 illustrated in FIG. 26 in a case where the configurations of the TSs, which are multiplexed in a multiplexed stream, are the configurations described with reference to FIG. 31. This decoding process, for example, is started when a multiplexed stream that is transmitted from the encoding device 180 illustrated in FIG. 22 is input to the decoding device 200.

In Step S211 illustrated in FIG. 32, the image generating unit 202 of the decoding device 200, similarly to the process of Step S151 illustrated in FIG. 27, determines whether or not an instruction for displaying a 2D image has been made by a viewer. In a case where it is determined that the instruction for displaying a 2D image has been made by a viewer in Step S211, the process proceeds to Step S212.

In Step S212, the separation unit 121 receives the multiplexed stream that is transmitted from the encoding device 180 and separates a TS1 from the multiplexed stream. Then, the separation unit 121 extracts a compatible stream that is included in the TS1 and supplies the extracted compatible stream to the decoder 201.

In Step S213, the compatible decoder 211 of the decoder 201 extracts an encoded compatible image from the compatible stream that is supplied from the separation unit 121 and decodes the encoded compatible image in accordance with a mode that corresponds to the MVC mode. The compatible decoder 211 supplies an image A2 that is acquired as a result of the decoding process to the image generating unit 202.

In Step S214, the image generating unit 202, similarly to the process of Step S154 illustrated in FIG. 15, outputs the image A2 that is supplied from the compatible decoder 211 to a display device not illustrated in the figure, thereby displaying the image. Then, the process ends.

On the other hand, in a case where it is determined that an instruction for displaying a 2D image has not been made by the viewer in Step S211, the image generating unit 202 determines whether nor not an instruction for displaying a 3D image of the two-viewpoint mode has been made by the viewer in Step S215. In a case where it is determined that the instruction for displaying a 3D image of the two-viewpoint mode has been made by the viewer in Step S215, the process proceeds to Step S216.

In Step S216, the separation unit 121 separates a TS1 from the multiplexed stream. Then, the separation unit 121 extracts a compatible stream that is included in the TS1 and supplies the extracted compatible stream to the decoder 122.

In Step S217, the compatible decoder 211 of the decoder 122 extracts an encoded compatible image from the compatible stream that is supplied from the separation unit 121 and decodes the encoded compatible image in accordance with a mode that corresponds to the MVC mode. The compatible decoder 211 supplies images A and B that are compatible images acquired as a result of the decoding process to the image generating unit 202.

In Step S218, the image generating unit 202 alternately outputs images A1 and B1 out of the compatible images that are supplied from the compatible decoder 211, thereby displaying the images A1 and B1 on a display device not illustrated in the figure. Then, the process ends.

On the other hand, in a case where it is determined that the instruction for displaying a 3D image of the two-viewpoint mode has not been made by the viewer in Step S215, in other words, in a case where an instruction for displaying a 3D image of the multi-viewpoint mode has not been made by the viewer, the process proceeds to Step S219.

In Step S219, the separation unit 121 separates a TS3 from the multiplexed stream that is output from the encoding device 180. Then, the separation unit 121 extracts auxiliary information that is included in the TS3 by referring to the delimiter and the like and supplies image information included in the auxiliary information to the image information acquiring unit 123 for the maintenance thereof and supplies viewpoint distance information to the inter-viewpoint distance information acquiring unit 124 for the maintenance thereof. In addition, the separation unit 121 supplies parallax image information included in the auxiliary information to the parallax image information acquiring unit 125 for the maintenance thereof and supplies compatibility information to the compatibility information acquiring unit 126 for the maintenance thereof.

In Step S220, the separation unit 121 separates a TS1 and a TS2 from the multiplexed stream that is output from the encoding device 180. Then, the separation unit 121 supplies a compatible stream included in the TS1 and an auxiliary stream included in the TS2 to the decoder 122.

In Step S221, the compatible decoder 211 of the decoder 122 extracts an encoded compatible image from the compatible stream that is supplied from the separation unit 121 and decodes the encoded compatible image in accordance with a mode that corresponds to the MVC mode. The compatible decoder 211 supplies images A and B that are compatible images acquires as a result of the decoding process to the image generating unit 202. Then, the process proceeds to Step S222.

The processes of Steps S222 to S230 are the same as the processes of Steps S192 to S200 illustrated in FIG. 30, and thus the description thereof will not be presented.

In the description presented above, although the decoding device separates the TS using the delimiter, in a case where a PID of each TS has a fixed value, the TS may be separated using the PID. In such a case, since a decoding device that can decode only a compatible stream does not recognize any PID other than the PID of the TS in which a compatible stream is included, the decoding device ignores TSs other than the TS.

In addition, the auxiliary information may be configured to be encoded.

Fourth Embodiment

[Configuration Example of Encoding Device According to Fourth Embodiment]

Figure 33:
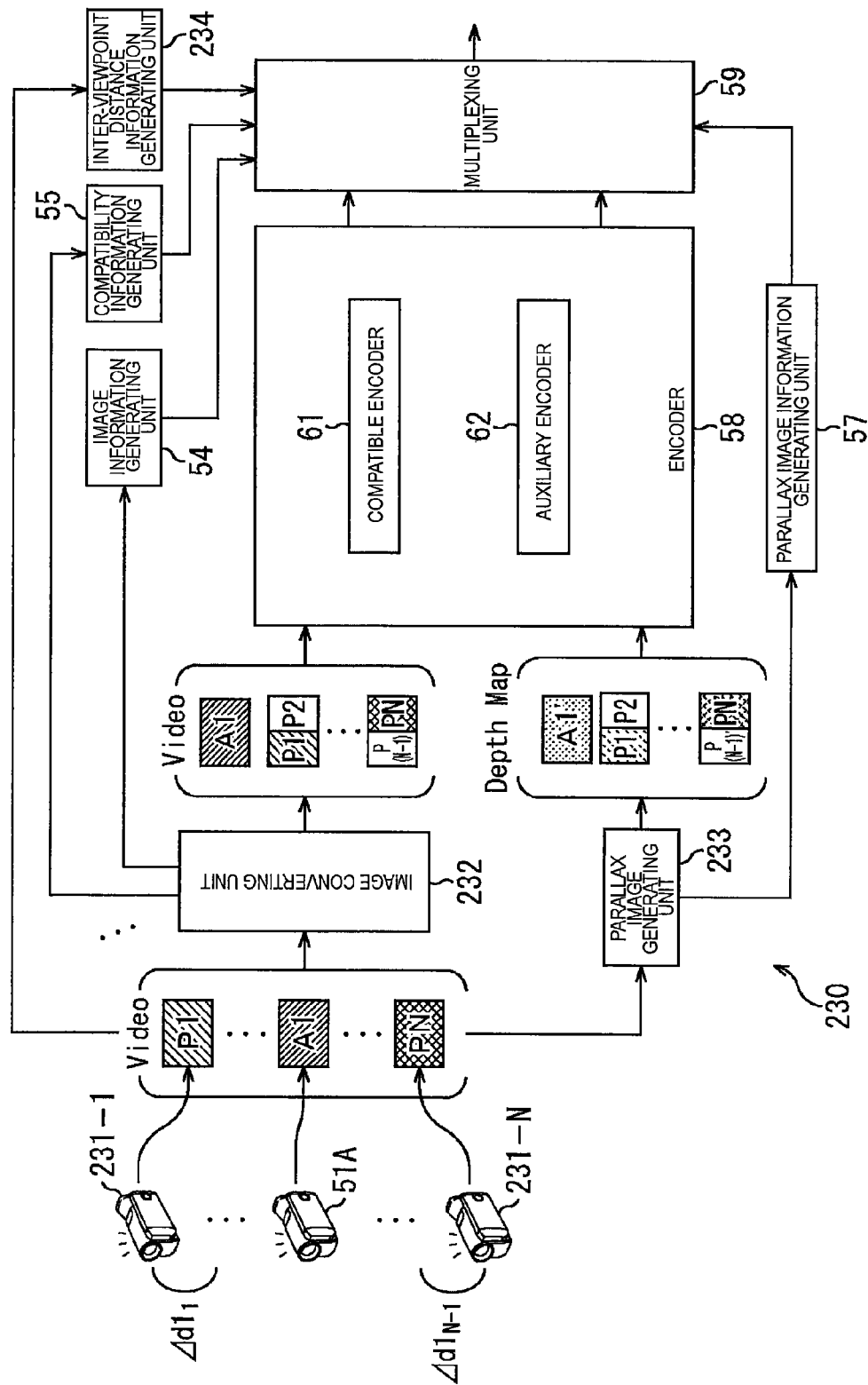
FIG. 33 is a block diagram that illustrates a configuration example of an encoding device according to a fourth embodiment of the present technology.

FIG. 33 is a block diagram that illustrates a configuration example of an encoding device according to a fourth embodiment of the present technology.

In the configuration illustrated in FIG. 33, the same reference numeral is assigned to a configuration that is the same as that illustrated in FIG. 2. Duplicate description will not be presented as is appropriate.

The configuration of the encoding device 230 illustrated in FIG. 33 is mainly different from the configuration illustrated in FIG. 2 in that imaging units 231-1 to 231-N (here, N is a multiple of two that is four or more), an image converting unit 232, a parallax image generating unit 233, and an inter-viewpoint distance information generating unit 234 are disposed instead of the imaging units 51B and 51C, the image converting unit 52, the parallax image generating unit 53, and the inter-viewpoint distance information generating unit 56. The encoding device 230 sets an image of one viewpoint out of multi-viewpoint images as a compatible image, sets images of the remaining N viewpoints as auxiliary images, and encodes the images.

More specifically, in the encoding device 230, the imaging units 231-1 to 231-N are sequentially aligned in the horizontal direction with the imaging unit 51A disposed at the center thereof. Here, distances between the imaging units 231-1 and 231-2 and the imaging units 231-2 and 231-3, and the imaging units 231-(N−1) and 231-N are distances $\Delta d1_1$, $\Delta d1_2, \ldots, \Delta d1_{N-1}$.

The imaging units 231-1 to 231-N capture HD images of a viewpoint different from the viewpoint of an image A1 as images P1 to PN and supplies the captured images to the image converting unit 232, the parallax image generating unit 233, and the inter-viewpoint distance information generating unit 234. Hereinafter, in a case where the imaging units 231-1 to 231-N do not need to be particularly discriminated from one another, the imaging units will be collectively referred to as an imaging unit 231. Similarly, images P1 to PN will be referred to as an image P.

A viewpoint that corresponds to the image P is a viewpoint that is located on the outer side out of viewpoints of images that can be recognized as 3D images. Accordingly, a decoding device that corresponds to the encoding device 230 can generate multi-viewpoint images by interpolating images of viewpoints located on the inner side from the viewpoint of the image P using the images A1 and P. As a result, multi-viewpoint images can be generated with precision that is higher than that of a case where images of viewpoints located on the outer side are interpolated using the images of viewpoints located on the inner side. The distances $\Delta d1_1$ to $\Delta d1_{N-1}$ may either be fixed or be changed for each time.

The image converting unit 232 determines the image A1, which is supplied from the imaging unit 51A of which the position in the horizontal direction is located on the inner side out of the imaging units 51A and 231, as a compatible image. The image converting unit 232 supplies information that designates the image A1 as a compatible image to the compatibility information generating unit 55. Then, the image converting unit 232 directly supplies the image A1 that is the compatible image to the encoder 58.

In addition, the image converting unit 232 sets images P other than the image A1 as auxiliary images and multiplexes the images in accordance with a predetermined multiplexing mode. More specifically, for example, in a case where the multiplexing mode is a side-by-side mode, the image converting unit 232 halves the resolution of the image P. Then, the image converting unit 232 multiplexes images P1, P3, . . . , P(N−1) (hereinafter, referred to as half-resolution odd images) of which the resolution has halved and images P2, P4, . . . , PN (hereinafter, referred to as half-solution even images) of which the resolution has halved such that the half-resolution odd images are images of a left half of the screen, and the half-resolution even images are images of a right half of the screen. The image converting unit 232 supplies a multiplexed image that is acquired as a result of the multiplexing process to the encoder 58 and supplies information that represents a multiplexing mode of the auxiliary images to the image information generating unit 54.

The parallax image generating unit 233 detects the disparity of each pixel of the images A1 and P using the image A1 that is supplied from the imaging unit 51A and the image P supplied from the imaging unit 231. The parallax image generating unit 233 generates a parallax image A1' of the image A1 that is a compatible image and directly supplies the generated parallax image to the encoder 58. In addition, the parallax image generating unit 233 generates parallax images P1' to PN' of the images P1 to PN that are auxiliary images and, similarly to the image converting unit 232, multiplexes the parallax images in accordance with a predetermined multiplexing mode. The parallax image generating unit 233 supplies a multiplexed image that is acquired as a result thereof to the encoder 58. The parallax image generating unit 233 supplies information that represents the multiplexing mode of the parallax images of the auxiliary images to the parallax image information generating unit 57.

Hereinafter, in a case where the parallax images P1' to PN' do not need to be particularly discriminated from each other, the parallax images will be collectively referred to as a parallax image P'.

The inter-viewpoint distance information generating unit 234 detects an inter-viewpoint distance between the images A1 and P using the image A1 supplied from the imaging unit 51A and the image P supplied from the imaging unit 231. For example, the inter-viewpoint distance information generating unit 234 detects a distance $\Delta d1_e$ between the imaging units 231-1 and 231-2 in the horizontal direction, and a distance $\Delta d1_{N-1}$ between the imaging units 231-(N−1) and 231-N in the horizontal direction as inter-viewpoint distances. The inter-viewpoint distance information generating unit 234 generates information that represents the inter-viewpoint distances and the like as inter-viewpoint distance information and supplies the inter-viewpoint distance information to the multiplexing unit 59.

[Configuration Example of TS]

Figure 34:
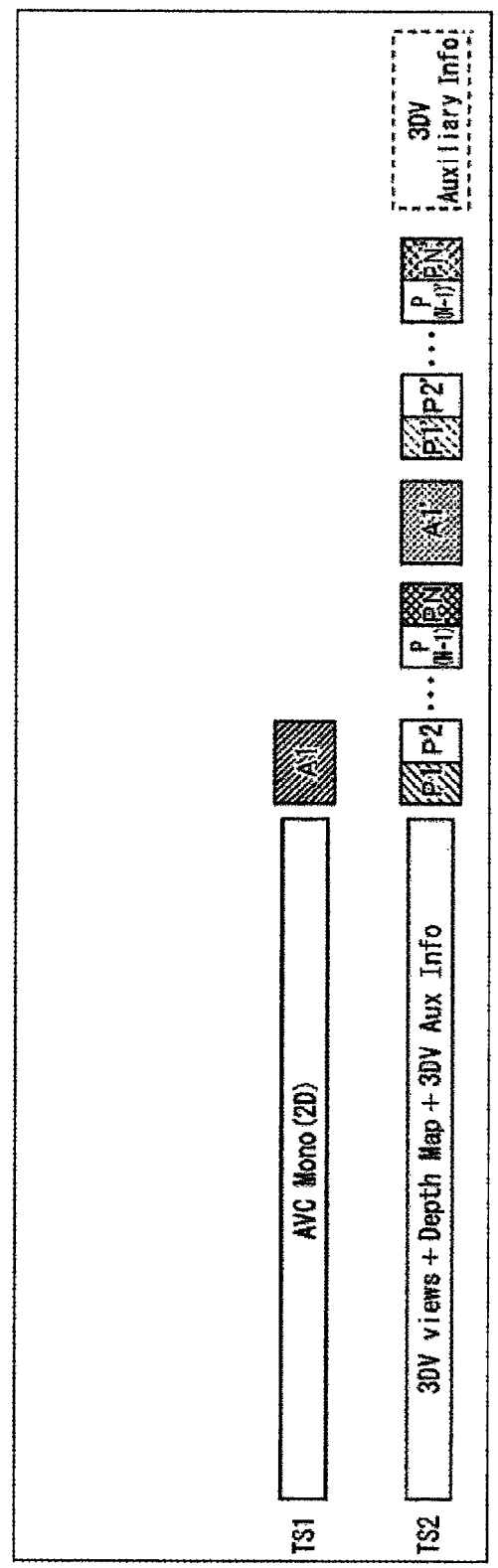
FIG. 34 is a diagram that illustrates a configuration example of TSs that are generated by a multiplexing unit illustrated in FIG. 33.

FIG. 34 is a diagram that illustrates a configuration example of TSs that are generated by a multiplexing unit 59 illustrated in FIG. 33.

In the example illustrated in FIG. 34, a TS1 is generated from the compatible stream by the multiplexing unit 59. In addition, a TS2 is generated from the auxiliary stream that includes the multiplexed images of the images P that are encoded auxiliary images, the parallax image A' of the compatible image, and the multiplexed image of the parallax images P' of the auxiliary images and the auxiliary information.

In the example illustrated in FIG. 34, similarly to the case illustrated in FIG. 3, since the compatible stream and the stream other than the compatible stream are stored in TSs different from each other, the amount of the information of the compatible stream does not need to be reduced. Accordingly, the image quality of the compatible image can be configured to be equal to the image quality of the 2D image that is encoded in accordance with the existing AVC method.

Figure 35:
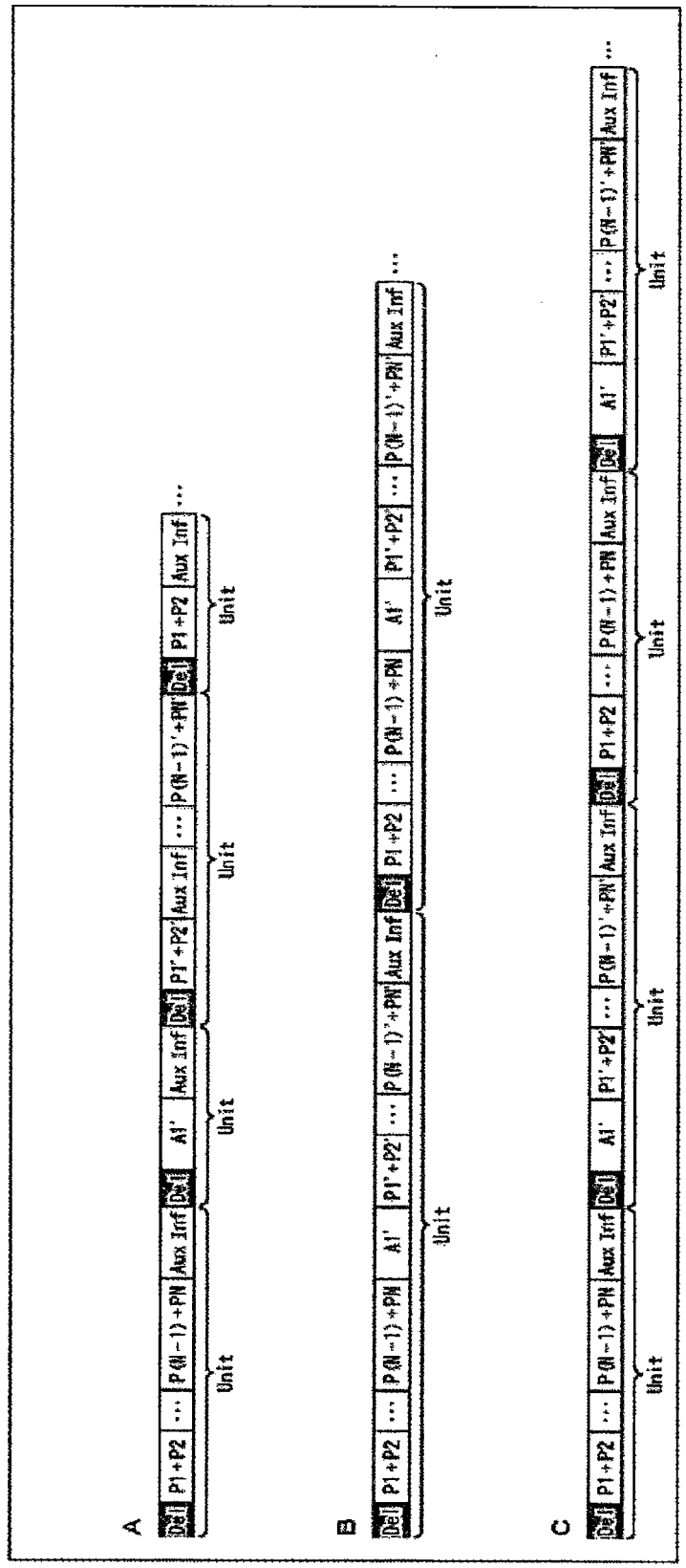
FIG. 35 is a diagram that illustrates a detailed configuration example of a TS2 illustrated in FIG. 34.

FIG. 35 is a diagram that illustrates a detailed configuration example of the TS2 illustrated in FIG. 34.

As illustrated in A of FIG. 35 to C of FIG. 35, in the TS2 illustrated in FIG. 34, data is arranged in units of units, and, at the head of each unit, a delimiter (Del) is inserted.

In the example illustrated in A of FIG. 35, a multiplexed image (P1+P2, P(N−1)+PN) of encoded auxiliary images and auxiliary information (Aux Inf) of the multiplexed image of the auxiliary images, a parallax image (A1') of an encoded compatible image and auxiliary information of the parallax image of the compatible image, or a multiplexed image (P1'+P2', . . . , P(N−1)'+PN') of parallax images of encoded auxiliary images and auxiliary information of the multiplexed image of the parallax images of the auxiliary images arranged in units of access units that are decoding units are arranged in each unit as data.

In such a case, similarly to the case illustrated in A of FIG. 4, a decoding device that receives the TS2 can independently extract the multiplexed image of the encoded auxiliary images, the parallax image of the compatible image, and the multiplexed image of the parallax images of the auxiliary images, which are arranged in units of access units, by extracting data in units of the units. As a result, for example, in a case where the decoding device generates multi-viewpoint images using only the compatible image and the parallax image of the compatible image, images that are used for generating multi-viewpoint images can be easily extracted. In addition, since each image of the multiplexed image of the auxiliary images, the parallax image of the compatible image, and the multiplexed image of the parallax images of the auxiliary images and the auxiliary information of the image are arranged in the same unit, an image that is arranged in each unit can be independently processed in an easy manner.

In the example illustrated in B of FIG. 35, a multiplexed image of encoded auxiliary images, a parallax image of a compatible image, a multiplexed image of parallax images of the auxiliary images, and auxiliary information, which are arranged in units of access units, are arranged altogether in each unit. In such a case, similarly to the case of B of FIG. 4, a decoding device that receives the TS2 can extract the multiplexed image of the encoded auxiliary images, the parallax image of the compatible image, the multiplexed image of parallax images of the auxiliary images, and the auxiliary information, which are arranged in units of access units, altogether by extracting data in units of units.

In the example illustrated in C of FIG. 35, a multiplexed image of encoded auxiliary images and auxiliary information of the multiplexed image of the auxiliary images or a parallax image of an encoded compatible image, a multiplexed image of parallax images of the auxiliary images, and auxiliary information of the parallax image of the compatible image and the parallax images of the auxiliary images, which are arranged in units of access units, are arranged in each unit.

In such a case, similarly to the case illustrated in C of FIG. 4, the decoding device that receives the TS2 can independently extract the multiplexed image of the encoded auxiliary images, the parallax image of the compatible image, and the multiplexed image of the parallax images of the auxiliary images, which are arranged in units of access units, by extracting data in units of the units. As a result, for example, in a case where the decoder for images and the decoder for parallax images are separately provided in the decoding device, data can efficiently be supplied to the respective decoders. In addition, images and parallax images can be independently processed in an easy manner in the decoding device.

An encoding process performed by the encoding device 230 illustrated in FIG. 33 is the same as the encoding process illustrated in FIGS. 6 and 7 except that the number of viewpoints of the auxiliary images is not two but N, and thus the description thereof will not be presented.

As above, the encoding device 230 performs multiplexing with the compatible stream, the auxiliary stream, and the compatibility information being stored in TSs different from each other, and accordingly, the compatibility with an existing encoding device can be secured which encodes a 2D image in multiplexing.

In addition, since the encoding device 230 encodes an image of one viewpoint out of multi-viewpoint images as a compatible image in accordance with an existing encoding mode, the compatibility with an existing encoding device that encodes a 2D image in the encoding process can be secured. In other words, the encoding device 230 can perform encoding for multi-viewpoint images in accordance with a mode that has compatibility with an existing encoding mode.

Furthermore, since the encoding device 230 encodes the images A1 and the image P of N+1 viewpoints, a decoding device that corresponds to the encoding device 230 can generate multi-viewpoint images from the images A1 and the image P of N+1 viewpoints. In this way, according to the decoding device, compared to a case where multi-viewpoint images are generated from images of two viewpoints, the viewpoints of images that can be generated are not limited, and multi-viewpoint images having relatively high prevision can be generated.

In addition, since the encoding device 230 encodes images with the resolution of the auxiliary images being lowered, the processing cost of the encoding process and the decoding process is lower than that of a case where encoding is performed without lowering the resolution.

[Configuration Example of Decoding Device]

Figure 36:
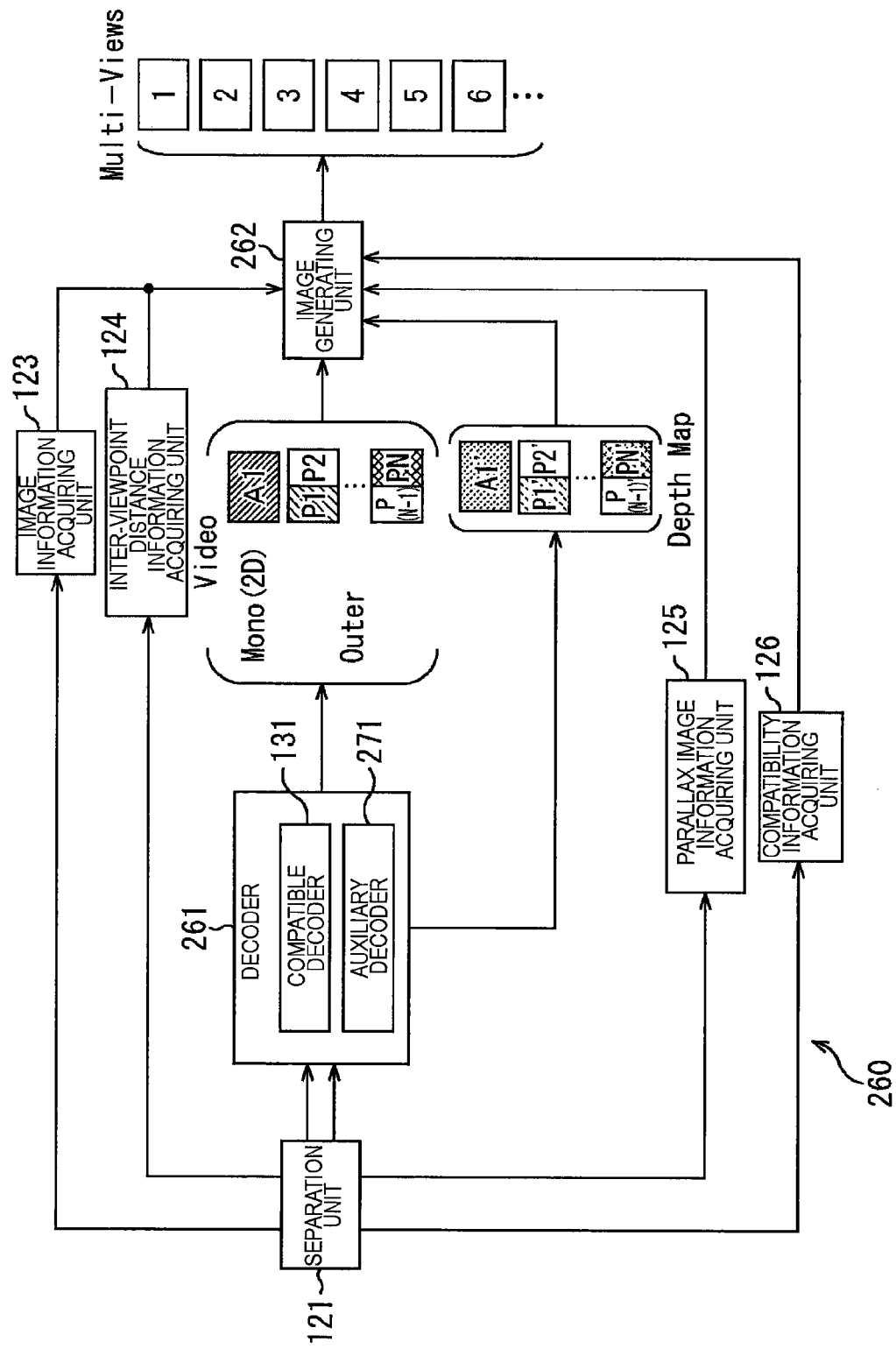
FIG. 36 is a diagram that illustrates a configuration example of a decoding device that corresponds to the encoding device illustrated in FIG. 33.

FIG. 36 is a diagram that illustrates a configuration example of a decoding device that decodes a multiplexed stream that is transmitted from the encoding device 230 illustrated in FIG. 33.

In the configuration illustrated in FIG. 36, the same reference numeral is assigned to a configuration that is the same as that illustrated in FIG. 8. Duplicate description will not be presented as is appropriate.

The configuration of the decoding device 260 illustrated in FIG. 36 is mainly different from the configuration illustrated in FIG. 8 in that a decoder 261 and an image generating unit 262 are disposed instead of the decoder 122 and the image generating unit 127. The decoding device 120 generates an image of one viewpoint or multi-viewpoint images by separating and decoding the multiplexed stream that is transmitted from the encoding device 230 and displays the generated images on a display device not illustrated in the figure.

The decoder 261 of the decoding device 260 illustrated in FIG. 36 is configured by a compatible decoder 131 and an auxiliary decoder 271. The auxiliary decoder 271 (auxiliary image decoding unit) of the decoder 261 decodes the multiplexed image of the auxiliary images, the parallax image of the compatible image, and the multiplexed image of the parallax images of the auxiliary images that are included in the auxiliary stream supplied form the separation unit 121 in accordance with a mode that corresponds to the auxiliary encoder 62 illustrated in FIG. 33. The auxiliary decoder 271 supplies the multiplexed image of the images P that are the auxiliary images acquired as a result of the decoding process, the parallax image A' of the compatible image, and the multiplexed image of the parallax images P' that are parallax images of the auxiliary images to the image generating unit 262.

The image generating unit 262 outputs an image in accordance with a displaying instruction supplied from a viewer and displays the image on a display device not illustrated in the figure. More specifically, the image generating unit 262 (generation unit) generates images of three or more viewpoints, which correspond to a display device not illustrated in the figure, each having the resolution that is a half of the resolution of the compatible image or the auxiliary image by using the image A that is a compatible image, the multiplexed image of the images P that are auxiliary images, the parallax image A' of the compatible image, and the multiplexed image of the parallax images P' of the auxiliary images in accordance with a viewer's instruction for displaying a 3D image of multi-viewpoints based on the image information supplied from the image information acquiring unit 123, the inter-viewpoint distance information supplied from the inter-viewpoint distance information acquiring unit 124, the parallax image information supplied from the parallax image information acquiring unit 125, the compatibility information supplied from the compatibility information acquiring unit 126, and the like.

When described in more detail, the image generating unit 262 separates the parallax image P' of each auxiliary image from the multiplexed image of the parallax images P1' of the auxiliary images based on the information that represents a multiplexing mode of the parallax images of the auxiliary images that is included in the parallax image information supplied from the parallax image information acquiring unit 125. In addition, the image generating unit 262 separates each image P from the multiplexed image of the image P that is the auxiliary images based on the information that represents a multiplexing mode of auxiliary images that is included in the image information supplied from the image information acquiring unit 123.

Furthermore, the image generating unit 262 determines the position of each viewpoint of the multi-viewpoint images to be generated based on the inter-viewpoint distance information and the number of viewpoints that corresponds to a display device not illustrated in the figure. Then, the image generating unit 262 generates the image of each viewpoint of which the position is determined by using the compatible image, each auxiliary image, the parallax image of the compatible image, and the parallax image of each auxiliary images. Then, the image generating unit 262 converts the resolution of the generated image of each viewpoint into resolution that is "1/the number of viewpoints" of the resolution of the compatible image or the auxiliary image, synthesizes the images, and displays the synthesized image on a display device not illustrated in the figure.

At this time, the multi-viewpoint images after the synthesis are displayed such that the viewing angles are different for each viewpoint, and a viewer can view a 3D image without wearing glasses by seeing images of arbitrary two viewpoints with his left and right eyes.

In addition, the image generating unit 262 outputs the image A1 that is the compatible image supplied from the compatible decoder 131 of the decoder 261 in accordance with a viewer's instruction for displaying a 2D image, thereby displaying the image on a display device not illustrated in the figure. Accordingly, the viewer can view the 2D image.

A decoding process performed by the decoding device 260 illustrated in FIG. 36 is the same as the decoding process illustrated in FIG. 9 except that the auxiliary images are images P of N viewpoints, and thus the description thereof will not be presented.

As above, the decoding device 260 can separate a multiplexed stream that is multiplexed by the encoding device 230 in accordance with a mode that has compatibility with an existing mode. In addition, the decoding device 260 can decode a compatible stream and an auxiliary stream that are encoded in accordance with a mode, which has compatibility with an existing mode and requires relatively low process cost, by the encoding device 230.

Fifth Embodiment

[Configuration Example of Encoding Device According to Fifth Embodiment]

Figure 37:
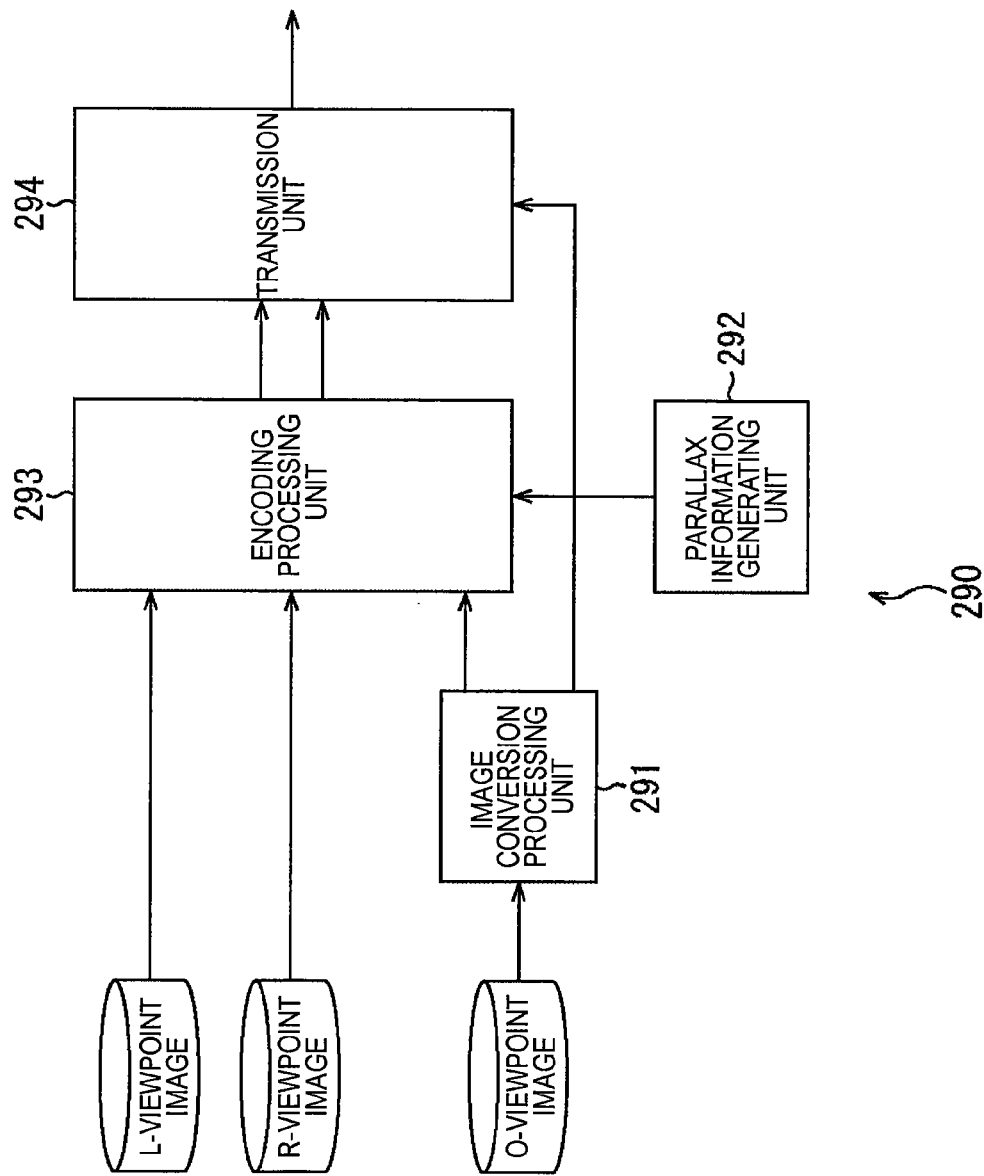
FIG. 37 is a block diagram that illustrates a configuration example of an encoding device according to a fifth embodiment of the present technology.

FIG. 37 is a block diagram that illustrates a configuration example of an encoding device according to a fifth embodiment of the present technology.

The encoding device 290 illustrated in FIG. 37 is configured by an image conversion processing unit 291, a parallax information generating unit 292, an encoding processing unit 293, and a transmission unit 294. The encoding device 290 encodes one of compatible images of two viewpoints in accordance with the AVC mode, encodes the other thereof in accordance with the MVC mode, and encodes an auxiliary image of one viewpoint, a parallax image of a compatible image, and a parallax image of the auxiliary image in accordance with the 3DV mode. Here, the 3DV mode is a mode that is used for encoding a display image in accordance with a mode of multi-viewpoints that is compliant with the AVC mode or the MVC mode.

More specifically, an L viewpoint image formed by an L image that is a left-eye image in the two-viewpoint mode as a compatible image of one viewpoint and a parallax image (hereinafter, referred to as an L parallax image) of the L image is input to the encoding device 290. In addition, an R viewpoint image formed by an R image that is a right-eye image in the two-viewpoint mode as a compatible image of another one viewpoint and a parallax image (hereinafter, referred to as an R parallax image) of the R image is input to the encoding device 290. Furthermore, an O-viewpoint image that is formed by an O image as an auxiliary image and a parallax image (hereinafter, referred to as an O parallax image) of the O image is input to the encoding device 290. Here, it is assumed that the resolutions of the L viewpoint image, the R viewpoint image, and the O viewpoint image are the same.

The image conversion processing unit 291 of the encoding device 290 lowers the resolutions by performing a resolution lowering process such as a filter process for the O image and the O parallax image that configure the O viewpoint image that is input to the encoding device 290. The image conversion processing unit 291 supplies the O viewpoint image after the resolution lowering process to the encoding processing unit 293. In addition, the image conversion processing unit 291 generates information that represents the type of a filter used in the resolution lowering process and the like as auxiliary image low-resolution converting information that is information relating to the resolution lowering process of the auxiliary image and supplies the generated auxiliary image low-resolution converting information to the transmission unit 294.

The parallax information generating unit 292 (setting unit) generates parallax information that is information relating to the parallax images of the L parallax image, the R parallax image, and the O parallax image based on information of the L image, the R image, and the O image at the time of capturing the images and the like and supplies the generated parallax information to the encoding processing unit 293.

The encoding processing unit 293 encodes the L image included in the L viewpoint image that is input to the encoding device 290 in accordance with the AVC mode. In addition, the encoding processing unit 293 encodes the R image included in the R viewpoint image with the L image set as a base view (base image) and the R image set as a non-base view (dependent image) in accordance with the MVC mode.

In addition, the encoding processing unit 293 encodes the L parallax image, the R viewpoint image, and the O viewpoint image after the resolution lowering process that is supplied from the image conversion processing unit 291 in accordance with the 3DV mode. At this time, in a case where the O viewpoint image after the resolution lowering process is encoded, the encoding processing unit 293 performs a resolution lowering process such as a filter process for the L viewpoint image and the R viewpoint image to be referred to and uses the L viewpoint image and the R viewpoint image, of which the resolutions are the same as the resolution of the O viewpoint image, that are acquired as a result thereof as reference images.

The encoding processing unit 293 generates a bit stream from encoded data of the L viewpoint image, the R viewpoint image, and the O viewpoint image, which are acquired as a result of the encoding process, and the parallax information that is supplied from the parallax information generating unit 292 and supplies the bit stream to the transmission unit 294. In addition, the encoding processing unit 293 generates information that represents the type of a filter used in the resolution lowering process at the time of generating the reference images of the O viewpoint image and the like as reference image low-resolution converting information that is information relating to the resolution lowering process of the reference images and supplies the generated reference image low-resolution converting information to the transmission unit 294.

The transmission unit 294 generates TSs from the auxiliary image low-resolution converting information supplied from the image conversion processing unit 291 and the bit stream and the reference image low-resolution converting information supplied from the encoding processing unit 293 and transmits the generated TSs.

[Configuration Example of Encoding Processing Unit]

Figure 38:
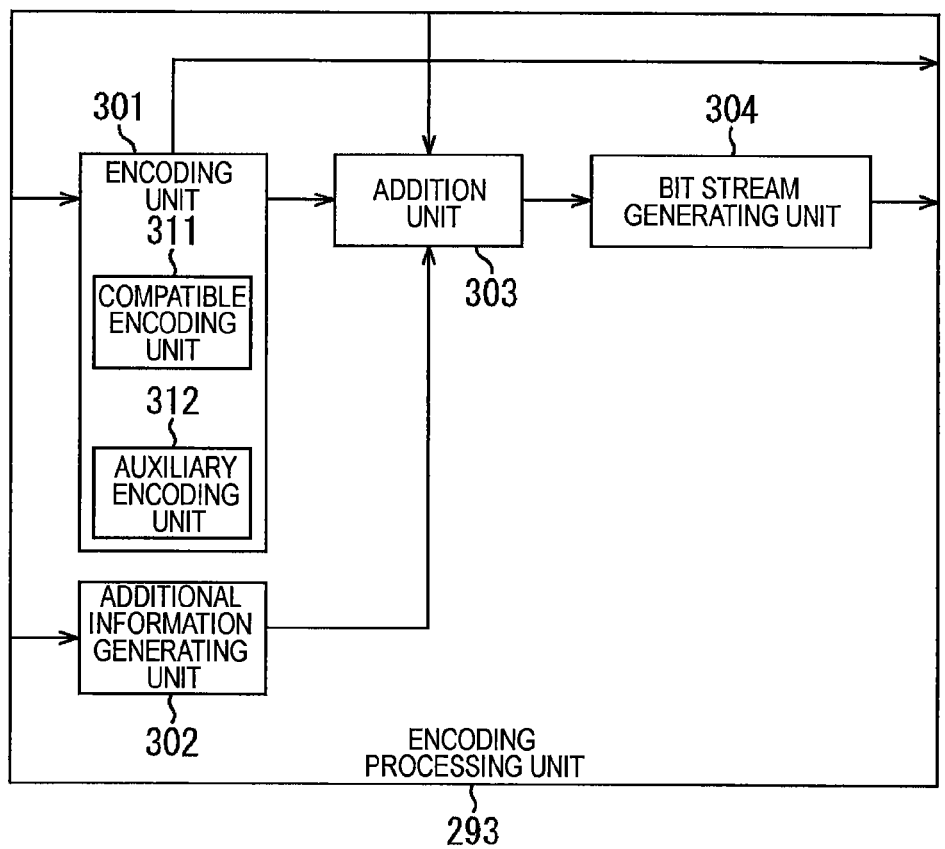
FIG. 38 is a diagram that illustrates a configuration example of an encoding processing unit illustrated in FIG. 37.

FIG. 38 is a diagram that illustrates a configuration example of the encoding processing unit 293 illustrated in FIG. 37.

The encoding processing unit 293 illustrated in FIG. 38 is configured by an encoding unit 301, an additional information generating unit 302, an addition unit 303, and a bit stream generating unit 304.

The encoding unit 301 of the encoding processing unit 293 is configured by a compatible encoding unit 311 and an auxiliary encoding unit 312. The compatible encoding unit 311 of the encoding unit 301 encodes the L image out of the L image and the R image that are compatible images in accordance with the AVC mode. In addition, the compatible encoding unit 311 encodes the R image in accordance with the MVC mode with the L image set as a base view and the R image as a non-base view. The compatible encoding unit 311 supplies encoded data of the L image and the R image that is acquired as a result of the encoding process to the addition unit 303.

The auxiliary encoding unit 312 encodes the L parallax image and the R parallax image, which are the parallax images of compatible images, the O image that is an auxiliary image, and an O parallax image that is the parallax image of the auxiliary image in accordance with the 3DV mode. More specifically, the auxiliary encoding unit 312 encodes the O image in accordance with the 3DV mode with the L image and the R image used as reference images. At this time, the auxiliary encoding unit 312 performs a resolution lowering process for the L image and the R image to be referred to, thereby lowering the resolutions of the L image and the R image to be the same as the resolution of the O image. Then, the auxiliary encoding unit 312 encodes the O image by referring to the L image and the R image after the resolution lowering process.

In addition, the auxiliary encoding unit 312 encodes the L parallax image in accordance with the 3DV mode without referring to any image other than the parallax image of the same viewpoint and encodes the R parallax image in accordance with the 3DV mode by referring to the L parallax image. Furthermore, the auxiliary encoding unit 312 encodes the O parallax image after the resolution lowering process in accordance with the 3DV mode by referring to the L parallax image and the R parallax image. At this time, the auxiliary encoding unit 312 lowers the resolution of the L parallax image and the R parallax image, which are referred to, to be the same resolution as the resolution of the O parallax image through a resolution lowering process and refers to the L parallax image and the R parallax image after the resolution lowering process.

The auxiliary encoding unit 312 supplies encoded data of the L parallax image, the R parallax image, and the O viewpoint image that are acquired as a result of the encoding process to the addition unit 303. In addition, the auxiliary encoding unit 312 generates information that represents the type of a filter used in the resolution lowering process at the time of generating the reference images of the O viewpoint image and the like as reference image low-resolution converting information and supplies the generated reference image low-resolution converting information to the transmission unit 294 illustrated in FIG. 37.

The additional information generating unit 302 generates information of an SPS (sequence parameter set) of the L image and a Subset SPS of the L parallax image, the R viewpoint image, and the O viewpoint image. In addition, the additional information generating unit 302 generates information of SEI (supplemental enhancement information) of the L image, the R image, and the O image. Furthermore, the additional information generating unit 302 generates information of the SEI of the L parallax image including the parallax information of the L parallax image, information of the SEI of the R parallax image including the parallax information of the R parallax image, and information of the SEI of the O parallax image including the parallax information of the O parallax image that are supplied from the parallax information generating unit 292 illustrated in FIG. 37. The additional information generating unit 302 supplies the information of the SPS and the SEI of the L image and the information of the Subset SPS and the SEI of the L parallax image, the R viewpoint image, and the O viewpoint image to the addition unit 303.

The addition unit 303 adds an NAL header that includes information representing the type of a picture of the AVC mode as a type of an NAL (network abstraction layer) unit to the encoded data of the L image that is supplied from the compatible encoding unit 311, thereby generating an NAL unit. In addition, the addition unit 303 adds an NAL header that includes information representing encoded data of the MVC mode as a type of the NAL unit to the encoded data of the R image that is supplied from the compatible encoding unit 311, thereby generating an NAL unit.

In addition, the addition unit 303 adds the NAL header that includes the information representing the encoded data of the 3DV mode as a type of the NAL unit and includes a parallax flag representing that the image is not a parallax image to the encoded data of the O image that is supplied from the auxiliary encoding unit 312, thereby generating an NAL unit. Furthermore, the addition unit 303 adds an NAL header that includes the information representing the encoded data of the 3DV mode as a type of the NAL unit and includes information relating to a parallax flag (parallax identification information) that represents a parallax image, information relating to a corresponding image, and the like to the encoded data of the L parallax image, the R parallax image, and the O parallax image supplied from the auxiliary encoding unit 312, thereby generating an NAL unit.

Furthermore, the addition unit 303 adds the NAL header that represents information as the type of the NAL unit to the information of the SPS and the SEI of the L image and the information of the Subset SPS and the SEI of the L parallax image, the R viewpoint image, and the O viewpoint image that are supplied from the additional information generating unit 302, thereby generating NAL units. The addition unit 303 supplies the NAL units generated as described above to the bit stream generating unit 304.

The bit stream generating unit 304 generates a bit stream by arranging the NAL units that are supplied from the addition unit 303 in a predetermined order and supplies the generated bit stream to the transmission unit 294 illustrated in FIG. 37.

[Description of Encoding]

Figure 39:
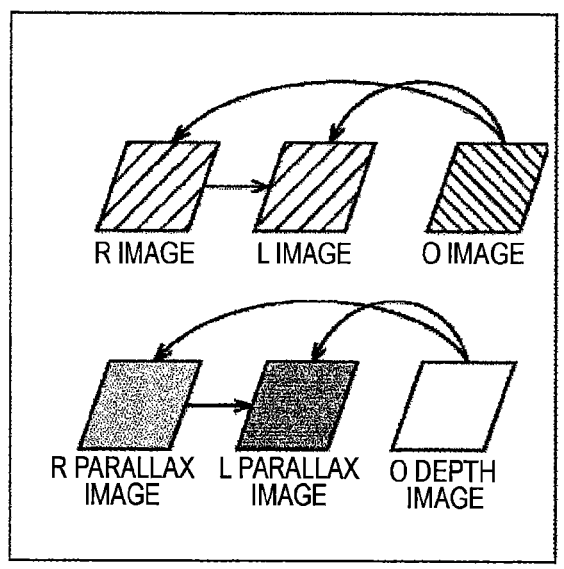
FIG. 39 is a diagram that illustrates the reference relation in an encoding process performed by the encoding unit illustrated in FIG. 38.

FIG. 39 is a diagram that illustrates the reference relation in an encoding process performed by the encoding unit 301 illustrated in FIG. 38.

As illustrated in FIG. 39, the compatible encoding unit 311 encodes the L image in accordance with the AVC mode. In addition, the compatible encoding unit 311 encodes the R image in accordance with the MVC mode with the L image set as a base view and the R image set as a non-base view. Furthermore, the auxiliary encoding unit 312 encodes the O image after the resolution lowering process in accordance with the 3DV mode by referring to the L image and the R image after the resolution lowering process.

In addition, as illustrated in FIG. 39, the auxiliary encoding unit 312 encodes the L parallax image in accordance with the 3DV mode without referring to any image other than the parallax image of the same viewpoint and encodes the R parallax image in accordance with the 3DV mode by referring to the L parallax image. Furthermore, the auxiliary encoding unit 312 encodes the O parallax image after the resolution lowering process in accordance with the 3DV mode by referring to the L parallax image and the R parallax image after the resolution lowering process.

[Configuration Example of NAL Unit]

Figure 40:
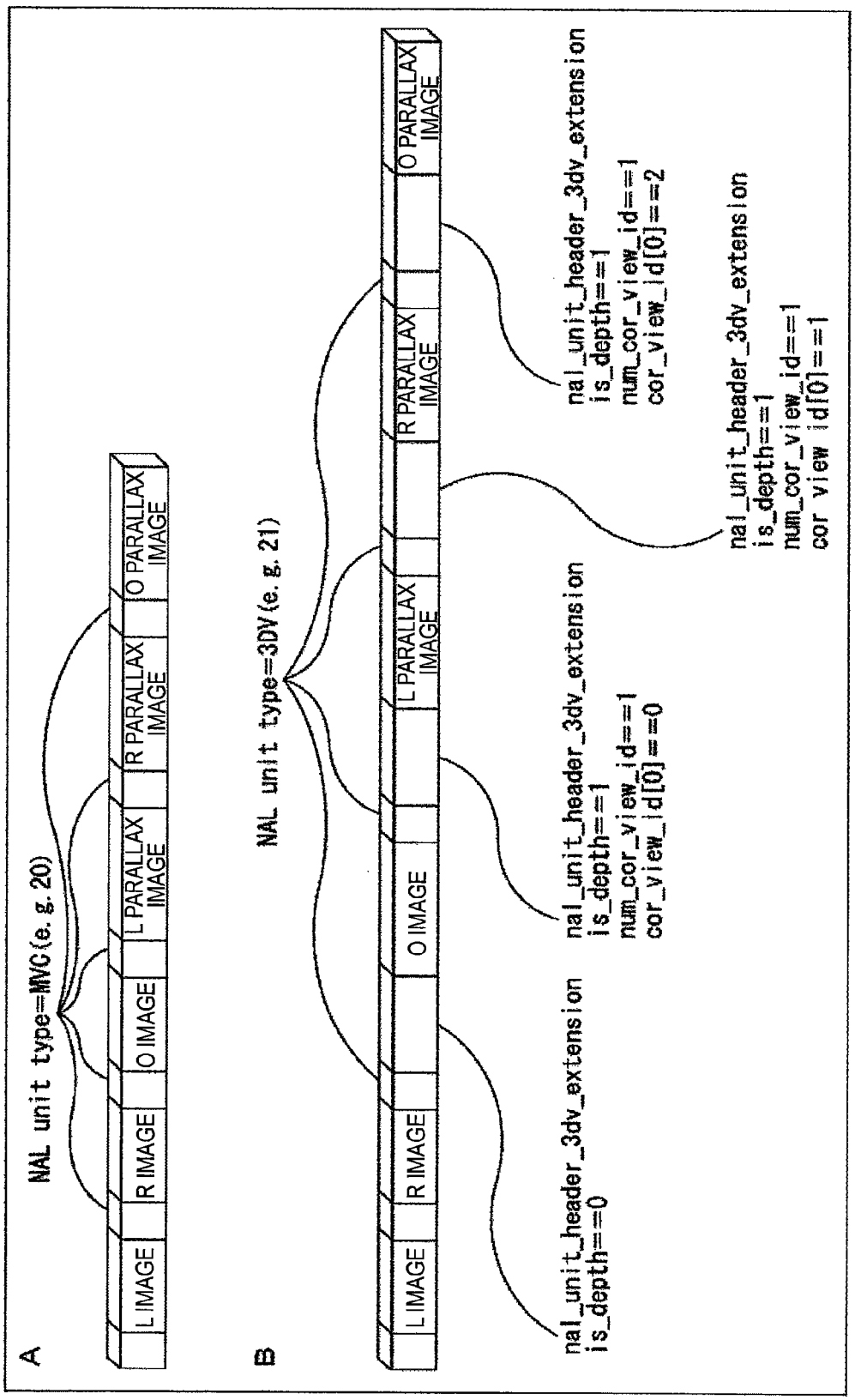
FIG. 40 is a diagram that illustrates configuration examples of an NAL unit.

FIG. 40 is a diagram that illustrates configuration examples of the NAL units of the encoded data of the L viewpoint image, the R viewpoint image, and the O viewpoint image that is included in the bit stream generated by the encoding processing unit 293 illustrated in FIG. 38.

As illustrated in A of FIG. 40, for example, in a case where an L image is encoded in accordance with the existing AVC mode, and an L parallax image, an R viewpoint image, and an O viewpoint image are encoded in accordance with the MVC mode with the L image set as a base view, the NAL unit of the encoded data of the L image is configured by, an NAL header that includes information representing the type of a picture of the AVC mode of the L image as a type of the NAL unit and encoded data of the L image.

In addition, the NAL unit of encoded data of each one of the R image, the O image, the L parallax image, the R parallax image, and the O parallax image is configured by an NAL header that includes information representing the encoded data of the MVC as a type of the NAL unit (NAL unit type) and the encoded data. Accordingly, the NAL headers of the NAL units of the encoded data of the R image, the O image, the L parallax image, the R parallax image, and the O parallax image, which are encoded in accordance with the MVC mode, are the same.

Accordingly, the decoding device that decodes a bit stream cannot identify the NAL units of the R image, the O image, the L parallax image, the R parallax image, and the O parallax image. Therefore, a decoding device of the existing MVC mode cannot extract and decode only an NAL unit of the R image, which is necessary, but performs an unnecessary decoding process.

In contrast to this, as illustrated in B of FIG. 40, in the encoding process performed by the encoding processing unit 293, in the NAL headers of the NAL units of the O image, the L parallax image, the R parallax image, and the O parallax image, information representing the encoded data of the 3DV mode is included as a type of the NAL unit, and a parallax flag (is_depth) is included as extension information (nal_unit_header_3dv_extension).

More specifically, in the NAL header of the NAL unit of the O image, a parallax flag that is "0" representing that the image is not a parallax image is included. Accordingly, the decoding device can identify the O image. In addition, in the NAL headers of the NAL units of the L parallax image, the R parallax image, and the O parallax image, a parallax flag that is "1" representing a parallax image is included. Accordingly, the decoding device can identify the L parallax image, the R parallax image, and the O parallax image.

Furthermore, in the NAL headers of the NAL units of the L parallax image, the R parallax image, and the O parallax image, information relating to corresponding images (a compatible image and an auxiliary image) is included as extension information. As the information relating to a corresponding image, there is information (cor_view_id) (compatible image identification information or auxiliary image identification information) that specifies the number of viewpoints (num_cor_view_id) of the corresponding image and the viewpoints of the corresponding image.

Here, the L parallax image is a parallax image of the L image of one viewpoint, the R parallax image is a parallax image of the R image of one viewpoint, and the O parallax image is a parallax image of the O image of one viewpoint. In the example illustrated in FIG. 40, information that specifies the viewpoint of the L image is 0, information that specifies the viewpoint of the R image is 1, and information that specifies the viewpoint of the O image is 2.

Accordingly, the information relating to a corresponding image that is included in the NAL header of the NAL unit of the L parallax image is "1" that is the number of viewpoints of the corresponding image and "0" as information that specifies the viewpoint of the corresponding image. In addition, the information relating to a corresponding image that is included in the NAL header of the NAL unit of the R parallax image is "1" that is the number of viewpoints of the corresponding image and "1" as information that specifies the viewpoint of the corresponding image. Furthermore, the information relating to a corresponding image that is included in the NAL header of the NAL unit of the O parallax image is "1" that is the number of viewpoints of the corresponding image and "2" as information that specifies the viewpoint of the corresponding image.

As above, by including the information relating to a corresponding image as the extension information, the L parallax image, the R parallax image, and the O parallax image can be respectively identified. In addition, since the information that specifies an image corresponding to the parallax image, which represents correspondence relation between the parallax image and the image, is included not in the NAL header of the image but in the NAL header of the parallax image, the compatibility of the NAL unit of the compatible image can be maintained.

In addition, the type of the NAL unit of the L image that is a compatible image is information representing a picture of the AVC mode, and the type of the NAL unit of the R image is information that represents encoded data of the MVC mode. Accordingly, the type of the NAL unit that represents encoded data of the 3DV mode may be described as information that represents the head of information other than a compatible image, in other words, boundary information that represents a boundary of information other than a compatible image.

[Configuration Example of Bit Stream]

Figure 41:
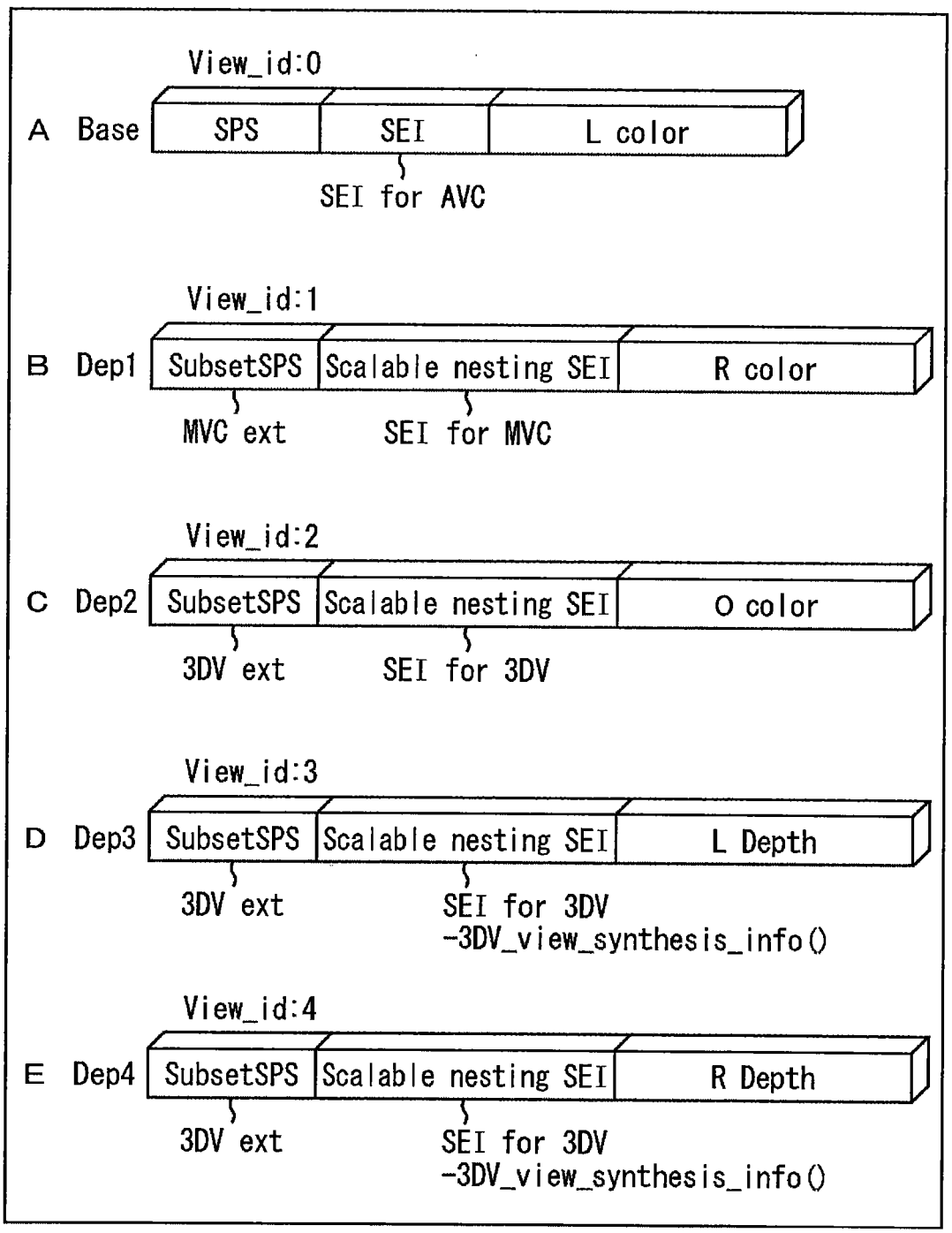
FIG. 41 is a diagram that illustrates a configuration example of a bit stream.

FIG. 41 is a diagram that illustrates a configuration example of the bit stream that is generated by the bit stream generating unit 304 illustrated in FIG. 38.

As illustrated in A of FIG. 41, the bit stream of the L image, which is encoded in accordance with the AVC mode, is configured by an NAL unit of the information of the SPS of the AVC mode of the L image, an NAL unit of information of the SEI of the AVC mode of the L image, and an NAL unit of the encoded data (L color) of the L image.

In addition, as illustrated in B of FIG. 41, a bit stream of the R image, which is encoded in accordance with the MVC mode, is configured by an NAL unit of the information of the Subset SPS of the MVC mode of the R image, an NAL unit of the information of the SEI of the MVC mode of the R image, and an NAL unit of the encoded data (R color) of the R image.

As illustrated in C of FIG. 41, the bit stream of the O image, which is encoded in accordance with the 3DV mode, is configured by an NAL unit of the information of the Subset SPS of the 3DV mode of the O image, an NAL unit of the information of the SEI of the 3DV mode of the O image, and an NAL unit of the encoded data (O color) of the O image.

As illustrated in D of FIG. 41, the bit stream of the L parallax image, which is encoded in accordance with the 3DV mode, is configured by an NAL unit of the information of the Subset SPS of the 3DV mode of the L parallax image, an NAL unit of the information of the SEI of the 3DV mode that includes the parallax information (3DV_view_synthesis_info) of the L parallax image, and an NAL unit of the encoded data (L Depth) of the L parallax image.

As illustrated in E of FIG. 41, the bit stream of the R parallax image, which is encoded in accordance with the 3DV mode, is configured by an NAL unit of the information of the Subset SPS of the 3DV mode of the R parallax image, an NAL unit of the information of the SEI of the 3DV mode that includes the parallax information of the R parallax image, and an NAL unit of the encoded data (R Depth) of the R parallax image.

Although not illustrated in the figure, the bit stream of the O parallax image, which is encoded in accordance with the 3DV mode, similarly to the bit stream of the R parallax image, is configured by an NAL unit of the information of the Subset SPS of the 3DV mode of the O parallax image, an NAL unit of the information of the SEI of the 3DV mode that includes the parallax information of the O parallax image, and an NAL unit of the encoded data of the O parallax image.

As above, since the parallax information is included in the SEI of the 3DV mode, a decoding device that is not in correspondence with the 3DV mode does not necessarily need to process the parallax information.

[Configuration Example of SEI of 3DV Mode]

FIG. 42 is a diagram that illustrates a configuration example of the SEI of the 3DV mode.

As illustrated in FIG. 42, in the SEI of the 3DV mode, parallax information (3DV_view_synthesis_info) is included.

FIG. 43 is a diagram that illustrates an example of the description of the parallax information (3DV_view_synthesis_info).

As illustrated in FIG. 43, as the parallax information, a parallax type (depth_type) is described which represents whether each pixel value of the parallax image is a parallax value (Disparity) that represents the parallax or a depth value that represents the depth (Depth) of a subject corresponding to the parallax.

In addition, as the parallax information, a normalization flag (is_normalized) (normalization identification information) is described which represents whether or not each pixel value of the parallax image is normalized within a predetermined range (for example, a range of 0 to 255).

Furthermore, in a case where each pixel value of the parallax image is a depth value, a maximal value (z_near) of depth values that are common to all the viewpoints and a minimal value (z_far) of the depth value are described as the parallax information. On the other hand, in a case where each pixel value of the parallax image is a parallax value, a maximal value (max_disp) of parallax values for each viewpoint and a minimal value (min_disp) of the parallax values are described.

In addition, as the parallax information, a photographing mode (camera_mode) of a camera that captures an image that corresponds to a parallax image is described. As the photographing modes, there are a parallel photographing mode (1D parallel mode) in which photographing is performed such that distances between cameras and a subject in the depth direction are the same and a photographing mode with radiation (general mode) in which photographing is performed with cameras being arranged in the radiation direction from a subject.

In addition, as the parallax information, correspondence relation information (interval_view_id) that represents an image, from which the parallax of an image corresponding to a parallax image is the parallax represented by the parallax image, is described. Furthermore, as the parallax information, the number of viewpoints (num_cor_view_id) of an image that corresponds to the parallax image and information (cor_vie_id) that specifies the image are described.

In addition, as the parallax information, parameters of cameras (camera_parameters) that capture images corresponding to the parallax images are described. The parameters of the cameras are configured by an internal parameter and external parameters. The internal parameter is formed by a focal distance of the camera in the horizontal direction that is common to all the viewpoints and a principal point that is the image center, in other words, the position of the optical center of the lens in the horizontal direction. The position of the principal point in the horizontal direction may be different for each viewpoint. In addition, the external parameter is a parameter that defines the position of the camera in the horizontal direction.

[Description of Process of Encoding Device]

Figure 44:
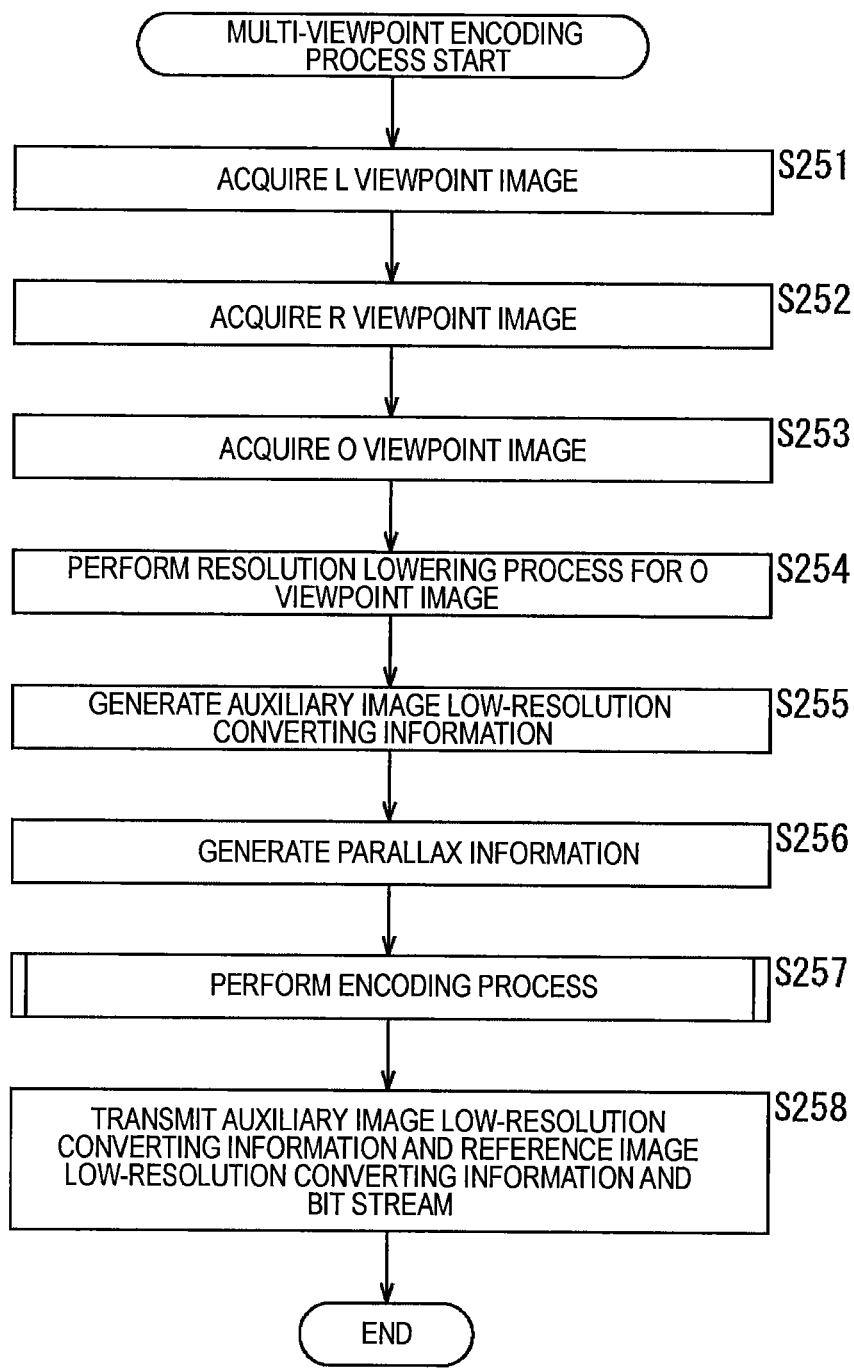
FIG. 44 is a flowchart that illustrates a multi-viewpoint encoding process performed by the encoding device illustrated in FIG. 37.

FIG. 44 is a flowchart that illustrates a multi-viewpoint encoding process performed by the encoding device 290 illustrated in FIG. 37. This multi-viewpoint image encoding process, for example, is started when an L viewpoint image, an R viewpoint image, and an O viewpoint image are input to the encoding device 290 as encoding targets.

In Step S251 illustrated in FIG. 44, the encoding processing unit 293 of the encoding device 290 acquires the L viewpoint image that is input to the encoding device 290. In Step S252, the encoding processing unit 293 acquires the R viewpoint image that is input to the encoding device 290. In Step S253, the image conversion processing unit 291 acquires the O viewpoint image that is input to the encoding device 290.

In Step S254, the image conversion processing unit 291 performs a resolution lowering process for each of an O image and an O parallax image out of images of O viewpoints. The image conversion processing unit 291 supplies the images of O viewpoints after the resolution lowering process to the encoding processing unit 293.

In Step S255, the image conversion processing unit 291 generates information that represents the type of a filter used in the resolution lowering process of Step S254 and the like as auxiliary image low-resolution converting information and supplies the generated auxiliary image low-resolution converting information to the transmission unit 294.

In Step S256, the parallax information generating unit 292 generates parallax information of the L parallax image, the R parallax image, and the O parallax image based on information of the L image, the R image, and the O image at the time of capturing the images and the like and supplies the generated parallax information to the encoding processing unit 293.

In Step S257, the encoding processing unit 293 performs an encoding process in which the L viewpoint image, the R viewpoint image, and the O viewpoint image after the resolution lowering process that is supplied from the image conversion processing unit 291 are encoded. This encoding process will be described in detail with reference to FIG. 45 to be described later.

In Step S258, the transmission unit 294 generates TSs from the auxiliary image low-resolution converting information supplied from the image conversion processing unit 291 and the reference image low-resolution converting information and the bit stream that are supplied from the encoding processing unit 293 and transmits the TSs. Then, the process ends.

Figure 45:
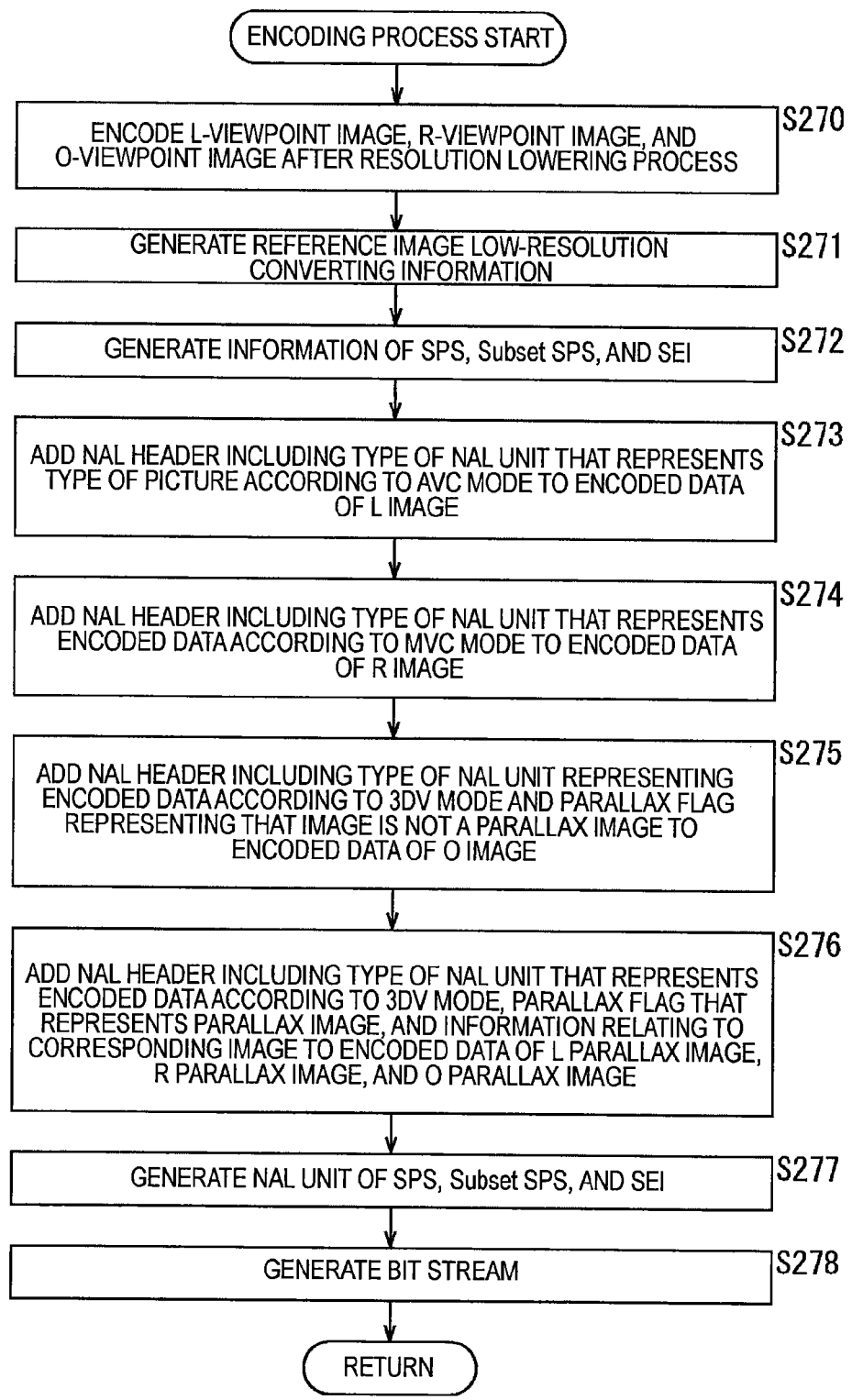
FIG. 45 is a flowchart that illustrates a detailed encoding process of Step S257 represented in FIG. 44.

FIG. 45 is a flowchart that illustrates the detailed encoding process of Step S257 illustrated in FIG. 44.

In Step S270 illustrated in FIG. 45, the encoding unit 301 (FIG. 38) of the encoding processing unit 293 encodes an L viewpoint image, an R viewpoint image, and an O viewpoint image after the resolution lowering process. More specifically, the compatible encoding unit 311 of the encoding unit 301 encodes the L image in accordance with the AVC mode and encodes the R image in accordance with the MVC mode. In addition, the auxiliary encoding unit 312 encodes an L parallax image, an R parallax image, and the O viewpoint image after the resolution lowering process in accordance with the 3DV mode. The encoding unit 301 supplies encoded data of the L viewpoint image, the R viewpoint image, and the O viewpoint image that are acquired as a result of the encoding process to the addition unit 303.

In Step S271, the auxiliary encoding unit 312 generates reference image low-resolution converting information and supplies the generated reference image low-resolution converting information to the transmission unit 294 illustrated in FIG. 37.

In Step S272, the additional information generating unit 302 generates information of the SPS and the SEI of the L image and the information of the Subset SPS and the SEI of the L parallax image, the R viewpoint image, and the O viewpoint image using the parallax information that is supplied from the parallax information generating unit 292 illustrated in FIG. 37 and supplies the generated information to the addition unit 303.

In Step S273, the addition unit 303 adds an NAL header including the type of the NAL unit that represents the type of a picture of the AVC mode to the encoded data of the L image that is supplied from the compatible encoding unit 311, thereby generating an NAL unit. The addition unit 303 supplies the generated NAL unit of the encoded data of the L image to the bit stream generating unit 304.

In Step S274, the addition unit 303 adds an NAL header including the type of the NAL unit that represents the encoded data of the MVC mode to the encoded data of the R image that is supplied from the compatible encoding unit 311, thereby generating an NAL unit. The addition unit 303 supplies the generated NAL unit of the encoded data of the R image to the bit stream generating unit 304.

In Step S275, the addition unit 303 adds an NAL header including the type of the NAL unit that represents the encoded data of the 3DV mode and a parallax flag representing that the image is not a parallax image to the encoded data of the O image that is supplied from the auxiliary encoding unit 312, thereby generating an NAL unit. The addition unit 303 supplies the generated NAL unit of the encoded data of the O image to the bit stream generating unit 304.

In Step S276, the addition unit 303 respectively adds an NAL header including the type of the NAL unit that represents the encoded data of the 3DV mode, a parallax flag representing a parallax image, and information relating to a corresponding image to the encoded data of the L parallax image, the R parallax image, and the O parallax image that is supplied from the auxiliary encoding unit 312, thereby generating an NAL unit. The addition unit 303 supplies the generated NAL unit of the encoded data of the L parallax image, the R parallax image, and the O parallax image to the bit stream generating unit 304.

In Step S277, the addition unit 303 respectively adds an NAL header including the type of the NAL unit that represents corresponding information to the information of the SPS and the SEI of the L image that is supplied from the additional information generating unit 302 and the information of the Subset SPS and SEI of the L parallax image, the R viewpoint image, and the O viewpoint image, thereby generating NAL units. The addition unit 303 supplies the generated NAL units of the information of the SPS and SEI of the L image and the information of the Subset SPS and the SEI of the L parallax image, the R viewpoint image, and the O viewpoint image to the bit stream generating unit 304.

In Step S278, the bit stream generating unit 304 generates a bit stream by arranging the NAL units supplied from the addition unit 303 in a predetermined order and supplies the generated bit stream to the transmission unit 294 illustrated in FIG. 37. Then, the process is returned to Step S257 illustrated in FIG. 44, and the process proceeds to Step S258.

As above, the encoding device 290 encodes compatible images in accordance with an existing encoding mode and adds the NAL header including the type of the NAL unit that represents the encoded data of the 3DV mode to the encoded data of the O image that is an auxiliary image. Accordingly, since a decoding device that corresponds to only an existing encoding mode can extract only the encoded data of the compatible image that can be decoded based on the NAL header and decode the extracted data in accordance with a mode that corresponds to an existing encoding mode, it can be stated that the encoding device 290 performs encoding in accordance with a mode that has compatibility with an existing mode. As a result, for example, data for applications that correspond to the AVC mode, the MVC mode, and the 3DV mode can be encoded together and broadcasted.

[Configuration Example of Decoding Device According to AVC Mode]

Figure 46:
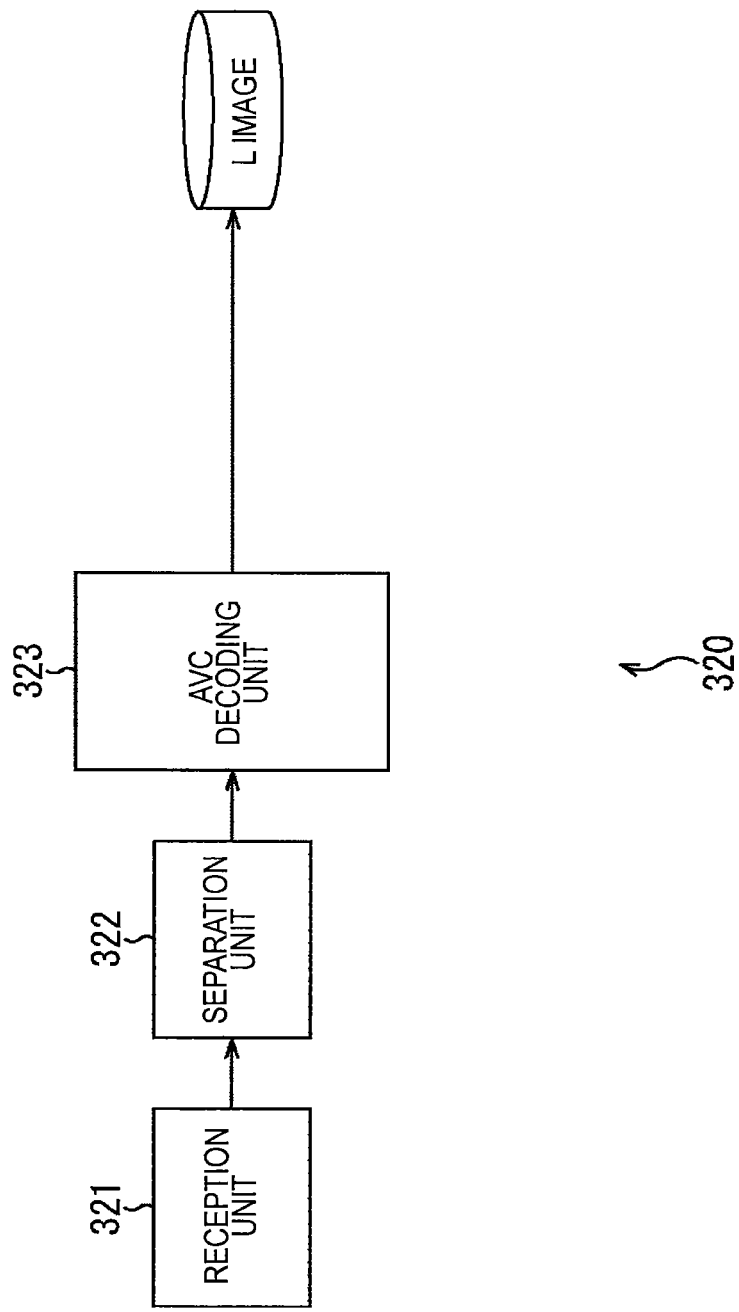
FIG. 46 is a block diagram that illustrates a configuration example of a decoding device according to the AVC mode that corresponds to the encoding device illustrated in FIG. 37.

FIG. 46 is a block diagram that illustrates a configuration example of a decoding device according to the AVC mode that decodes a bit stream transmitted from the encoding device 290 illustrated in FIG. 37.

The decoding device 320 illustrated in FIG. 46 is configured by a reception unit 321, a separation unit 322, and an AVC decoding unit 323 and decodes the encoded data of the L image that is included in the bit stream transmitted from the encoding device 290.

The reception unit 321 of the decoding device 320 receives a TS that is transmitted from the encoding device 290 illustrated in FIG. 37 and supplies a bit stream that is included in the TS to the separation unit 322.

The separation unit 322 separates NAL units of the SPS and the SEI and the encoded data of the L image and NAL units other than the above-described NAL units from the bit stream that is supplied from the reception unit 321 based on the NAL headers.

More specifically, the separation unit 322 extracts an NAL unit of the encoded data of the L image including the type of the NAL unit that represents the type of the picture of the AVC mode in the NAL header, an NAL unit of the SPS of the L image including the type of the NAL unit that represents the SPS of the AVC mode in the NAL header, and an NAL unit of the SEI of the L image including the type of the NAL unit that represents the SEI of the AVC mode in the NAL header from the bit stream. The separation unit 322 supplies the information of the SPS and the information of the SEI, and encoded data of the L image that is data included in the separated NAL units to the AVC decoding unit 323 together with type information that represents that the data is one of the information of the SPS, the information of the SEI, and the encoded data. Here, the type information is generated based on the type of the corresponding NAL unit.

The AVC decoding unit 323 maintains the information of the SPS and the SEI that is supplied in correspondence with the type information representing the information of the SPS and the information of the SEI based on the type information that is supplied from the separation unit 322. The AVC decoding unit 323 decodes the encoded data of the L image that is supplied together with the type information representing the encoded data from the separation unit 322 based on the maintained information of the SPS and the SEI in accordance with a mode that corresponds to the AVC mode. The AVC decoding unit 323 outputs the L image that is acquired as a result of the decoding process on a display device not illustrated in the figure, thereby displaying the L image. Therefore, a viewer can view a 2D image.

[Description of Decoding Device According to AVC Mode]

Figure 47:
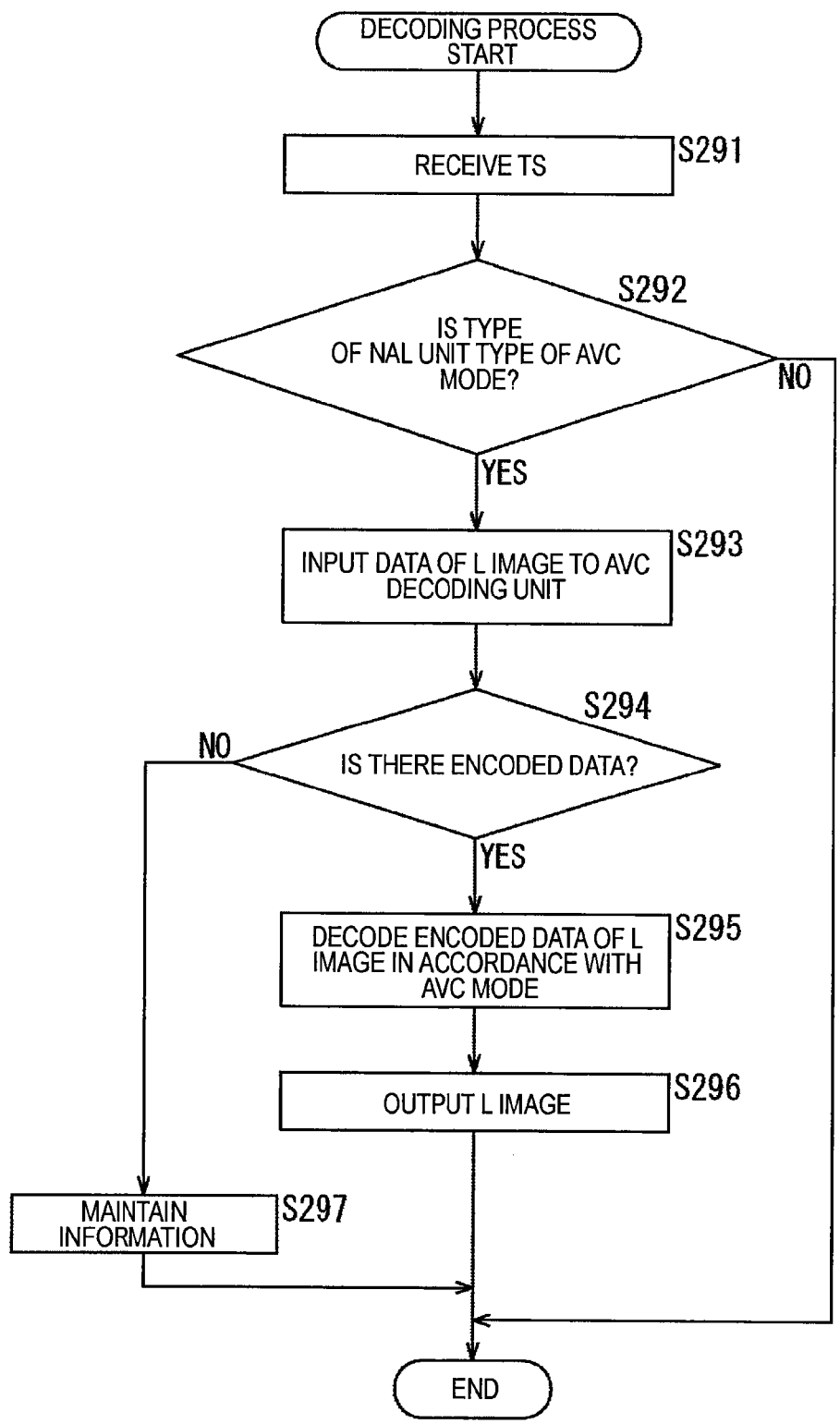
FIG. 47 is a flowchart that illustrates a decoding process performed by a decoding device illustrated in FIG. 46.

FIG. 47 is a flowchart that illustrates a decoding process performed by the decoding device 320 illustrated in FIG. 46. This decoding process, for example, is started when a TS is transmitted from the encoding device 290 illustrated in FIG. 37.

In Step S291 illustrated in FIG. 47, the reception unit 321 of the decoding device 320 receives a TS that is transmitted from the encoding device 290. The reception unit 321 supplies a bit stream that is included in the TS to the separation unit 322. The process of the subsequent Steps S292 to S297 is performed for each NAL unit that configures the bit stream.

In Step S292, the separation unit 322 determines whether or not the type of the NAL unit that is included in the NAL header of the NAL unit is the type of the AVC mode. In other words, the separation unit 322 determines whether the type of the NAL unit is information representing the type of the picture, the SPS, or the SEI according to the AVC mode.

In a case where the type of the NAL unit is determined to be the type of the AVC mode in Step S292, the process proceeds to Step S293. In Step S293, the separation unit 322 inputs the data of the L image included in the NAL unit, in other words, the information of the SPS, the information of the SEI, or the encoded data of the L image to the AVC decoding unit 323 together with the type information.

In Step S294, the AVC decoding unit 323 determines whether or not the data is encoded data of the L image based on the type information corresponding to the data of the L image that is supplied from the separation unit 322. In a case where the encoded data of the L image is determined in Step S294, the AVC decoding unit 323 decodes the encoded data of the L image in accordance with a mode corresponding to the AVC mode based on the maintained information of the SPS and the SEI in Step S295.

In Step S296, the AVC decoding unit 323 outputs the L image that is acquired as a result of the decoding process to a display device not illustrated in the figure, thereby displaying the L image. Then, the process ends.

On the other hand, in a case where it is determined that the data is not the encoded data of the L image in Step S294, in other words, the data of the L image that is supplied from the separation unit 322 is the information of the SPS or the SEI of the L image, the process proceeds to Step S297.

In Step S297, the AVC decoding unit 323 maintains the information of the SEI or the SPS of the L image that is supplied from the separation unit 322, and the process ends.

In addition, in a case where the type of the NAL unit is determined not to be the type of the AVC mode in Step S292, the NAL unit is not supplied to the AVC decoding unit 323, and the process ends.

As described above, the decoding device 320 separates NAL units of the SPS, the SEI, and the encoded data of the L image that is a compatible image that can be decoded by the decoding device 320 and NAL units other than the above-described NAL units from the bit stream based on the NAL headers and decodes only encoded data included in the separated NAL units in accordance with a mode corresponding to an existing AVC mode. Accordingly, the decoding device 320 can decode a bit stream that is acquired as a result of an encoding process having compatibility with an existing mode that is performed by the encoding device 290.

[Configuration Example of Decoding Device According to MVC Mode]

Figure 48:
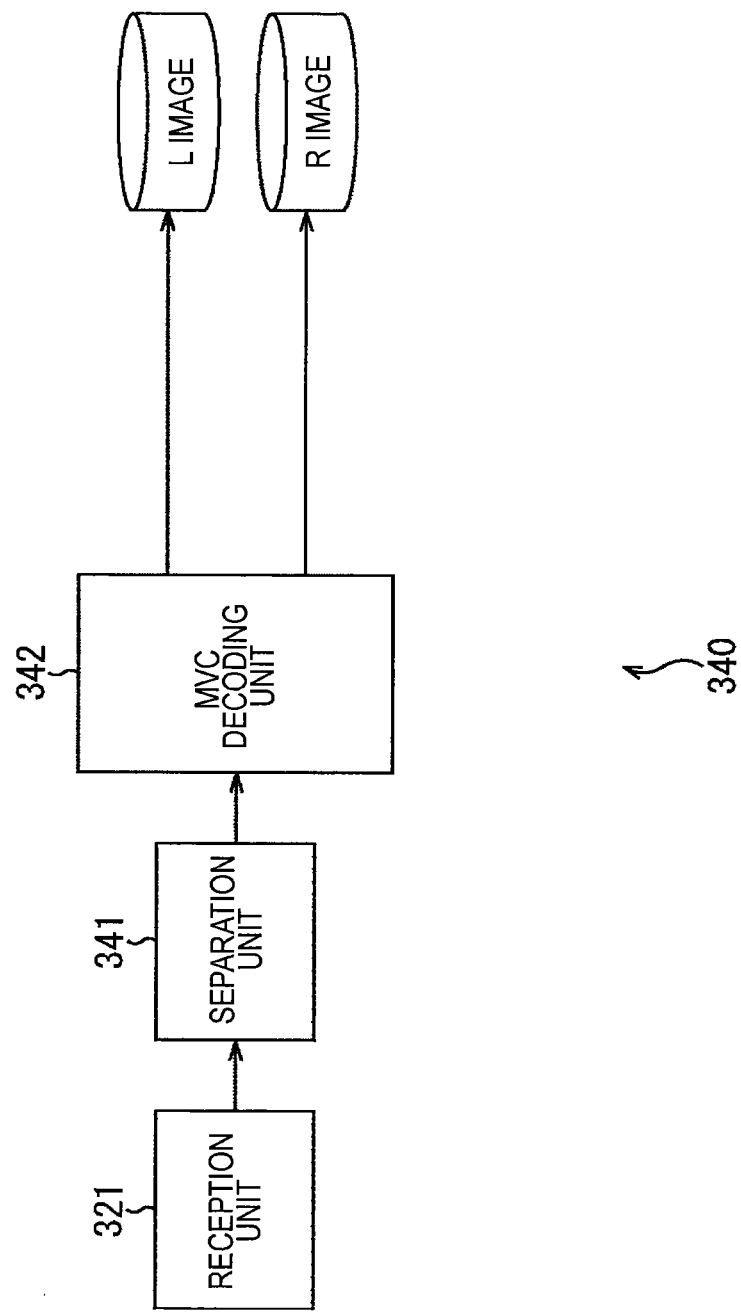
FIG. 48 is a block diagram that illustrates a configuration example of the decoding device according to the MVC mode that corresponds to the encoding device illustrated in FIG. 37.

FIG. 48 is a block diagram that illustrates a configuration example of a decoding device according to the MVC mode that decodes a bit stream transmitted from the encoding device 290 illustrated in FIG. 37.

In the configuration illustrated in FIG. 48, the same reference numeral is assigned to a configuration that is the same as that illustrated in FIG. 46. Duplicate description will not be presented as is appropriate.

The configuration of the decoding device 320 illustrated in FIG. 48 is mainly different from the configuration illustrated in FIG. 46 in that a separation unit 341 and an MVC decoding unit 342 are disposed instead of the separation unit 322 and the AVC decoding unit 323. The decoding device 320 decodes the encoded data of the L image and the R image that is included in the bit stream transmitted from the encoding device 290.

More specifically, the separation unit 341 of the decoding device 320 separates NAL units of the SPS of the L image, the Subset SPS of the R image, and the SEI and the encoded data of the L image and the R image and NAL units other than the above-described NAL units from the bit stream that is supplied from the reception unit 321 based on the NAL headers.

When described in more detail, the separation unit 341, similarly to the separation unit 322 illustrated in FIG. 46, extracts NAL units of the encoded data, the SPS, and the SEI of the L image from the bit stream. In addition, the separation unit 341 extracts an NAL unit of the encoded data of the R image including the type of the NAL unit that represents encoded data of the MVC mode in the NAL header, an NAL unit of the Subset SPS of the R image including the type of the NAL unit that represents the Subset SPS of the MVC mode in the NAL header, and an NAL unit of the SEI of the R image including the type of the NAL unit that represents the SEI of the MVC mode in the NAL header from the bit stream.

The separation unit 341 supplies the SPS of the L image, the Subset SPS of the R image, and the SEI and the encoded data of the L image and the R image that are data included in the separated NAL units to the MVC decoding unit 342 together with the type information of the data.

The MVC decoding unit 342 maintains the information of the SEI of the L image and the R image, the SPS of the L image, and the Subset SPS of the R image based on the type information that is supplied from the separation unit 341. The MVC decoding unit 342, similarly to the AVC decoding unit 323 illustrated in FIG. 46, decodes the encoded data of the L image that is supplied from the separation unit 341 in accordance with a mode that corresponds to the AVC mode based on the maintained information of the SEI and the SPS of the L image.

The MVC decoding unit 342 decodes the encoded data of the R image that is supplied from the separation unit 341 together with the type information representing the encoded data of the R image based on the maintained information of the SEI and the Subset SPS of the R image in accordance with a mode that corresponds to the MVC mode with the L image set as a base view and the R image set as a non-base view. The MVC decoding unit 342 alternately outputs the L image and the R image that are acquired as a result of the decoding process on a display device not illustrated in the figure, thereby displaying the L image and the R image.

At this time, a viewer can view a 3D image by wearing glasses of which the left-eye shutter is open at the time of displaying the L image and of which the right-eye shutter is open at the time of displaying the R image and seeing the L image and the R image that are alternately displayed on the display device.

[Description of Process of Decoding Device According to MVC Mode]

Figure 49:
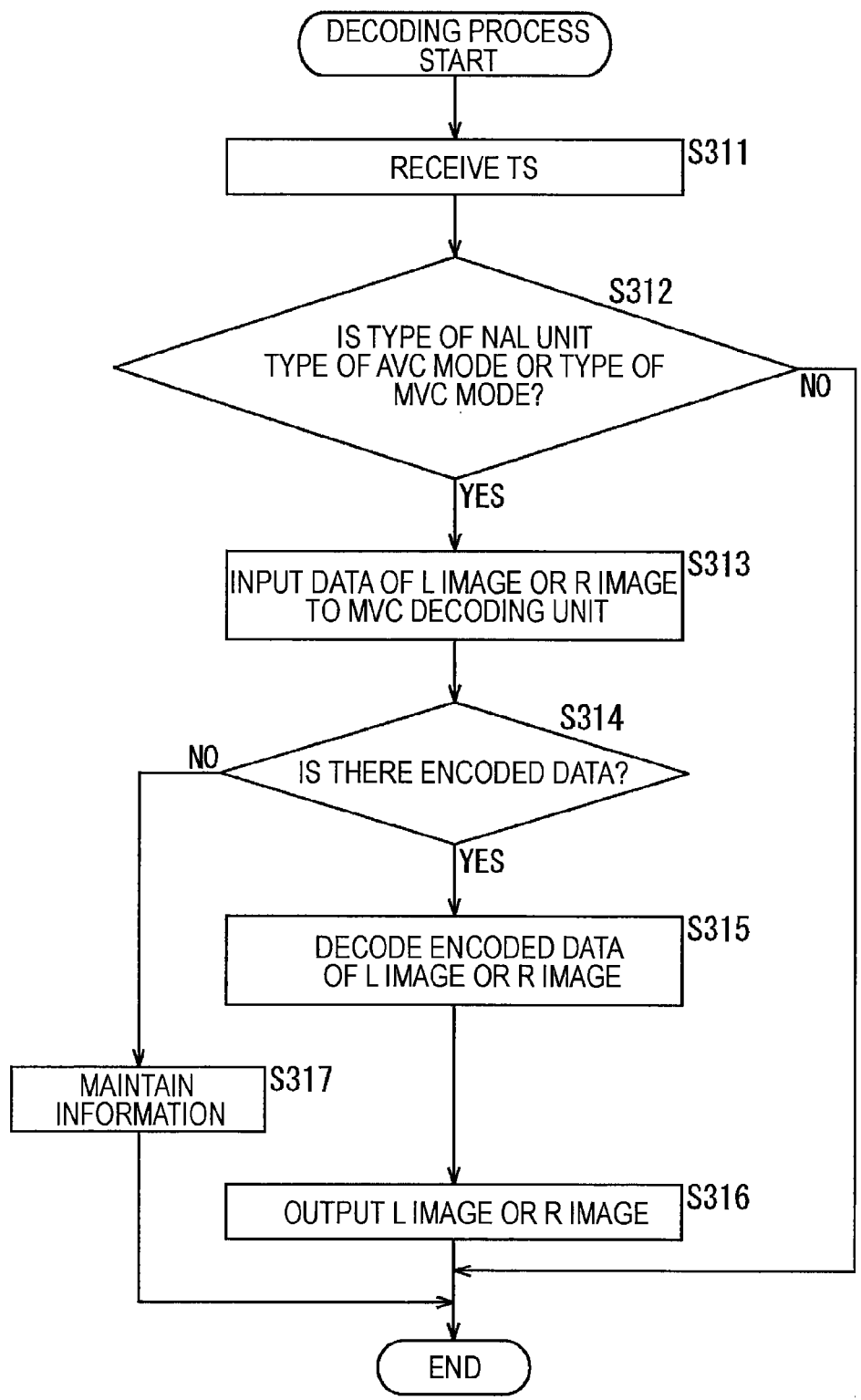
FIG. 49 is a flowchart that illustrates a decoding process performed by the decoding device illustrated in FIG. 48.

FIG. 49 is a flowchart that illustrates a decoding process performed by the decoding device 340 illustrated in FIG. 48. This decoding process, for example, is started when a TS is transmitted from the encoding device 290 illustrated in FIG. 37.

In Step S311 illustrated in FIG. 49, the reception unit 321 of the decoding device 340 receives the TS that is transmitted from the encoding device 290. The reception unit 321 supplies a bit stream that is included in the TS to the separation unit 341. The process of the subsequent Steps S312 to S317 is performed for each NAL unit that configures the bit stream.

In Step S312, the separation unit 341 determines whether the type of the NAL unit that is included in the NAL header of the NAL unit is the type of the AVC mode or the type of the MVC mode. In other words, the separation unit 341 determines whether the type of the NAL unit is information representing the type of the picture, the SPS, or the SEI according to the AVC mode or information representing encoded data, the Subset SPS, or the SEI according to the MVC mode.

In a case where the type of the NAL unit is determined to be the type of the AVC mode or the type of the MVC mode in Step S312, the process proceeds to Step S313. In Step S313, the separation unit 341 inputs the data of the L image or the R image that is included in the NAL unit, in other words, the information of the SPS, the information of the SEI, or the encoded data of the L image, or the information of the Subset SPS, the SEI information, or the encoded data of the R image to the MVC decoding unit 342 together with the type information.

In Step S314, the MVC decoding unit 342 determines whether the data supplied from the separation unit 341 is encoded data of the L image or encoded data of the R image based on the type information. In a case where the encoded data of the L image or the encoded data of the R image is determined in Step S314, the MVC decoding unit 342 decodes the encoded data of the L image or the R image based on the maintained SPS or the information of the Subset SPS and the SEI in Step S315.

In Step S316, the MVC decoding unit 342 outputs the L image or the R image that is acquired as a result of the decoding process to a display device not illustrated in the figure so as to display the image, and the process ends.

On the other hand, in a case where it is determined that the data is not the encoded data of the L image or the R image in Step S314, in other words, the data supplied from the separation unit 341 is the information of the SPS or the SEI of the L image or the information of the Subset SPS or the SEI of the R image, the process proceeds to Step S317.

In Step S317, the MVC decoding unit 342 maintains the information of the SEI or the SPS of the L image or the information of the Subset SPS or the SEI of the R image that is supplied from the separation unit 341, and the process ends.

In addition, in a case where the type of the NAL unit is determined not to be the type of the AVC mode or the type of the MVC type in Step S312, the NAL unit is not supplied to the MVC decoding unit 342, and the process ends.

As described above, the decoding device 340 separates NAL units of the SPS, the SEI, and the encoded data of the L image that is a compatible image that can be decoded by the decoding device 340 and the Subset SPS, the SEI, and the encoded data of the R image and NAL units other than the above-described NAL units from the bit stream based on the NAL headers and decodes only encoded data included in the separated NAL units in accordance with a mode corresponding to an existing AVC mode or an MVC mode. Accordingly, the decoding device 340 can decode a bit stream that is acquired as a result of an encoding process having compatibility with an existing mode that is performed by the encoding device 290.

[Configuration Example of Decoding Device According to 3DV Mode]

Figure 50:
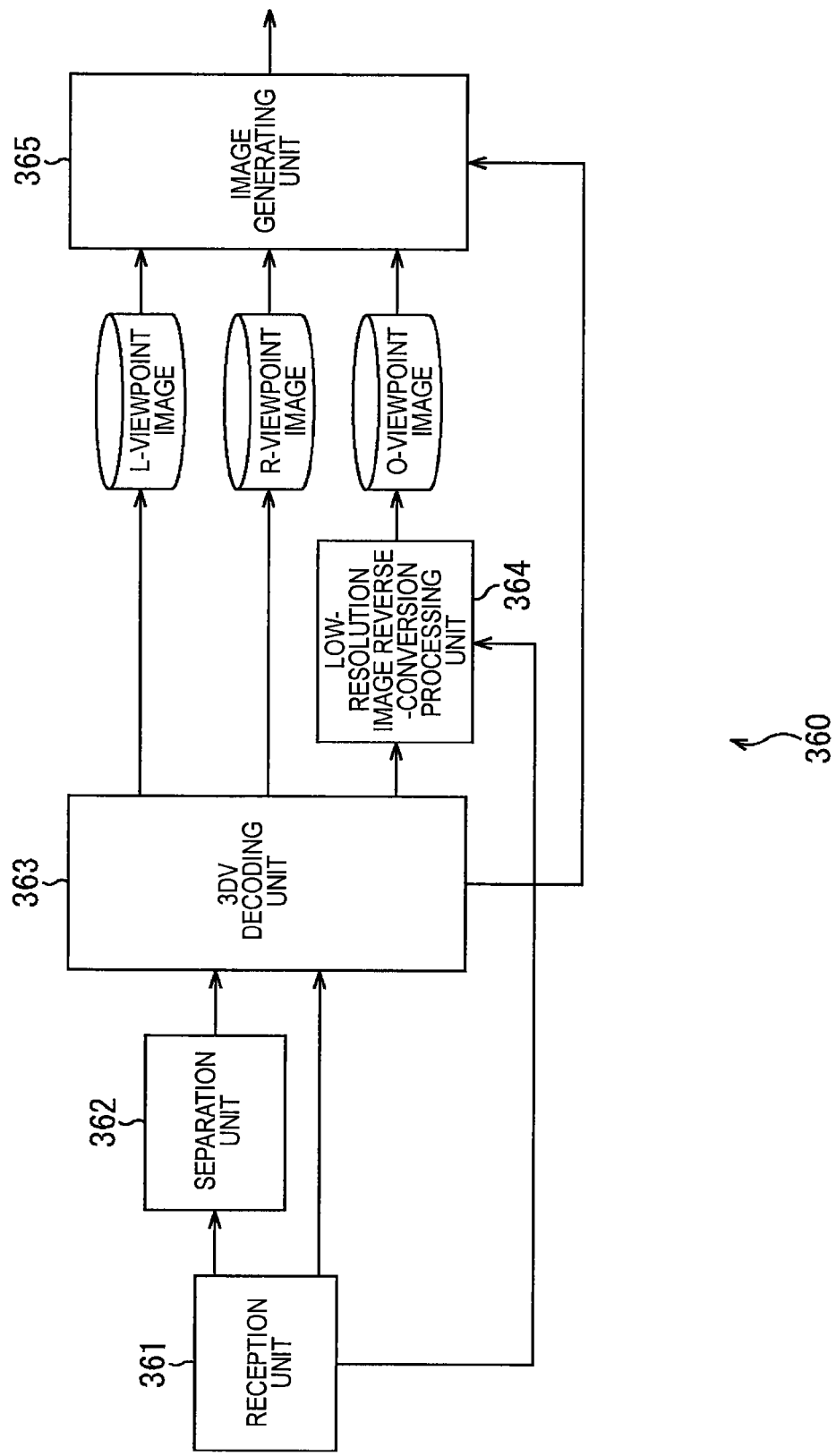
FIG. 50 is a block diagram that illustrates a configuration example of a decoding device according to the 3DV mode that corresponds to the encoding device illustrated in FIG. 37.

FIG. 50 is a block diagram that illustrates a configuration example of a decoding device according to the 3DV mode that decodes a bit stream transmitted from the encoding device 290 illustrated in FIG. 37.

The decoding device 360 illustrated in FIG. 50 is configured by a reception unit 361, a separation unit 362, a 3DV decoding unit 363, a low-resolution image reverse-conversion processing unit 364, and an image generating unit 365. The decoding device 360 decodes the encoded data of the L viewpoint image, the R viewpoint image, and O viewpoint image that is included in the bit stream transmitted from the encoding device 290.

More specifically, the reception unit 361 of the decoding device 360 receives a TS that is transmitted from the encoding device 290 illustrated in FIG. 37. The reception unit 361 supplies the bit stream included in the TS to the separation unit 362, supplies the reference image low-resolution converting information to the 3DV decoding unit 363, and supplies the auxiliary image low-resolution converting information to the low-resolution image reverse-conversion processing unit 364.

The separation unit 362 separates each NAL unit from the bit stream that is supplied from the reception unit 361 based on the NAL headers. Described in more detail, the separation unit 362, similarly to the separation unit 341 illustrated in FIG. 48, extracts the NAL units of the encoded data, the SPS, and the SEI of the L image from the bit stream. In addition, the separation unit 362, similarly to the separation unit 341, extracts the NAL units of the encoded data, the Subset SPS, and the SEI of the R image from the bit stream.

Furthermore, the separation unit 362 extracts NAL units of the encoded data of the L parallax image, the R parallax image, and the O viewpoint image that includes the type of the NAL unit that represents the encoded data of the 3DV mode in the NAL headers. In addition, the separation unit 362 extracts NAL units of the Subset SPS of the L parallax image, the R parallax image, and the O viewpoint image and the SEI of the L parallax image, the R parallax image, and the O viewpoint image that include the type of the NAL unit representing the Subset SPS and the SEI of the 3DV mode in the NAL headers.

In addition, the separation unit 362 further separates NAL headers of the encoded data of the L parallax image, the R parallax image, and the O viewpoint image based on the extension information included in the NAL headers. More specifically, the separation unit 362 extracts NAL units of which the parallax flag as the extension information represents that the image is not a parallax image as NAL units of the encoded data of the O parallax image. In addition, the separation unit 362 extracts NAL units of which the parallax flag as the extension information represents that the image is a parallax image and of which information specifies one as the number of viewpoints of a corresponding image and specifies the L image as information specifying the viewpoint of a corresponding image as NAL units of the encoded data of the L parallax image. Similarly, the separation unit 362 extracts an NAL unit of the encoded data of the R parallax image and an NAL unit of the encoded data of the O parallax image.

The separation unit 362 supplies the information of the SPS of the L image, the information of the Subset SPS of the L parallax image, the R viewpoint image, and the O viewpoint image, and the information of the SEI and the encoded data of L viewpoint image, the R viewpoint image, and the O viewpoint image, which are data included in the separated NAL units, to the 3DV decoding unit 363 together with the type information of the data.

The 3DV decoding unit 363 maintains the information of the SPS and the SEI of the L image and the information of the Subset SPS and the SEI of the L parallax image, the R viewpoint image, and the O viewpoint image based on the type information that is supplied from the separation unit 362. The 3DV decoding unit 363, similarly to the MVC decoding unit 342 illustrated in FIG. 48, decodes the encoded data of the L image that is supplied from the separation unit 362 based on the maintained information of the SEI and the SPS of the L image in accordance with a mode that corresponds to the AVC mode. In addition, the 3DV decoding unit 363, similarly to the MVC decoding unit 342, decodes the encoded data of the R image that is supplied from the separation unit 362 based on the maintained information of the SEI and the Subset SPS of the R image in accordance with a mode that corresponds to the MVC mode.

In addition, the 3DV decoding unit 363 decodes the encoded data of the O image that is supplied from the separation unit 362 together with the type information representing the encoded data of the O image based on the maintained information of the SEI and the Subset SPS of the O image in accordance with a mode that corresponds to the 3DV mode by referring to the L image and the R image. At this time, the 3DV decoding unit 363 performs a resolution lowering process for the L image and the R image that are referred to based on the reference image low-resolution converting information that is supplied from the reception unit 361 and refers to the L image and the R image after the resolution lowering process.

Furthermore, the 3DV decoding unit 363 decodes the encoded data of the L parallax image that is supplied form the separation unit 362 together with the type information representing the encoded data of the L parallax image based on the maintained information of the SEI and the Subset SPS of the L parallax image in accordance with a mode that corresponds to the 3DV mode without referring to any image other than the parallax image of the same viewpoint. In addition, the 3DV decoding unit 363 decodes the encoded data of the R parallax image that is supplied form the separation unit 362 together with the type information representing the encoded data of the R parallax image based on the maintained information of the SEI and the Subset SPS of the R parallax image in accordance with a mode that corresponds to the 3DV mode by referring to the L parallax image.

Furthermore, the 3DV decoding unit 363 decodes the encoded data of the O parallax image that is supplied form the separation unit 362 together with the type information representing the encoded data of the O parallax image based on the maintained information of the SEI and the Subset SPS of the O parallax image in accordance with a mode that corresponds to the 3DV mode by referring to the L parallax image and the R parallax image. At this time, the 3DV decoding unit 363 performs a resolution lowering process for the L parallax image and the R parallax image that are referred to based on the reference image low-resolution converting information that is supplied from the reception unit 361 and refers to the L parallax image and the R parallax image after the resolution lowering process.

The 3DV decoding unit 363 supplies the L viewpoint image and the R viewpoint image acquired as a result of the decoding process to the image generating unit 365. In addition, the 3DV decoding unit 363 supplies the O viewpoint image acquired as a result of the decoding process to the low-resolution image reverse-conversion processing unit 364. Furthermore, the 3DV decoding unit 363 supplies the parallax information that is included in the maintained SEI of the L parallax image, the R parallax image, and the O parallax image to the image generating unit 365.

The low-resolution image reverse-conversion processing unit 364 performs a resolution increasing process such as a filter process that corresponds to the resolution lowering process performed by the image conversion processing unit 291 illustrated in FIG. 37 for an O image and an O parallax image that configure the O viewpoint image supplied from the 3DV decoding unit 363 based on the auxiliary image low-resolution converting information supplied from the reception unit 361. In this way, the resolution of the O viewpoint image becomes the same as the resolution of the L viewpoint image and the R viewpoint image. The low-resolution image reverse-conversion processing unit 364 supplies the O viewpoint image after the resolution increasing process to the image generating unit 365.

The image generating unit 365 performs conversion for the L parallax image that is supplied from the 3DV decoding unit 363 as is necessary based on the parallax information of the L parallax image that is supplied from the 3DV decoding unit 363.

For example, in a case where the parallax type included in the parallax information of the L parallax image represents that each pixel value of the parallax image is a depth value, and a value that represents parallax that can be processed by the image generating unit 365 is a parallax value, the image generating unit 365 converts each pixel value of the L parallax image into a parallax value.

In addition, in a case where the normalization flag included in the parallax information of the L parallax image is a value representing that each pixel value is not normalized, and the value representing parallax that can be processed by the image generating unit 365 is a value after normalization, the image generating unit 365 normalizes each pixel value of the L parallax image, thereby converting it into a value after normalization.

Furthermore, in a case where the photographing mode included in the parallax information of the L parallax image is the photographing mode with radiation, and the parallax image that can be processed by the image generating unit 365 is a parallax image of an image captured in the parallel photographing mode, the image generating unit 365 converts the L parallax image into a parallax image of the L image that is captured in the parallel photographing mode.

The image generating unit 365, similarly to the L parallax image, converts the R parallax image based on the parallax information of the R parallax image and converts the O parallax image based on the parallax information of the O parallax image as is necessary.

The image generating unit 365 generates images having the number of viewpoints that is three or more corresponding to a display device not illustrated in the figure based on the L parallax image, the R parallax image, and the O parallax image after conversion and a maximal value and a minimal value of the depth values or a maximal value and a minimal value of the parallax values that are included in the L image, the R image, the O image, and parallax information and, the correspondence relation information. Then, the image generating unit 365 converts the resolution of the generated image of each viewpoint into resolution that is "1/the number of viewpoints" of the resolution of the compatible image or the auxiliary image, synthesizes the images, and outputs the synthesized image to a display device not illustrated in the figure so as to display the image.

At this time, the multi-viewpoint images after the synthesis are displayed such that the viewing angles are different for each viewpoint, and a viewer can view a 3D image without wearing glasses by seeing images of arbitrary two viewpoints with his left and right eyes.

[Description of Process of Decoding Device According to 3DV Mode]

Figure 51:
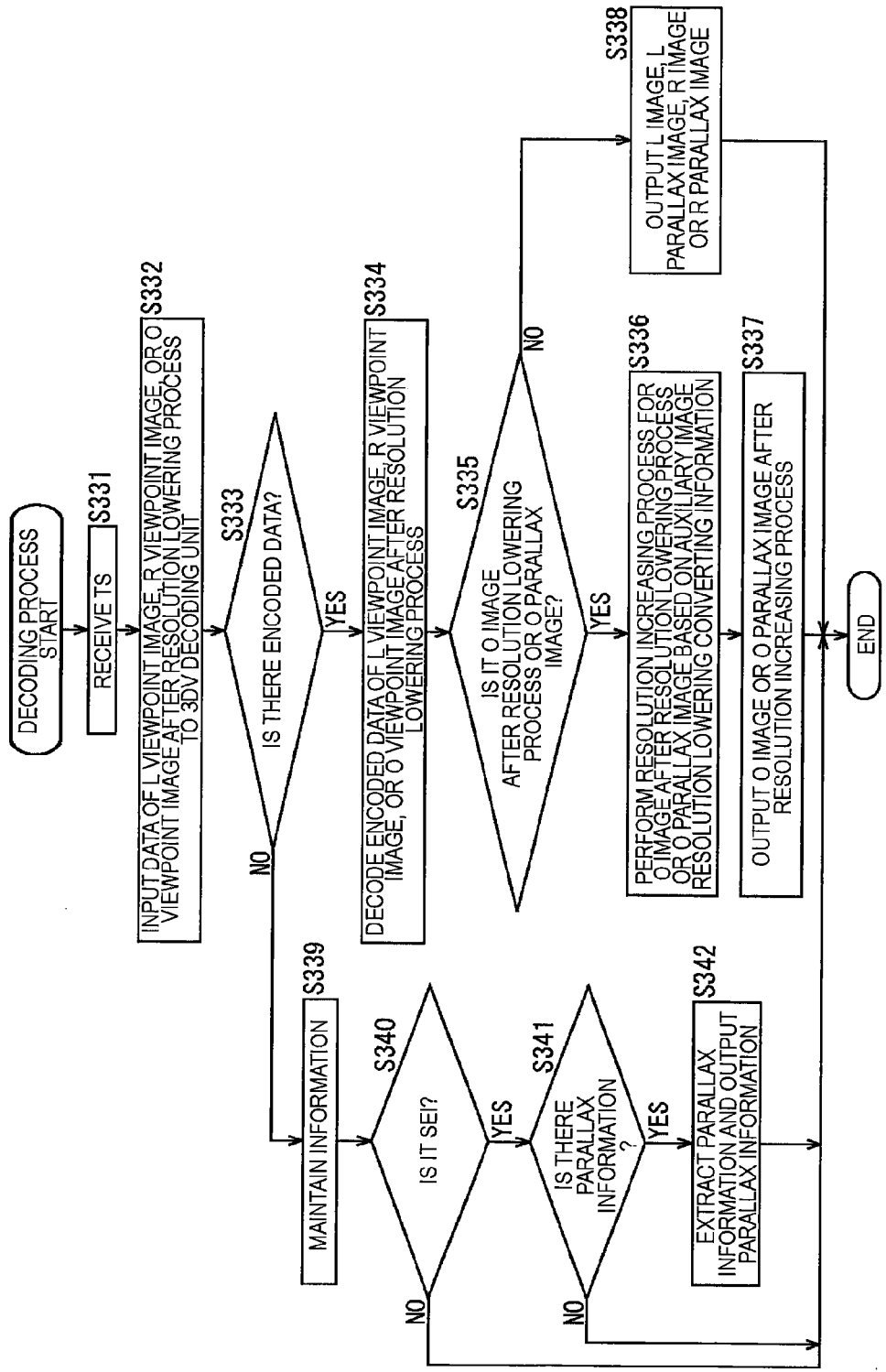
FIG. 51 is a flowchart that illustrates a decoding process performed by the decoding device 360 illustrated in FIG. 50.

FIG. 51 is a flowchart that illustrates a decoding process performed by the decoding device 360 illustrated in FIG. 50. This decoding process, for example, is started when a TS is transmitted from the encoding device 290 illustrated in FIG. 37.

In Step S331 illustrated in FIG. 51, the reception unit 361 of the decoding device 340 receives a TS that is transmitted from the encoding device 290. The reception unit 361 supplies the bit stream included in the TS to the separation unit 362, supplies the reference image low-resolution converting information to the 3DV decoding unit 363, and supplies the auxiliary image low-resolution converting information to the low-resolution image reverse-conversion processing unit 364. The process of the subsequent Steps S332 to S342 is performed for each NAL unit that configures the bit stream.

In Step S332, the separation unit 362 separates each NAL unit based on the NAL header of the NAL unit and supplies data of the L viewpoint image, the R viewpoint image, or the O viewpoint image after the resolution lowering process that is included in the NAL unit to the 3DV decoding unit 363 together with the type information.

In Step S333, the 3DV decoding unit 363 determines whether the data supplied from the separation unit 362 together with the type information is the encoded data of the L viewpoint image, the R viewpoint image, or the O viewpoint image after the resolution lowering process based on the type information. In a case where the data is determined to be the encoded data of the L viewpoint image, the R viewpoint image, or the O viewpoint image in Step S333, the process proceeds to Step S334.

In Step S334, the 3DV decoding unit 363 decodes the encoded data of the L viewpoint image, the R viewpoint image, or the O viewpoint image after the resolution lowering process based on the maintained information of the SPS, the Subset SPS, or the SEI.

In Step S335, the 3DV decoding unit 363 determines whether the image acquired as a result of the decoding process is the O image or the O parallax image after the resolution lowering process based on the type information. In a case where the image acquired as a result of the decoding process is determined to be the O image or the O parallax image after the resolution lowering process in Step S335, the 3DV decoding unit 363 supplies the O image or the O parallax image to the low-resolution image reverse-conversion processing unit 364.

In Step S336, the low-resolution image reverse-conversion processing unit 364 performs a resolution increasing process for the O image or the O parallax image after the resolution lowering process that is supplied from the 3DV decoding unit 363 based on the auxiliary image low-resolution converting information that is supplied from the reception unit 361. In this way, the resolution of the O image or the O parallax image becomes the same as that of the L viewpoint image and the R viewpoint image.

In Step S337, the low-resolution image reverse-conversion processing unit 364 outputs the O image or the O parallax image after the resolution increasing process to the image generating unit 365, and the process ends.

On the other hand, in a case where the image acquired as a result of the decoding process is determined not to be the O image or the O parallax image after the resolution lowering process in Step S335, in other words, the image acquired as a result of the decoding process is the L image, the L parallax image, the R image, or the R parallax image, the process proceeds to Step S338.

In Step S338, the 3DV decoding unit 363 outputs the L image, the L parallax image, the R image, or the R parallax image that is acquired as a result of the decoding process to the image generating unit 365, and the process ends.

In addition, in a case where the data is determined not to be the encoded data of the L viewpoint image, the R viewpoint image, or the O viewpoint image in Step S333, in other words, the data supplied from the separation unit 362 is the information of the SPS, the Subset SPS, or the SEI, the process proceeds to Step S339.

In Step S339, the 3DV decoding unit 363 maintains the information of the SPS, the Subset SPS, or the SEI that is supplied from the separation unit 362.

In Step S340, the 3DV decoding unit 363 determines whether or not the data maintained in Step S339 is the information of the SEI. In a case where the data maintained in Step S340 is determined to be the information of the SEI, the process proceeds to Step S341.

In Step S341, the 3DV decoding unit 363 determines whether there is parallax information in the information of the SEI that is maintained in Step S339. In a case where it is determined that there is the parallax information in Step S341, in Step S342, the 3DV decoding unit 363 extracts parallax information from the information of the SEI and outputs the extracted parallax information to the image generating unit 365, and the process ends.

On the other hand, in a case where the data maintained in Step S340 is determined not to be the information of the SEI or in a case where it is determined that there is no parallax information in Step S341, the process ends.

As described above, the decoding device 360 separates each NAL unit from the bit stream based on the NAL header. Then, the decoding device 360 decodes the encoded data of the compatible image that is included in the separated NAL unit in accordance with a mode that corresponds to the existing AVC mode or the MVC mode and decodes the encoded data of the auxiliary image and the parallax image in accordance with a mode that corresponds to the 3DV mode. Accordingly, the decoding device 340 can decode a bit stream that is acquired as a result of an encoding process performed by the encoding device 290 in accordance with a mode that has compatibility with an existing mode.

[Description of Encoded Data that is Decoding Target]

Figure 52:
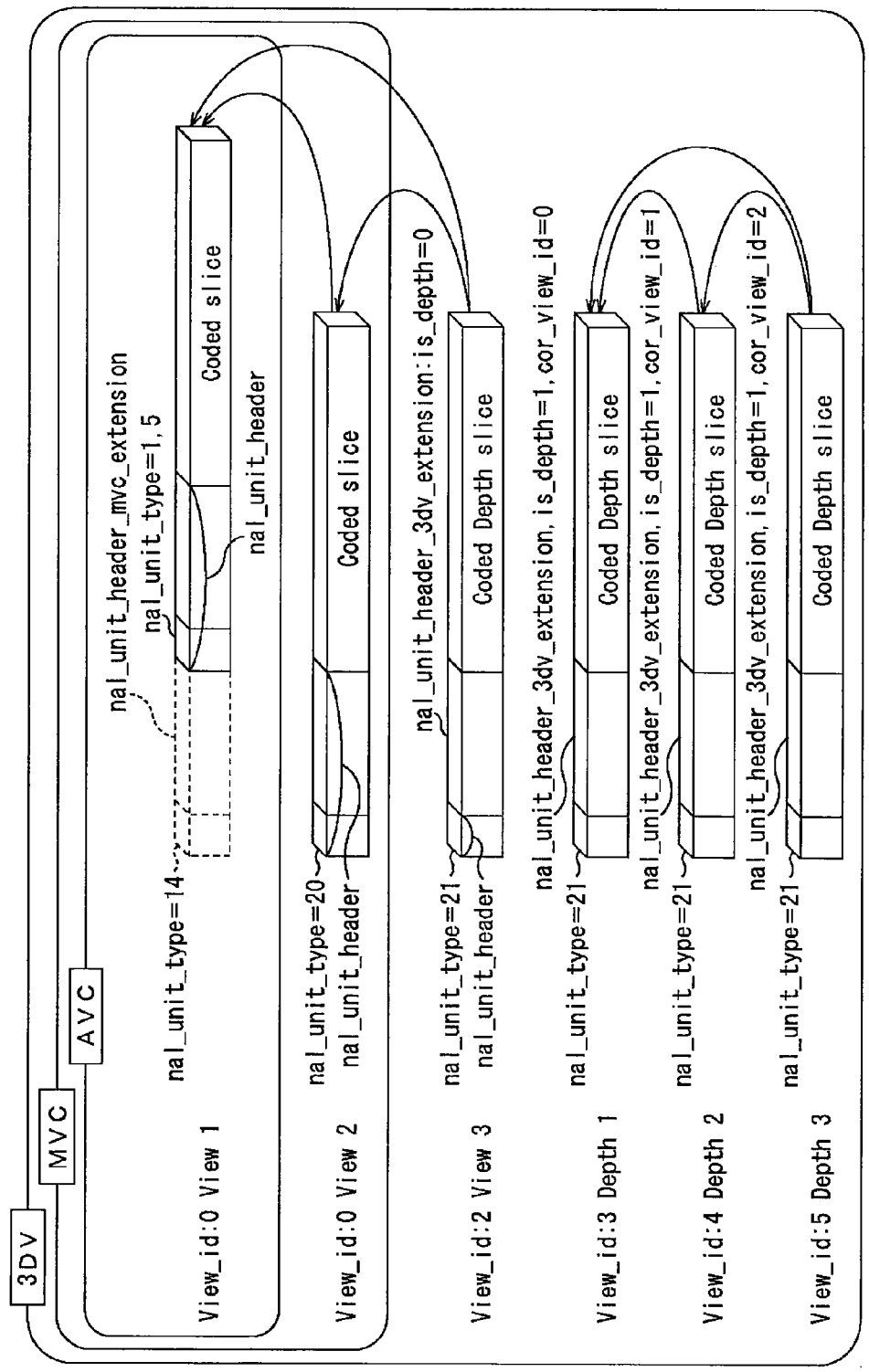
FIG. 52 is a diagram that illustrates encoded data that is a decoding target.

FIG. 52 is a diagram that illustrates encoded data that is a decoding target for the decoding device 320 illustrated in FIG. 46, the decoding device 340 illustrated in FIG. 48, and the decoding device 360 illustrated in FIG. 50.

In the example illustrated in FIG. 52, it is assumed that a bit stream encoded in the reference relation illustrated in FIG. 39 is transmitted from the encoding device 290.

In this case, as illustrated in FIG. 52, the decoding device 320 decodes only encoded data (Coded slice) that is included in the NAL unit of the L image of which the type of the NAL unit (nal_unit_type) is information (in the example illustrated in FIG. 52, one or five) that represents the type of the picture of the AVC mode in accordance with a mode that corresponds to the AVC mode.

Meanwhile, the decoding device 340, as illustrated in FIG. 52, similarly to the decoding device 320, decodes the encoded data included in the NAL unit of the L image in accordance with a mode that corresponds to the AVC mode. In addition, the decoding device 340 decodes the encoded data included in the NAL unit of the R image of which the type of the NAL unit is information (in the example illustrated in FIG. 52, 20) representing the encoded data of the MVC mode in accordance with a mode that corresponds to the MVC mode with the L image set as a base view and the R image set as a non-base view.

Furthermore, the decoding device 360, as illustrated in FIG. 52, similarly to the decoding device 320 and the decoding device 340, decodes encoded data included in the NAL unit of the L image in accordance with a mode that corresponds to the AVC mode. In addition, the decoding device 360, similarly to the decoding device 340, decodes encoded data that is included in the NAL unit of the R image in accordance with a mode corresponding to the MVC mode with the L image set as a base view and the R image set as a non-base view.

The decoding device 360 decodes encoded data included in the NAL unit of the O image after the resolution lowering process of which the type of the NAL unit is information (in the example illustrated in FIG. 52, 21) representing the encoded data of the 3DV mode and of which the extension information (nal_unit_header_3dv_extension) is a parallax flag (is_depth=0) representing that the image is not a parallax image in accordance with a mode that corresponds to the 3DV mode by referring to the L image and the R image after the resolution lowering process.

In addition, the decoding device 360 decodes encoded data included in the NAL unit of the L parallax image of which the type of the NAL unit is information representing the encoded data of the 3DV mode and of which the extension information is information (cor_view_id=0) that specifies the L image as information specifying an image that corresponds to a parallax flag (is_depth=1)) representing a parallax image in accordance with a mode that corresponds to the 3DV mode without referring to any image other than a parallax image of the same viewpoint.

Furthermore, the decoding device 360 decodes encoded data included in the NAL unit of the R parallax image of which the type of the NAL unit is information representing the encoded data of the 3DV mode and of which the extension information is information (cor_view_id=1) that specifies the R image as information specifying an image that corresponds to a parallax flag representing a parallax image in accordance with a mode that corresponds to the 3DV mode by referring to the L parallax image.

In addition, the decoding device 360 decodes encoded data included in the NAL unit of the O parallax image after the resolution lowering process of which the type of the NAL unit is information representing the encoded data of the 3DV mode and of which the extension information is information (cor_view_id=2) that specifies the O image as information specifying an image that corresponds to a parallax flag representing a parallax image in accordance with a mode that corresponds to the 3DV mode by referring to the L parallax image and the R parallax image after the resolution lowering process.

Sixth Embodiment

[Configuration Example of Encoding Device According to Sixth Embodiment]

Figure 53:
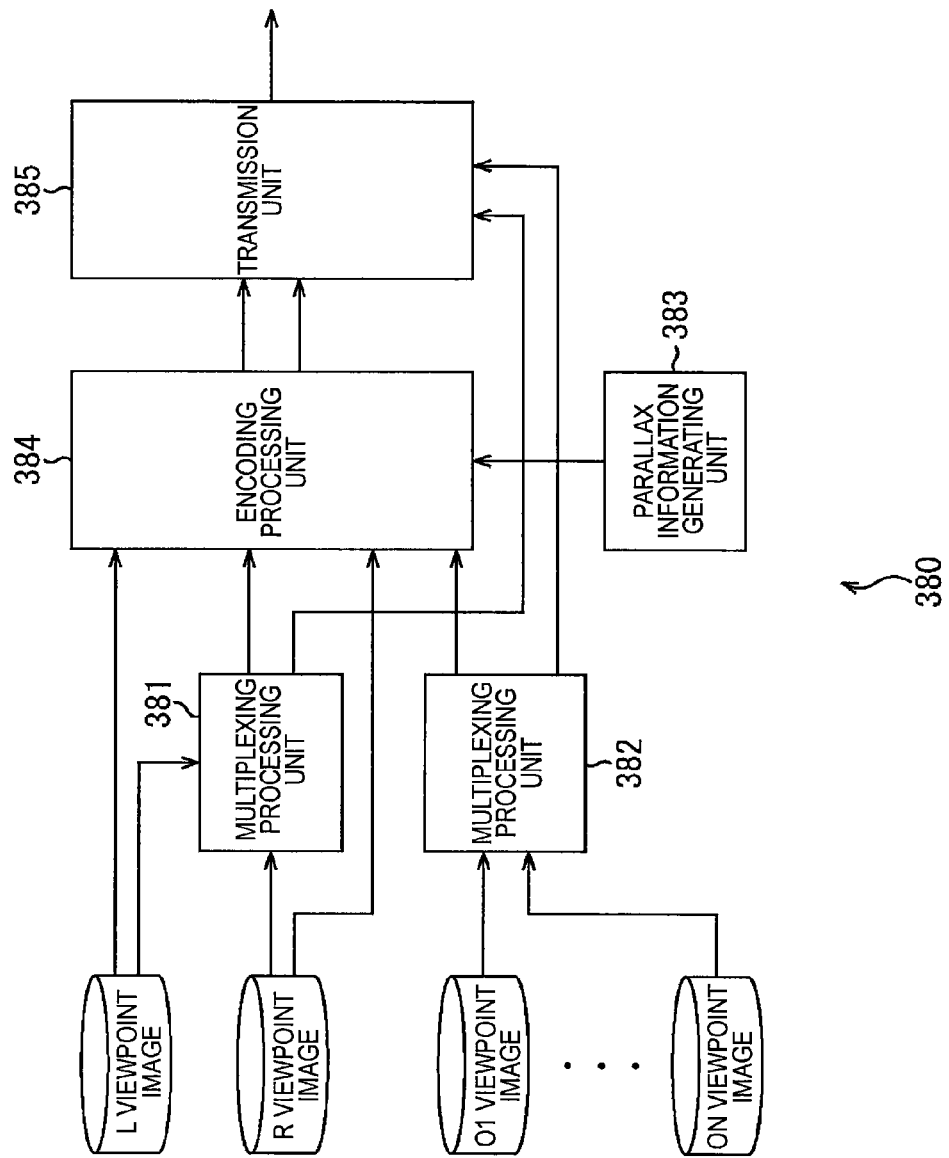
FIG. 53 is a block diagram that illustrates a configuration example of an encoding device according to a sixth embodiment of the present technology.

FIG. 53 is a block diagram that illustrates a configuration example of an encoding device according to a sixth embodiment of the present technology.

The encoding device 380 illustrated in FIG. 53 is configured by a multiplexing processing unit 381, a multiplexing processing unit 382, a parallax information generating unit 383, an encoding processing unit 384, and a transmission unit 385. In the encoding device 380, compatible images are an L image and an R image, and auxiliary images are an O1 image to an ON image of N (here, N is a multiple of two) viewpoints. The encoding device 380 multiplexes and then encodes parallax images of the compatible images, auxiliary images of each two viewpoints, and parallax images of the auxiliary images.

More specifically, an L parallax image out of L viewpoint images input to the encoding device 380 and an R parallax image out of R viewpoint images are input to the multiplexing processing unit 381 of the encoding device 380. The multiplexing processing unit 381 multiplexes the L parallax image and the R parallax image in accordance with a predetermined multiplexing mode.

More specifically, for example, in a case where the multiplexing mode is a side-by-side mode, the multiplexing processing unit 381 halves the resolution of each one of the L parallax image and the R parallax image. Then, the multiplexing processing unit 381 multiplexes the L parallax image and the R parallax image of which the resolution has halved such that the L parallax image of which the resolution has halved becomes a left-half image of the screen, and the R parallax image of which the resolution has halved becomes a right-half image of the screen. In addition, for example, in a case where the multiplexing mode is a top-and-bottom mode, the multiplexing processing unit 381 multiplexes the L parallax image and the R parallax image of which the resolution has halved such that the L parallax image of which the resolution has halved becomes an upper-half image of the screen, and the R parallax image of which the resolution has halved becomes a lower-half image of the screen.

The multiplexing processing unit 381 supplies a multiplexed image that is acquired as a result of the multiplexing process to the encoding processing unit 384 as a compatible parallax image. In addition, the multiplexing processing unit 381 generates compatible multiplexing information that is information representing the multiplexing mode of the L parallax image and the R parallax image that are parallax images of the compatible images and supplies the generated compatible multiplexing information to the transmission unit 385.

To the multiplexing processing unit 382, an O1 viewpoint image that is formed by an O1 image and O1 parallax image that is a parallax image of the O1 image, . . . , and an ON viewpoint image that is formed by an ON image and an ON parallax image that is a parallax image of the ON image, which are input to the encoding device 380, are input. The multiplexing processing unit 382 respectively multiplexes the O1 image and an O2 image, an O3 image and an O4 image, . . . , an O(N−1) image and the ON image in accordance with a predetermined multiplexing mode. Then, the multiplexing processing unit 382 supplies a multiplexed image that is acquired as a result of the multiplexing process to the encoding processing unit 384 as an auxiliary multiplexed image.

Similarly, the multiplexing processing unit 382 respectively multiplexes the O1 parallax image and an O2 parallax image, an O3 parallax image and an O4 parallax image, an O(N−1) parallax image and the ON parallax image in accordance with a predetermined multiplexing mode. Then, the multiplexing processing unit 382 supplies a multiplexed image that is acquired as a result of the multiplexing process to the encoding processing unit 384 as an auxiliary parallax multiplexed image. In addition, the multiplexing processing unit 382 generates auxiliary multiplexing information that is information representing the multiplexing modes of the O1 image to the ON image that are auxiliary images and the O1 parallax image to the ON parallax image that are parallax images of auxiliary images and supplies the generated auxiliary multiplexing information to the transmission unit 385.

Hereinafter, in a case where the O1 viewpoint image to the ON viewpoint image do not need to be particularly discriminated from each other, the O1 to ON viewpoint images will be collectively referred to as an O multi-viewpoint image. Similarly, O1 to ON images will be referred to as an O multiple image, and O1 to ON parallax images will be referred to as an O multi-parallax image.

The parallax information generating unit 383 generates parallax information of the L parallax image, the R parallax image and the O multi-parallax image based on information acquired at the time of capturing the L image, the R image, and the O multi-image and supplies the generated parallax information to the encoding processing unit 384.

The encoding processing unit 384, similarly to the encoding processing unit 293 illustrated in FIG. 37, encodes the L image included in the L viewpoint image that is input to the encoding device 380 in accordance with the AVC mode. In addition, the encoding processing unit 384, similarly to the encoding processing unit 293, encodes the R image included in the R viewpoint image input to the encoding device 380 with the L image set as a base view and the R image set as a non-base view in accordance with the MVC mode.

Furthermore, the encoding processing unit 384 encodes an auxiliary multiplexed image supplied from the multiplexing processing unit 382 in accordance with the 3DV mode by referring to the L image and the R image. At this time, the encoding processing unit 384 replicates the L image and the R image that are referred to, performs multiplexing in accordance with a multiplexing mode that is the same as that of the auxiliary multiplexed image, and refers to a multiplexed image that is acquired as a result of the multiplexing process.

In addition, the encoding processing unit 384 encodes the compatible multiplexed image that is supplied from the multiplexing processing unit 381 in accordance with the 3DV mode without referring to any image other than the compatible multiplexed image of the same viewpoint. Furthermore, the encoding processing unit 384 encodes the auxiliary parallax multiplexed image that is supplied from the multiplexing processing unit 382 in accordance with the 3DV mode.

The encoding processing unit 384 generates a bit stream from the encoded data of the L image, the R image, the compatible multiplexed image, the auxiliary multiplexed image, and the auxiliary parallax multiplexed image that is acquired as a result of the encoding process and the parallax information that is supplied from the parallax information generating unit 383 and supplies the generated bit stream to the transmission unit 385. In addition, the encoding processing unit 384 generates reference image multiplexing information that is information representing the multiplexing mode at the time of generating a reference image of the compatible multiplexed image and supplies the generated reference image multiplexing information to the transmission unit 385.

The transmission unit 385 generates a TS from the compatible multiplexing information that is supplied from the multiplexing processing unit 381, the auxiliary multiplexing information that is supplied from the multiplexing processing unit 382, and the bit stream and the reference image multiplexing information that are supplied from the encoding processing unit 384 and transmits the generated TS.

[Configuration Example of Encoding Processing Unit]

Figure 54:
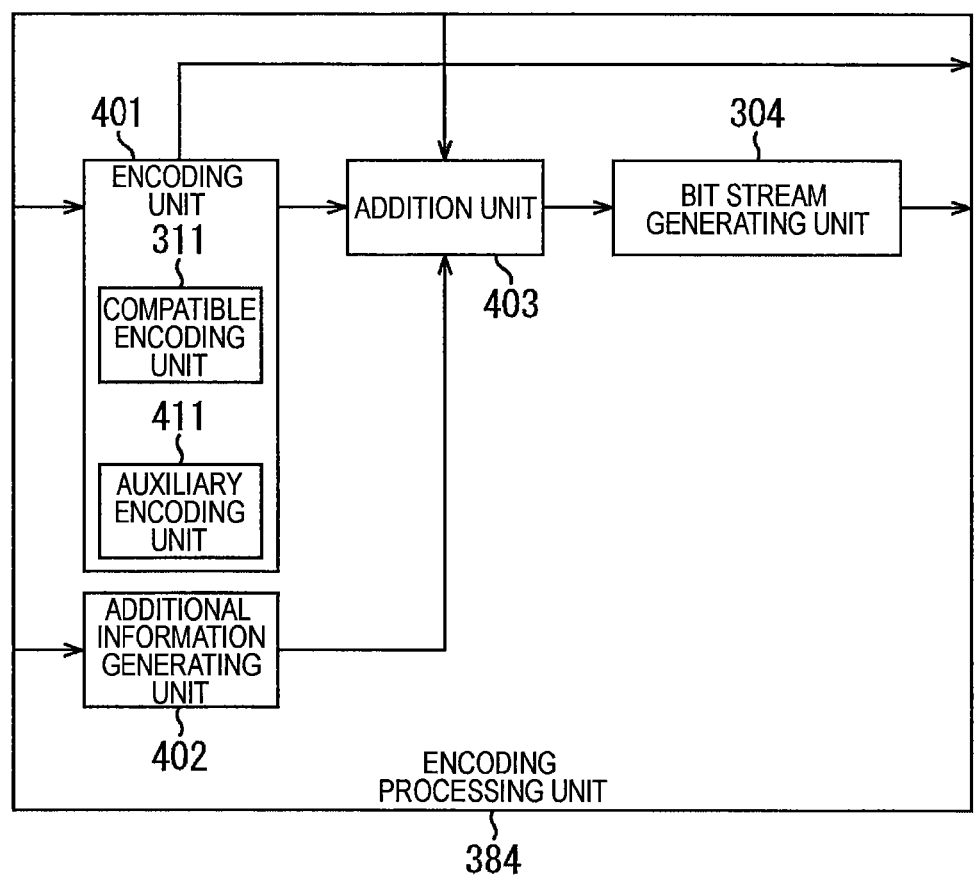
FIG. 54 is a block diagram that illustrates a configuration example of an encoding processing unit illustrated in FIG. 53.

FIG. 54 is a block diagram that illustrates a configuration example of the encoding processing unit 384 illustrated in FIG. 53.

In the configuration illustrated in FIG. 54, the same reference numeral is assigned to a configuration that is the same as that illustrated in FIG. 38. Duplicate description will not be presented as is appropriate.

The configuration of the encoding processing unit 384 illustrated in FIG. 54 is mainly different from the configuration illustrated in FIG. 38 in that an encoding unit 401, an additional information generating unit 402, and an addition unit 403 are disposed instead of the encoding unit 301, the additional information generating unit 302, and the addition unit 303.

The encoding unit 401 of the encoding processing unit 384 is configured by a compatible encoding unit 311 and an auxiliary encoding unit 411. The auxiliary encoding unit 411 of the encoding unit 401 encodes the compatible multiplexed image, the auxiliary multiplexed image, and the auxiliary parallax multiplexed image in accordance with the 3DV mode. The auxiliary encoding unit 411 supplies encoded data of the compatible multiplexed image, the auxiliary multiplexed image, and the auxiliary parallax multiplexed image that is acquired as a result of the encoding process to the addition unit 403. In addition, the encoding unit 401 generates reference image multiplexing information and supplies the generated reference image multiplexing information to the transmission unit 385 illustrated in FIG. 53.

The additional information generating unit 402 generates the information of the SPS of the L image and the information of the Subset SPS of the R image, the compatible multiplexed image, the auxiliary multiplexed image, and the auxiliary parallax multiplexed image. In addition, the additional information generating unit 402 generates the information of the SEI of the L image, the R image, and the auxiliary multiplexed image. Furthermore, the additional information generating unit 402 generates information of the SEI of the compatible multiplexed image that includes the parallax information of the L parallax image and the R parallax image supplied from the parallax information generating unit 383 illustrated in FIG. 53.

In addition, the additional information generating unit 402 generates information of the SEI of the auxiliary parallax multiplexed image that includes the parallax information of the O multi-parallax image of two viewpoints configuring the auxiliary parallax multiplexed image supplied from the parallax information generating unit 383. The additional information generating unit 402 supplies the information of the SPS of the L image, the information of the Subset SPS of the R image, the compatible multiplexed image, the auxiliary multiplexed image, and the auxiliary parallax multiplexed image, and the information of the SEI of the L image, the R image, the compatible multiplexed image, the auxiliary multiplexed image, and the auxiliary parallax multiplexed image to the addition unit 403.

The addition unit 403, similarly to the addition unit 303 illustrated in FIG. 38, adds an NAL header that includes information representing the type of the picture of the AVC mode as the type of the NAL unit to the encoded data of the L image that is acquired as a result of the encoding process performed by the compatible encoding unit 311, thereby generating an NAL unit. In addition, the addition unit 403, similarly to the addition unit 303, adds an NAL header that includes information representing encoded data of the MVC mode as the type of the NAL unit to the encoded data of the R image that is acquired as a result of the encoding process performed by the compatible encoding unit 311, thereby generating an NAL unit.

In addition, the addition unit 403 adds an NAL header that includes information representing the encoded data of the 3DV mode as the type of the NAL unit and includes a parallax flag that represents that the image is not a parallax image to the encoded data of the auxiliary multiplexed image supplied from the auxiliary encoding unit 411, thereby generating an NAL unit. Furthermore, the addition unit 403 respectively adds an NAL header that includes information representing the encoded data of the 3DV mode as the type of the NAL unit and includes information relating to an image that corresponds to the parallax flag representing a parallax image to the encoded data of the compatible multiplexed image and the auxiliary parallax multiplexed image that is supplied from the auxiliary encoding unit 411, thereby generating NAL units.

In addition, the addition unit 403 respectively adds a NAL header that represents information as the type of the NAL unit to the information of the SPS of the L image that is supplied from the additional information generating unit 402, the information of the Subset SPS of the R image, the compatible multiplexed image, the auxiliary multiplexed image, and the auxiliary parallax multiplexed image, and the information of the SEI of the L image, the R image, the compatible multiplexed image, the auxiliary multiplexed image, and the auxiliary parallax multiplexed image, thereby generating NAL units. The addition unit 403 supplies the NAL unit generated as above to the bit stream generating unit 304.

[Configuration Example of NAL Unit]

Figure 55:
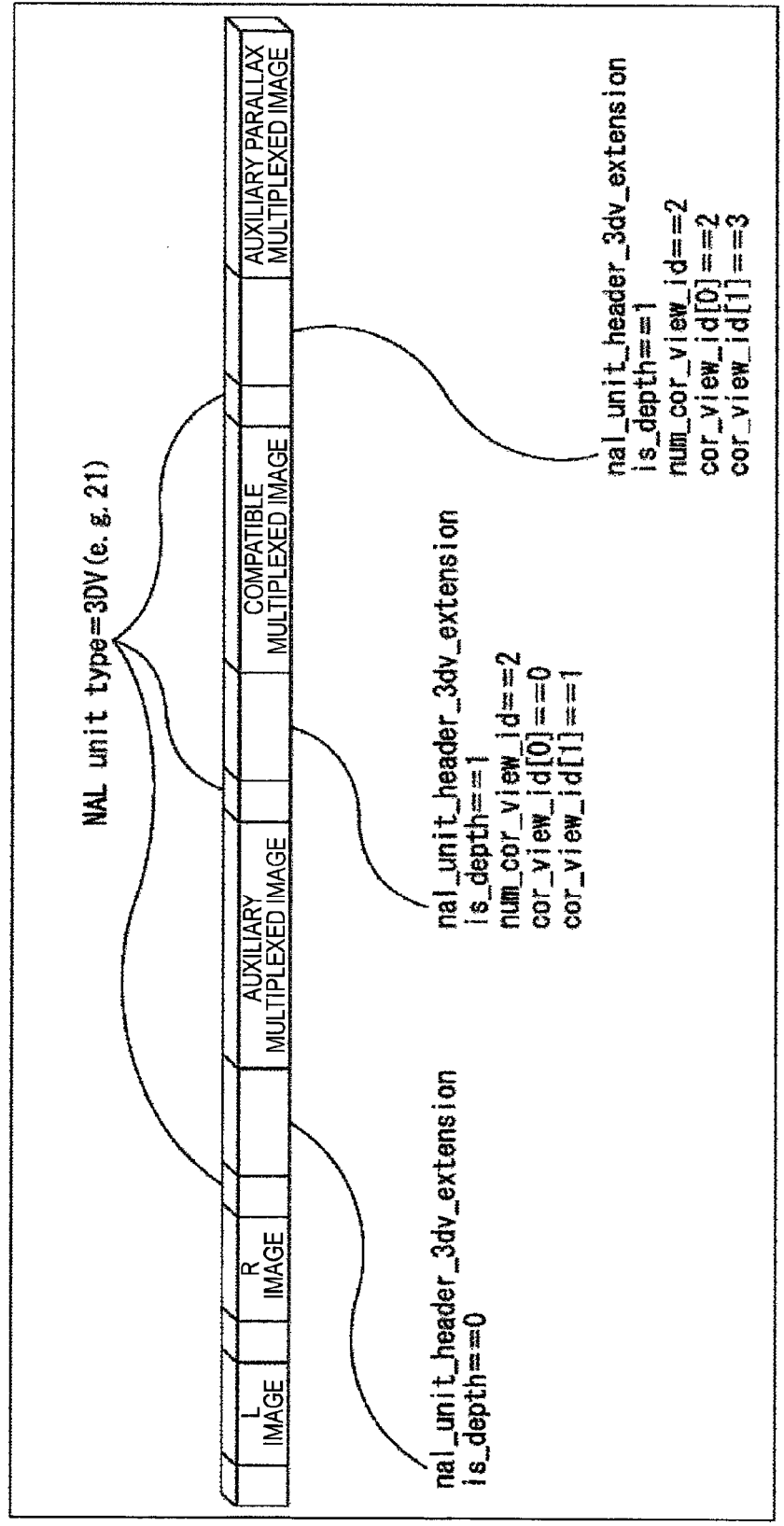
FIG. 55 is a diagram that illustrates a configuration example of an NAL unit.

FIG. 55 is a diagram that illustrates configuration examples of the NAL units of the encoded data of the L image, the R image, the auxiliary multiplexed image, the compatible multiplexed image, and the auxiliary parallax multiplexed image in a bit stream that is generated by the encoding processing unit 384 illustrated in FIG. 53.

As illustrated in FIG. 55, the NAL units of the encoded data of the L image and the encoded data of the R image are the same as those of the case illustrated in FIG. 40, and thus the description thereof will not be presented.

As illustrated in FIG. 55, in the encoding process performed by the encoding processing unit 384, in the NAL header of the NAL unit of the auxiliary multiplexed image, information representing encoded data of the 3DV mode as the type of the NAL unit is included, and a parallax flag of "0" representing that the image is not a parallax image is included as the extension information. Accordingly, an auxiliary multiplexed image can be identified by the decoding device.

In addition, in the NAL headers of the NAL units of the compatible multiplexed image and each auxiliary parallax multiplexed image, a parallax flag of "1" that represents a parallax image is included. Accordingly, the compatible multiplexed image and the auxiliary parallax multiplexed image can be identified by the decoding device.

Furthermore, in the NAL headers of the NAL units of the compatible multiplexed image and each auxiliary parallax multiplexed image, information relating to a corresponding image is included as the extension information. Here, the compatible multiplexed image is a parallax image of the L image and the R image of two viewpoints, and each auxiliary parallax multiplexed image is a parallax image of the O multi-images of two viewpoints. In the example illustrated in FIG. 55, information that specifies the viewpoint of the L image is 0, information that specifies the viewpoint of the R image is 1, and information that specifies viewpoints of the O multi-image of two viewpoints corresponding to the auxiliary parallax multiplexed image is 2 and 3.

Accordingly, the information relating to a corresponding image that is included in the NAL header of the NAL unit of the compatible multiplexed image is 2 that is the number of viewpoints of the corresponding image and 0 and 1 as the information that specifies the viewpoint of the corresponding image. In addition, the information relating to a corresponding image that is included in the NAL header of the NAL unit of the auxiliary parallax multiplexed image is 2 that is the number of viewpoints of the corresponding image and 2 and 3 as information that specifies the viewpoints of the corresponding image.

As above, since the information relating to a corresponding image is included as the extension information, the compatible multiplexed image and each auxiliary parallax multiplexed image can be respectively identified.

[Configuration Example of Bit Stream]

Figure 56:
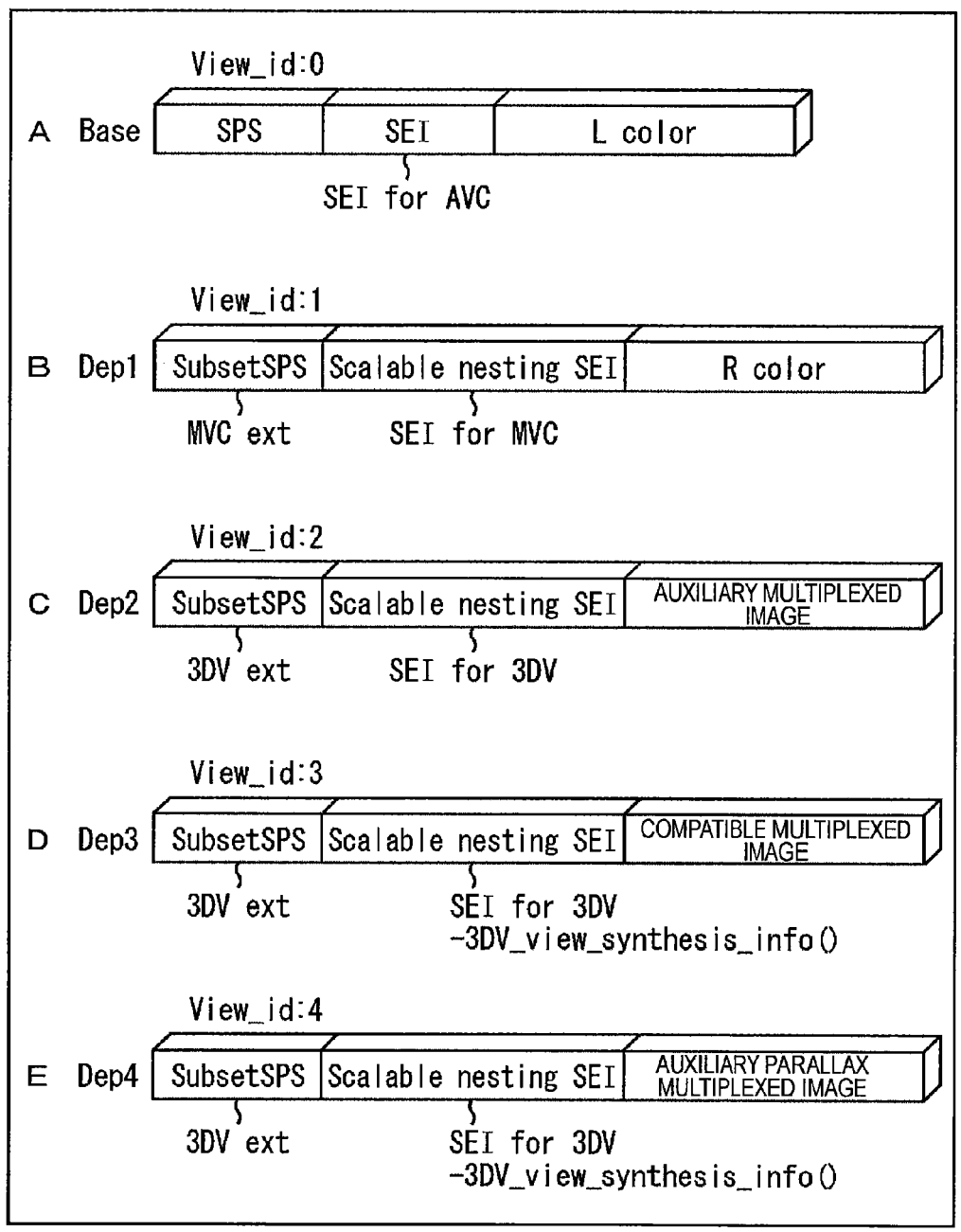
FIG. 56 is a diagram that illustrates a configuration example of a bit stream.

FIG. 56 is a diagram that illustrates a configuration example of the bit stream that is generated by the bit stream generating unit 304 illustrated in FIG. 54.

A bit stream of the L image that is illustrated in A of FIG. 56 and a bit stream of the R image that is illustrated in B of FIG. 56 are the same as the bit stream of the L image that is illustrated in A of FIG. 41 and the bit stream of the R image that is illustrated in B of FIG. 41, and thus the description thereof will not be presented.

As illustrated in C of FIG. 56, a bit stream of the auxiliary multiplexed image that is encoded in accordance with the 3DV mode is configured by an NAL unit of the information of the Subset SPS of the 3DV mode of the auxiliary multiplexed image, an NAL unit of the information of the SEI of the 3DV mode of the auxiliary multiplexed image, and an NAL unit of encoded data of the auxiliary multiplexed image.

As illustrated in D of FIG. 56, a bit stream of the compatible multiplexed image that is encoded in accordance with the 3DV mode is configured by an NAL unit of the information of the Subset SPS of the 3DV mode of the compatible multiplexed image, an NAL unit of the information of the SEI of the 3DV mode that includes parallax information of the compatible multiplexed image, and an NAL unit of encoded data of the compatible multiplexed image.

As illustrated in E of FIG. 56, a bit stream of the auxiliary parallax multiplexed image that is encoded in accordance with the 3DV mode is configured by an NAL unit of the information of the Subset SPS of the 3DV mode of the auxiliary parallax multiplexed image, an NAL unit of the information of the SEI of the 3DV mode that includes parallax information of the auxiliary parallax multiplexed image, and an NAL unit of encoded data of the auxiliary parallax multiplexed image.

As above, since the parallax information is included in the SEI of the 3DV mode, a decoding device that is not in correspondence with the 3DV mode does not unnecessarily need to process the parallax information.

[Description of Process of Encoding Device]

Figure 57:
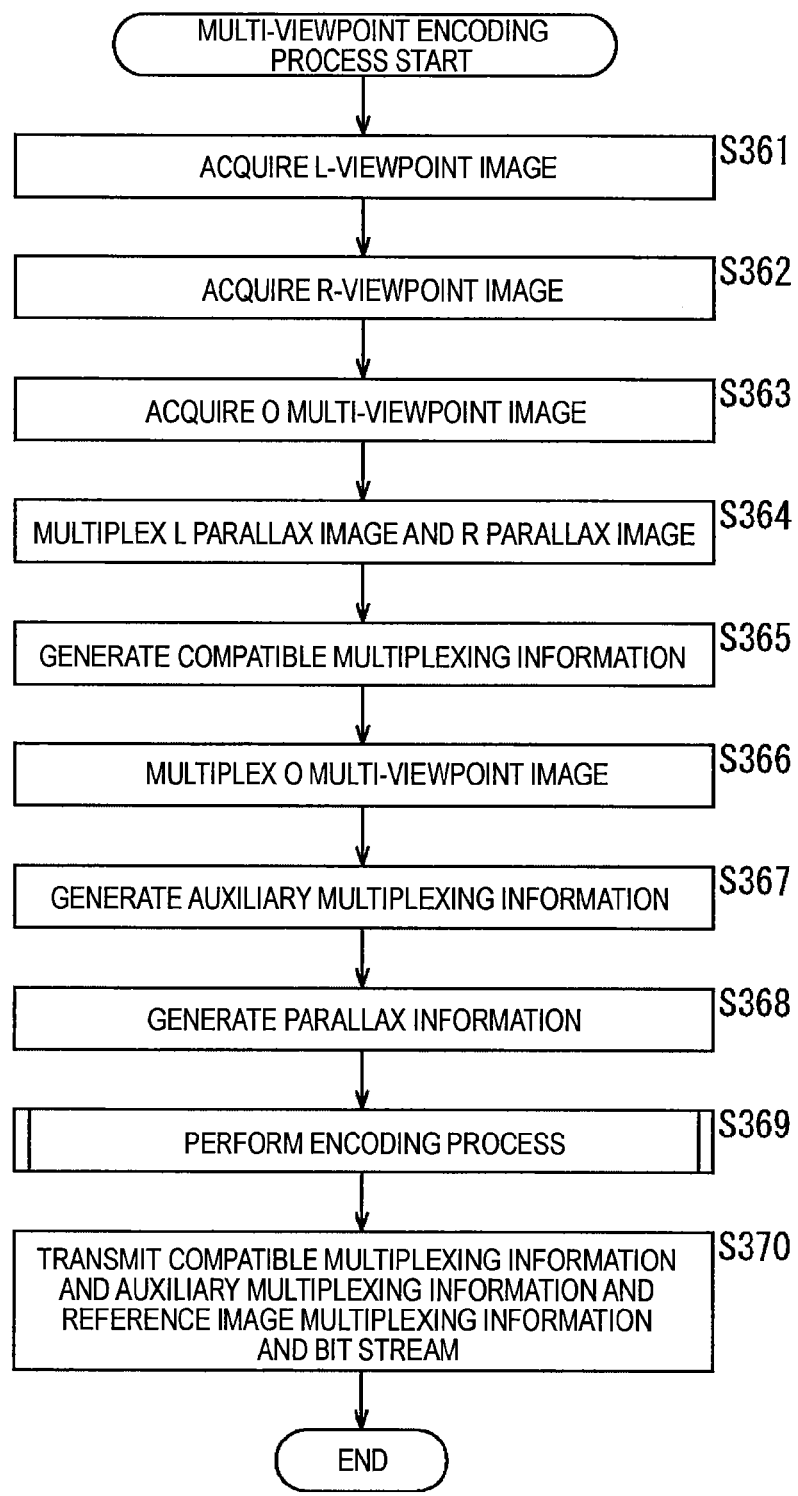
FIG. 57 is a flowchart that illustrates a multi-viewpoint encoding process performed by the encoding device illustrated in FIG. 53.

FIG. 57 is a flowchart that illustrates a multi-viewpoint encoding process performed by the encoding device 380 illustrated in FIG. 53. This multi-viewpoint image encoding process, for example, is started when an L viewpoint image, an R viewpoint image, and an O multi-viewpoint image are input to the encoding device 380 as encoding targets.

In Step S361 illustrated in FIG. 57, the encoding processing unit 384 of the encoding device 380 acquires an L image included in the L viewpoint image that is input to the encoding device 380, and the multiplexing processing unit 382 acquires an L parallax image.

In Step S362, the encoding processing unit 384 acquires an R image included in the R viewpoint image that is input to the encoding device 380, and the multiplexing processing unit 382 acquires an R parallax image. In Step S363, the multiplexing processing unit 382 acquires an O multi-viewpoint image that is input to the encoding device 380.

In Step S364, the multiplexing processing unit 381 multiplexes the L parallax image acquired in Step S361 and the R parallax image acquired in Step S362 in accordance with a predetermined multiplexing mode and supplies a multiplexed image that is acquired as a result of the multiplexing process to the encoding processing unit 384 as a compatible parallax image. In Step S365, the multiplexing processing unit 381 generates compatible multiplexing information and supplies the generated compatible multiplexing information to the transmission unit 385.

In Step S366, the multiplexing processing unit 382 multiplexes O multi-images that configure the O multi-viewpoint image and the O multi-parallax image in accordance with a predetermined multiplexing mode for each two viewpoints. The multiplexing processing unit 382 supplies the multiplexed image of the O multi-images acquired as a result of the multiplexing process as an auxiliary multiplexed image and the multiplexed image of the O multi-parallax image as an auxiliary parallax multiplexed image to the encoding processing unit 384.

In Step S367, the multiplexing processing unit 382 generates auxiliary multiplexing information and supplies the generated auxiliary multiplexing information to the transmission unit 385.

In Step S368, the parallax information generating unit 383 generates parallax information of the L parallax image, the R parallax image, and the O multi-parallax image based on the information acquired at the time of capturing the L image, the R image, and the O multi-images and the like and supplies the generated parallax information to the encoding processing unit 384.

In Step S369, the encoding processing unit 384 performs an encoding process in which the L image, the R image, the compatible multiplexed image supplied from the multiplexing processing unit 381, the auxiliary multiplexed image and the auxiliary parallax multiplexed image supplied from the multiplexing processing unit 382 are encoded. This encoding process will be described in detail with reference to FIG. 58 to be described later.

In Step S370, the transmission unit 385 generates a TS from the compatible multiplexing information supplied from the multiplexing processing unit 381, the auxiliary multiplexing information supplied from the multiplexing processing unit 382, and the reference image multiplexing information and the bit stream that are supplied from the encoding processing unit 384 and transmits the generated TS. Then, the process ends.

Figure 58:
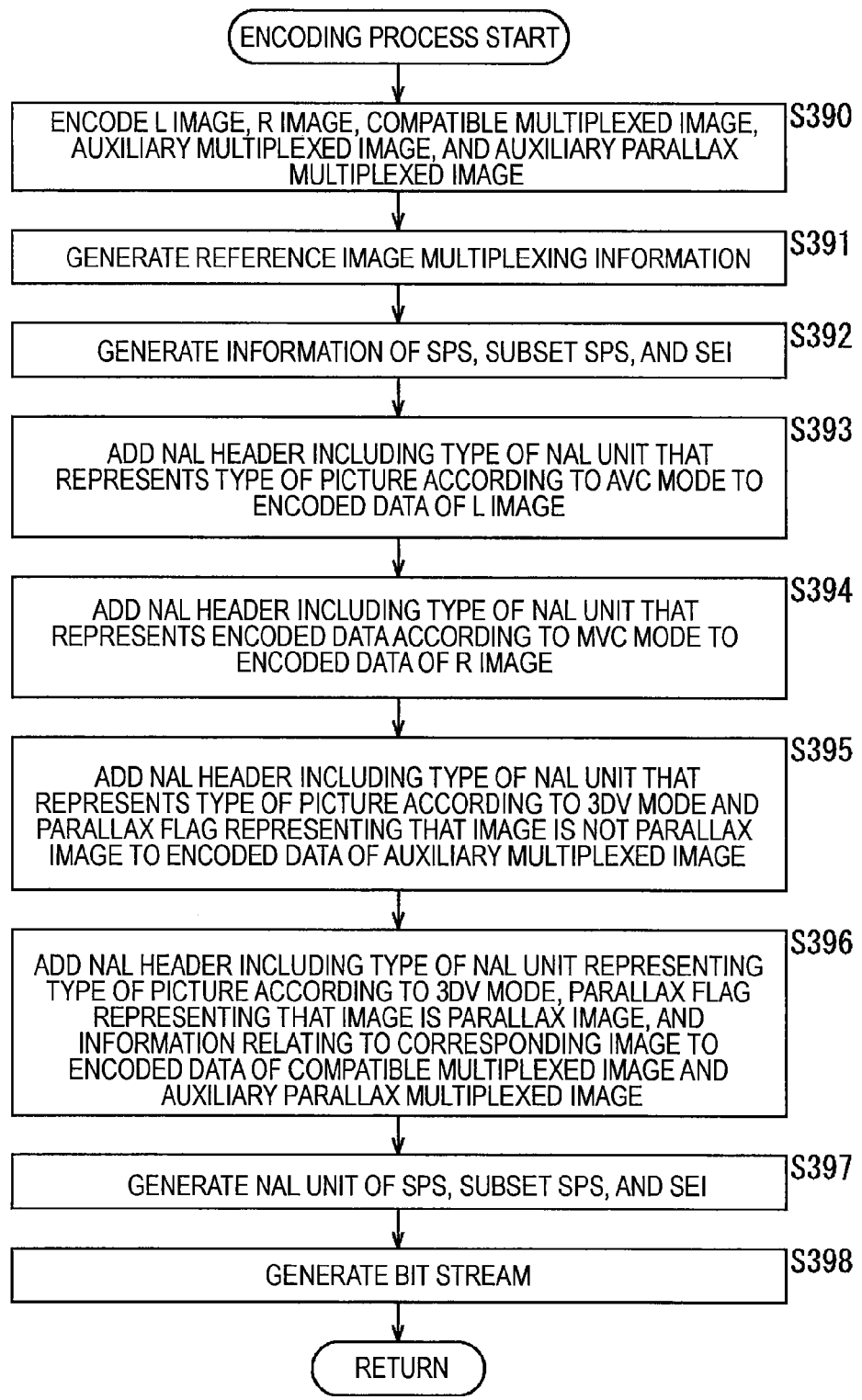
FIG. 58 is a flowchart that illustrates a detailed encoding process of Step S369 represented in FIG. 57.

FIG. 58 is a flowchart that illustrates a detailed encoding process of Step S369 represented in FIG. 57.

In Step S390 illustrated in FIG. 58, the encoding unit 401 (FIG. 54) of the encoding processing unit 384 encodes the L image, the R image, the compatible multiplexed image, the auxiliary multiplexed image, and the auxiliary parallax multiplexed image. More specifically, the compatible encoding unit 311 of the encoding unit 401 encodes the L image in accordance with the AVC mode and encodes the R image in accordance with the MVC mode. In addition, the auxiliary encoding unit 411 encodes the compatible multiplexed image, the auxiliary multiplexed image, and the auxiliary parallax multiplexed image in accordance with the 3DV mode. The encoding unit 401 supplies encoded data of the L image, the R image, the compatible multiplexed image, the auxiliary multiplexed image, and the auxiliary parallax multiplexed image that is acquired as a result of the encoding process to the addition unit 403.

In Step S391, the auxiliary encoding unit 411 generates reference image multiplexing information and supplies the generated reference image multiplexing information to the transmission unit 385 illustrated in FIG. 53.

In Step S392, the additional information generating unit 402 generates the information of the SPS and the SEI of the L image and the information of the Subset SPS and the SEI of the R image, the compatible multiplexed image, the auxiliary multiplexed image, and the auxiliary parallax multiplexed image using the parallax information that is supplied from the parallax information generating unit 383 illustrated in FIG. 53 and supplies the generated information to the addition unit 303.

The process of Steps S393 and S394 is the same as the process of Steps S273 and S274 illustrated in FIG. 45, and thus the description thereof will not be presented.

After the process of Step S394, in Step S395, the addition unit 403 adds an NAL header that includes the type of the NAL unit that represents encoded data according to the 3DV mode and a parallax flag that represents that the image is not a parallax image to the encoded data of the auxiliary multiplexed image that is supplied from the auxiliary encoding unit 411, thereby generating an NAL unit. The addition unit 403 supplies the generated NAL unit of the encoded data of the auxiliary multiplexed image to the bit stream generating unit 304.

In Step S396, the addition unit 403 respectively adds an NAL header that includes the type of the NAL unit that represents encoded data according to the 3DV mode, a parallax flag that represents a parallax image, and information relating to a corresponding image to the encoded data of the compatible multiplexed image and the encoded data of the auxiliary parallax multiplexed image that are supplied from the auxiliary encoding unit 411, thereby generating NAL units. The addition unit 403 supplies the generated NAL units of the encoded data of the compatible multiplexed image and the auxiliary parallax multiplexed image to the bit stream generating unit 304.

In Step S397, the addition unit 403 respectively adds an NAL header that includes the type of the NAL unit represents corresponding information to the information of the SPS and the SEI of the L image that is supplied from the additional information generating unit 402 and the information of the Subset SPS and the SEI of the R image, the compatible multiplexed image, the auxiliary multiplexed image, and the auxiliary parallax multiplexed image, thereby generating NAL units. The addition unit 403 supplies the generated NAL units of the SPS and the SEI of the L image and the Subset SPS and the SEI of the R image, the compatible multiplexed image, the auxiliary multiplexed image, and the auxiliary parallax multiplexed image to the bit stream generating unit 304.

In Step S398, the bit stream generating unit 304, similarly to the process of Step S278 illustrated in FIG. 45, arranges the NAL units supplied from the addition unit 403 in a predetermined order, thereby generating a bit stream. Then, the bit stream generating unit 304 supplies the bit stream to the transmission unit 385 illustrated in FIG. 53 and returns the process to Step S369 illustrated in FIG. 57. Accordingly, the process proceeds to Step S370.

As described above, the encoding device 380 encodes compatible images in accordance with an existing encoding mode and adds the NAL header that includes the type of the NAL unit representing the encoded data according to the 3DV mode to the encoded data of the O multi-images that are auxiliary images. Accordingly, since a decoding device that corresponds to only an existing encoding mode can extract only the encoded data of the compatible image that can be decoded based on the NAL header and decode the extracted data in accordance with a mode that corresponds to an existing encoding mode, it can be stated that the encoding device 380 performs encoding in accordance with a mode that has compatibility with an existing mode.

Although the encoding device 290 and the encoding device 380 described above encode the parallax image of the compatible image without referring to any image other than the parallax image of the same viewpoint, the encoding may be performed by additionally referring to an image of the same viewpoint.

In addition, although the encoding device 380 has been described to directly encode the compatible images, the compatible image may be multiplexed and then encoded.

[Configuration Example of Decoding Device According to 3DV Mode]

Figure 59:
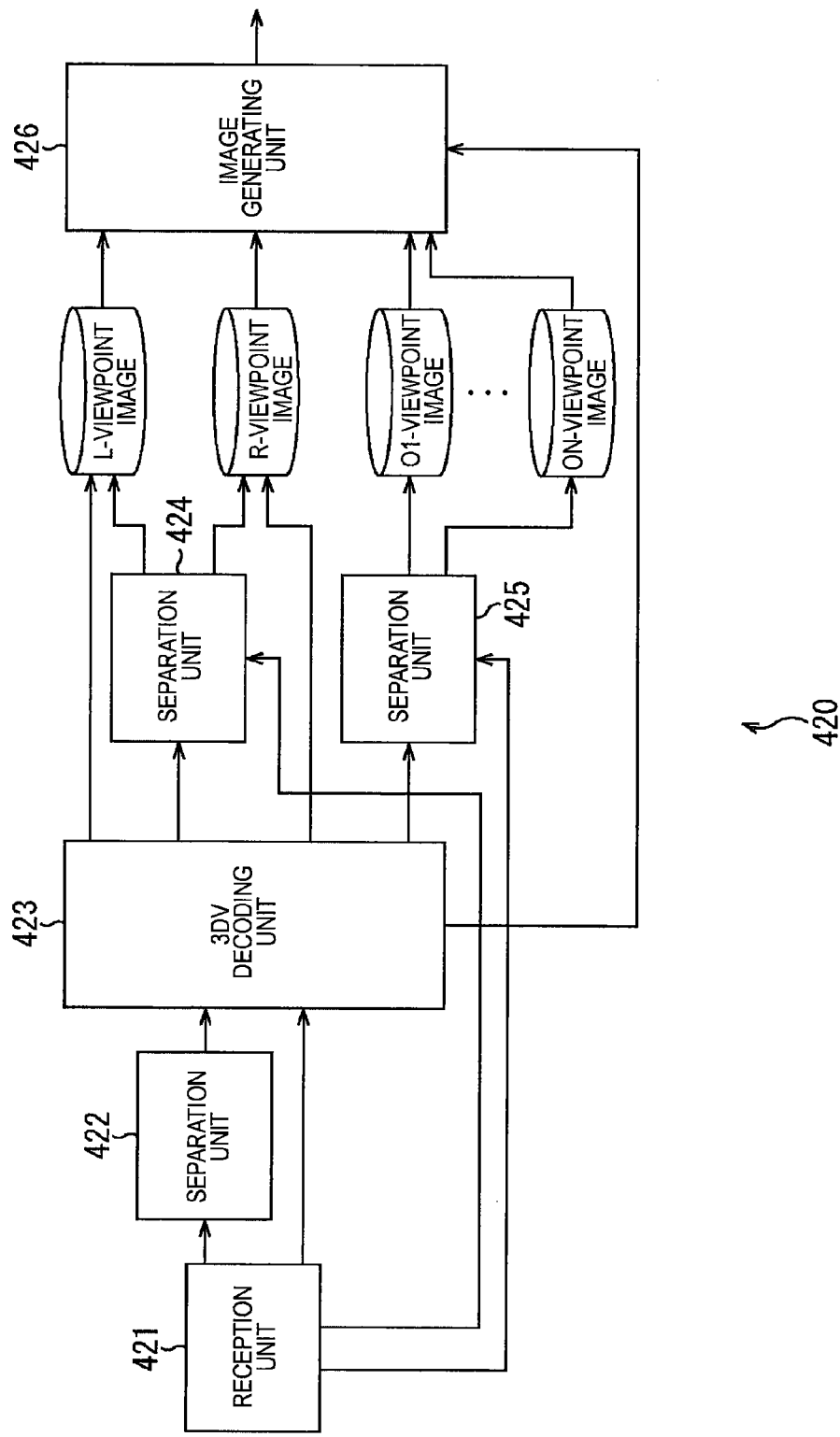
FIG. 59 is a block diagram that illustrates a configuration example of a decoding device according to the 3DV mode that corresponds to the encoding device illustrated in FIG. 53.

FIG. 59 is a block diagram that illustrates a configuration example of the decoding device according to the 3DV mode that decodes a bit stream transmitted from the encoding device 380 illustrated in FIG. 53.

The decoding device 420 illustrated in FIG. 59 is configured by a reception unit 421, a separation unit 422, a 3DV decoding unit 423, a separation unit 424, a separation unit 425, and an image generating unit 426. The decoding device 420 decodes the encoded data of the L image, the R image, the auxiliary multiplexed image, the compatible multiplexed image, and the auxiliary parallax multiplexed image that are included in the bit stream transmitted from the encoding device 380.

More specifically, the reception unit 421 of the decoding device 420 receives a TS that is transmitted from the encoding device 380 illustrated in FIG. 53. The reception unit 421 supplies a bit stream included in the TS to the separation unit 422 and supplies reference image multiplexing information to the 3DV decoding unit 423. In addition, the reception unit 421 supplies compatible multiplexing information that is included in the TS to the separation unit 424 and supplies the auxiliary multiplexing information to the separation unit 425.

The separation unit 422 separates each NAL unit from the bit stream that is supplied from the reception unit 421 based on the NAL headers. When described in more detail, the separation unit 422, similarly to the separation unit 362 illustrated in FIG. 50, extracts the NAL units of the encoded data, the SPS, and the SEI of the L image from the bit stream. In addition, the separation unit 422, similarly to the separation unit 362, extracts the NAL units of the encoded data, the Subset SPS, and the SEI of the R image from the bit stream.

Furthermore, the separation unit 422 extracts NAL units, which include the type of the NAL unit representing the encoded data according to the 3DV in the NAL header, of encoded data of the compatible multiplexed image, the auxiliary multiplexed image, and the auxiliary parallax multiplexed image. In addition, the separation unit 422 extracts NAL units, which include the type of the NAL unit that represents the Subset SPS and the SEI according to the 3DV in the NAL header, of the Subset SPS of the compatible multiplexed image, the auxiliary multiplexed image, and the auxiliary parallax multiplexed image and the SEI of the compatible multiplexed image, the auxiliary multiplexed image, and the auxiliary parallax multiplexed image.

Furthermore, the separation unit 422 further separates the NAL headers of the encoded data of the auxiliary multiplexed image, the compatible multiplexed image, and the auxiliary parallax multiplexed image based on the extension information included in the NAL header. More specifically, the separation unit 422 extracts an NAL unit of which the extension information is a parallax flag that represents that the image is not a parallax image as an NAL unit of the encoded data of the auxiliary multiplexed image. In addition, the separation unit 422 extracts an NAL unit of which the extension information is a parallax flag that represents a parallax image, of which the number of viewpoints of a corresponding image is 2, and of which information specifies the L image and the R image as information that specifies the viewpoints of a corresponding image as a NAL unit of the encoded data of the compatible multiplexed image. Similarly, the separation unit 422 extracts an NAL unit of the encoded data of the auxiliary parallax multiplexed image.

The separation unit 422 supplies the information of the SPS of the L image, the information of the Subset SPS of the R image, the compatible multiplexed image, the auxiliary multiplexed image, and the auxiliary parallax multiplexed image, and the information of the SEI and the encoded data of the L image, the R image, the auxiliary multiplexed image, the compatible multiplexed image, and the auxiliary parallax multiplexed image to the 3DV decoding unit 423, which are data included in the separated NAL units, together with the type information of the data.

The 3DV decoding unit 423 maintains the SPS of the L image, the Subset SPS of the R image, the compatible multiplexed image, the auxiliary multiplexed image, and the auxiliary parallax multiplexed image, and the information of the SEI of the L image, the R image, the auxiliary multiplexed image, the compatible multiplexed image, and the auxiliary parallax multiplexed image based on the type information that is supplied from the separation unit 422.

The 3DV decoding unit 423, similarly to the 3DV decoding unit 363 illustrated in FIG. 50, decodes the encoded data of the L image that is supplied from the separation unit 422 based on the maintained information of the SEI and the SPS of the L image in accordance with a mode that corresponds to the AVC mode. In addition, the 3DV decoding unit 423, similarly to the 3DV decoding unit 363, decodes the encoded data of the R image that is supplied from the separation unit 422 based on the maintained information of the SEI and the Subset SPS of the R image in accordance with a mode that corresponds to the MVC mode.

Furthermore, the 3DV decoding unit 423 decodes the encoded data of the auxiliary multiplexed image that is supplied from the separation unit 422 together with the type information representing the encoded data of the auxiliary multiplexed image based on the maintained information of the SEI and the Subset SPS of the auxiliary multiplexed image in accordance with a mode that corresponds to the 3DV mode by referring to the L image and the R image. At this time, the 3DV decoding unit 423 replicates and multiplexes the L image and the R image that are referred to based on the reference image multiplexing information that is supplied from the reception unit 421 and refers to a multiplexed image that is acquired as a result of the multiplexing process.

Furthermore, the 3DV decoding unit 423 decodes the encoded data of the compatible multiplexed image that is supplied from the separation unit 422 together with the type information representing the encoded data of the compatible multiplexed image based on the maintained information of the SEI and the Subset SPS of the compatible multiplexed image in accordance with a mode that corresponds to the 3DV mode without referring to any image other than the parallax image of the same viewpoint.

In addition, the 3DV decoding unit 423 decodes the encoded data of the auxiliary parallax multiplexed image that is supplied form the separation unit 422 together with the type information representing the encoded data of the auxiliary parallax multiplexed image based on the maintained information of the SEI and the Subset SPS of the auxiliary parallax multiplexed image in accordance with a mode that corresponds to the 3DV mode by referring to the compatible multiplexed image.

The 3DV decoding unit 423 supplies the L image and the R image acquired as a result of the decoding process to the image generating unit 426, supplies the compatible multiplexed image to the separation unit 424, and supplies the auxiliary multiplexed image and the auxiliary parallax multiplexed image to the separation unit 425. In addition, the 3DV decoding unit 423 supplies the parallax information that is included in the maintained SEI of the compatible multiplexed image and the auxiliary parallax multiplexed image to the image generating unit 426.

The separation unit 424 separates an L parallax image and an R parallax image of which the resolutions are the same as those of the L image and the R image from the compatible multiplexed image that is supplied from the 3DV decoding unit 423 based on the compatible multiplexing information supplied from the reception unit 421. More specifically, the separation unit 424 separates the L parallax image and the R parallax image of which the resolutions have halved from the compatible multiplexed image and performs a resolution increasing process for the L parallax image and the R parallax image, thereby acquiring the L parallax image and the R parallax image of which the resolutions are the same as those of the L image and the R image. The separation unit 424 supplies the L parallax image and the R parallax image to the image generating unit 426.

The separation unit 425, similarly to the separation unit 424, separates O multi-images from the auxiliary multiplexed image that is supplied from the 3DV decoding unit 423 and separates the O multi-parallax images from the auxiliary parallax multiplexed image based on the auxiliary image multiplexed information that is supplied from the reception unit 421. The separation unit 425 supplies O multi-viewpoint images acquired as a result thereof to the image generating unit 426.

The image generating unit 426, similarly to the image generating unit 365 illustrated in FIG. 50 performs conversion for the L parallax image and the R parallax image that are supplied from the separation unit 424 and the O multi-parallax images supplied from the separation unit 425 as is necessary based on the parallax information that is supplied from the 3DV decoding unit 423.

The image generating unit 426 generates images having the number of viewpoints that is three or more corresponding to a display device not illustrated in the figure based on the L parallax image, the R parallax image, and the O multi-parallax image after conversion, the L image, the R image, and the O multi-viewpoint image, and a maximal value and a minimal value of the depth values or a maximal value and a minimal value of the parallax values that are included in the parallax information, and the correspondence relation information. Then, the image generating unit 426 converts the resolution of the generated image of each viewpoint into resolution that is "1/the number of viewpoints" of the resolution of the compatible image or the auxiliary image, synthesizes the images, and displays the synthesized image on a display device not illustrated in the figure.

At this time, the multi-viewpoint images after the synthesis are displayed such that the viewing angles are different for each viewpoint, and a viewer can view a 3D image without wearing glasses by seeing images of arbitrary two viewpoints with his left and right eyes.

[Description of Process of Decoding Device According to 3DV Mode]

Figure 60:
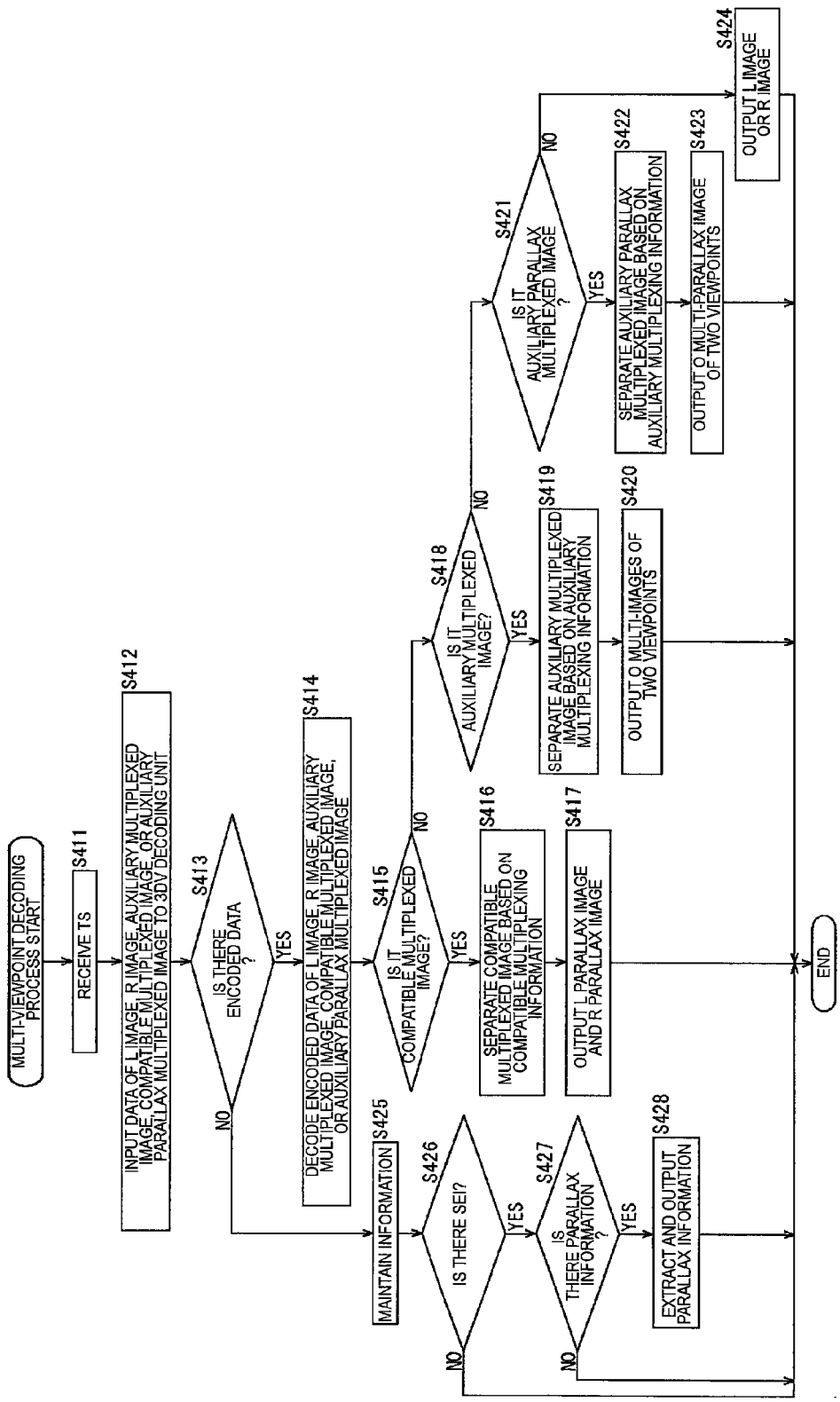
FIG. 60 is a flowchart that illustrates a decoding process performed by the decoding device illustrated in FIG. 59.

FIG. 60 is a flowchart that illustrates a decoding process performed by the decoding device 420 illustrated in FIG. 59. This decoding process, for example, is started when a TS is transmitted from the encoding device 380 illustrated in FIG. 53.

In Step S411 illustrated in FIG. 60, the reception unit 421 of the decoding device 340 receives a TS that is transmitted from the encoding device 380. The reception unit 421 supplies the bit stream included in the TS to the separation unit 422 and supplies the reference image multiplexing information to the 3DV decoding unit 423. In addition, the reception unit 421 supplies the compatible multiplexing information included in the TS to the separation unit 424 and supplies the auxiliary multiplexing information to the separation unit 425. The process of the subsequent Steps S412 to S428 is performed for each NAL unit that configures the bit stream.

In Step S412, the separation unit 422 separates each NAL unit based on the NAL header of the NAL unit and inputs data of the L image and the R image, the auxiliary multiplexed image, the compatible multiplexed image, or the auxiliary parallax multiplexed image that is included in the NAL unit to the 3DV decoding unit 423 together with the type information.

In Step S413, the 3DV decoding unit 423 determines whether the data input together with the type information is the encoded data of the L image, the R image, the auxiliary multiplexed image, the compatible multiplexed image, or the auxiliary parallax multiplexed image based on the type information that is supplied from the separation unit 422. In a case where the data is determined to be the encoded data of the L image, the R image, the auxiliary multiplexed image, the compatible multiplexed image, or the auxiliary parallax multiplexed image in Step S413, the process proceeds to Step S414.

In Step S414, the 3DV decoding unit 423 decodes the encoded data of the L image, the R image, the auxiliary multiplexed image, the compatible multiplexed image, or the auxiliary parallax multiplexed image based on the maintained information of the SPS, the Subset SPS, or the SEI.

In Step S415, the 3DV decoding unit 423 determines whether or not an image acquired as a result of the decoding process is a compatible multiplexed image based on the type information. In a case where the image acquired as a result of the decoding process is determined to be a compatible multiplexed image in Step S415, the 3DV decoding unit 423 supplies the compatible multiplexed image to the separation unit 424.

In Step S416, the separation unit 424 separates the compatible multiplexed image supplied from the 3DV decoding unit 423 into an L parallax image and an R parallax image of which the resolution is the same as that of the L image and the R image based on the compatible multiplexing information supplied from the reception unit 421. The separation unit 424 supplies the L parallax image and the R parallax image to the image generating unit 426.

In Step S417, the separation unit 424 outputs the L parallax image and the R parallax image to the image generating unit 426, and the process ends.

On the other hand, in a case where the image acquired as a result of the decoding process is determined not to be a compatible multiplexed image in Step S415, the 3DV decoding unit 423 determines whether or not the image acquired as the result of the decoding process is an auxiliary multiplexed image based on the type information in Step S418.

In a case where the image acquired as the result of the decoding process is determined to be an auxiliary multiplexed image in Step S418, the 3DV decoding unit 423 supplies the auxiliary multiplexed image to the separation unit 425, and the process proceeds to Step S419.

In Step S419, the separation unit 425 separates the auxiliary multiplexed image supplied from the 3DV decoding unit 423 into O multi-images of two viewpoints of which the resolution is the same as that of the L image and the R image based on the auxiliary multiplexing information supplied from the reception unit 421. The separation unit 425 supplies the O multi-images of the two viewpoints to the image generating unit 426.

In Step S420, the separation unit 425 outputs the O multi-images of the two viewpoints to the image generating unit 426, and the process ends.

In a case where the image acquired as the result of the decoding process is determined not to be an auxiliary multiplexed image in Step S418, the 3DV decoding unit 423 determines whether or not the image acquired as the result of the decoding process is an auxiliary parallax multiplexed image based on the type information in Step S421.

In a case where the image acquired as the result of the decoding process is determined to be an auxiliary parallax multiplexed image in Step S421, the 3DV decoding unit 423 supplies the auxiliary parallax multiplexed image to the separation unit 425, and the process proceeds to Step S422.

In Step S422, the separation unit 425 separates the auxiliary parallax multiplexed information supplied from the 3DV decoding unit 423 into O multi-parallax images of two viewpoints of which the resolution is the same as that of the L image and the R image based on the auxiliary multiplexing information. The separation unit 425 supplies the O multi-parallax images of the two viewpoints to the image generating unit 426.

In Step S423, the separation unit 424 outputs the O multi-parallax images of two viewpoints to the image generating unit 426, and the process ends.

On the other hand, in a case where the image acquired as the result of the decoding process is determined not to be an auxiliary parallax multiplexed image in Step S421, in other words, in a case where the image acquired as the result of the decoding process is the L image or the R image, the process proceeds to Step S424.

In Step S424, the 3DV decoding unit 423 outputs the L image or the R image that is acquired as the result of the decoding process to the image generating unit 426, and the process ends.

On the other hand, in a case where the data is determined not to be the encoded data of the L image, the R image, the auxiliary multiplexed image, the compatible multiplexed image, or the auxiliary parallax multiplexed image in Step S413, in other words, in a case where the data supplied from the separation unit 422 is the information of the SPS, the Subset SPS, or the SEI, the process proceeds to Step S425.

The process of Steps S425 to S428 is the same as the process of Steps S339 to S342 illustrated in FIG. 51, and thus the description thereof will not be presented.

As above, the decoding device 420 separates the bit stream into each NAL unit based on the NAL headers. Then, the decoding device 420 decodes the encoded data of the compatible image included in the separated NAL unit in accordance with a mode that corresponds to the existing AVC mode or the MVC mode and decodes the data of the auxiliary image and the parallax image in accordance with a mode that corresponds to the 3DV mode. Accordingly, the decoding device 420 can decode the bit stream that is acquired as a result of an encoding process having compatibility with an existing mode using the encoding device 380.

Although not illustrated in the figure, the decoding device according to the AVC mode and the decoding device according to the MVC mode that decode the bit stream that is generated by the encoding device 380 illustrated in FIG. 53 are the same as the decoding device 320 illustrated in FIG. 46 and the decoding device 340 illustrated in FIG. 48.

[Another Arrangement Example of Parallax Information]

In the description presented above, although the parallax information has been described to be included in the SEI, the parallax information may be included in the TS. In such a case, for example, the parallax information is described in a descriptor of a PMT (program map table) or an SIT (selection information table) within the TS.

FIG. 61 is a diagram that illustrates an example of the description of parallax information in a case where the parallax information is described in a descriptor of the PMT.

As illustrated in FIG. 61, in a case where the parallax information is described in a descriptor of the PMT, the descriptor (3DV_view_synthesis_descriptor) in which the parallax information is arranged is disposed as the descriptor of the PMT. In this descriptor, the parallax information (3DV_view_synthesis_info) illustrated in FIG. 43 is described.

In addition, the parallax information may be included in both the PMT and the SIT within the SEI and the TS. Furthermore, the extension information may be described not in the NAL header but in the PMT, the SIT, the SEI, or the like within the TS.

Furthermore, the auxiliary image low-resolution converting information, the compatible multiplexing information, and the auxiliary multiplexing information may be transmitted while being included in the SEI or the like.

In addition, in the description presented above, the extension information has been described to be added to the encoded data, the extension information may be transmitted (recorded) separately from the image data (or the bit stream). Furthermore, the extension information may be connected to the image data (or the bit stream).

In this embodiment, the "connection" is defined as below. The "connection" represents a state in which the image data (or the bit stream) and the extension information are linked to each other. The image data and the extension information as connection targets may be transmitted through mutually-different transmission lines. In addition, the image data (or the bit stream) and the extension information as connection targets may be recorded on mutually-different recording media (or mutually-different areas of the same recording medium). Furthermore, the unit of linking the image data (or the bit stream) and the extension information to each other, for example, may be an encoding processing unit (one frame, multiple frames, or the like).

In addition, although the encoding device 290 and the encoding device 380 have been described to respectively generate one TS, in the same manner as the encoding device 50 illustrated in FIG. 2, the encoding device 140 illustrated in FIG. 14, the encoding device 180 illustrated in FIG. 22, and the encoding device 230 illustrated in FIG. 33 except that the auxiliary information replaces the auxiliary image low-resolution converting information and the reference image low-resolution converting information, a plurality of TSs may be generated.

Seventh Embodiment

[Configuration Example of Encoding Device According to Seventh Embodiment]

Figure 62:
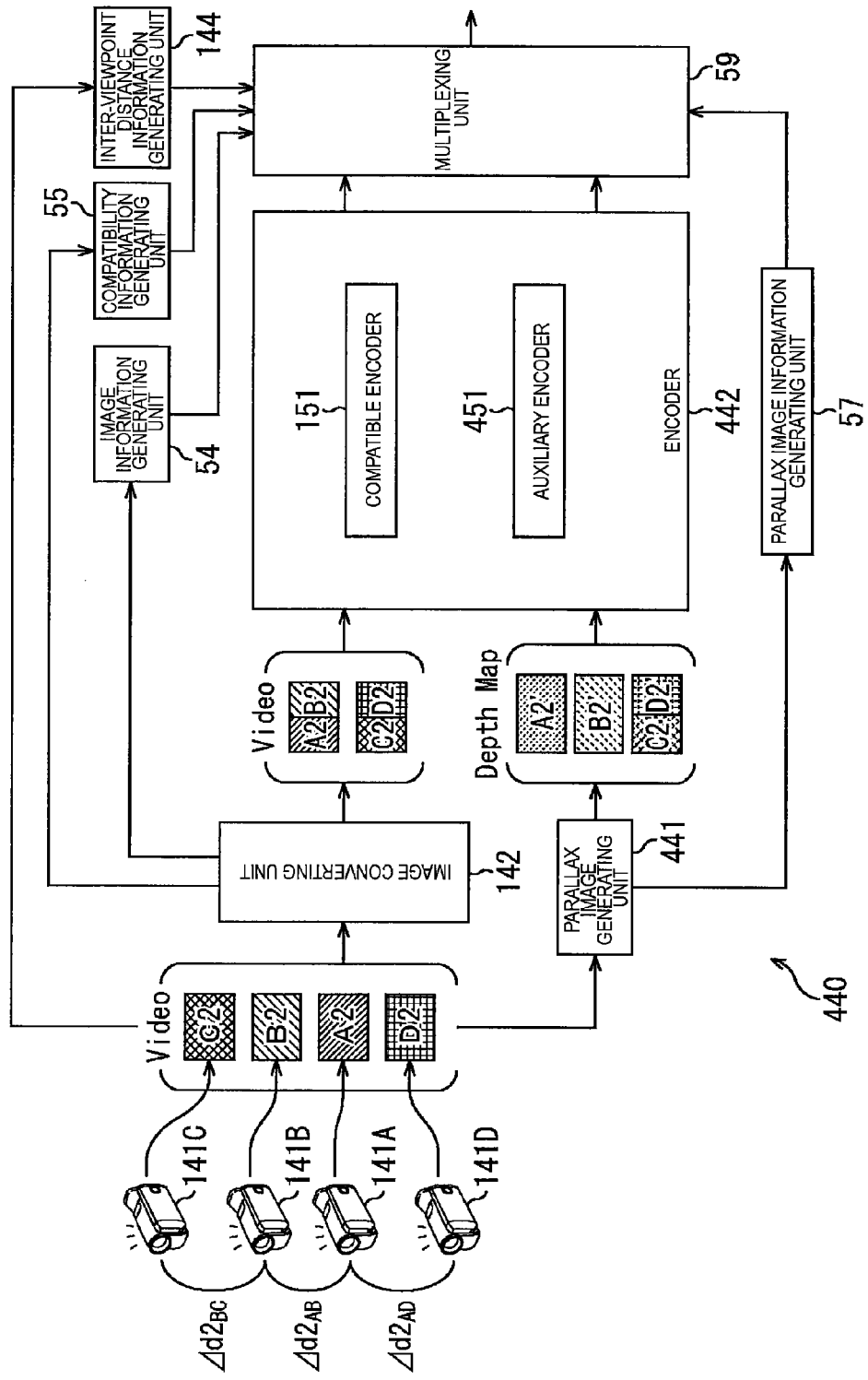
FIG. 62 is a block diagram that illustrates a configuration example of an encoding device according to a seventh embodiment of the present technology.

FIG. 62 is a block diagram that illustrates a configuration example of an encoding device according to a seventh embodiment of the present technology.

In the configuration illustrated in FIG. 62, the same reference numeral is assigned to a configuration that is the same as that illustrated in FIG. 14. Duplicate description will not be presented as is appropriate.

The configuration of the encoding device 440 illustrated in FIG. 62 is mainly different from the configuration illustrated in FIG. 14 in that a parallax image generating unit 441 and an encoder 442 are disposed instead of the parallax image generating unit 143 and the encoder 145. The encoding device 440 does not multiplex the parallax images of compatible images in the spatial direction but multiplexes the parallax images of the compatible images in the time direction and encodes the multiplexed parallax images.

More specifically, the parallax image generating unit 441 of the encoding device 440 detects the disparity of each pixel of images A2 to D2 using the images A2 to D2 that are supplied from the imaging units 141A to 141D. The parallax image generating unit 441 generates a parallax image A2' of the image A2 and a parallax image B2' of the image B2, which are compatible images, and a parallax image C2' of the image C2 and a parallax image D2' of the image D2, which are auxiliary images, based on the detection result.

In addition, the parallax image generating unit 441, similarly to the parallax image generating unit 143 illustrated in FIG. 14, multiplexes the parallax images C2' and D2' in the spatial direction in accordance with a predetermined multiplexing mode. Furthermore, the parallax image generating unit 441 multiplexes the parallax images A2' and B2' and the multiplexed image of the parallax images of the auxiliary images in the time direction. The parallax image generating unit 441 supplies a multiplexed image in which parallax images A2' and B2' and the multiplexed image of the parallax images of the auxiliary images corresponding to one frame exist within one frame time, which is acquired as a result thereof, to the encoder 442 as a time-multiplexed image.

In addition, the parallax image generating unit 441 supplies information that represents a multiplexing mode of the parallax images of the auxiliary images and a multiplexing mode (hereinafter, referred to as a frame sequential mode) in the time direction as a multiplexing mode of the parallax images of the compatible images and the auxiliary images to the parallax image information generating unit 57.

The encoder 442 is configured by a compatible encoder 151 and an auxiliary encoder 451. The auxiliary encoder 451 of the encoder 442 encodes the multiplexed image of the auxiliary images that is supplied from the image converting unit 142 and the time-multiplexed image that is supplied from the parallax image generating unit 441 in accordance with the 3DV mode in units of access units. The auxiliary encoder 451 supplies encoded streams acquired as a result thereof to the multiplexing unit 59 as auxiliary streams.

[Example of Description of Auxiliary Information]

FIG. 63 is a diagram that illustrates an example of the description of the compatibility information and the parallax image information in a case where the auxiliary information is described in a descriptor of the PMT.

As illustrated in FIG. 63, in a case where the auxiliary information is described in the descriptor of the PMT, a descriptor (3DV_view_structure_descriptor) in which compatibility information is arranged and a descriptor (depth_map_structure_descriptor) in which the parallax image information is arranged, and the like are disposed as the descriptors of the PMT.

In the descriptor (depth_map_structure_descriptor), as illustrated in FIG. 64, following a descriptor tag (descriptor_tag) and a descriptor length (descriptor_length), the number (num_of_depth_map) of parallax images, a flag (is_frame_packing) that represents whether or not parallax images are multiplexed, a multiplexing mode (frame_packing_mode) of the parallax images, information (comb_frame_packing_views) that designates the parallax images that are multiplexed, and the like are described as the parallax image information.

In addition, as examples of the multiplexing mode, there are a side-by-side mode (SBS), a top-and-bottom mode (TOB), and a frame sequential mode.

In this specification, although the auxiliary information is configured to be included in the TS, the auxiliary information may be included in the auxiliary stream.

FIGS. 65 and 66 are diagrams that illustrate examples of the description of the compatibility information and the parallax image information included in an auxiliary stream in a case where the auxiliary information is included in the auxiliary stream.

As illustrated in FIG. 65, the compatibility information (3DV_view_structure) and the parallax image information (depth_map_structure), for example, are arranged in the SEI (Supplemental Enhancement Information) included in the auxiliary stream.

As the parallax image information (depth_map_structure), as illustrated in FIG. 66, the number (num_of_depth_map) of parallax images (depth map), a flag (is_frame_packing) that represents whether or not the parallax images are multiplexed, the multiplexing mode (frame_packing_mode) of the parallax images, information (comb_frame_packing_views) that designates the parallax images that are multiplexed, and the like are described.

Although not illustrated in the figure, the image information is the same as the parallax image information except that the image information is not a parallax image but information of the compatible images and the auxiliary images.

[Description of Process of Encoding Device]

Figure 67:
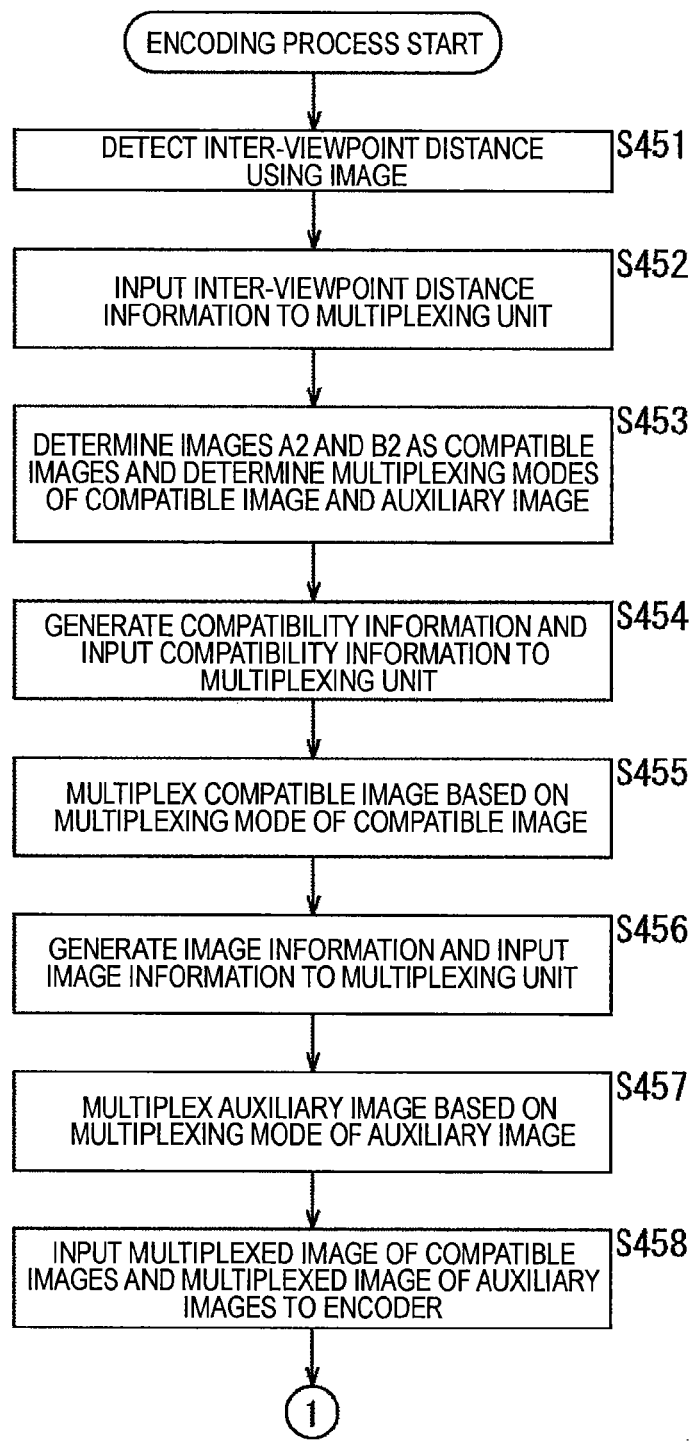
FIG. 67 is a flowchart that illustrates an encoding process performed by the encoding device illustrated in FIG. 62.
Figure 68:
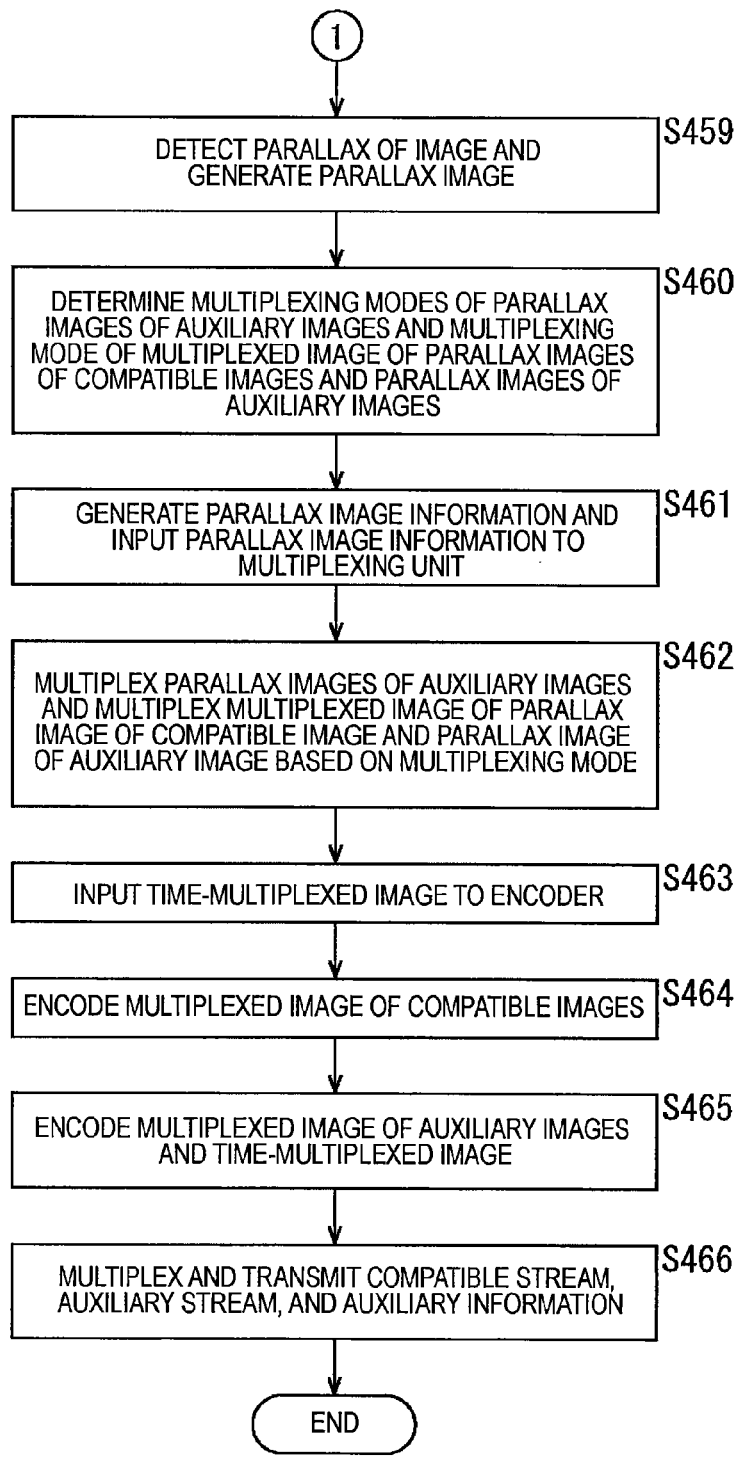
FIG. 68 is a flowchart that illustrates the encoding process performed by the encoding device illustrated in FIG. 62.

FIGS. 67 and 68 represent a flowchart that illustrates an encoding process that is performed by the encoding device 440 illustrated in FIG. 62. This encoding process, for example, is started when images A2 to D2 are output from imaging units 141A to 141D.

The process of Steps S451 to S459 illustrated in FIGS. 67 and 68 is the same as the process of Steps S71 to S79 illustrated in FIGS. 16 and 17, and thus the description thereof will not be presented.

In Step S460 illustrated in FIG. 68, the parallax image generating unit 441 determines the multiplexing mode of the parallax images of the auxiliary images and the multiplexing mode of the multiplexed image of the parallax images of the compatible images and the parallax images of the auxiliary image and supplies information that represents the multiplexing modes to the parallax image information generating unit 57.

In Step S461, the parallax image information generating unit 57 generates information that represents the multiplexing mode of the parallax images of the auxiliary images and the multiplexing mode of the multiplexed image of the parallax images of the compatible images and the parallax images of the auxiliary images and the like as parallax image information based on the information that is supplied from the parallax image generating unit 441 and inputs the generated parallax image information to the multiplexing unit 59.

In Step S462, the parallax image generating unit 441 multiplexes the parallax images C2' and D2' of the auxiliary images in the spatial direction and multiplexes the parallax images A2' and B2' of the compatible images and the multiplexed image of the parallax images of the auxiliary images in the time direction, based on the multiplexing mode that is determined in Step S460.

In Step S463, the parallax image generating unit 441 inputs the time-multiplexed image that is acquired as a result of the multiplexing process of Step S462 to the encoder 442.

In Step S464, the compatible encoder 151 of the encoder 442 encodes the multiplexed image of the compatible images that is supplied from the image converting unit 142 in accordance with the existing AVC mode and supplies an encoded stream that is acquired as a result thereof to the multiplexing unit 59 as a compatible stream.

In Step S465, the auxiliary encoder 451 encodes the multiplexed image of the auxiliary images that is supplied from the image converting unit 142 and the time-multiplexed image that is supplied from the parallax image generating unit 441 in accordance with the 3DV mode. The auxiliary encoder 451 supplies an encoded stream that is acquired as a result of the encoding process to the multiplexing unit 59 as an auxiliary stream.

In Step S466, the multiplexing unit 59, similarly to the process of Step S86 illustrated in FIG. 17, generates a TS1 from the compatible stream that is supplied from the compatible encoder 151, generates a TS2 from the auxiliary stream and the auxiliary information supplied from the auxiliary encoder 451, performs a multiplexing process, and transmits a multiplexed stream acquired as a result thereof. This multiplexed stream, for example, is recorded on a BD or the like or is transmitted as a broadcast stream. Then, the process ends.

[Configuration Example of Decoding Device]

Figure 69:
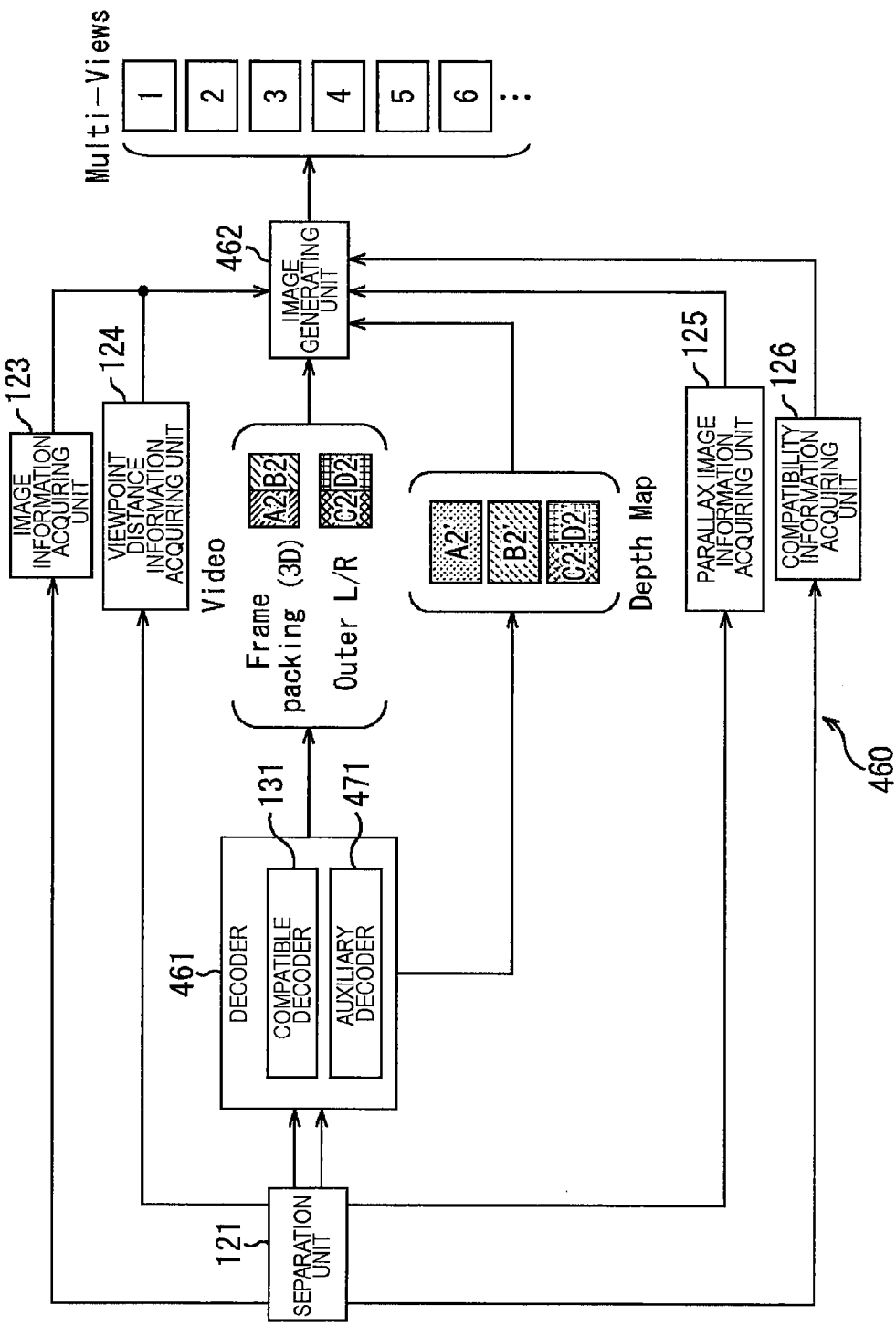
FIG. 69 is a diagram that illustrates a configuration example of a decoding device that corresponds to the encoding device illustrated in FIG. 62.

FIG. 69 is a diagram that illustrates a configuration example of a decoding device that decodes the multiplexed stream that is transmitted from the encoding device 440 illustrated in FIG. 62.

In the configuration illustrated in FIG. 69, the same reference numeral is assigned to a configuration that is the same as that illustrated in FIG. 18. Duplicate description will not be presented as is appropriate.

The configuration of the decoding device 460 illustrated in FIG. 69 is mainly different from the configuration illustrated in FIG. 18 in that a decoder 461 and an image generating unit 462 are disposed instead of the decoder 122 and the image generating unit 171. The decoding device 460 generates images of two viewpoints or multi-viewpoint images by decoding the multiplexed stream that is transmitted from the encoding device 440 and displays the generated images on a display device not illustrated in the figure.

More specifically, the decoder 461 of the decoding device 460 is configured by a compatible decoder 131 and an auxiliary decoder 471. The auxiliary decoder 471 of the decoder 461 decodes the multiplexed image of auxiliary images and a time-multiplexed image that are included in the auxiliary stream supplied from the separation unit 121 in accordance with a mode that corresponds to the auxiliary encoder 451 illustrated in FIG. 62. The auxiliary decoder 471 supplies the multiplexed image of the auxiliary images and the time-multiplexed image that are acquired as a result of the decoding process to the image generating unit 462.

The image generating unit 462 outputs an image in accordance with an instruction supplied from a viewer and displays the image on a display device not illustrated in the figure. When described in more detail, the image generating unit 462 generates images of three or more viewpoints, which correspond to a display device not illustrated in the figure, each having the resolution that is a half of the resolution of the compatible image or the auxiliary image by using the multiplexed image of compatible images, the multiplexed image of the auxiliary images, and the time-multiplexed image in accordance with a viewer's instruction for displaying a 3D image of the multi-viewpoint mode based on the image information supplied from the image information acquiring unit 123, the inter-viewpoint distance information supplied from the inter-viewpoint distance information acquiring unit 124, the parallax image information supplied from the parallax image information acquiring unit 125, the compatibility information supplied from the compatibility information acquiring unit 126, and the like.

Described in more detail, the image generating unit 462 separates parallax images A2' and B2' that are the parallax images of the compatible images and the multiplexed image of the parallax images of the auxiliary images from the time-multiplexed image based on the information representing the frame sequential mode as the multiplexing mode of the multiplexed image of the parallax images of the compatible images and the parallax images of the auxiliary images included in the parallax image information that is supplied from the parallax image information acquiring unit 125. Then, the image generating unit 462 separates the parallax images C2' and D2' from the multiplexed image of the parallax images of the auxiliary images based on the multiplexing mode of the parallax images of the auxiliary images that is included in the parallax image information.

In addition, the image generating unit 462, similarly to the image generating unit 171 illustrated in FIG. 18, separates each auxiliary image from the multiplexed image of the auxiliary images based on the information that represents the multiplexing mode of the auxiliary images that is included in the image information supplied from the image information acquiring unit 123. Furthermore, the image generating unit 462, similarly to the image generating unit 171, separates each compatible image from the multiplexed image of the compatible images based on the information that represents the multiplexing mode of the compatible images that is included in the image information.

Furthermore, the image generating unit 462, similarly to the image generating unit 171, determines the position of each viewpoint of multi-viewpoint images to be generated based on the inter-viewpoint distance information and the number of viewpoints corresponding to a display device not illustrated in the figure. Then, the image generating unit 462, similarly to the image generating unit 171, generates the image of each viewpoint of which the position is determined by using each compatible image, each auxiliary image, the parallax image of each compatible image, and the parallax image of each auxiliary image. Then, the image generating unit 462, similarly to the image generating unit 171, converts the resolution of the generated multi-viewpoint images into resolution that is "1/the number of viewpoints" of the resolution of the compatible image or the auxiliary image, synthesizes the images, and displays the synthesized image on a display device not illustrated in the figure.

At this time, the multi-viewpoint images after the synthesis are displayed such that the viewing angles are different for each viewpoint, and a viewer can view a 3D image without wearing glasses by seeing images of arbitrary two viewpoints with his left and right eyes.

In addition, the image generating unit 462, similarly to the image generating unit 171 separates the multiplexed image of the compatible images that is supplied from the decoder 461 into images A2 and B2 of which the resolution is a half of the resolution of the compatible image based on the image information supplied from the image information acquiring unit 123 in accordance with an instruction for displaying a 3D image of the two-viewpoint mode that is supplied from a viewer. Then, the image generating unit 462, similarly to the image generating unit 171, alternately outputs the separated images A2 and B2 of which the resolution is a half of the resolution of the compatible image, thereby displaying the separated images on a display device not illustrated in the figure. At this time, the viewer can view a 3D image by wearing glasses in which one a left-eye shutter and a right-eye shutter is open at the time of displaying the image A2, and the other is open at the time of displaying the image B2 and viewing the images A2 and B2 that are alternately displayed on the display device.

[Description of Decoding Process]

Figure 70:
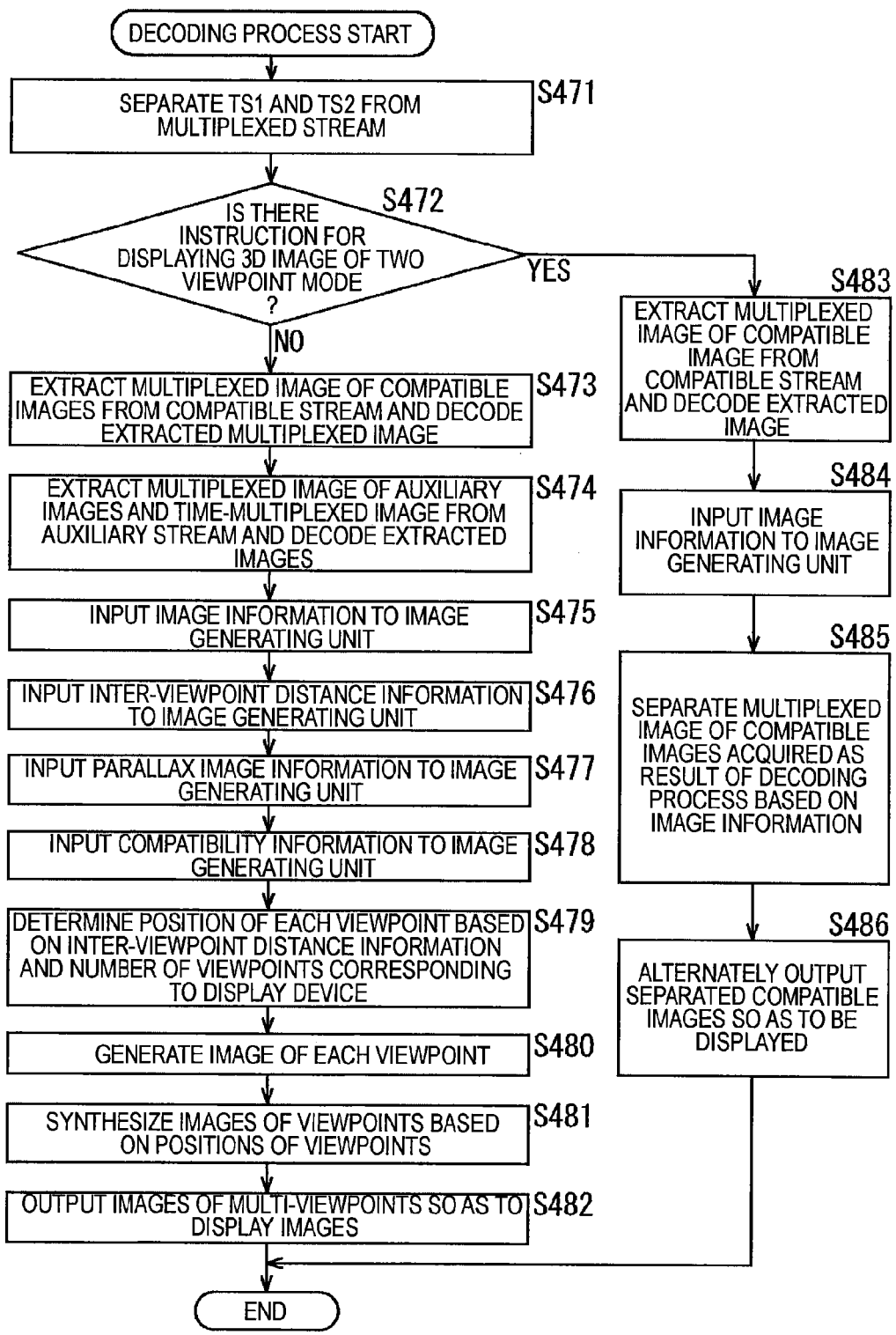
FIG. 70 is a flowchart that illustrates a decoding process performed by the decoding device illustrated in FIG. 69.

FIG. 70 is a flowchart that illustrates a decoding process performed by the decoding device 460 illustrated in FIG. 69. This decoding process, for example, is started when a multiplexed stream that is transmitted from the encoding device 440 illustrated in FIG. 62 is input to the decoding device 460.

The process of Steps S471 to S473 illustrated in FIG. 70 is similar to that of Steps S91 to S93 illustrated in FIG. 19, and thus, the description thereof will not be presented.

In Step S474, the auxiliary decoder 471 extracts a multiplexed image of encoded auxiliary images and a time-multiplexed image from the auxiliary stream and decodes the extracted multiplexed images in accordance with a mode that corresponds to the auxiliary encoder 62 illustrated in FIG. 2. The auxiliary decoder 471 supplies the multiplexed image of the auxiliary images and the time-multiplexed image that are acquired as a result of the decoding process to the image generating unit 127, and the process proceeds to Step S475.

The process of Steps S475 to S479 is similar to that of Steps S95 to S99 illustrated in FIG. 19, and thus, the description thereof will not be presented.

In Step S480, the image generating unit 462 generates images of the viewpoints each having the resolution that is a half of the resolution of the compatible image or the auxiliary image based on the position of each viewpoint determined in Step S479, the image information supplied from the image information acquiring unit 123, the parallax image information supplied from the parallax image information acquiring unit 125, the compatibility information supplied from the compatibility information acquiring unit 126, and the like by using the multiplexed image of the compatible images, the multiplexed image of the auxiliary images, and the time-multiplexed image.

The process of Steps S481 to S486 is similar to that of Steps S101 to S106 illustrated in FIG. 19, and thus, the description thereof will not be presented.

In a decoding device that can decode only a compatible stream that has compatibility with the decoding device 460, a TS2 to which the 3DV representation delimiter NAL unit is added is ignored, and the process of Steps S483, S485, and S486 is performed. However, in this case, in the process of Step S485, the multiplexed image of the compatible images is separated based on the multiplexing mode that is determined in advance.

Eighth Embodiment

[Configuration Example of Encoding Device According to Eighth Embodiment]

Figure 71:
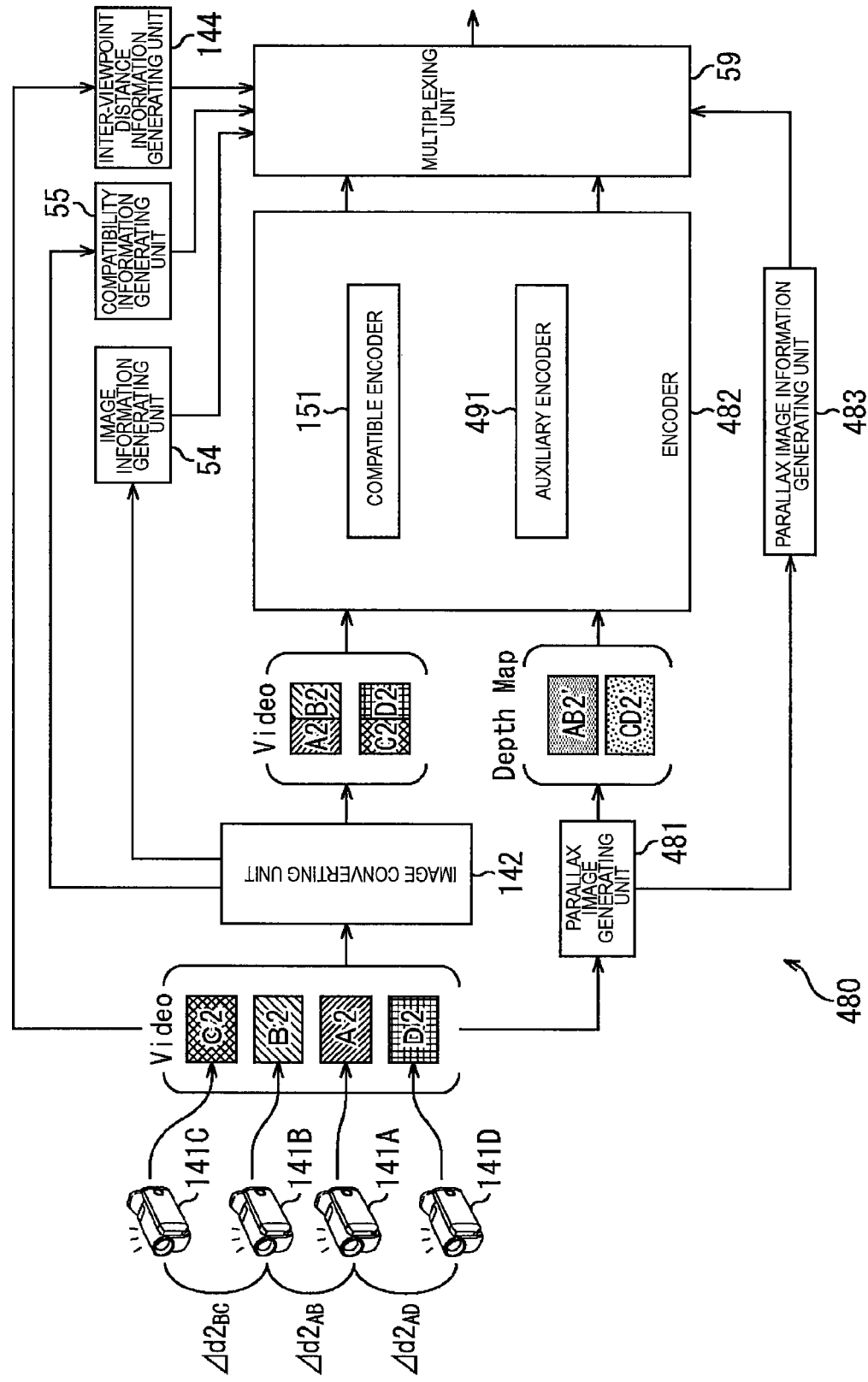
FIG. 71 is a block diagram that illustrates a configuration example of an encoding device according to an eighth embodiment of the present technology.

FIG. 71 is a block diagram that illustrates a configuration example of an encoding device according to an eighth embodiment of the present technology.

In the configuration illustrated in FIG. 71, the same reference numeral is assigned to a configuration that is the same as that illustrated in FIG. 14. Duplicate description will not be presented as is appropriate.

The configuration of the encoding device 480 illustrated in FIG. 71 is mainly different from the configuration illustrated in FIG. 14 in that a parallax image generating unit 481, an encoder 482, and a parallax image information generating unit 483 are disposed instead of the parallax image generating unit 143, the encoder 145, and the parallax image information generating unit 57. The encoding device 480 encodes a common parallax image that shows a parallax value that is common to the compatible images and a common parallax image of the auxiliary images.

More specifically, the parallax image generating unit 481 of the encoding device 480 detects the disparity of each pixel between images A2 and B2 and the disparity of each pixel between images C2 and D2 using the images A2 to D2 that are supplied from the imaging units 141A to 141D. The parallax image generating unit 481 generates a parallax image formed by disparity values that represent the disparity of each pixel between the images A2 and B2 as a common parallax image AB2' of the compatible images and supplies the generated common parallax image to the encoder 482. In addition, the parallax image generating unit 481 generates a parallax image formed by disparity values that represent the disparity of each pixel between the images C2 and D2 as a common parallax image CD2' of the auxiliary images and supplies the generated common parallax image to the encoder 482.

Furthermore, the parallax image generating unit 481 supplies information that represents that the parallax images of the compatible images and the auxiliary images are common parallax images to the parallax image information generating unit 483.

The encoder 482 is configured by a compatible encoder 151 and an auxiliary encoder 491. The auxiliary encoder 491 encodes the multiplexed image of auxiliary images that is supplied from the image converting unit 142 and the common parallax image AB2' of the compatible images and the common parallax image CD2' of the auxiliary images that are supplied from the parallax image generating unit 481 in accordance with the 3DV mode in units of access units. The auxiliary encoder 491 supplies an encoded stream acquired as a result thereof to the multiplexing unit 59 as an auxiliary stream.

The parallax image information generating unit 483 generates information representing that the parallax images of the compatible images and the auxiliary images are common parallax images and the like as parallax image information based on the information that is supplied from the parallax image generating unit 53 and supplies the generated parallax image information to the multiplexing unit 59.

[Description of Process of Encoding Device]

Figure 72:
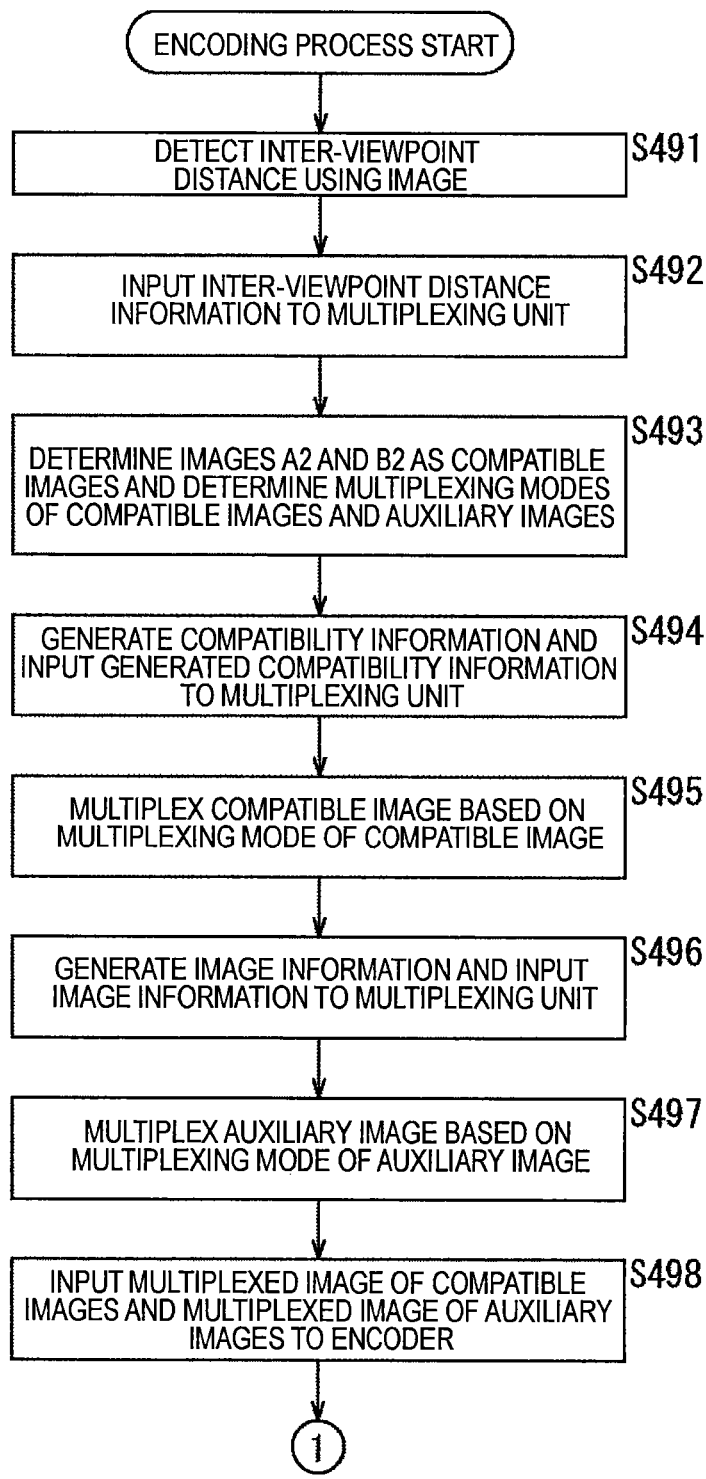
FIG. 72 is a flowchart that illustrates an encoding process performed by the encoding device illustrated in FIG. 71.
Figure 73:
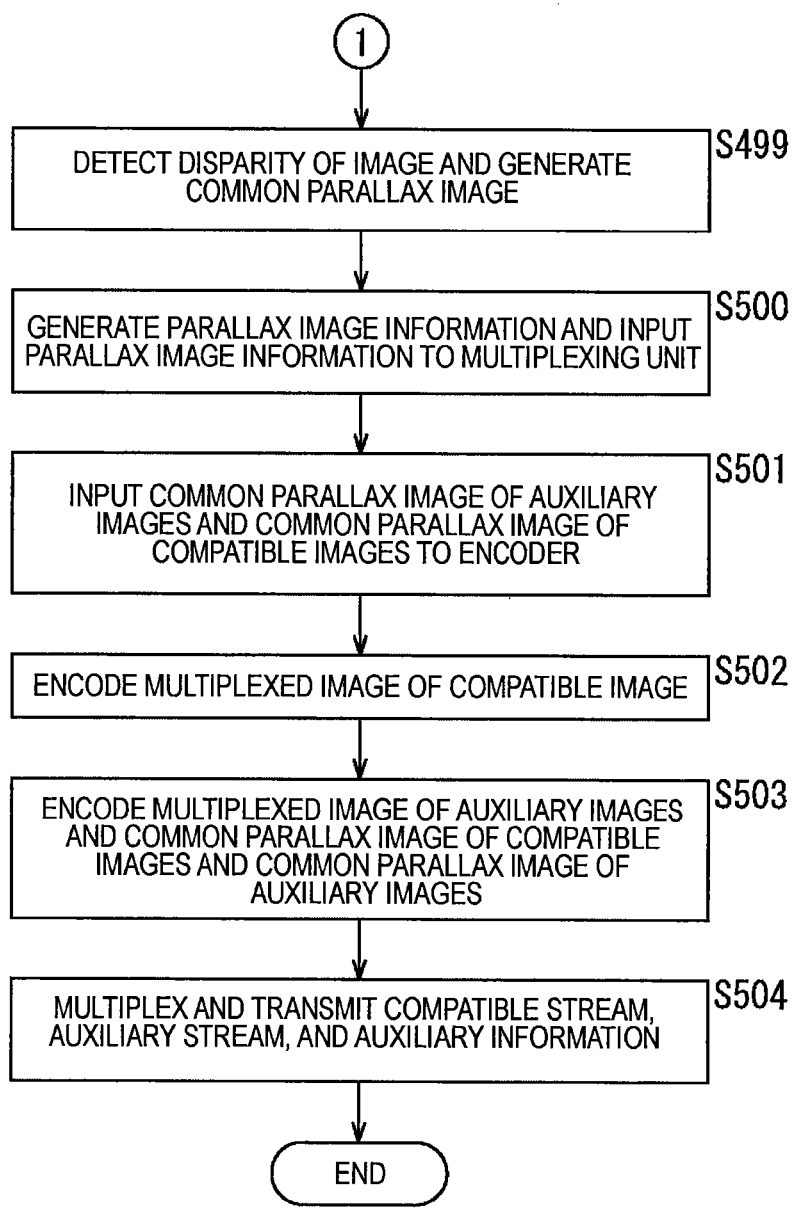
FIG. 73 is a flowchart that illustrates the encoding process performed by the encoding device illustrated in FIG. 71.

FIGS. 72 and 73 represent a flowchart that illustrates an encoding process that is performed by the encoding device 480 illustrated in FIG. 71. This encoding process, for example, is started when images A2 to D2 are output from the imaging units 141A to 141D.

The process of Steps S491 to S498 illustrated in FIG. 72 is similar to that of Steps S71 to S78 illustrated in FIG. 16, and thus, the description thereof will not be presented.

In Step S499 illustrated in FIG. 73, the parallax image generating unit 481 detects the disparity of each pixel between images A2 and B2 and the disparity of each pixel between images C2 and D2 using the images A2 to D2 that are supplied from the imaging units 141A to 141D. Then, the parallax image generating unit 481 generates a common parallax image AB2' that is formed by disparity values that represent the disparity of each pixel between the images A2 and B2 and a common parallax image CD2' that is formed by disparity values that represent the disparity of each pixel between the images C2 and D2.

In Step S500, The parallax image information generating unit 483 generates information representing that the parallax images of the compatible images and the auxiliary images are common parallax images and the like as parallax image information based on the information that is supplied from the parallax image generating unit 481 and inputs the generated parallax image information to the multiplexing unit 59.

In Step S501, the parallax image generating unit 481 inputs the common parallax images CD2' of the auxiliary images and the common parallax images AB2' of the compatible images, which are generated in Step S499, to the encoder 482.

In Step S502, the compatible encoder 151 of the encoder 482 encodes the multiplexed image of the compatible images that is supplied from the image converting unit 142 in accordance with the existing AVC mode and supplies an encoded stream acquired as a result thereof to the multiplexing unit 59 as a compatible stream.

In Step S503, the auxiliary encoder 491 encodes the multiplexed image of the auxiliary images supplied from the image converting unit 142 and the common parallax image of the compatible images and the common parallax image of the auxiliary images that are supplied from the parallax image generating unit 481 in accordance with the 3DV mode. The auxiliary encoder 491 supplies an encoded stream acquired as a result of the encoding process to the multiplexing unit 59 as an auxiliary stream.

In Step S504, the multiplexing unit 59 generates a TS1 from the compatible stream that is supplied from the compatible encoder 151, generates a TS2 from the auxiliary stream and the auxiliary information supplied from the auxiliary encoder 491, performs a multiplexing process, and transmits a multiplexed stream acquired as a result thereof. This multiplexed stream, for example, is recorded on a BD or the like or is transmitted as a broadcast stream. Then, the process ends.

[Configuration Example of Decoding Device]

Figure 74:
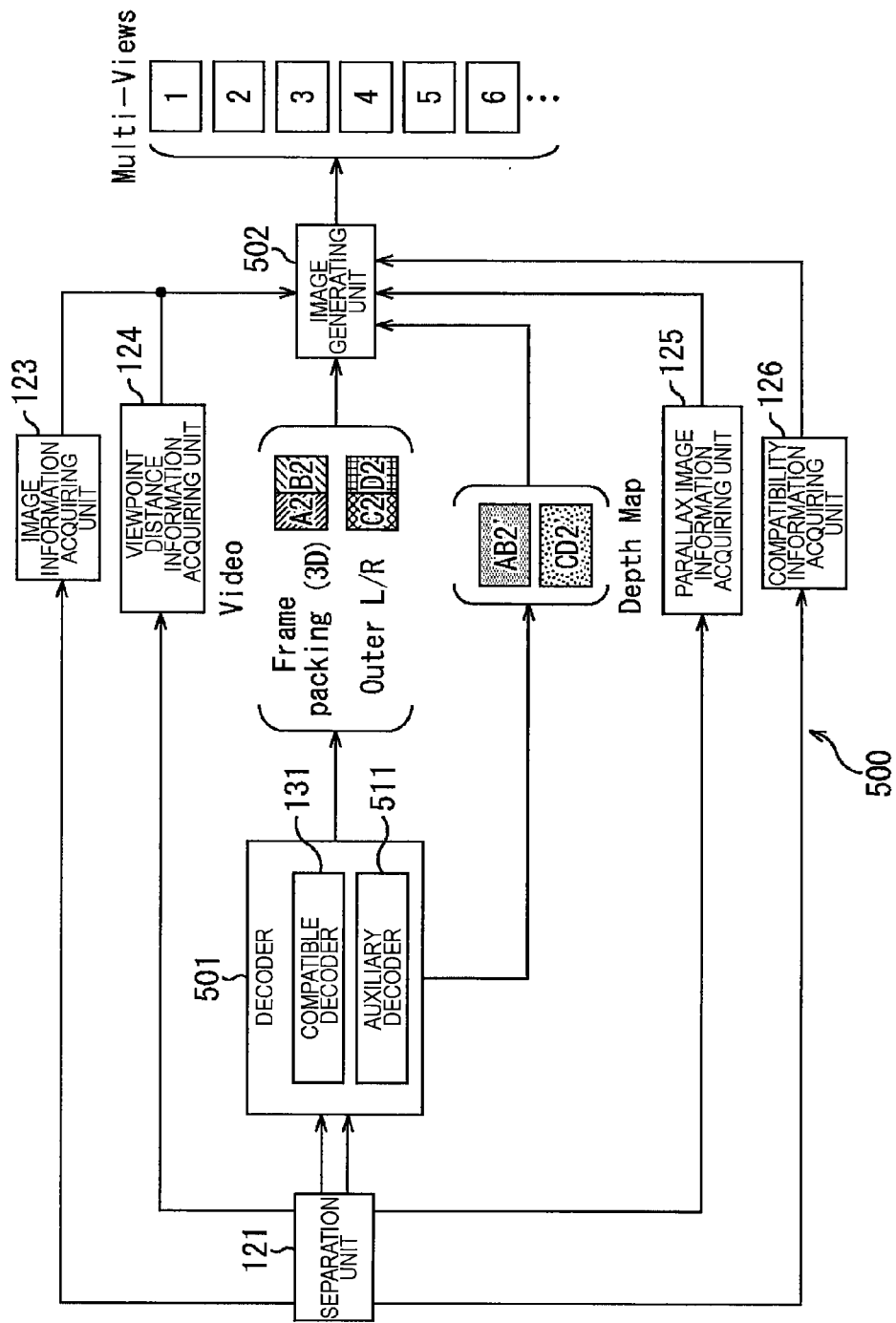
FIG. 74 is a diagram that illustrates a configuration example of a decoding device that corresponds to the encoding device illustrated in FIG. 71.

FIG. 74 is a diagram that illustrates a configuration example of a decoding device that decodes the multiplexed stream transmitted from the encoding device 480 illustrated in FIG. 71.

In the configuration illustrated in FIG. 74, the same reference numeral is assigned to a configuration that is the same as that illustrated in FIG. 18. Duplicate description will not be presented as is appropriate.

The configuration of the decoding device 500 illustrated in FIG. 74 is mainly different from the configuration illustrated in FIG. 18 in that a decoder 501 and an image generating unit 502 are disposed instead of the decoder 122 and the image generating unit 171. The decoding device 500 generates images of two viewpoints or multi-viewpoint images by decoding the multiplexed stream that is transmitted from the encoding device 480 and displays the generated images on a display device not illustrated in the figure.

More specifically, the decoder 501 of the decoding device 500 is configured by a compatible decoder 131 and an auxiliary decoder 511. The auxiliary decoder 511 of the decoder 501 decodes the multiplexed image of auxiliary images that is included in the auxiliary stream that is supplied from the separation unit 121, the common parallax image AB2' of the compatible images, and the common parallax image CD2' of the auxiliary images in accordance with a mode that corresponds to the auxiliary encoder 491 illustrated in FIG. 71. The auxiliary decoder 511 supplies the multiplexed image of the auxiliary images and the common parallax images AB2' and CD2' that are acquired as a result of the decoding process to the image generating unit 502.

The image generating unit 502 outputs an image in accordance with an instruction supplied from a viewer and displays the image on a display device not illustrated in the figure. When described in more detail, the image generating unit 502 generates images of three or more viewpoints, which correspond to a display device not illustrated in the figure, each having the resolution that is a half of the resolution of the compatible image or the auxiliary image by using the multiplexed image of compatible images, the multiplexed image of the auxiliary images, and the common parallax images AB2' and CD2' in accordance with a viewer's instruction for displaying a 3D image of the multi-viewpoint mode based on the image information supplied from the image information acquiring unit 123, the inter-viewpoint distance information supplied from the inter-viewpoint distance information acquiring unit 124, the parallax image information supplied from the parallax image information acquiring unit 125, the compatibility information supplied from the compatibility information acquiring unit 126, and the like.

Described in more detail, the image generating unit 502 maintains the common parallax images AB2' and CD2' without being changed based on the information representing that the parallax images of the compatible images and the auxiliary images are common parallax images that is included in the parallax image information supplied from the parallax image information acquiring unit 125.

In addition, the image generating unit 502, similarly to the image generating unit 171 illustrated in FIG. 18, separates each auxiliary image from the multiplexed image of the auxiliary images based on the information that represents the multiplexing mode of the auxiliary images that is included in the image information supplied from the image information acquiring unit 123. Furthermore, the image generating unit 502, similarly to the image generating unit 171, separates each compatible image from the multiplexed image of the compatible images based on the information that represents the multiplexing mode of the compatible images that is included in the image information.

Furthermore, the image generating unit 502, similarly to the image generating unit 171, determines the position of each viewpoint of the multi-viewpoint images to be generated based on the inter-viewpoint distance information and the number of viewpoints that corresponds to a display device not illustrated in the figure. Then, the image generating unit 502 generates the image of each viewpoint of which the position is determined by using each compatible image, each auxiliary image, the common parallax image AB2', and the common parallax image CD2'. Then, the image generating unit 502, similarly to the image generating unit 171, converts the resolution of the generated multi-viewpoint images into resolution that is "1/the number of viewpoints" of the resolution of the compatible image or the auxiliary image, synthesizes the images, and displays the synthesized image on a display device not illustrated in the figure.

At this time, the multi-viewpoint images after the synthesis are displayed such that the viewing angles are different for each viewpoint, and a viewer can view a 3D image without wearing glasses by seeing images of arbitrary two viewpoints with his left and right eyes.

In addition, the image generating unit 502, similarly to the image generating unit 171, separates from the multiplexed image of the compatible images that is supplied from the decoder 501 into images A2 and B2 of which the resolution is a half of the resolution of the compatible image based on the image information supplied from the image information acquiring unit 123 in accordance with an instruction for displaying a 3D image of the two-viewpoint mode that is supplied from a viewer. Then, the image generating unit 502, similarly to the image generating unit 171, alternately outputs the separated images A2 and B2 of which the resolution is a half of the resolution of the compatible image, thereby displaying the separated images on a display device not illustrated in the figure. At this time, the viewer can view a 3D image by wearing glasses in which one a left-eye shutter and a right-eye shutter is open at the time of displaying the image A2, and the other is open at the time of displaying the image B2 and viewing the images A2 and B2 that are alternately displayed on the display device.

[Description of Process of Decoding Device]

Figure 75:
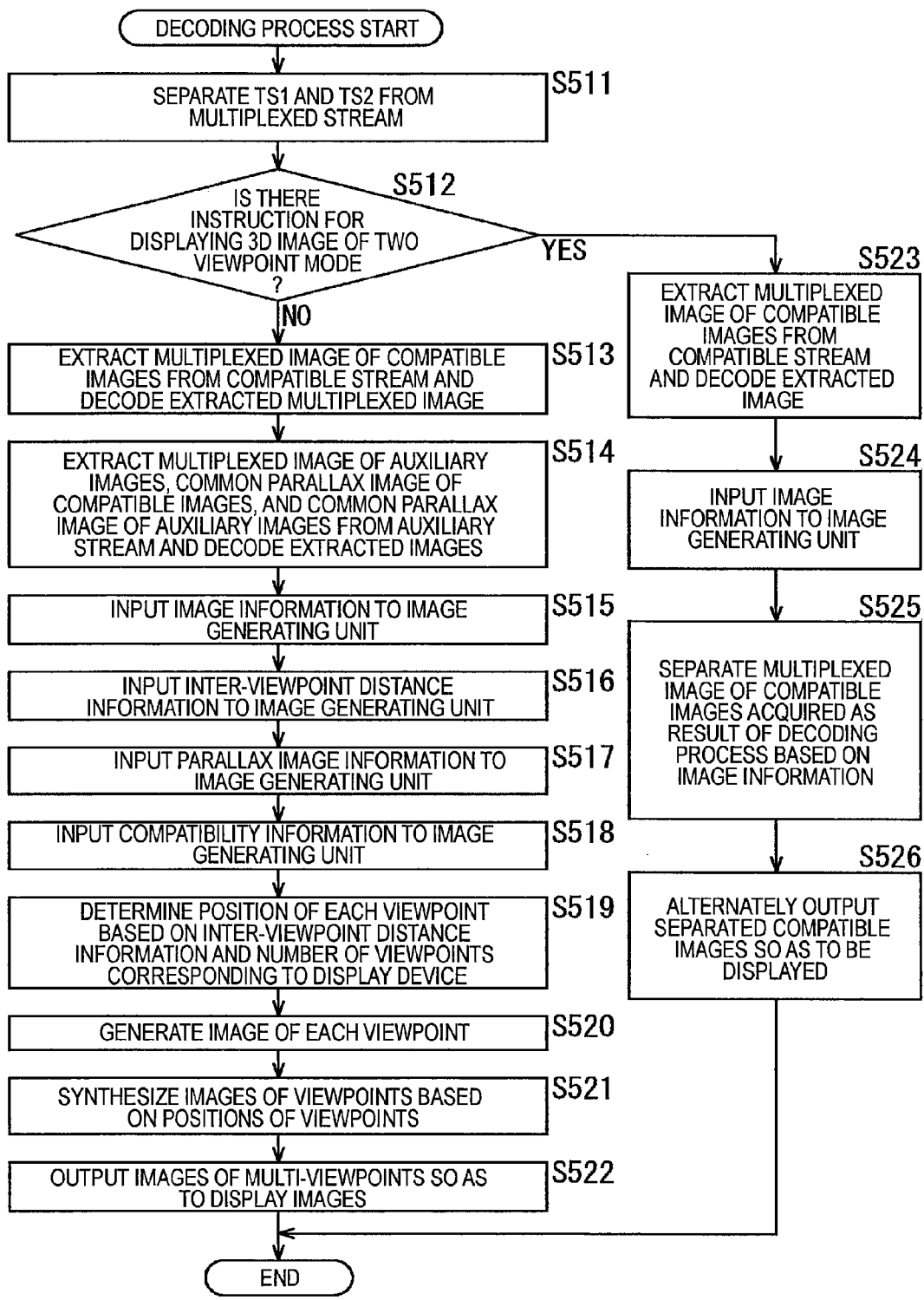
FIG. 75 is a flowchart that illustrates a decoding process performed by the decoding device illustrated in FIG. 74.

FIG. 75 is a flowchart that illustrates a decoding process performed by the decoding device 500 illustrated in FIG. 74. This decoding process, for example, is started when a multiplexed stream that is transmitted from the encoding device 480 illustrated in FIG. 71 is input to the decoding device 500.

The process of Steps S511 to S513 illustrated in FIG. 75 is similar to that of Steps S91 to S93 illustrated in FIG. 19, and thus, the description thereof will not be presented.

In Step S514, the auxiliary decoder 511 extracts the encoded multiplexed image of the auxiliary images, the common parallax image AB2' of the compatible images, and the common parallax image CD2' of the auxiliary images and decodes the extracted images in accordance with a mode that corresponds to the auxiliary encoder 491 illustrated in FIG. 71. The auxiliary decoder 511 supplies the multiplexed image of the auxiliary images, the common parallax image AB2', and the common parallax image CD2', which are acquired as a result of the decoding process, to the image generating unit 502.

The process of Steps S515 to S519 is similar to that of Steps S95 to S99 illustrated in FIG. 19, and thus, the description thereof will not be presented.

After the process of Step S519, in Step S520, the image generating unit 502 generates an image of each viewpoint of which the resolution is a half of the resolution of the compatible image or the auxiliary image by using the compatible images, the multiplexed image of the auxiliary images, the common parallax image AB2', and the common parallax images CD2' based on the position of each viewpoint determined in Step S519, the image information supplied from the image information acquiring unit 123, the parallax image information supplied from the parallax image information acquiring unit 125, and the compatibility information supplied from the compatibility information acquiring unit 126, and the like.

The process of Steps S521 to S526 is similar to that of Steps S101 to S106 illustrated in FIG. 19, and thus, the description thereof will not be presented.

Although the encoding devices 440 and 480, similarly to the encoding device 140, multiplex and encode compatible images of two view points, similarly to the encoding device 180 illustrated in FIG. 22, the encoding devices 440 and 480 may encode compatible images of two viewpoints without multiplexing them. In addition, the encoding devices 440 and 480, similarly to the encoding device 50 illustrated in FIG. 2, may encode a compatible image of one viewpoint.

In addition, the encoding devices 140 and 180 may encode the parallax images of the compatible images and the auxiliary images without multiplexing the above-described parallax images. Furthermore, the encoding device 50 may encode the parallax images of the auxiliary images without multiplexing the above-described parallax images.

<Example of Multiplexed Pattern of Encoding Target>

Figure 76:
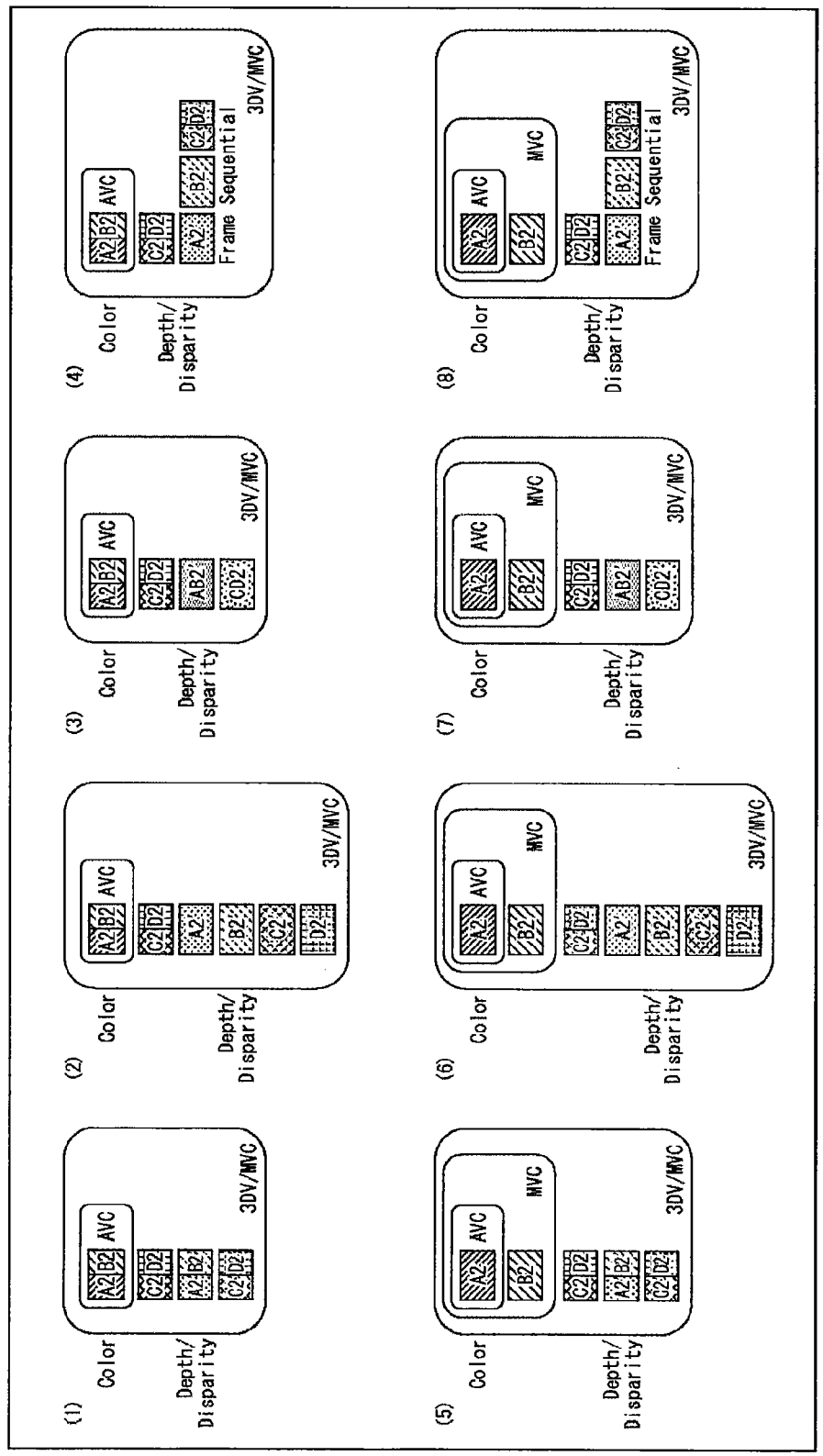
FIG. 76 is a diagram that illustrates an example of a multiplexing pattern of an encoding target.

FIG. 76 is a diagram that illustrates an example of a multiplexing pattern of an encoding target in a case where the number of viewpoints of the compatible images is two, and the number of viewpoints of the auxiliary images is two.

As illustrated in (1) of FIG. 76, the encoding device 140 illustrated FIG. 14 multiplexes images A2 and B2 that are compatible images in the spatial direction and encodes the multiplexed image in accordance with the AVC mode. In addition, the encoding device 140 multiplexes the images C2 and D2 that are auxiliary images, the parallax images A2' and B2' that are parallax images of the compatible images, and the parallax images C2' and D2' that are parallax images of the auxiliary images in the spatial direction and encodes the multiplexed image in accordance with the 3DV mode that is compliant with the MVC mode.

Furthermore, as illustrated in (2) of FIG. 76, the encoding device 140 may encode the parallax images A2' to D2' in accordance with the 3DV mode that is compliant with the MVC mode without multiplexing the parallax images. In addition, as illustrated in (3) of FIG. 76, the encoding device 480 illustrated in FIG. 71 may encode the common parallax image AB2' instead of the parallax images A2' and B2' that are parallax images of the compatible images and encode the common parallax image CD2' instead of the parallax images C2' and D2' that are parallax images of the auxiliary images.

Furthermore, as illustrated in (4) of FIG. 76, the encoding device 440 illustrated in FIG. 62 multiplexes the parallax images A2' and B2' and the multiplexed image of the parallax images of the auxiliary images in accordance with the frame sequential mode without multiplexing the parallax images A2' and B2' that are parallax images of the compatible images in the spatial direction and encodes the multiplexed image in accordance with the 3DV mode that is compliant with the MVC mode.

As illustrated in (5) of FIG. 76, the encoding device 180 illustrated in FIG. 22 encodes the image A2 in accordance with the AVC mode and encodes the image B2 with the image A2 set as a base view in accordance with the MVC mode without multiplexing the images A2 and B2 that are compatible images. In addition, the encoding device 180 encodes the images C2 and D2 that are auxiliary images, the parallax images A2' and B2' that are the parallax images of the compatible images, and the parallax images C2' and D2' that are the parallax images of the auxiliary images in the spatial direction and encodes a resultant multiplexed image in accordance with a 3DV mode that is in compliant with the MVC mode.

In addition, as illustrated in (6) of FIG. 76, the encoding device 180 may encode the parallax images A2' to D2' in accordance with the 3DV mode that is compliant with the MVC mode without multiplexing them. Furthermore, as illustrated in (7) of FIG. 76, similarly to the encoding device 480, the encoding device 180 may encode the common parallax image AB2' instead of the parallax images A2' and B2' and encode the common parallax image CD2' instead of the parallax images C2' and D2'.

Furthermore, as illustrated in (8) of FIG. 76, the encoding device 180, similarly to the encoding device 440, may multiple the parallax images A2' and B2' and the multiplexed image of the parallax images of the auxiliary images in accordance with the frame sequential mode and encode a resultant multiplexed image in accordance with the 3DV mode that is compliant with the MVC mode without multiplexing the parallax images A2' and B2' in the spatial direction.

FIG. 77 is a diagram that illustrates features of the effects of multiplexing in the multiplexing patterns illustrated in (1) to (8) of FIG. 76.

In the table represented in FIG. 77, items of the effects "Compatibility", "Image Quality", and "Data Amount" are arranged, and the degrees of the effects of the items for the multiplexing patterns illustrated in (1) to (8) of FIG. 76 are represented. In the table represented in FIG. 77, a circle represents the presence of an effect, and a double circle represents a remarkable effect.

In a case where multiplexing is performed using the multiplexing pattern illustrated in (1) of FIG. 76, the multiplexing mode and the encoding mode of compatible images are the same as those of an existing mode, whereby the compatibility is secured. In addition, since parallax images, similarly to the compatible images, are multiplexed in the spatial direction, for example, the parallax images can be separated using a separation unit, which separates compatible images, prepared on the decoding device side. Accordingly, it is assured that the parallax images can be separated on the decoding device side. Therefore, in this case, there is a remarkable effect on the compatibility, and a double circle is described in correspondence with the item "Compatibility" illustrated in FIG. 77.

In a case where multiplexing is performed using the multiplexing pattern illustrated in (2) of FIG. 76, the multiplexing mode and the encoding mode of compatible images are the same as those of an existing mode, whereby the compatibility is secured. In addition, since the resolution of the parallax image is the same as that of the image before being multiplexed, the accuracy is high. As a result, in the decoding device, the accuracy of an image of a predetermined viewpoint that is generated using the parallax image is improved. Therefore, in this case, there are effects on the compatibility and the image quality of an image that is generated using the parallax image, and accordingly, circles are described in correspondence with items "Compatibility" and "Image Quality" represented in FIG. 77.

In a case where multiplexing is performed using the multiplexing pattern illustrated in (3) of FIG. 76, the multiplexing mode and the encoding mode of compatible images are the same as those of an existing mode, whereby the compatibility is secured. In addition, the amount of data of the parallax images of the compatible images and the auxiliary images each having the same resolution as that of the image before multiplexing decreases to be the amount of data of the parallax images of two viewpoints. Accordingly, in this case, since there are effects on the compatibility and the data amount, circles are described in correspondence with items "Compatibility" and "Data Amount" represented in FIG. 77.

In a case where multiplexing is performed using the multiplexing pattern illustrated in (4) of FIG. 76, the multiplexing mode and the encoding mode of compatible images are the same as those of an existing mode, whereby the compatibility is secured. In addition, since the parallax images are multiplexed in the time direction, the amount of data of the parallax images at each time is less than that of the case of (3) of FIG. 76, whereby the amount of data that can be transmitted increases.

Accordingly, even in a situation in which there is no room for a transmission bandwidth for transmitting a parallax image having the same resolution as the image before multiplexing, a parallax image of which the resolution is the same as the resolution of the image before multiplexing can be transmitted, whereby the accuracy of images of predetermined viewpoints to be generated in the decoding device using the parallax image is improved. Accordingly, in this case, there are effects on the compatibility and the image quality of an image generated using the parallax image, and there is a remarkable effect on the data amount. Therefore, circles are described in correspondence with items "Compatibility" and "Image Quality" illustrated in FIG. 77, and a double circle is described in correspondence with "Data Amount".

The multiplexing process using the multiplexing patterns illustrated in (1) to (4) of FIG. 76 is performed, for example, when an image used for broadcasting, the IP (Internet Protocol) that is compliant with broadcasting, ATSC (Advanced Television Systems Committee) 2.0 specifications, and the like, next-generation broadcasting that is converged broadcasting, or internet delivery is set as an encoding target.

In a case where multiplexing is performed using the multiplexing pattern illustrated in (5) of FIG. 76, the multiplexing mode and the encoding mode of compatible images are the same as those of an existing mode, whereby the compatibility is secured. In addition, since the resolution of each parallax image is a half of the resolution of the image, the amount of data of the parallax images of the compatible image and the auxiliary image decreases to be the amount of data of the parallax images of two viewpoints. Accordingly, in this case, there are effects on the compatibility and the data amount, and circles are described in correspondence with items "Compatibility" and "Data Amount" illustrated in FIG. 77.

In a case where multiplexing is performed using the multiplexing pattern illustrated in (6) of FIG. 76, similarly to the case of (2) of FIG. 76, the compatibility is secured, and the accuracy of images of predetermined viewpoints generated in the decoding device using the parallax images is improved. Accordingly, in this case, there are effects on the compatibility and the image quality of an image generated using parallax images, and circles are described in correspondence with items "Compatibility" and "Image Quality" illustrated in FIG. 77.

In a case where multiplexing is performed using the multiplexing pattern illustrated in (7) of FIG. 76, similarly to the case of (3) of FIG. 76, the compatibility is secured, and the amount of data of the parallax image decreases. Accordingly, in this case, there are effects on the compatibility and the data amount, and circles are described in correspondence with items "Compatibility" and "Data Amount" illustrated in FIG. 77.

In a case where multiplexing is performed using the multiplexing pattern illustrated in (8) of FIG. 76, similarly to the case of (4) of FIG. 76, the compatibility is secured. In addition, similarly to the case of (4) of FIG. 76, the amount of data of the parallax images at each time is less than that of the case of (7) of FIG. 76, and as a result, the accuracy of images of predetermined viewpoints generated using the parallax images is improved. Accordingly, in this case, there are effects on the compatibility and the image quality of an image generated using the parallax images, and there is a remarkable effect on the data amount. Therefore, circles are described in correspondence with items "Compatibility" and "Image Quality" illustrated in FIG. 77, and a double circle is described in correspondence with "Data Amount".

The multiplexing process using the multiplexing patterns illustrated in (5), (7), and (8) of FIG. 76 is performed, for example, when an image used for an application for the BD, broadcasting, next-generation broadcasting or internet delivery is set as an encoding target. In addition, the multiplexing process using the multiplexing pattern illustrated in (6) of FIG. 76 is performed, for example, when an image used for an application for the BD, next-generation broadcasting or internet delivery is set as an encoding target.

Figure 78:
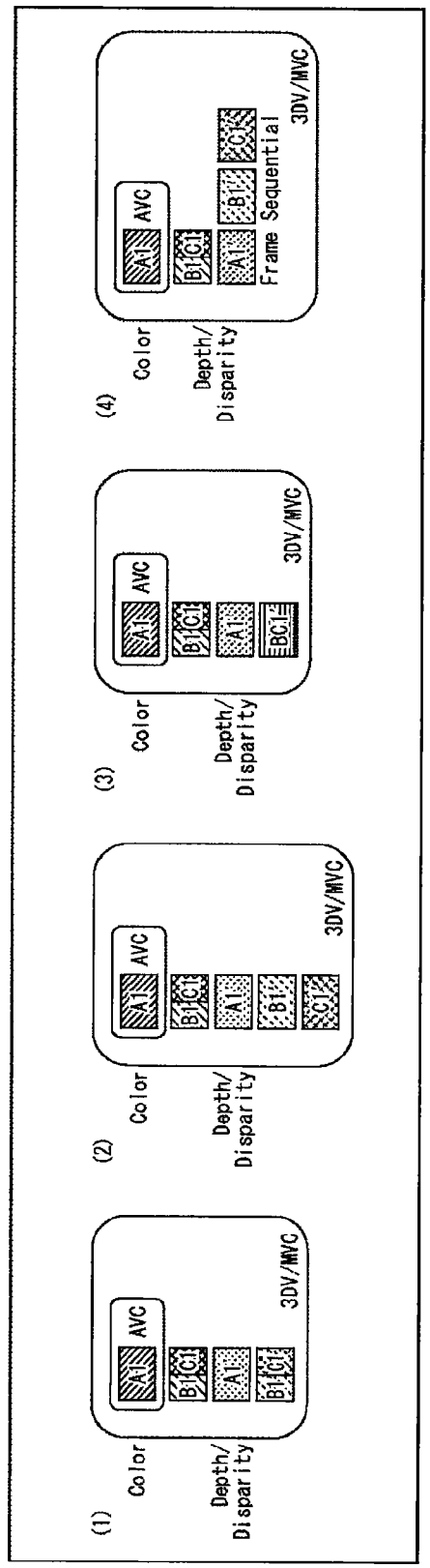
FIG. 78 is a diagram that illustrates another example of the multiplexing pattern of the encoding target.

FIG. 78 is a diagram that illustrates an example of the multiplexing pattern of the encoding target in a case where the number of viewpoints of the compatible image is one, and the number of viewpoints of the auxiliary image is two.

As illustrated in (1) of FIG. 78, the encoding device 50 illustrated in FIG. 2 encodes an image A1 that is a compatible image in accordance with the AVC mode. In addition, the encoding device 50 multiplexes images B1 and C1 that are auxiliary images and parallax images B1' and C1' that are the parallax images of the auxiliary images in the time direction. Then, the encoding device 50 encodes a parallax image A1' that is the parallax image of the compatible image, a multiplexed image of the auxiliary images, and a multiplexed image of the parallax images of the auxiliary images in accordance with the 3DV mode that is compliant with the MVC mode.

The encoding device 50, as illustrated in (2) of FIG. 78, may encode the parallax images A1' to C1' in accordance with the 3DV mode that is compliant with the MVC mode without multiplexing the parallax images. In addition, as illustrated in (3) of FIG. 78, the encoding device 50, similarly to the encoding device 480, may encode a common parallax image BC1' of images B and C that are auxiliary images instead of the multiplexed image of the parallax images of the auxiliary images.

In addition, as illustrated in (4) of FIG. 78, the encoding device 50, similarly to the encoding device 440, may multiplex the parallax images A1' to C1' in accordance with the frame sequential mode and encode a resultant multiplexed image in accordance with the 3DV mode that is compliant with the MVC mode without multiplexing the parallax images B1' and C1' in the spatial direction.

The effects of the multiplexing processes using the multiplexing patterns illustrated in (1) to (4) of FIG. 78 and the encoding targets at the time of performing the multiplexing processes using the multiplexing patterns are the same as the effects and the encoding targets of the multiplexing process using the multiplexing patterns illustrated in (5) to (8) of FIG. 76. However, in the multiplexing process using the multiplexing pattern illustrated in (1) of FIG. 78, the resolution of the parallax image of the compatible image is the same as the resolution of the compatible image, and a decrease in the amount of data of the parallax image as an effect of this multiplexing process is an effect only for the parallax image of the auxiliary image.

Figure 79:
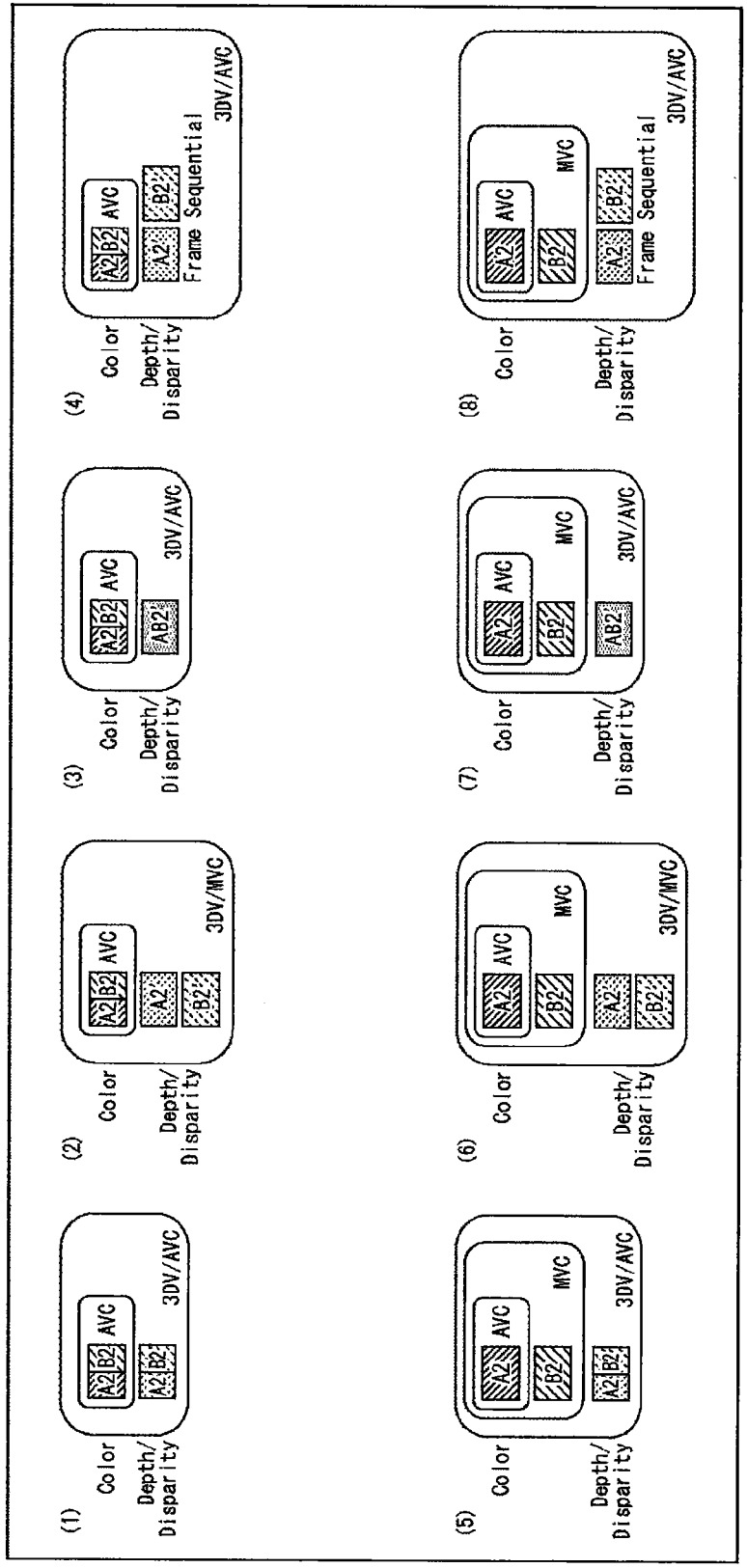
FIG. 79 is a diagram that illustrates further another example of the multiplexing pattern of an encoding target.

FIG. 79 is a diagram that illustrates an example of the multiplexing pattern of an encoding target in a case where the number of viewpoints of the compatible image is two, and the number of viewpoints of the auxiliary image is zero.

In a case where the number of viewpoints of the compatible images is two, and the number of viewpoints of the auxiliary image is zero, as illustrated in (1) of FIG. 79, similarly to the case of the encoding device 140 illustrated in FIG. 14, the images A2 and B2 that are compatible images are multiplexed in the spatial direction and are encoded in accordance with the AVC mode. In addition, the parallax images A2' and B2' that are the parallax images of the compatible images are multiplexed in the spatial direction and are encoded in accordance with the 3DV mode that is compliant with the AVC mode.

As illustrated in (2) of FIG. 79, the parallax images A2' and B2' may be encoded in accordance with the 3DV mode that is compliant with the MVC mode without being multiplexed. In addition, as illustrated in (3) of FIG. 79, similarly to the case of the encoding device 480, the common parallax image AB2' may be encoded instead of the parallax images A2' and B2'.

Furthermore, as illustrated in (4) of FIG. 79, similarly to the case of the encoding device 440, the parallax images A2' and B2' may be multiplexed in the frame sequential mode and be encoded without being multiplexed in the time direction.

In addition, as illustrated in (5) of FIG. 79, similarly to the encoding device 180, it may be configured such that the image A2 is encoded in accordance with the AVC mode, and the image B2 is encoded with the MVC mode in which the image A2 is set as a base view without multiplexing the images A2 and B2 that are compatible images.

In this case, as illustrated in (6) of FIG. 79, similarly to the case of (2) of FIG. 79, the parallax images may be encoded without being multiplexed, or, as illustrated in (7) of FIG. 79, similarly to the case of (3) of FIG. 79, the common parallax image AB2' may be encoded. In addition, as illustrated in (8) of FIG. 79, similarly to the case of (4) illustrated in FIG. 79, the parallax images of the compatible images may be multiplexed in accordance with the frame sequential mode and be encoded.

In addition, the effects of the multiplexing processes using the multiplexing patterns illustrated in (1) to (8) of FIG. 78 and the encoding targets at the time of performing the multiplexing processes using the multiplexing patterns are the same as the effects and the encoding targets of the multiplexing processes using the multiplexing patterns illustrated in (1) to (8) of FIG. 76.

In the description presented above, although the resolution of the parallax images that are multiplexed in accordance with the frame sequential mode has been described to be the same as the resolution of the image before the multiplexing process, the resolution may be lower than the resolution of the image before the multiplexing process. In addition, the auxiliary images, similarly to the parallax images, may be also multiplexed in accordance with the frame sequential mode.

Furthermore, in the description presented above, although the information representing the multiplexing mode of the images and the information representing the multiplexing mode of the parallax images have been described to be transmitted in the encoding device, information used for identifying the multiplexing patterns illustrated in FIGS. 76, 78, and 79 may be transmitted.

In addition, the encoding device may transmit a flag that is used for identifying an application that corresponds to an image that is an encoding target.

Ninth Embodiment

[Configuration Example of Encoding Device According to Ninth Embodiment]

Figure 80:
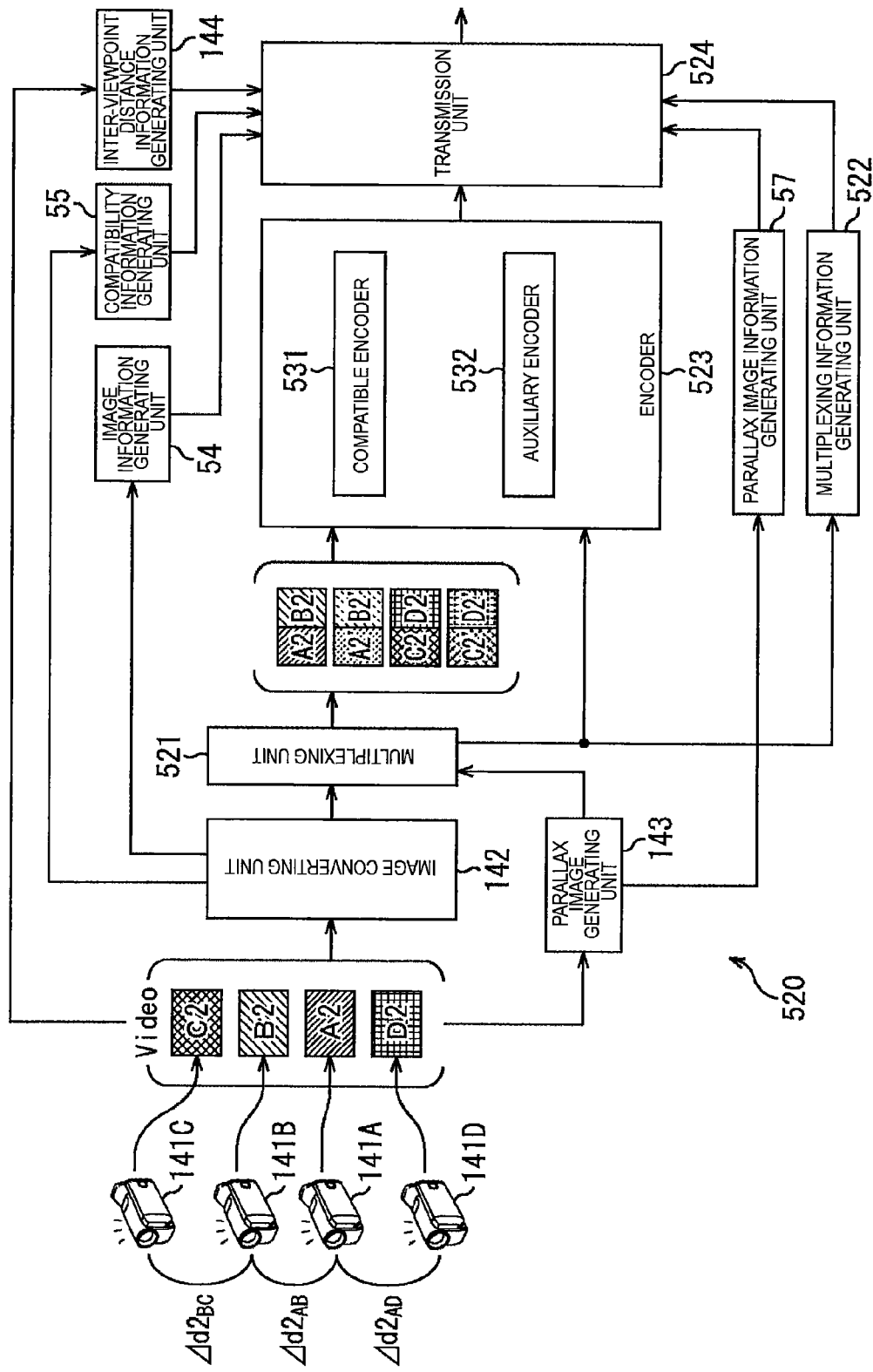
FIG. 80 is a block diagram that illustrates a configuration example of an encoding device according to a ninth embodiment of the present technology.

FIG. 80 is a block diagram that illustrates a configuration example of an encoding device according to a ninth embodiment of the present technology.

In the configuration illustrated in FIG. 80, the same reference numeral is assigned to a configuration that is the same as that illustrated in FIG. 14. Duplicate description will not be presented as is appropriate.

The configuration of the encoding device 520 illustrated in FIG. 80 is mainly different from the configuration illustrated in FIG. 14 in that an encoder 523 and a transmission unit 524 are disposed instead of the encoder 145 and the multiplexing unit 59, and a multiplexing unit 521 and a multiplexing information generating unit 522 are newly arranged.

The encoding device 520 multiplexes a multiplexed image of compatible images, a multiplexed image of auxiliary images, a multiplexed image of parallax images of the compatible images, and a multiplexed image of parallax images of the auxiliary images in accordance with the frame sequential mode and encodes a resultant multiplexed image.

More specifically, the multiplexing unit 521 of the encoding device 520 multiplexes a multiplexed image of a compatible image and an auxiliary image that is acquired as a result of the multiplexing process performed by an image converting unit 142 and a multiplexed image of the parallax images of the compatible image and the auxiliary image that is acquired as a result of the multiplexing process performed by a parallax image generating unit 143 in accordance with the frame sequential mode.

Then, the multiplexing unit 521 supplies a multiplexed image in which a multiplexed image of compatible images, a multiplexed image of the parallax images of the compatible images, a multiplexed image of auxiliary images, and a multiplexed image of the parallax images of the auxiliary images, which can be acquired as a result of the multiplexing process, are sequentially present to the encoder 523 as a time-direction multiplexed image within one frame time.

In addition, the multiplexing unit 521 supplies information representing that multiplexed images of the compatible images and the auxiliary images and a multiplexed image of the parallax images of the compatible image and the auxiliary image are multiplexed in accordance with the frame sequential mode and representing the arrangement order of images in the time-multiplexed image to the multiplexing information generating unit 522 and the encoder 523.

The multiplexing information generating unit 522, based on the information that is supplied from the multiplexing unit 521, generates the information and the like as whole multiplexing information relating to the multiplexing of the compatible images and the auxiliary images and the parallax images of the compatible images and the auxiliary images and supplies the generated whole multiplexing information to the transmission unit 524.

The encoder 523 is configured by a compatible encoder 531 and an auxiliary encoder 532. The encoder 523 designates the multiplexed image of the compatible images that is included in the time-multiplexed image supplied from the multiplexing unit 521 based on the information supplied from the multiplexing unit 521 and supplies the multiplexed image of the compatible images to the compatible encoder 531. In addition, the encoder 523 supplies the multiplexed image of the auxiliary images and the multiplexed images of the parallax images of the compatible images and the auxiliary images that are included in the time-multiplexed image to the auxiliary encoder 532 based on the information that is supplied from the multiplexing unit 521.

The compatible encoder 531 of the encoder 523 encodes the multiplexed image of the compatible images that is included in the time-multiplexed image in units of access units in accordance with the existing AVC mode. The auxiliary encoder 532 encodes the multiplexed image of the auxiliary images and the multiplexed images of the parallax images of the compatible images and the auxiliary images that are included in the time-multiplexed image in units of access units in accordance with the 3DV mode. At this time, the multiplexed image of the auxiliary images are encoded by referring to the multiplexed image of the compatible images, and the multiplexed image of the parallax images of the auxiliary images is encoded by referring to the multiplexed image of the parallax images of the compatible images.

The encoder 523 supplies a bit stream that is formed from encoded data of the time-multiplexed image that is acquired as a result of the encoding process performed by the compatible encoder 531 or the auxiliary encoder 532 to the transmission unit 524.

The transmission unit 524 generates a TS using the bit stream supplied from the encoder 523, image information supplied from the image information generating unit 54, compatibility information supplied from the compatibility information generating unit 55, inter-viewpoint distance information supplied from the inter-viewpoint distance information generating unit 144, parallax image information supplied from the parallax image information generating unit 57, the whole multiplexing information supplied from the multiplexing information generating unit 522, and the like. The multiplexing unit 59 transmits the generated TS.

[Description of Process of Encoding Device]

Figure 81:
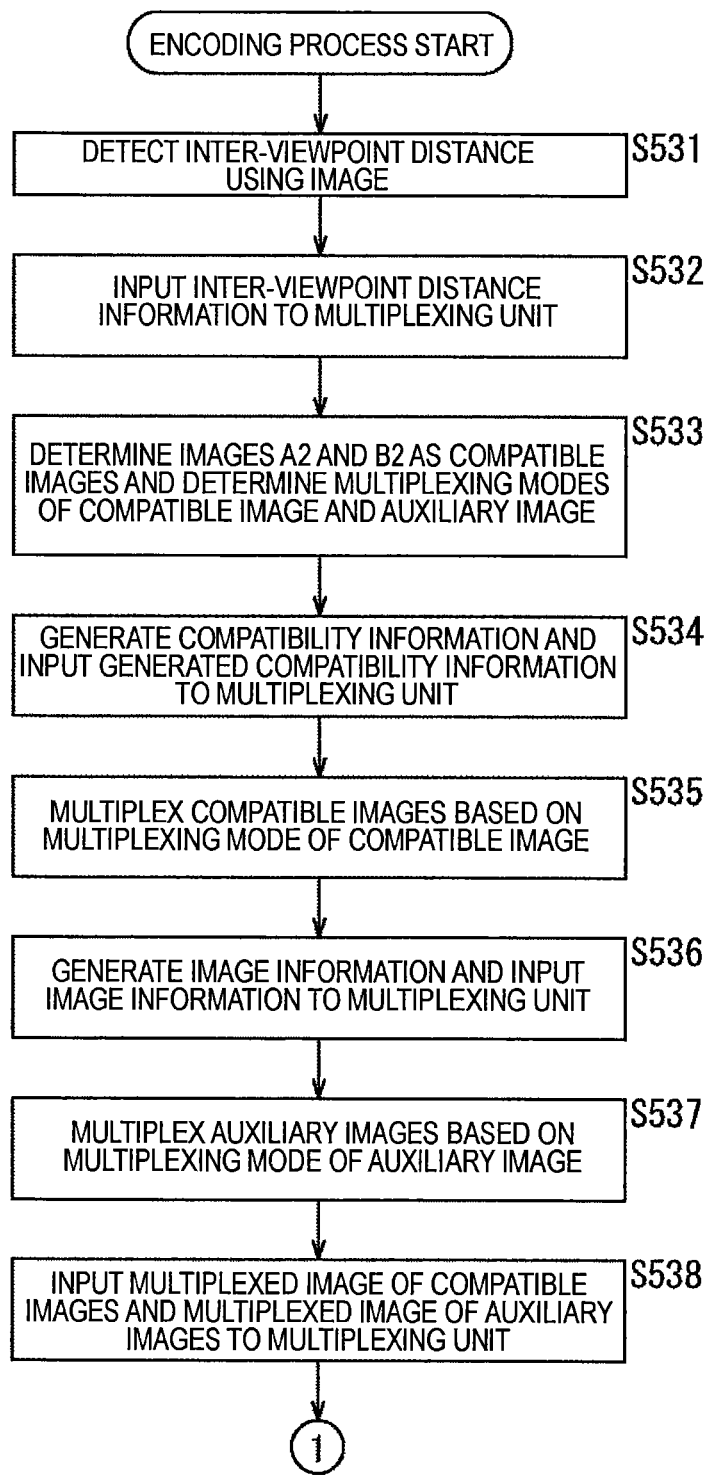
FIG. 81 is a flowchart that illustrates an encoding process performed by the encoding device illustrated in FIG. 80.
Figure 82:
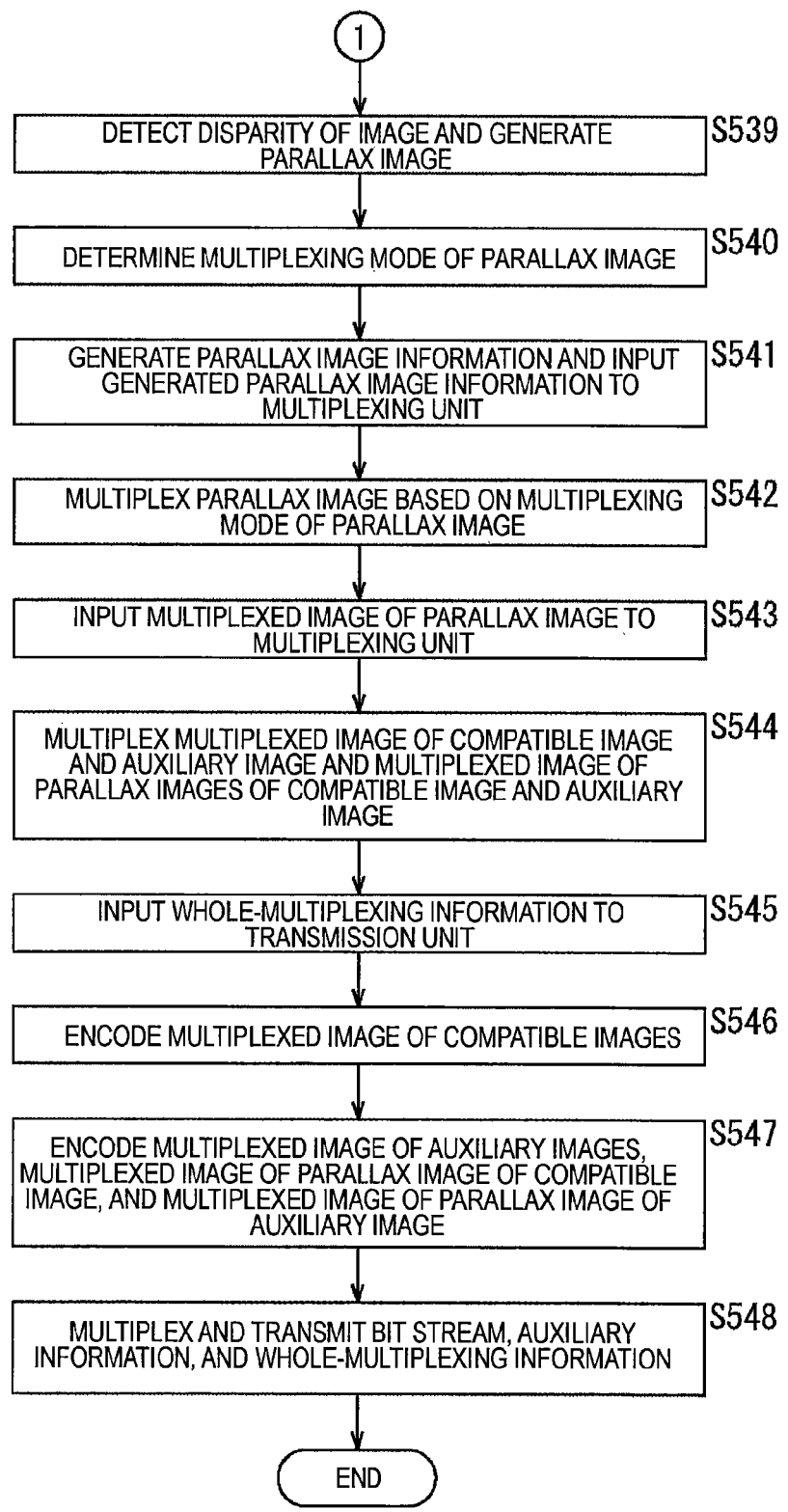
FIG. 82 is a flowchart that illustrates the encoding process performed by the encoding device illustrated in FIG. 80.

FIGS. 81 and 82 represent a flowchart that illustrates an encoding process that is performed by the encoding device 520 illustrated in FIG. 80. This encoding process, for example, is started when images A2 to D2 are output from the imaging units 141A to 141D.

The process of Steps S531 to and S537 illustrated in FIG. 81 is the same as the process of Steps S71 to S77 illustrated in FIG. 16, and thus the description thereof will not be presented.

After the process of Step S537, in Step S538, the image converting unit 142 inputs a multiplexed image of the compatible images and a multiplexed image of the auxiliary images to the multiplexing unit 521, and the process proceeds to Step S539 illustrated in FIG. 82.

The process of Steps S539 to S542 illustrated in FIG. 82 is the same as the process of Steps S79 to S82 illustrated in FIG. 17, and thus the description thereof will not be presented.

After the process of Step S543, in Step S544, the multiplexing unit 521 multiplexes the multiplexed images of the compatible images and the auxiliary images that are acquired as a result of the multiplexing process performed by the image converting unit 142 and the multiplexed images of the parallax images of the compatible images and the auxiliary images that are acquired as a result of the multiplexing process performed by the parallax image generating unit 143 in accordance with the frame sequential mode. The multiplexing unit 521 supplies a multiplexed image that is acquired as a result of the multiplexing process to the encoder 523 as a time-direction multiplexed image.

In addition, the multiplexing unit 521 supplies information representing that multiplexed images of the compatible images and the auxiliary images and multiplexed images of the parallax images are multiplexed in accordance with the frame sequential mode and representing the arrangement order of images in the time-multiplexed image to the multiplexing information generating unit 522 and the encoder 523.

In Step S545, the multiplexing information generating unit 522, based on the information that is supplied from the multiplexing unit 521, generates the information and the like as whole multiplexing information and supplies the generated whole multiplexing information to the transmission unit 524.

In Step S546, the compatible encoder 531 encodes the multiplexed image of the compatible images that is included in the time-multiplexed image input based on the information supplied from the multiplexing unit 521 by the encoder 523 in accordance with the existing AVC mode.

In Step S547, the auxiliary encoder 532 encodes the multiplexed image of the auxiliary images, the multiplexed image of the parallax images of the compatible images, and the multiplexed image of the parallax images of the auxiliary images that are included in the time-multiplexed image that is input based on the information supplied from the multiplexing unit 521 by the encoder 523 in accordance with the 3DV mode. The encoder 523 supplies a bit stream that is formed from encoded data of the time-multiplexed image that is acquired as a result of the encoding process of Steps S546 and S547 to the transmission unit 524.

In Step S548, the transmission unit 524 generates a TS from the bit stream supplied from the encoder 523, the auxiliary information, and the whole multiplexing information supplied from the multiplexing information generating unit 522 and transmits the generated TS. This TS, for example, is recorded on a BD or the like or is transmitted as a broadcast stream. Then, the process ends.

As above, the encoding device 520 generates one bit stream from encoded data of the multiplexed image of the compatible images, the multiplexed image of the auxiliary images, the multiplexed image of the parallax images of the compatible images, and the multiplexed image of the parallax images of the auxiliary images. Accordingly, a decoding device that includes a decoder that can decode only one bit stream can decode the bit stream that is generated by the encoding device 520.

In the description presented above, although the parallax images of the compatible images, the auxiliary images and the parallax images of the auxiliary images have been described to be encoded in accordance with the 3DV mode that is compliant with the encoding mode of the compatible images, the images may be encoded in accordance with MPEG2 (Moving Picture Experts Group phase 2) or the like that is not compliant with an encoding mode of compatible images.

[Configuration Example of Decoding Device]

Figure 83:
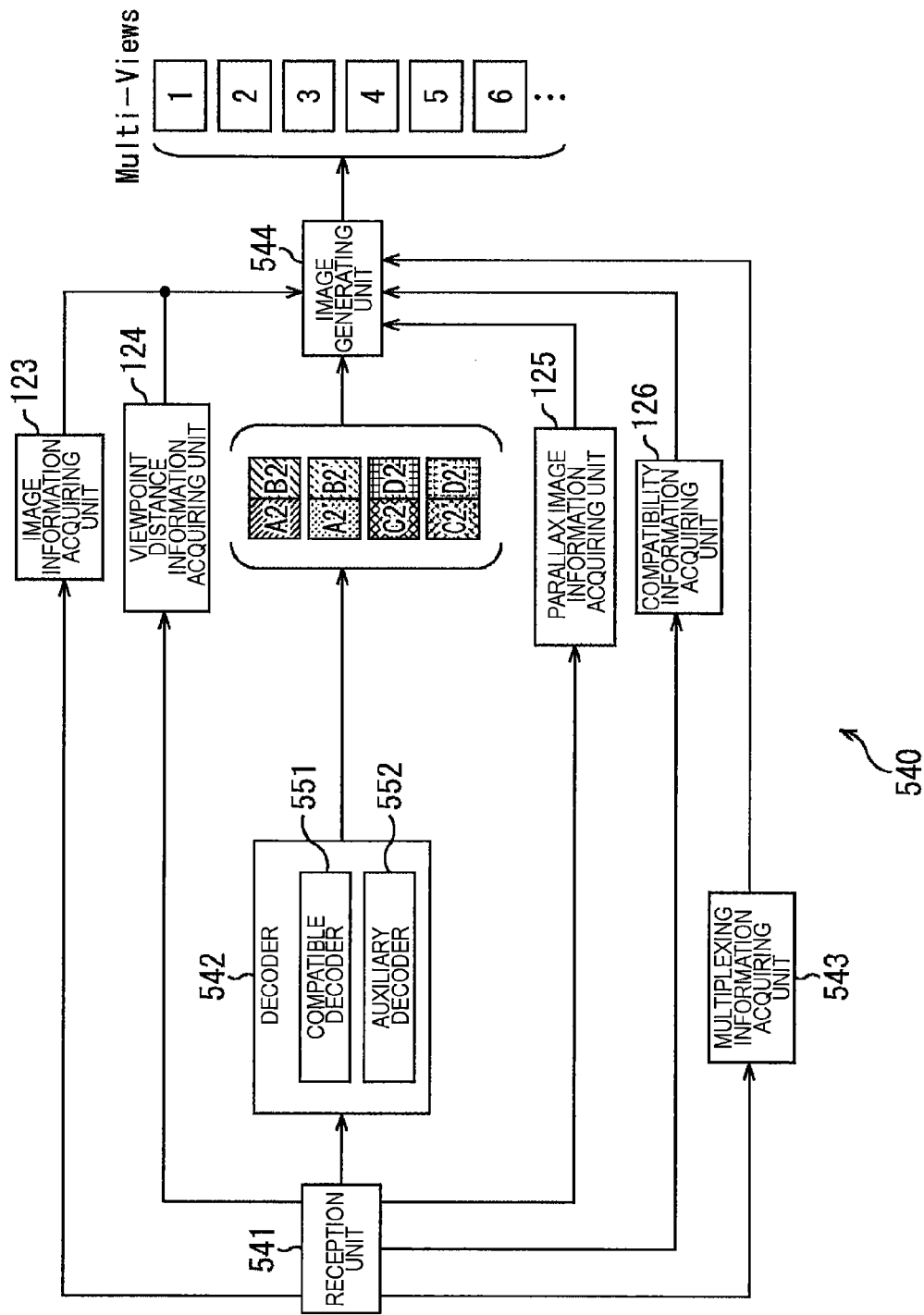
FIG. 83 is a diagram that illustrates a configuration example of a decoding device that corresponds to the encoding device illustrated in FIG. 80.

FIG. 83 is a diagram that illustrates a configuration example of a decoding device that decodes the TS transmitted from the encoding device 520 illustrated in FIG. 80.

In the configuration illustrated in FIG. 83, the same reference numeral is assigned to a configuration that is the same as that illustrated in FIG. 18. Duplicate description will not be presented as is appropriate.

The configuration of the decoding device 540 illustrated in FIG. 83 is mainly different from the configuration illustrated in FIG. 18 in that a reception unit 541, a decoder 542, and an image generating unit 544 are disposed instead of the separation unit 121, the decoder 122, and the image generating unit 171, and a multiplexing information acquiring unit 543 is newly arranged. The decoding device 540 decodes a bit stream of a time-multiplexed image that is included in a TS transmitted from the encoding device 520, generates images of two viewpoints or multi-viewpoint images, and displays the generated images on a display device not illustrated in the figure.

More specifically, the reception unit 541 of the decoding device 540 receives a TS that is transmitted from the encoding device 520. The reception unit 541 extracts a bit stream of a time-multiplexed image that is included in the TS and supplies the bit stream to the decoder 542. In addition, the reception unit 541 extracts auxiliary information that is included in the TS and supplies image information that is included in the auxiliary information to the image information acquiring unit 123 and supplies viewpoint distance information to an inter-viewpoint distance information acquiring unit 124. Furthermore, the reception unit 541 supplies parallax image information included in the auxiliary information to a parallax image information acquiring unit 125 and supplies compatibility information to a compatibility information acquiring unit 126. In addition, the reception unit 541 extracts whole multiplexing information that is included in the TS and supplies the extracted whole multiplexing information to the multiplexing information acquiring unit 543.

The decoder 542 is configured by a compatible decoder 551 and an auxiliary decoder 552. The compatible decoder 551 of the decoder 542 decodes encoded data of a multiplexed image of compatible images that is included in the bit stream supplied from the reception unit 541 in accordance with a mode that corresponds to the AVC mode and supplies the decoded data to the image generating unit 544.

The auxiliary decoder 552 decodes encoded data of a multiplexed image of auxiliary images, a multiplexed image of the parallax images of compatible images, and a multiplexed image of the parallax images of the auxiliary images, which is included in the bit stream supplied from the reception unit 541, in accordance with a mode that corresponds to the decoding mode of the auxiliary encoder 532 illustrated in FIG. 80. The auxiliary decoder 552 supplies the multiplexed image of the auxiliary images, the multiplexed image of the parallax images of the compatible images, and the multiplexed image of the parallax images of the auxiliary images, which are acquired as a result of the decoding process, to the image generating unit 544.

The multiplexing information acquiring unit 543 acquires the whole multiplexing information that is supplied from the reception unit 541 and supplies the acquired whole multiplexing information to the image generating unit 544.

The image generating unit 544 outputs an image in accordance with a viewer's display instruction, thereby displaying the image on a display device not illustrated in the figure. More specifically, the image generating unit 544, in accordance with a viewer's instruction for displaying a 3D image of the multi-viewpoint system, generates images of three or more viewpoints, which correspond to a display device not illustrated in the figure, each having the resolution that is a half of the resolution of the compatible image or the auxiliary image by using the multiplexed image of the compatible images, the multiplexed image of the auxiliary images, the multiplexed image of the parallax images of the compatible images, and the multiplexed image of the parallax images of the auxiliary images based on the image information supplied from the image information acquiring unit 123, the inter-viewpoint distance information supplied from the inter-viewpoint distance information acquiring unit 124, the parallax image information supplied from the parallax image information acquiring unit 125, the compatibility information supplied from the compatibility information acquiring unit 126, the whole multiplexing information supplied from the multiplexing information acquiring unit 543, and the like.

Described in more detail, the image generating unit 544 identifies the multiplexed image of the auxiliary image, the multiplexed image of the parallax image of the compatible image, and the multiplexed image of the parallax image of the auxiliary image, which are supplied from the auxiliary decoder 552, based on the whole multiplexing information supplied from the multiplexing information acquiring unit 543. In addition, the image generating unit 544, similarly to the image generating unit 171 illustrated in FIG. 18, separates the parallax image of each auxiliary image from the multiplexed image of the parallax images of the auxiliary images based on the information that represents the multiplexing mode of the parallax image of the auxiliary image that is included in the parallax image information supplied from the parallax image information acquiring unit 125. Furthermore, the image generating unit 544, similarly to the image generating unit 171, separates the parallax image of each compatible image from the multiplexed image of the parallax images of the compatible images based on the information that represents the multiplexing mode of the parallax images of the compatible images that is included in the parallax image information.

Furthermore, the image generating unit 544, similarly to the image generating unit 171, separates each auxiliary image from the multiplexed image of the auxiliary images based on the information that represents the multiplexing mode of the auxiliary images that is included in the image information supplied from the image information acquiring unit 123. In addition, the image generating unit 544, similarly to the image generating unit 171, separates each compatible image from the multiplexed image of the compatible images based on the information that represents the multiplexing mode of the compatible images that is included in the image information.

In addition, the image generating unit 544, similarly to the image generating unit 171, determines the position of each viewpoint of the multi-viewpoint images to be generated based on the inter-viewpoint distance information and the number of viewpoints that corresponds to a display device not illustrated in the figure. Then, the image generating unit 544, similarly to the image generating unit 171, generates an image of each viewpoint of which the position is determined by using each compatible image, each auxiliary image, the parallax image of each compatible image, and the parallax image of each auxiliary image. Then, the image generating unit 544 converts the resolution of the generated multi-viewpoint images to the resolution that is "1/the number of viewpoints" of the resolution of the compatible image or the auxiliary image, synthesizes the converted images, and displays the synthesized image on a display device not illustrated in the figure.

At this time, the multi-viewpoint images after the synthesis are displayed such that the viewing angles are different for each viewpoint, and a viewer can view a 3D image without wearing glasses by seeing images of arbitrary two viewpoints with his left and right eyes.

In addition, the image generating unit 544, similarly to the image generating unit 171, separates the multiplexed image of the compatible images that is supplied from the decoder 542 into images A2 and B2 of which the resolution is a half of the resolution of the compatible image based on the image information supplied from the image information acquiring unit 123 in accordance with an instruction for displaying a 3D image of the two-viewpoint mode that is supplied from a viewer. Then, the image generating unit 544, similarly to the image generating unit 171, alternately outputs the separated images A2 and B2 of which the resolution is a half of the resolution of the compatible image, thereby displaying the separated images on a display device not illustrated in the figure. At this time, the viewer can view a 3D image by wearing glasses in which one a left-eye shutter and a right-eye shutter is open at the time of displaying the image A2, and the other is open at the time of displaying the image B2 and viewing the images A2 and B2 that are alternately displayed on the display device.

[Description of Process of Decoding Device]

Figure 84:
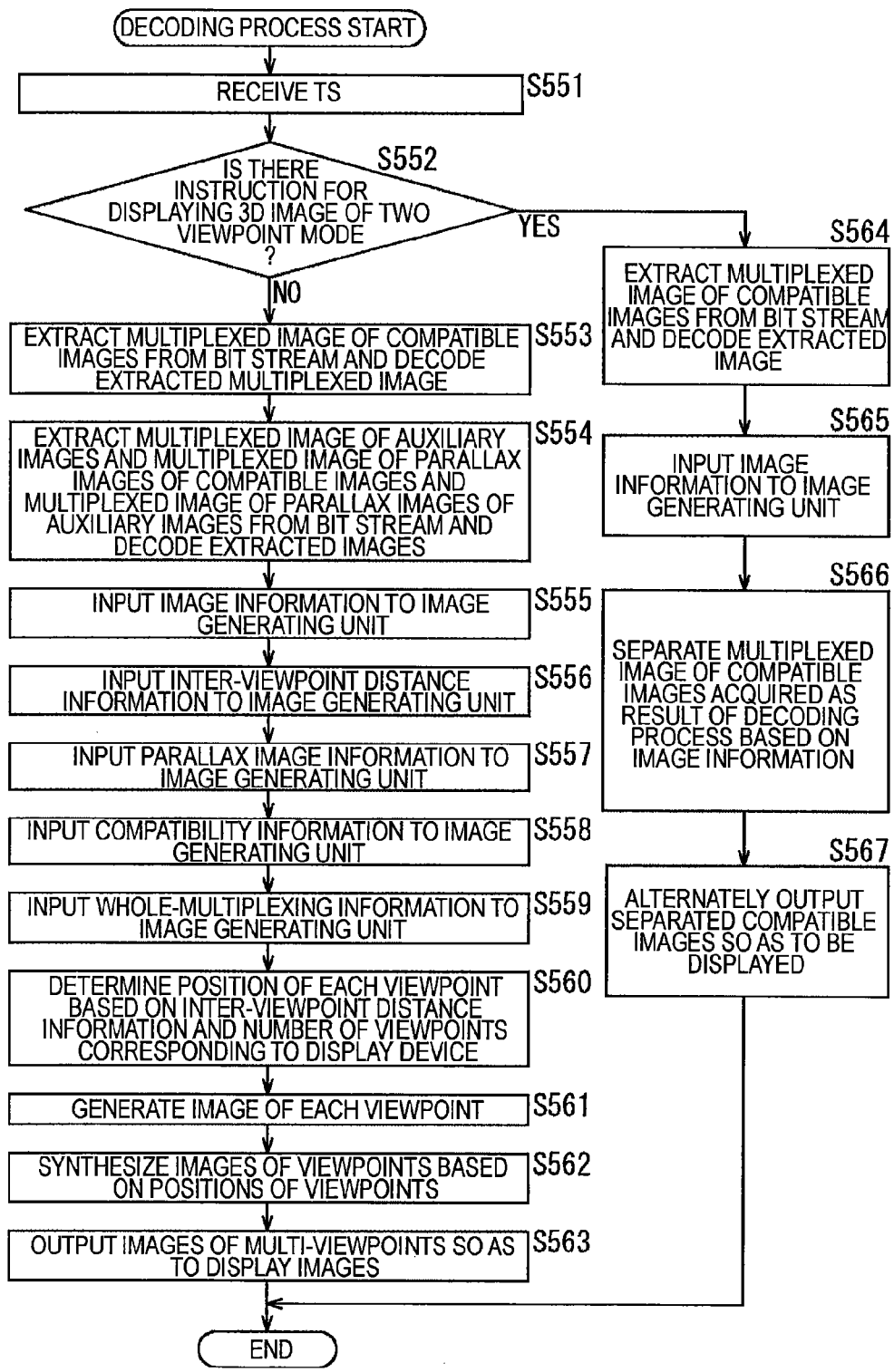
FIG. 84 is a flowchart that illustrates the decoding process performed by the decoding device illustrated in FIG. 83.

FIG. 84 is a flowchart that illustrates a decoding process performed by the decoding device 540 illustrated in FIG. 83. This decoding process, for example, is started when a TS that is transmitted from the encoding device 520 illustrated in FIG. 80 is input to the decoding device 540.

In Step S551 illustrated in FIG. 84, the reception unit 541 of the decoding device 540 receives a TS that is transmitted from the encoding device 520. The reception unit 541 extracts a bit stream included in the TS and supplies the extracted bit stream to the decoder 542. In addition, the reception unit 541 extracts auxiliary information that is included in the TS, supplies image information included in the auxiliary information to the image information acquiring unit 123, and supplies viewpoint distance information to the inter-viewpoint distance information acquiring unit 124. Furthermore, the reception unit 541 supplies parallax image information included in the auxiliary information to the parallax image information acquiring unit 125 and supplies compatibility information to the compatibility information acquiring unit 126. In addition, the reception unit 541 extracts whole multiplexing information that is included in the TS and supplies the extracted whole multiplexing information to the multiplexing information acquiring unit 543.

In Step S552, similarly to the process of Step S92 illustrated in FIG. 19, the image generating unit 544 determines whether or not an instruction for displaying a 3D image of the two-viewpoint mode has been made by a viewer. In a case where it is determined that the instruction for displaying a 3D image of the two-viewpoint mode has not been made by the viewer in Step S552, in other words, in a case where an instruction for displaying a 3D image of the multi-viewpoint mode has been made, the process proceeds to Step S553.

In Step S553, the compatible decoder 551 of the decoder 542 extracts encoded data of the multiplexed image of the compatible images from the bit stream that is supplied from the reception unit 541 and encodes the extracted encoded data in a mode that corresponds to the AVC mode. Then, the compatible decoder 551 supplies a multiplexed image of the compatible images that is acquired as a result of the decoding process to the image generating unit 544.

In Step S554, the auxiliary decoder 552 extracts encoded data of the multiplexed image of the auxiliary images, the multiplexed image of the parallax images of the compatible images, and the multiplexed image of the parallax images of the auxiliary images from the bit stream that is supplied from the reception unit 541 and decodes the extracted encoded data in a mode that corresponds to the auxiliary encoder 532 illustrated in FIG. 80. The auxiliary decoder 552 supplies the multiplexed image of the auxiliary images, the multiplexed image of the parallax images of the compatible images, and the multiplexed image of the parallax images of the auxiliary images, which are acquired as a result of the decoding process, to the image generating unit 544, and the process proceeds to Step S555.

The process of Steps S555 to S558 is the same as that of Steps S95 to S98 illustrated in FIG. 19, and thus description thereof will not be presented.

After the process of Step S558, in Step S559, the multiplexing information acquiring unit 543 acquires the whole multiplexing information that is supplied from the reception unit 541 and inputs the acquired whole multiplexing information to the image generating unit 544.

In Step S560, the image generating unit 544, similarly to the process of Step S99 illustrated in FIG. 19, determines the position of each viewpoint of multi-viewpoint images to be generated based on the inter-viewpoint distance information supplied from the inter-viewpoint distance information acquiring unit 124 and the number of viewpoints that corresponds to a display device not illustrated in the figure.

In Step S561, the image generating unit 544 generates an image of each viewpoint of which the resolution is a half of the resolution of the compatible image or the auxiliary image by using the multiplexed image of the compatible images, the multiplexed image of the auxiliary images, the multiplexed image of the parallax images of the compatible images, and the multiplexed image of the parallax images of the auxiliary images based on the position of each viewpoint that is determined in Step S560, the image information supplied from the image information acquiring unit 123, the parallax image information supplied from the parallax image information acquiring unit 125, the compatibility information supplied from the compatibility information acquiring unit 126, the whole multiplexing information supplied from the multiplexing information acquiring unit 543, and the like. Then, the process proceeds to Step S562.

The process of Steps S562 to S567 is the same as that of Steps S101 to S106 illustrated in FIG. 19, and thus description thereof will not be presented. However, in the process of Step S564, the compatible decoder 551 extracts a multiplexed image of the compatible images not from the compatible stream but from the bit stream that is supplied from the reception unit 541.

In addition, in a decoding device that can decode only a compatible image that has compatibility with the decoding device 540, encoded data other than the encoded data of the compatible images that can be processed is ignored, and the process of Steps S564, S566, and S567 is performed. However, in such a case, in the process of Step S566, a multiplexed image of the compatible images is separated in accordance with a multiplexing mode that is determined in advance.

As above, the decoding device 540 can decode one bit stream that is generated from the encoded data of the multiplexed image of the compatible images, the multiplexed image of the auxiliary images, the multiplexed image of the parallax images of the compatible images, and the multiplexed image of the parallax images of the auxiliary images.

<Another Example of Bit Stream According to Fifth Embodiment>
[Another Configuration Example of Bit Stream]

Figure 85:
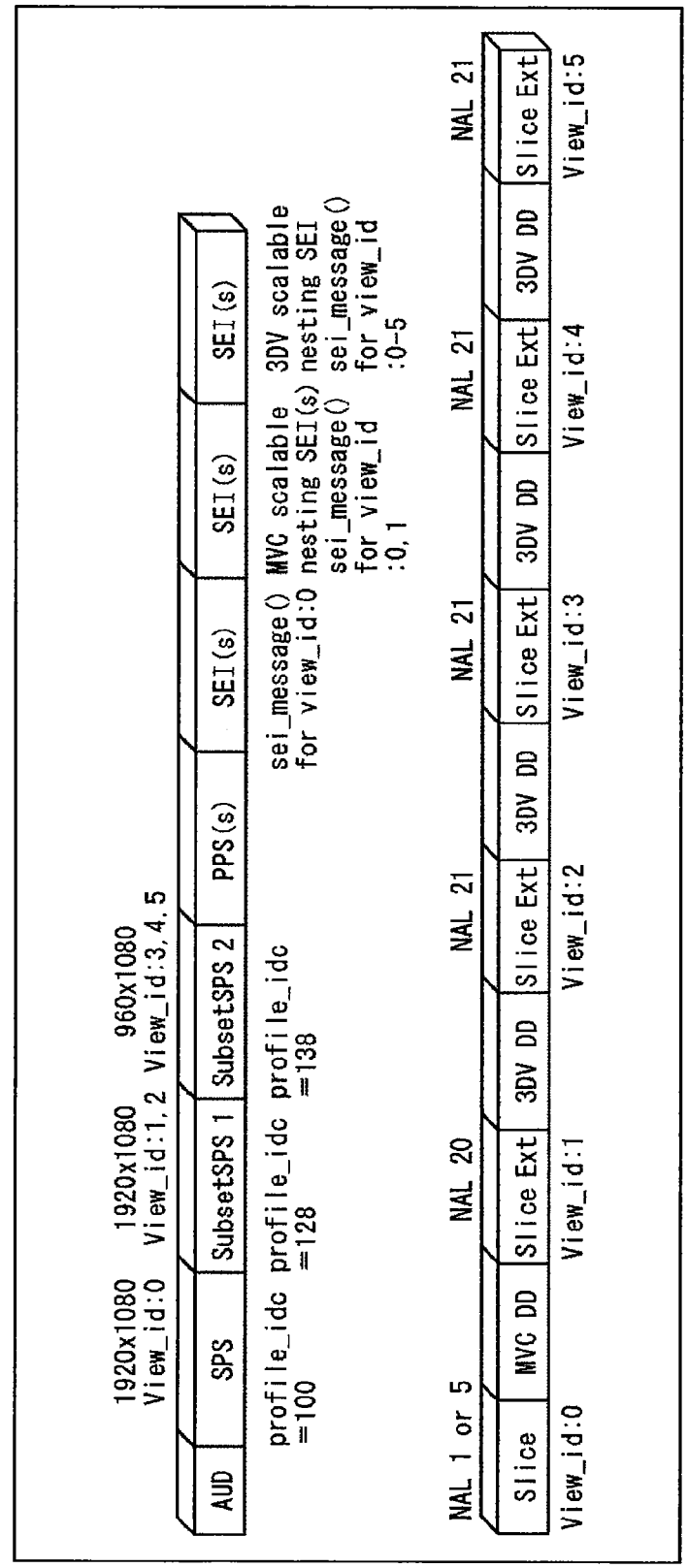
FIG. 85 is another configuration example of the bit stream.

FIG. 85 is a diagram that illustrates another configuration example of the bit stream in units of access units that is generated in accordance with the fifth embodiment.

In the example illustrated in FIG. 85, the compatible images are an L image and an R image of 1920×1080 pixels, and the auxiliary image is an O image of 1920×1080 pixels. In addition, the size of the L parallax image, the R parallax image, and the O parallax image is 960×1080 pixels. Furthermore, the L image is encoded in accordance with the AVC mode, the R image is encoded in accordance with the MVC mode, and the O image, the L parallax image, the R parallax image, and the O parallax image are encoded in according with the 3DV mode. In addition, the view IDs of the L image, the R image, the O image, the L parallax image, the R parallax image, and the O parallax image are 0, 1, 2, 3, 4, and 5, respectively. Here, the view ID is an ID that is unique to the image of each viewpoint and the parallax image.

As illustrated in FIG. 85, in the bit stream in units of access units, for example, an access unit delimiter (AUD), an SPS, a Subset SPS (Subset SPS1) according to the MVC mode for an image, a Subset SPS (Subset SPS2) according to the 3DV mode for a parallax image, a PPS, SEI according to the AVC mode, SEI according to the MVC mode, SEI according to the 3DV mode, and an NAL unit of encoded data are arranged in order from the head.

The NAL unit of the access unit delimiter is an NAL unit that represents a boundary of an access unit. The NAL unit of the SPS is an NAL unit of the SPS that includes a profile_idc (100 in the example illustrated in FIG. 85) that represents a profile of the L image out of profiles defined in accordance with the AVC mode. The NAL unit of the Subset SPS for an image is an NAL unit of the Subset SPS including profile_idc (128 in the example illustrated in FIG. 85) that represents profiles of the R image and the O image out of profiles defined in accordance with the MVC mode. The NAL unit of the Subset SPS for a parallax image is an NAL unit of the Subset SPS that includes profile_idc (138 in the example of FIG. 85) that represents profiles of the L parallax image, the R parallax image, and the O parallax image out of profiles defined as profiles for a parallax image in accordance with the 3DV mode.

The NAL unit of the SEI according to the AVC mode is an NAL unit of the SEI of the L image. The NAL unit of the SEI according to the MVC mode is an NAL unit of the SEI of the L image or the R image. The NAL unit of the SEI of the 3DV mode is an NAL unit of the SEI of the L image, the R image, the O image, the L parallax image, the R parallax image, or the O parallax image.

As NAL units of the encoded data, NAL units of encoded data of an L image, a delimiter (MVC DD), encoded data of an R image, a delimiter (3DV DD), encoded data of an O image, a delimiter (3DV DD), encoded data of an L parallax image, a delimiter (3DV DD), encoded data of an R parallax image, a delimiter (3DV DD), encoded data of an O parallax image are arranged in order from the head.

In the NAL unit of the encoded data of the L image, an NAL header that includes 1 or 5 as the type of the NAL unit is added. In addition, the NAL unit of the delimiter (MVC DD) is an NAL unit that represents a head of the encoded data of the MVC mode. In the NAL unit of the encoded data of the R image, an NAL head that includes 20 as the type of the NAL unit is added. In addition, the NAL unit of the delimiter (3DV DD) is an NAL unit that represents a head of the encoded data of the 3DV mode. Furthermore, in the NAL units of the encoded data of the O image, the L parallax image, the R parallax image, and the O parallax image, an NAL header that includes 21 as the type of the NAL unit is added.

[Example of Description of Subset SPS According to 3DV Mode for Parallax Image]

FIG. 86 is a diagram that illustrates an example of the description of a Subset SPS according to the 3DV mode for a parallax image illustrated in FIG. 85.

As illustrated in FIG. 86, in a Subset SPS of the 3DV mode for a parallax image, SPS (seq_parameter_set_data) that includes profile_idc (138 in the example illustrated in FIG. 86) representing the profiles of the L parallax image, the R parallax image, and the O parallax image and information for each profile_idc that is defined in accordance with the 3DV mode are described.

More specifically, in the Subset SPS of the 3DV mode for a parallax image, as information when profile_idc is 138, extension information (seq_parameter_set_depth_extension) for a parallax image, a VUI information flag (depth_vui_parameters_present_flag) for a parallax image that represents whether or not VUI extension information for a parallax image is included and the like are described. In addition, in a case where the VUI information flag for a parallax image represents that the VUI extension information for a parallax image is included, VUI extension information (depth_vui_parameters_extension) for a parallax image is also described.

In addition, in a case where the Subset SPS of the 3DV mode for a parallax image is referred to in a decoding process, in other words, in a case where the L parallax image, the R parallax image, and the O parallax image are decoded, similarly to a case where an IDR picture is decoded, the reference image is reset.

FIG. 87 is a diagram that illustrates an example of the description of extension information for a parallax image that is illustrated in FIG. 86.

As illustrated in FIG. 87, the extension information for a parallax image, similarly to the extension information (seq_parameter_set_mvc_extension) within the Subset SPS of the MVC mode, is formed by described information and a view ID (ref_view_id) of an image corresponding to each parallax image.

In FIG. 87, similarly to the extension information within the Subset SPS of the MVC mode, the described information is expanded and is included in the extension information for a parallax image. Accordingly, the view ID (view_id) of each parallax view and the view ID of an image that corresponds to each parallax image can be described together for each parallax image. In other words, information (num_views_minus1) that represents the number of parallax images is described, and a description for reading out the view ID of a parallax image and the view ID of an image that corresponds to the parallax image can be made as many times as the number.

In contrast to this, similarly to the extension information within the Subset SPS of the MVC mode, in a case where the described information is not expanded and is included in the extension information for a parallax image, in addition to the extension information for a parallax image, information representing the number of parallax images is described, and a description for reading out a view ID of an image that corresponds to the parallax image needs to be made as many times as the number. As a result, the description of the information that represents the number of parallax images and the description for reading out the information as many times as the number overlap each other.

Accordingly, as illustrated in FIG. 87, similarly to the extension information within the Subset SPS of the MVC mode, in a case where the described information is expanded and is included in the extension information for a parallax image, the amount of data of the extension information for a parallax image can be less than that of a case where the information is not expanded and is included in the extension information for a parallax image.

FIG. 88 is a diagram that illustrates an example of the description of VUI extension information for a parallax image illustrated in FIG. 86.

As illustrated in FIG. 88, the VUI extension information for a parallax image is described in the same manner as the VUI extension information (mvc_vui_parameters_extension) of the MVC mode except for the following points. In other words, in the VUI information for a parallax image, for each pixel of a parallax image, a position type flag (depth_loc_info_present_flag) that represents whether or not a position type representing the type of a position of an image that corresponds to the parallax image is included and a before-conversion size information flag (video_src_info_present_flag) representing whether or not before-conversion size information representing the size of the parallax image before resolution conversion is included are included. In addition, in a case where the position type flag represents that the position type is included, the position type is also included in the VUI information for a parallax image, and, in a case where the before-conversion size information flag represents that the before-conversion size information is included, the before-conversion size information is also included in the VUI information for a parallax image.

The position type is formed by a top field position type (depth_sample_loc_type_top_field) and a bottom field position type (depth_sample_loc_type_bottom_field). The top field and bottom field position types are described similarly to the top field position type (chroma_sample_loc_type_top_field) and the bottom field position type (chroma_sample_loc_type_bottom_field) that are included in the VUI extension information of the MVC mode.

In addition, the before-conversion size information is configured by information (pic_width_in_mbs_minus1) that represents the number of macro blocks of the parallax image before resolution conversion in the horizontal direction, information (pic_height_in_mbs_minus1) that represents the number of macro blocks in the vertical direction, an aspect ratio flag (aspect_ratio_info_present_flag) that represents whether or not aspect information representing an aspect ratio is included, and the like. In a case where the aspect ratio flag represents that the aspect information is included, the aspect information is also included in the before-conversion size information.

The aspect information is formed by an aspect ratio ID (aspect_ratio_idc) that is an ID unique to an aspect ratio and the like. This aspect ratio IDs are assigned not only to aspect ratios that are defined in advance but also to all the aspect ratios that are not defined. In a case where an aspect ratio ID that is included in the aspect information is an aspect ratio ID (Extended_SAR) that is given to all the aspect ratios that are not defined, values (sar_width and sar_height) of the aspect ratio of the parallax image before resolution conversion in the horizontal and vertical directions are also included in the aspect information.

[Example of Description of NAL Header of Encoded Data of 3DV Mode]

FIG. 89 is a diagram that illustrates an example of the description of an NAL header of an NAL unit of encoded data according to the 3DV mode in which 21 is included as the type of the NAL unit.

As illustrated in FIG. 89, in the NAL header of the encoded data according to the 3DV mode, as information at a time when the type of the NAL unit is 21, a parallax image header extension information flag (depth_extension_flag) representing whether or not parallax image header extension information is included and the like is described. Here, the parallax image header extension information is described in the NAL header of the encoded data of the parallax image of the 3DV mode, and the parallax image header extension information flag is similar to the above-described parallax flag.

In a case where the parallax image header extension information flag represents that the parallax image header extension information is included, in the NAL header of the encoded data of the 3DV mode, the parallax image header extension information (nal_unit_header_depth_extension) is also described. On the other hand, in a case where the parallax image header extension information flag represents that the parallax image header extension information is not included, in the NAL header of the encoded data of the 3DV mode, MVC mode header extension information (nal_unit_header_mvc_extension) is also described.

FIG. 90 is a diagram that illustrates an example of the description of the parallax image header extension information illustrated in FIG. 89.

As illustrated in FIG. 90, the parallax image header extension information is configured to be the same as the MVC mode header extension information except that a view ID (ref_view_id) of an image corresponding to the parallax image is included.

[Example of Description of SEI According to 3DV Mode]

FIG. 91 is a diagram that illustrates an example of the description of SEI according to the 3DV mode illustrated in FIG. 85.

As illustrated in FIG. 91, in the SEI according to the 3DV mode, similarly to the SEI according to the MVC mode, a message of SEI is described.

In other words, in the SEI according to the 3DV mode, an operation point flag (operation_point_flag) representing whether or not an operation point is designated is described, and, in a case where the operation point flag represents that the operation point is not designated, an all-component flag (all_view_components_in_au_flag) representing whether or not the message of the SEI is adapted to all the images and the parallax images within the access unit is described. On the other hand, in a case where the all-component flag represents that the message of the SEI is not adapted to all the images and the parallax images within the access unit, the number (num_view_components_minus1) of view IDs and the view IDs (sei_view_id) of the images and the parallax images to which the message of the SEI is adapted are described.

On the other hand, in a case where the operation point flag represents that the operation point is designated, out of operation points to which the message of the SEI is adapted, view IDs (sei_op_view_id) of the images and the parallax images that are adaptation targets and the number (sei_op_temporal_id) of the operation points are described. Then, the message (sei_rbsp) of the SEI is described. In addition, in the SEI according to the 3DV mode, a plurality of messages of the SEI can be described. As the message of the SEI, the parallax information described above and the like are described.

In the example illustrated in FIG. 85, although the profiles of the R and O images are assumed to be the same, the profiles of the R and O images may be different from each other.

[Further Another Configuration Example of Bit Stream]

Figure 92:
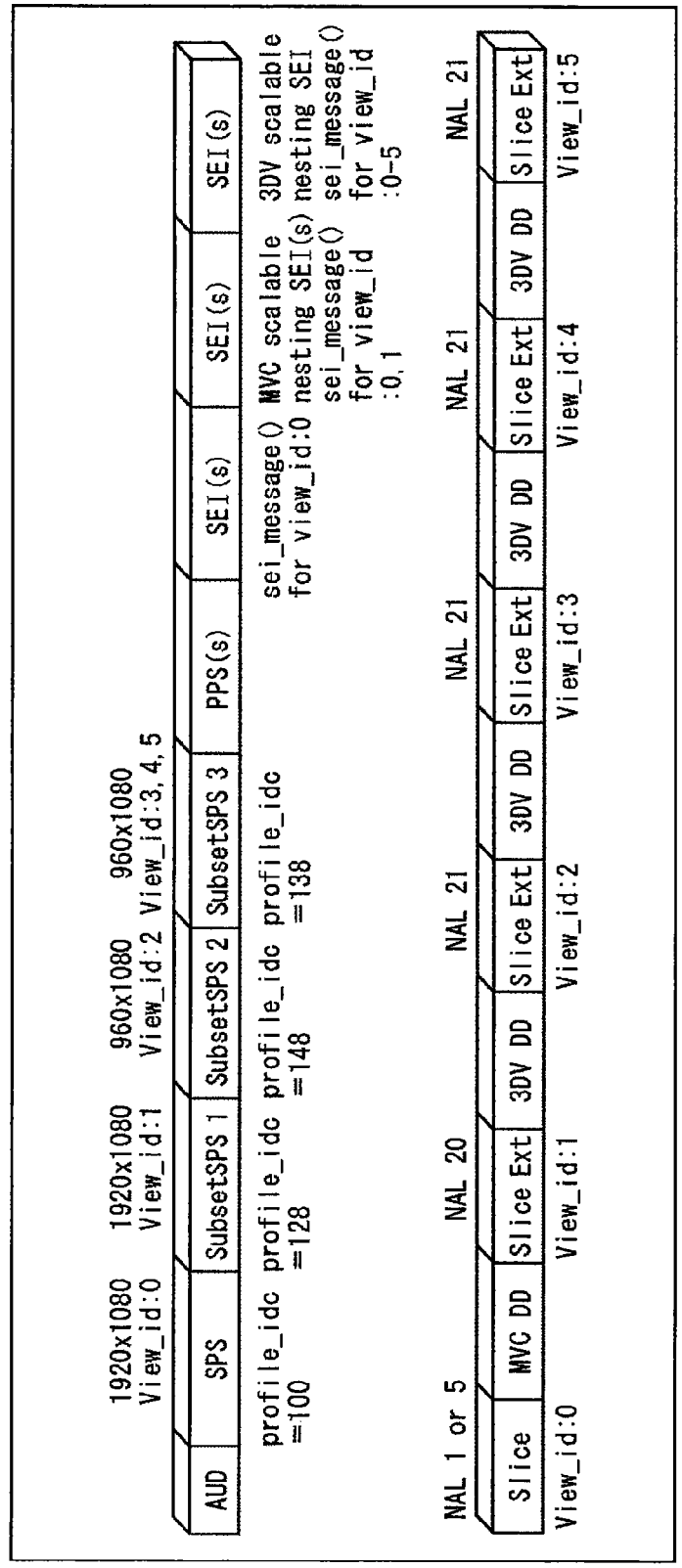
FIG. 92 is a diagram that illustrates further another configuration example of the bit stream.

FIG. 92 is a diagram that illustrates configuration example of the bit stream in units of access units in a case where profiles of the R and O images illustrated in FIG. 85 are different from each other.

The configuration of the bit stream illustrated in FIG. 92 is different from the configuration of the bit stream illustrated in FIG. 85 in that a Subset SPS according to the 3DV mode for an image other than the Subset SPS according to the MVC mode for an image and the Subset SPS according to the 3DV mode for a parallax image is arranged.

The NAL unit (Subset SPS1) of the Subset SPS according to the MVC mode for an image is an NAL unit of the Subset SPS that includes profile_idc (128 in the example illustrated in FIG. 92) representing the profile of the R image out of profiles defined in the MVC mode. The NAL unit of the Subset SPS (Subset SPS2) according to the 3DV mode for an image is an NAL unit of the Subset SPS that includes profile_idc (148 illustrated in the example of FIG. 92) representing the profile of the O image out of profiles defined as profiles for an image in the 3DV mode. The NAL unit of the Subset SPS (Subset SPS3) for a parallax image is an NAL unit of the Subset SPS that includes profile_idc (138 illustrated in the example of FIG. 92) representing the profiles of the L parallax image, the R parallax image, and the O parallax image out of profiles defined as profiles for a parallax image in the 3DV mode.

[Example of Description of Subset SPS According to 3DV Mode for Image]

FIG. 93 is a diagram that illustrates an example of the description of Subset SPS according to the 3DV mode for an image that is illustrated in FIG. 92.

As illustrated in FIG. 93, in the Subset SPS according to the 3DV mode for an image, SPS (seq_parameter_set_data) that includes profile_idc (148 in the example illustrated in FIG. 93) representing the profile of the image O and information for each profile_idc that is defined in the 3DV mode are described.

More specifically, in the Subset SPS according to the 3DV mode for an image, similarly to the Subset SPS according to the MVC mode as information at a time when profile_idc is 148, the extension information (seq_parameter_set_mvc_extension) according to the MVC mode, the VUI information flag (mvc_vui_parameters_present_flag) according to the MVC mode that represents whether or not the VUI extension information according to the MVC mode is included, and the like are described. In addition, in a case where the VUI information flag according to the MVC mode represents that the VUI extension information according to the MVC mode is included, the VUI extension information (mvc_vui_parameters_extension) according to the MVC mode is also described. Furthermore, as the information at a time when profile_idc is 138, information similar to that illustrated in FIG. 86 is described.

In the fifth embodiment, although the 3DV mode is assumed to be a mode used for encoding a display image according to a multi-viewpoint mode that is compliant with the AVC mode or the MVC mode, the 3DV mode may be a mode for encoding a display image according to a multi-viewpoint mode that is compliant with an HEVC (High Efficiency Video Coding) mode. A bit stream of such a case will be described as below. In this specification, it is assumed that the HEVC mode is based on HEVC Working Draft: Thomas Wiegand, Woo-jin Han, Benjamin Bross, Jens-Rainer Ohm, Gary J. Sullivian, "WD3: Working Draft3 of High-Efficiency Video Coding", JCTVc-E603_d5 (version5), written on May 20, 2011.

<Bit Stream in Case where 3DV Mode is Mode that is Compliant with HEVC Mode>

[Configuration Example of Bit Stream]

Figure 94:
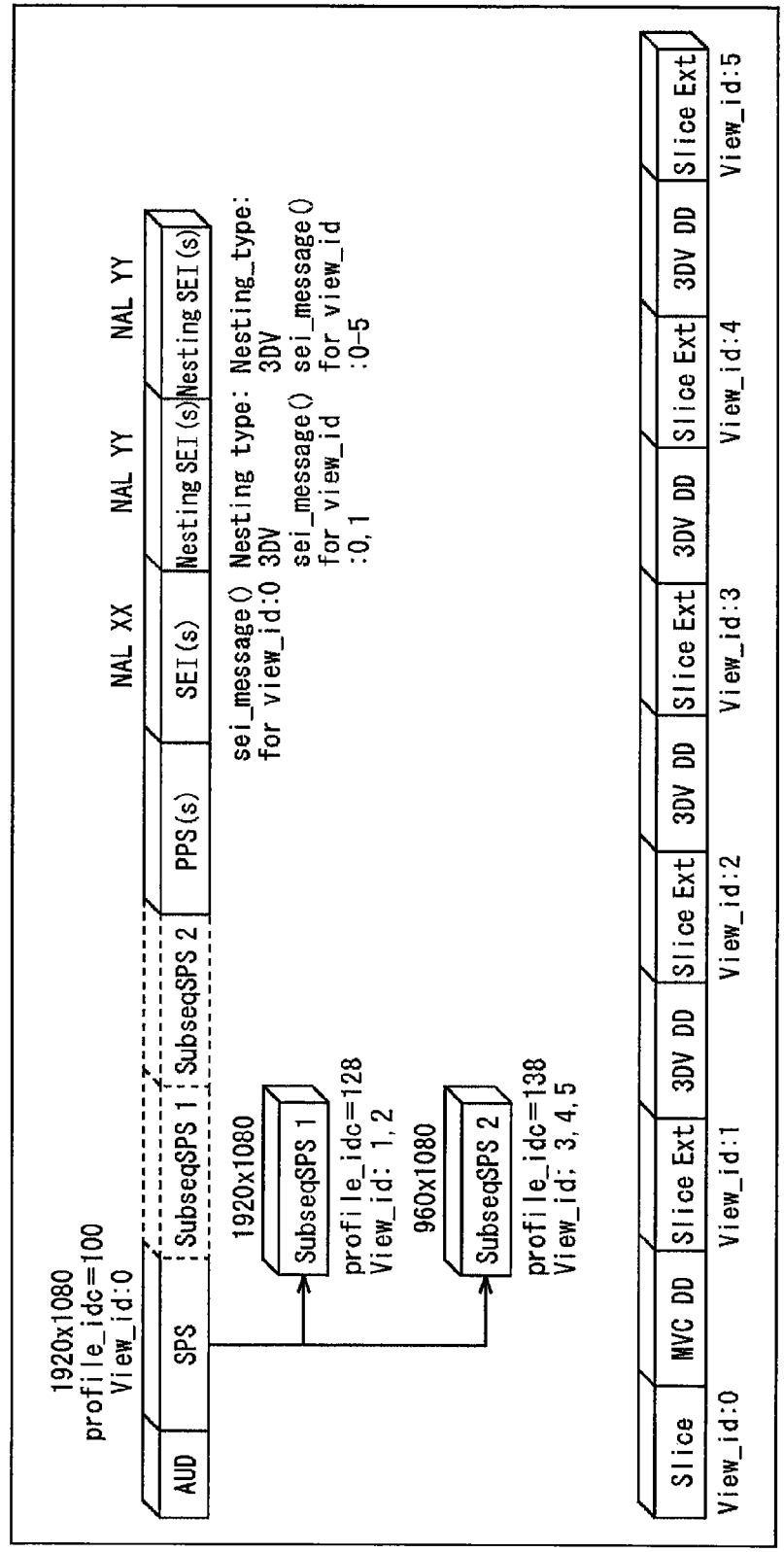
FIG. 94 is a diagram that illustrates a configuration example of a bit stream in a case where the 3DV mode is a mode that is compliant with an HEVC mode.

FIG. 94 is a diagram that illustrates a configuration example of a bit stream in units of access units in a case where the 3DV mode is a mode that is compliant with the HEVC mode.

In the example illustrated in FIG. 94, it is assumed that the L viewpoint image, the R viewpoint image, and the O viewpoint image as in the example illustrated in FIG. 85 are encoding targets, the L image is encoded in accordance with the AVC mode, and the L parallax image, the R viewpoint image, and the O viewpoint image are encoded in accordance with the 3DV mode.

The bit stream illustrated in FIG. 94 is different from the bit stream illustrated in FIG. 85 in that the Subset SPS (Subset SPS1) according to the 3DV mode for an image and the Subset SPS (Subset SPS2) according to the 3DV mode for a parallax image can be described within the SPS, and NAL headers including mutually-different types of the NAL units are added to the NAL units of the SEI according to the HEVC mode and the SEI according to the 3DV mode.

In the bit stream illustrated in FIG. 94, the Subset SPS according to the 3DV mode for an image and the Subset SPS according to the 3DV mode for a parallax image may be described only within the SPS, may be described separated from the SPS, or may be described in the SPS and described separated from the SPS. Here, the description of the Subset SPS according to the 3DV mode for an image and the Subset SPS according to the 3DV mode for a parallax image separated from the SPS is compliant with the BD standard and is appropriate for a case where the encoded data according to the HEVC mode and the encoded data according to the 3DV mode are generated as ES (elementary streams) different from each other.

In the bit stream illustrated in FIG. 94, since the types of the NAL units that are included in the NAL headers added to the NAL unit of the SEI according to the HEVC mode and the NAL unit of the SEI according to the 3DV mode are different from each other, an NAL unit of the SEI according to the HEVC mode or the SEI according to the 3DV mode can be easily extracted in a decoding process.

[Example of Description of SPS]

FIG. 95 is a diagram that illustrates an example of the description of SPS illustrated in FIG. 94.

The description of the SPS illustrated in FIG. 95 is the same as the description of the SPS according to the HEVC mode in which a Subset SPS information flag (subset_seq_present_flag) representing whether or not information of the Subset SPS is included is described, and the information of the Subset SPS is described in a case where the Subset SPS information flag represents that the information of the Subset SPS is included.

As illustrated in FIG. 95, the information of the Subset SPS includes the number (num_subset_seq) of Subset SPS and a Subset SPS flag (subset_seq_info_present_flag) that represents whether or not the Subset SPS is included. In addition, in a case where the Subset SPS flag represents that the Subset SPS is included, the Subset SPS (subset_seq_parameter_set_data) is also included in the information of the Subset SPS.

As above, since the number of Subset SPS is described as the information of the Subset SPS, it can be recognized whether or the Subset SPS is present by only reading out the description of the SPS in the decoding process. In addition, since the Subset SPS flag is described, the Subset SPS can be described separated from the SPS without being described within the SPS, whereby duplicate on the description of the Subset SPS can be prevented.

[Example of Description of Subset SPS]

FIG. 96 is a diagram that illustrates an example of the description of the Subset SPS illustrated in FIG. 95.

The description of the Subset SPS illustrated in FIG. 96 is the same as the description of the SPS according to the HEVC mode except that images to which the Subset SPS is adapted, the number (num_subset_seq_views) of view IDs of parallax images, a parallax image flag (depth_extension_flag) that represents whether or not the adaptation target of the Subset SPS is a parallax image, and an invalidness flag (seq_param_override_flag) that represents whether or not the SPS is invalidated at the time of adapting the Subset SPS are described.

In a case where the parallax image flag represents that the adaptation target of the Subset SPS is a parallax image, a view ID (ref_view_id) of an image that corresponds to the parallax image that is the adaption target is described in the Subset SPS. In addition, in a case where the invalidness flag represents that the SPS is invalidated at the time of adapting the Subset SPS, similarly to the SPS, information (subset_seq_profile_idc) that represents profiles and the like are described in the Subset SPS.

Of the descriptions of the Subset SPS, as descriptions similar to the descriptions of the SPS, for example, there are information (subset_seq_frame cropping flag) that represents whether or not an adapted image and a parallax image are cropped, a VUI information flag (subset_seq_vui_parameters_present_flag) that represents whether or not the VUI information (subset_seq_vui_parameters) is included, and the like. In a case whether VUI information flag represents that the VUI information is included, similarly to the SPS, the VUI information is also described. On the other hand, in a case where the VUI information flag represents that the VUI information is not included, similarly to the SPS, the VUI information is not described. In such a case, the VUI information of the SPS is adapted as the VUI information.

[Example of Description of VUI Information of Subset SPS]

FIG. 97 is a diagram that illustrates an example of the description of the VUI information of the Subset SPS illustrated in FIG. 96.

The description of the VUI information of the Subset SPS illustrated in FIG. 97 is the same as the description of the VUI information of the SPS according to the HEVC mode except that a before-conversion size information flag (video_src_info_present_flag) representing whether or not before-conversion size information that is an adaptation target is included is described.

In a case where the before-conversion size information flag represents that the before-conversion size information of an adaption target is included, the before-conversion size information is described in the VUI information illustrated in FIG. 97. In other words, information (src_pic_width_in_mbs_minus1) that represents the number of macro blocks of the adaptation target before resolution conversion in the horizontal direction, information (src_pic_height_in_mbs- _minus1) that represents the number of macro blocks in the vertical direction, an aspect ratio flag (src_aspect_ratio_info_present_flag) that represents whether or not aspect information representing an aspect ratio is included, and the like are described.

In a case where the aspect ratio flag represents that the aspect information is included, the aspect information that is formed by an aspect ratio ID (src_aspect_ratio_idc) and the like are also included in the before-conversion size information. In a case where the aspect ratio ID included in the aspect information is an aspect ratio ID (Extended_SAR) given to all the aspect ratios that are not defined, values (sar_width and sar_height) of the aspect ratio of the adaption target before resolution conversion in the horizontal and vertical directions are also included in the aspect information.

In addition, in the VUI information of the Subset SPS illustrated in FIG. 97, points different from those of the VUI information of the SPS may be described. In such a case, for information that is not described in the VUI information of the Subset SPS, information that is included in the VUI information of the SPS is applied.

[Example of Description of SEI]

FIG. 98 is a diagram that illustrates an example of the description of the SEI according to the 3DV mode that is illustrated in FIG. 94.

The description of the SEI according to the 3DV mode illustrated in FIG. 98 is the same as the description of the SEI message of the type of the SEI message except that the type (nesting_type) of the SEI message, an all-component flag (all_view_components_in_au_flag), and the like are described.

As the types of the SEI message, there are SEI message according to the MVC mode, SEI message according to the 3DV mode, SEI message defined by a user, and the like. In a case where the all-component flag represents that adaptation to all the images and the parallax images within the access unit is not performed, the number of view IDs (num_view_components_minus1) of the images and the parallax images to which the SEI message is adapted and view IDs (nesting_sei_view_id) corresponding to the number are also described in the SEI according to the 3DV mode.

Here, the bit stream (encoded stream) according to an embodiment other than the fifth embodiment may be also generated similarly to the bit stream illustrated with reference to FIGS. 85 to 98.

Tenth Embodiment

[Description of Computer to which Present Technology is Applied]

Next, a series of processes described above may be performed by either hardware or software. In a case where the series of processes is performed by software, a program configuring the software is installed to a general-purpose computer or the like.

Figure 99:
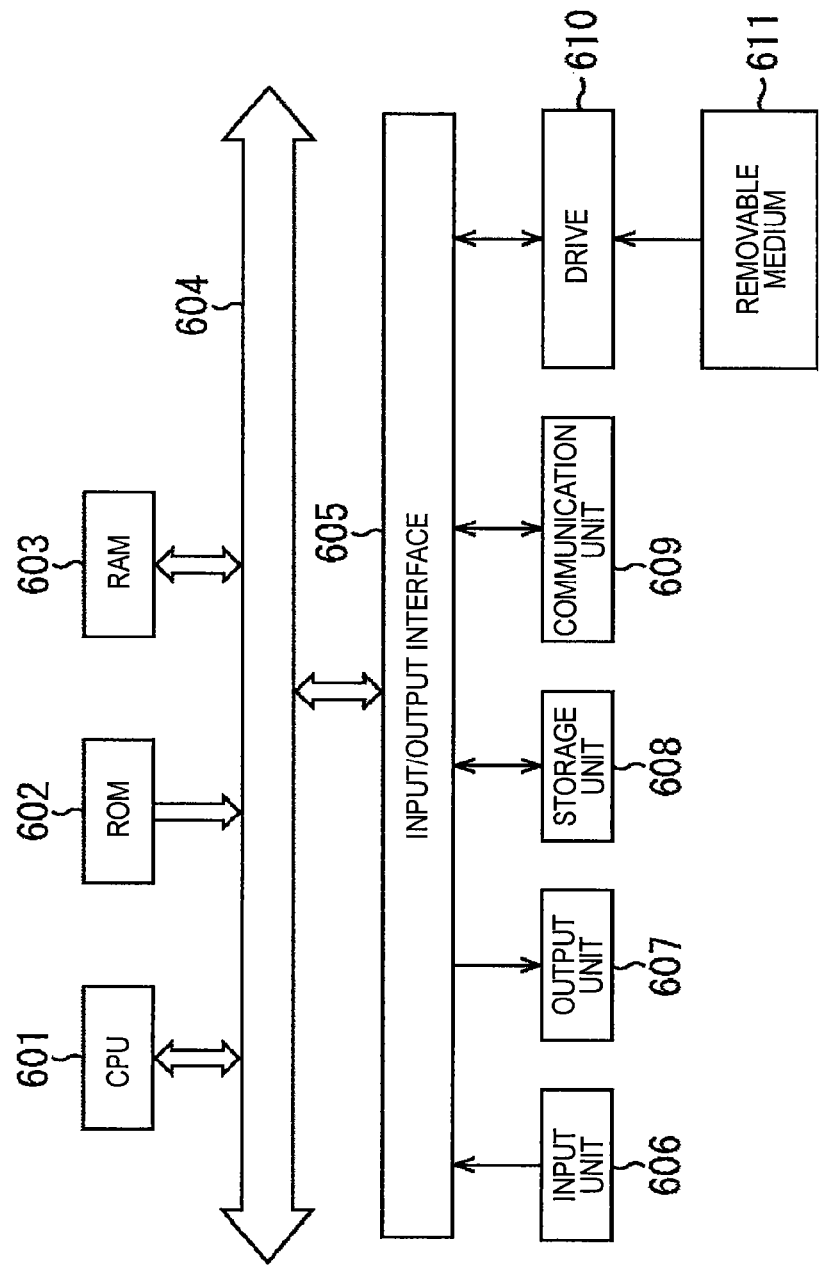
FIG. 99 is a diagram that illustrates a configuration example of a computer according to an embodiment.

FIG. 99 illustrates a configuration example of a computer according to an embodiment to which a program that executes the above-described series of processes is installed.

The program may be recorded in a storage unit 608 as a recording medium that is built in the computer or a ROM (Read Only Memory) 602 in advance.

Alternatively, the program may be stored (recorded) on a removable medium 611. Such removable medium 611 may be provided as so-called package software. Here, examples of the removable medium 611 include a flexible disk, a compact disc read only memory (CD-ROM), a magneto optical (MO) disk, a digital versatile disc (DVD), a magnetic disk, and a semiconductor memory.

In addition, instead of installing the program to the computer from the removable medium 611 as described above through a drive 610, the program may be downloaded into the computer through a communication network or a broadcast network and be installed to the storage unit 608 that is built therein. In other words, the program may be transmitted to the computer in a wireless manner, for example, from a download site through a satellite used for digital satellite broadcasting or be transmitted to the computer in a wired manner through a network such as a local area network (LAN) or the Internet.

The computer includes a CPU (central processing unit) 601 therein, and an input/output interface 605 is connected to the CPU 601 through a bus 604.

When an instruction is input from a user through the input/output interface 605 by operating an input unit 606, the CPU 601 executes a program that is stored in the ROM 602 in accordance with the instruction. Alternatively, the CPU 601 loads a program that is stored in the storage unit 608 into a RAM (random access memory) 603 and executes the program.

Accordingly, the CPU 601 performs the process according to the above-described flowchart or the process that is performed by the configuration of the above-described block diagram. Then, the CPU 601 outputs a processing result from an output unit 607, for example, through the input/output interface 605, transmits the processing result from a communication unit 609, or records the processing result in the storage unit 608 as is needed.

Here, the input unit 606 is configured by a keyboard, a mouse, a microphone, and the like. In addition, the output unit 607 is configured by an LCD (Liquid Crystal Display), a speaker, and the like.

Here, in this specification, the process that is performed by a computer in accordance with a program does not need to be performed necessarily in a time series in accordance with the sequence described in the flowchart. In other words, the process that is performed by the computer in accordance with the program includes a process (for example, a parallel process or a process using an object) that is performed in a parallel manner or in an individual manner.

In addition, the program may be processed by one computer (processor) or may be processed by a plurality of computers in a distributed manner. Furthermore, the program may be transmitted to a remote computer and be executed.

The present technology can be applied to an encoding device and a decoding device that are used when data is received through a network medium such as satellite broadcasting, cable TV (television), the Internet, or a cellular phone or data is processed on a storage medium such as an optical disc, a magnetic disk, or a flash memory.

In addition, the encoding device and the decoding device described above can be applied to an arbitrary electronic apparatus. Hereinafter, the examples thereof will be described.

Eleventh Embodiment

[Configuration Example of Television Apparatus]

Figure 100:
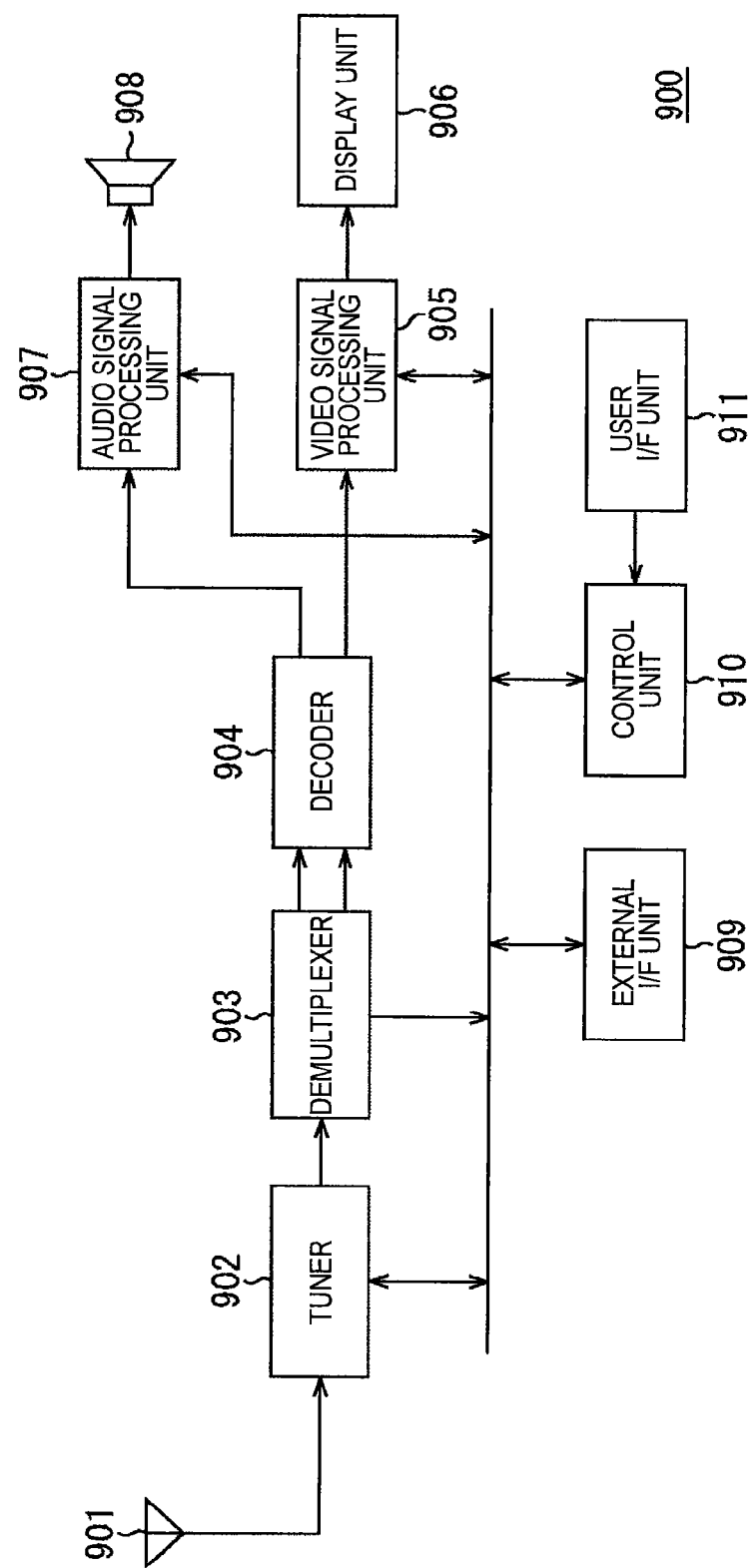
FIG. 100 is a diagram that illustrates a schematic configuration of a television apparatus according to the present technology.

FIG. 100 illustrates a schematic configuration of a television apparatus according to the present technology. The television apparatus 900 includes an antenna 901, a tuner 902, a demultiplexer 903, a decoder 904, a video signal processing unit 905, a display unit 906, an audio signal processing unit 907, a speaker 908, and an external interface unit 909. In addition, the television apparatus 900 includes a control unit 910, a user interface unit 911, and the like.

The tuner 902 selects a desired channel from among broadcasting signals received by the antenna 901, demodulates a corresponding broadcasting signal, and outputs an acquired decoded bit stream to the demultiplexer 903.

The demultiplexer 903 extracts packets of a video and an audio of a program that is a viewing target from the encoded bit stream and outputs data of the extracted packets to the decoder 904. In addition, the demultiplexer 903 supplies packets of data such as EPG (electronic program guide) to the control unit 910. Furthermore, in a case where scrambling is performed, the scrambling is cancelled by the demultiplexer.

The decoder 904 performs a decoding process of the packets, outputs video data generated by the decoding process to the video signal processing unit 905, and outputs audio data to the audio signal processing unit 907.

The video signal processing unit 905 performs noise elimination or video processing according to a user's setting for the video data. The video signal processing unit 905 generates video data of a program to be displayed on the display unit 906, image data acquired by a process that is based on an application supplied through a network, and the like. In addition, the video signal processing unit 905 generates video data used for displaying a menu screen of item selection or the like and superimposes the generated video data on the video data of the program. The video signal processing unit 905 generates a driving signal based on the video data generated as above and drives the display unit 906.

The display unit 906 drives a display device (for example, a liquid crystal display device or the like) based on the driving signal supplied from the video signal processing unit 905, thereby displaying a video of the program or the like.

The audio signal processing unit 907 performs predetermined processing such as noise elimination for the audio data, performs a D/A conversion process or an amplification process for the audio data after processing, and supplies resultant audio data to the speaker 908, thereby performing an audio output process.

The external interface unit 909 is an interface for a connection with an external device or a network and performs data transmission or data reception of video data, audio data, and the like.

The user interface unit 911 is connected to the control unit 910. The user interface unit 911 is configured by an operating switch, a remote control signal reception unit, and the like and supplies an operating signal according to a user's operation to the control unit 910.

The control unit 910 is configured by a CPU (central processing unit), a memory, and the like. The memory stores various kinds of data, EPG data, data acquired through the network, and the like that are necessary for a program that is executed by the CPU or the CPU to performing a process. The program stored in the memory is read out and executed by the CPU at predetermined timing such as start-up of the television apparatus 900. The CPU controls each unit so as to enable the television apparatus 900 to perform an operation according to a user's operation by executing the program.

In addition, in the television apparatus 900, a bus 912 is disposed so as to connect the tuner 902, the demultiplexer 903, the video signal processing unit 905, the audio signal processing unit 907, the external interface unit 909, and the like and the control unit 910 to each other.

In the television apparatus configured as above, the function of the decoding device (decoding method) according to this application is arranged in the demultiplexer 903 and the decoder 904. Accordingly, multi-viewpoint images that are multiplexed in a mode having compatibility with an existing mode can be separated.

Twelfth Embodiment

[Configuration Example of Cellular Phone]

Figure 101:
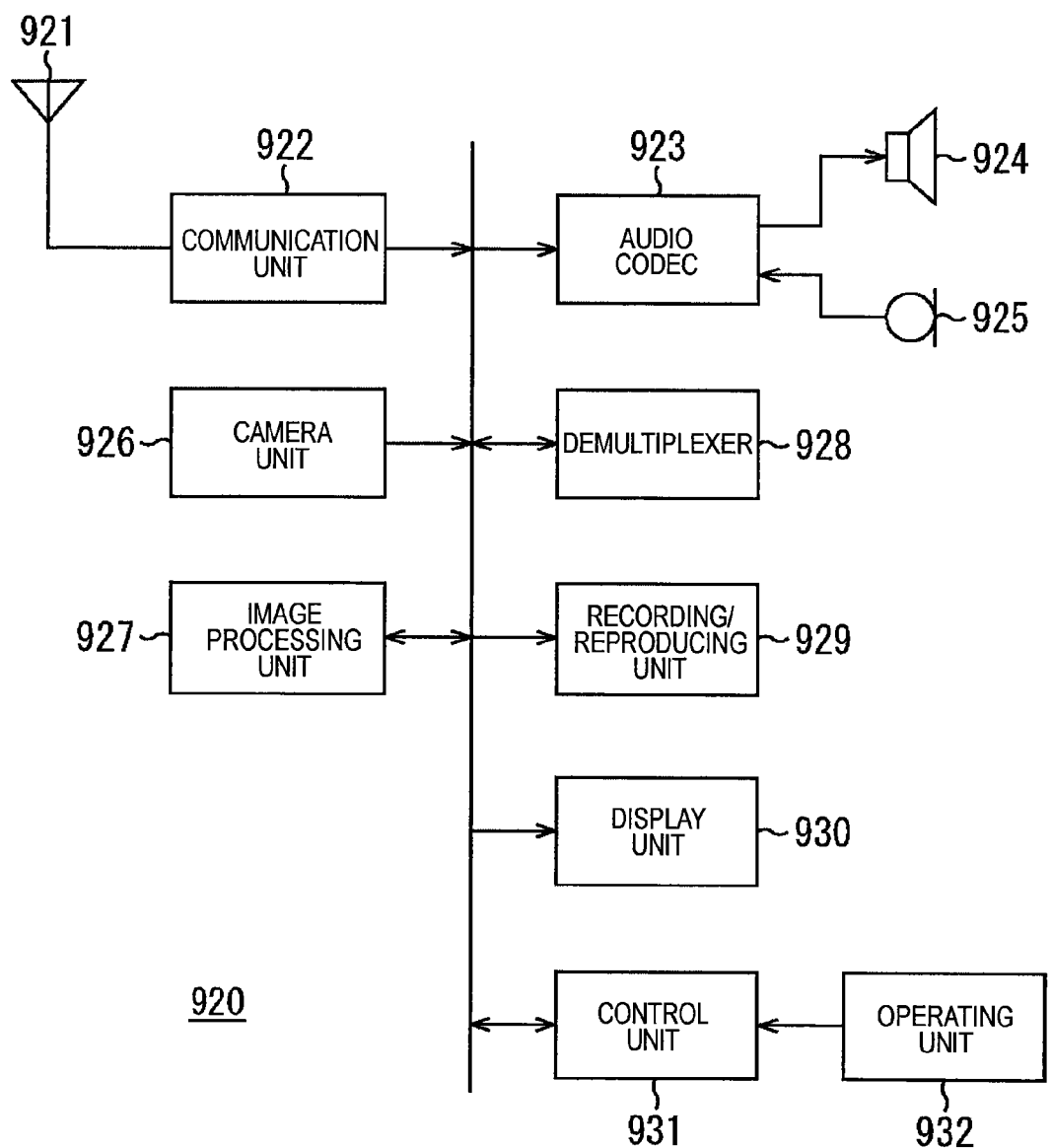
FIG. 101 is a diagram that illustrates a schematic configuration of a cellular phone according to the present technology.

FIG. 101 illustrates a schematic configuration of a cellular phone according to the present technology. The cellular phone 920 includes a communication unit 922, an audio codec 923, a camera unit 926, an image processing unit 927, a demultiplexing unit 928, a recording/reproducing unit 929, a display unit 930, and a control unit 931. These are interconnected through a bus 933.

In addition, an antenna 921 is connected to the communication unit 922, and a speaker 924 and a microphone 925 are connected to the audio codec 923. Furthermore, an operating unit 932 is connected to the control unit 931.

The cellular phone 920 performs various operations such as transmission and reception of an audio signal, transmission and reception of an electronic mail or image data, image capturing, and data recording in various modes such as a voice phone mode and a data communication mode.

In the voice phone mode, an audio signal generated by the microphone 925 is converted into audio data and is compressed by the audio codec 923, and resultant audio data is supplied to the communication unit 922. The communication unit 922 performs a modulation process, a frequency converting process, and the like for the audio data, thereby generating a transmission signal. In addition, the communication unit 922 supplies the transmission signal to the antenna 921, thereby transmitting the transmission signal to a base station not illustrated in the figure. Furthermore, the communication unit 922 performs an amplification process, a frequency converting process, a demodulation process, and the like for the reception signal received by the antenna 921 and supplies acquired audio data to the audio codec 923. The audio codec 923 performs data decompression of the audio data, converts the audio data into an analog audio signal, and outputs the audio signal to the speaker 924.

In the data communication mode, in a case where mail transmission is performed, the control unit 931 receives character data input by an operation of the operating unit 932 and displays the input character on the display unit 930. In addition, the control unit 931 generates mail data based on a user's instruction or the like supplied from the operating unit 932 and supplies the generated mail data to the communication unit 922. The communication unit 922 performs a modulation process, a frequency converting process, and the like for the mail data and transmits an acquired transmission signal from the antenna 921. In addition, the communication unit 922 performs an amplification process, a frequency converting process, a demodulation process, and the like for the reception signal received by the antenna 921, thereby restoring the mail data. This mail data is supplied to the display unit 930, whereby the content of the mail is displayed.

In addition, the cellular phone 920 may record the received mail data on a storage medium by using the recording/reproducing unit 929. The storage medium is an arbitrary rewritable storage medium. For example, the storage medium is a semiconductor memory such as a RAM or a built-in-type flash memory or a removable medium such as a hard disk, a magnetic disk, a magneto-optical disk, an optical disc, a USB memory, or a memory card.

In a case where image data is transmitted in the data communication mode, the image data generated by the camera unit 926 is supplied to the image processing unit 927. The image processing unit 927 performs an encoding process of the image data, thereby generating encoded data.

The demultiplexing unit 928 multiplexes the encoded data generated by the image processing unit 927 and the audio data supplied from the audio codec 923 in a predetermined mode and supplies multiplexed data to the communication unit 922. The communication unit 922 performs a modulation process, a frequency converting process, and the like of the multiplexing data and transmits an acquired transmission signal from the antenna 921. In addition, the communication unit 922 performs an amplification process, a frequency converting process, a demodulation process, and the like for the reception signal received by the antenna 921, thereby restoring the multiplexed data. This multiplexed data is supplied to the demultiplexing unit 928. The demultiplexing unit 928 demultiplexes the multiplexed data, supplies encoded data to the image processing unit 927, and supplies audio data to the audio codec 923. The image processing unit 927 decodes the encoded data, thereby generating image data. This image data is supplied to the display unit 930, and the received image is displayed. The audio codec 923 converts audio data into an analog audio signal and supplies the analog audio signal to the speaker 924, thereby outputting the received audio.

In the cellular phone device configured as above, the function of the decoding device (decoding method) according to this application is arranged in the image processing unit 927 and the demultiplexing unit 928. Accordingly, in communication of the image data, multi-viewpoint images multiplexed in accordance with a mode having compatibility with an existing mode can be separated.

Thirteenth Embodiment

[Configuration Example of Recording and Reproducing Device]

Figure 102:
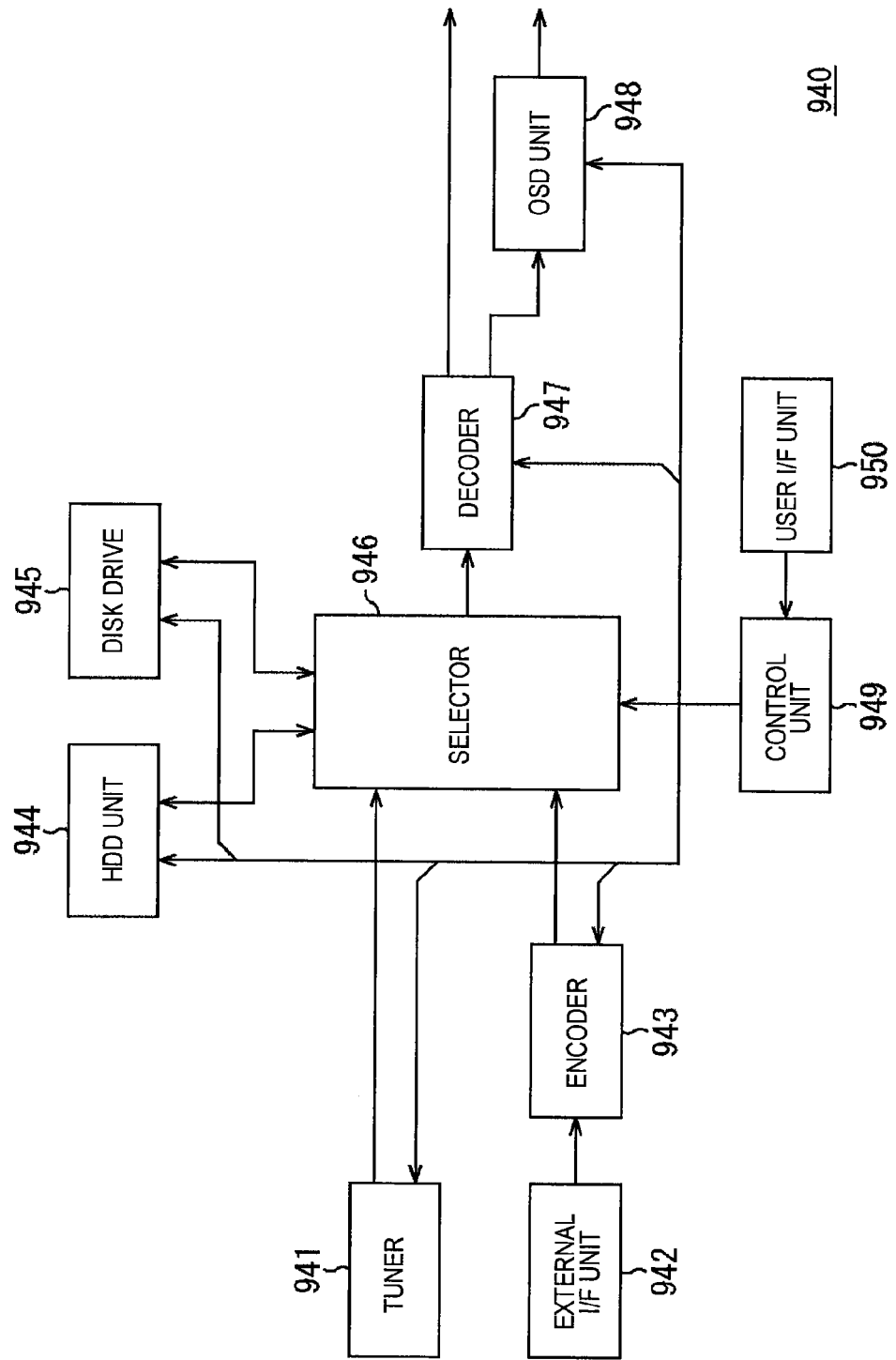
FIG. 102 is a diagram that illustrates a schematic configuration of a recording and reproducing device according to the present technology.

FIG. 102 illustrates a schematic configuration of a recording and reproducing device according to the present technology. The recording and reproducing device 940, for example, records audio data and video data of a received broadcasting program on a recording medium and supplies the recorded data to a user at timing according to a user's instruction. In addition, the recording and reproducing device 940, for example, may acquire audio data and video data from another device and record the data on a recording medium. Furthermore, the recording and reproducing device 940 decodes and outputs the audio data and the video data that are recorded on the recording medium, whereby an image display or audio output in a monitor device or the like can be performed.

The recording and reproducing device 940 includes a tuner 941, an external interface unit 942, an encoder 943, an HDD (Hard Disk Drive) unit 944, a disk driver 945, a selector 946, a decoder 947, an OSD (On-Screen Display) unit 948, a control unit 949, and a user interface unit 950.

The tuner 941 selects a desired channel from among broadcasting signals received by an antenna not illustrated in the figure. The tuner 941 outputs an encoded bit stream that is acquired by demodulating a reception signal of the desired channel to the selector 946.

The external interface unit 942 is configured as at least one of an IEEE 1394 interface, a network interface unit, a USB interface, a flash memory interface, and the like. The external interface unit 942 is an interface used for a connection with an external device, a network, a memory card, or the like and performs data reception of video data, audio data, and the like to be recorded.

When the video data and the audio data supplied from the external interface unit 942 are not encoded, the encoder 943 encodes the data in accordance with a predetermined mode, multiplexes the encoded bit stream, and outputs the multiplexed encoded bit stream to the selector 946.

The HDD unit 944 records content data such as a video and an audio, various programs, and other data on a built-in hard disk and reads out the data from the hard disk at the time of reproducing the data or the like.

The disk driver 945 performs signal recording and signal reproduction for the installed optical disc. Examples of the optical disc include a DVD disc (a DVD-Video, a DVD-RAM, a DVD-R, a DVD-RW, a DVD+R, DVD+RW, and the like), a Blu-ray disc, and the like.

The selector 946 selects one of encoded bit streams supplied from the tuner 941 or the encoder 943 at the time of recording a video or audio and supplies the encoded bit stream to one of the HDD unit 944 and the disk driver 945. In addition, the selector 946 supplies an encoded bit stream that is output from the HDD unit 944 or the disk driver 945 to the decoder 947 at the time of reproducing a video or an audio.

The decoder 947 performs a decoding process of the encoded bit stream. The decoder 947 supplies the video data that is generated by performing the decoding process to the OSD unit 948. In addition, the decoder 947 outputs audio data that is generated by performing a decoding process.

The OSD unit 948 generates video data used for displaying a menu screen of item selection or the like and outputs the generated video data while being superimposed on the video data output from the decoder 947.

The user interface unit 950 is connected to the control unit 949. The user interface unit 950 is configured by an operating switch, a remote control signal reception unit, and the like and supplies an operating signal according to a user's operation to the control unit 949.

The control unit 949 is configured by a CPU, a memory, and the like. The memory stores various kinds of data that is necessary for a program executed by the CPU or the CPU to perform a process. The program that is stored in the memory is read out and executed by the CPU at predetermined timing such as start-up of the recording and reproducing device 940. The CPU controls each unit such that the recording and reproducing device 940 performs an operation according to a user's operation by executing the program.

In the recording and reproducing device configured as above, the function of the encoding device (encoding method) according to this application is arranged in the encoder 943. Accordingly, multi-viewpoint images can be multiplexed in accordance with a mode that has compatibility with an existing mode.

Fourteenth Embodiment

[Configuration Example of Imaging Apparatus]

Figure 103:
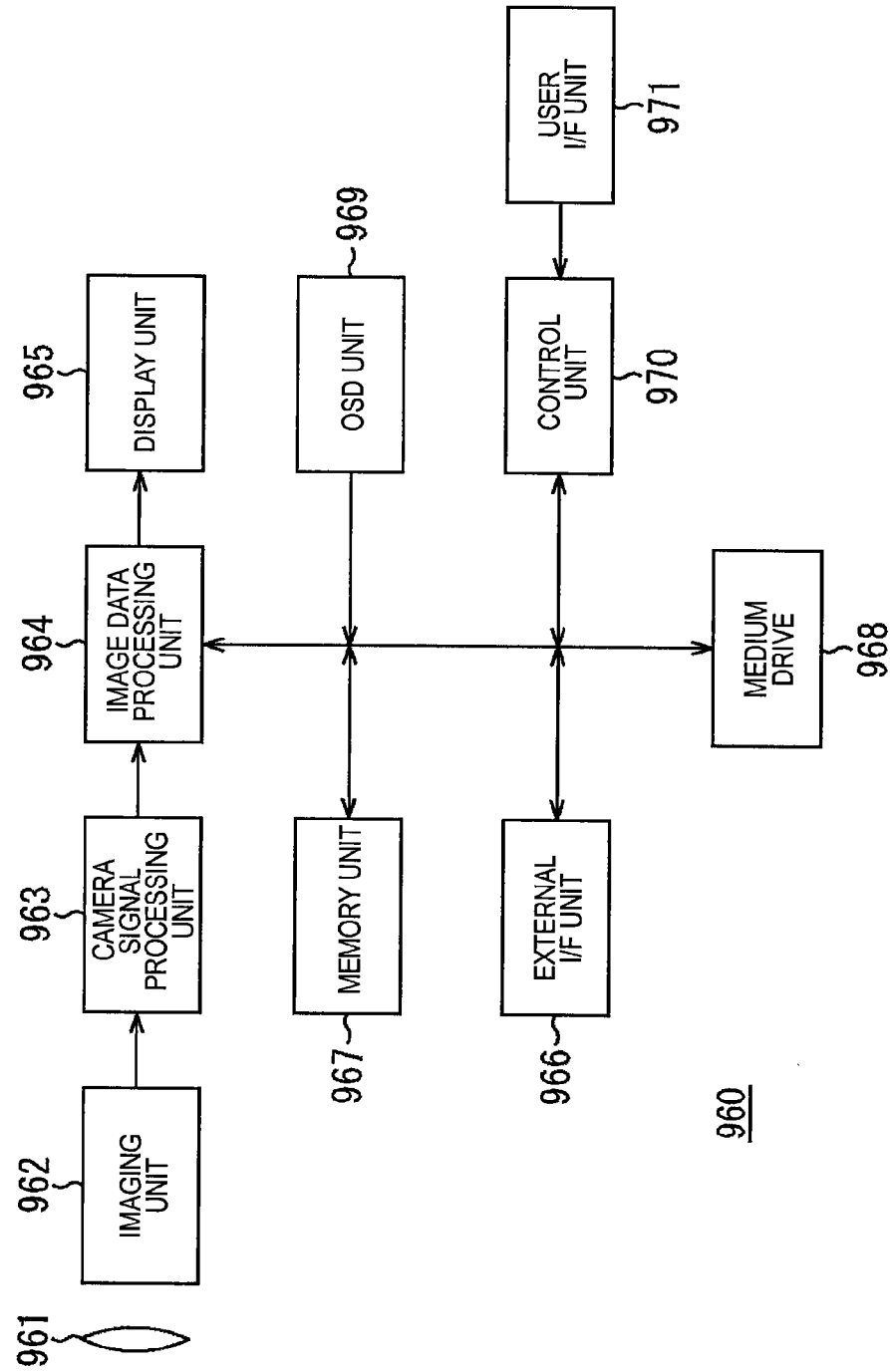
FIG. 103 is a diagram that illustrates a schematic configuration of an imaging apparatus according to the present technology.

FIG. 103 illustrates a schematic configuration of an imaging apparatus according to the present technology. The imaging apparatus 960 images a subject, displays an image of the subject on the display unit or records the image on the recording medium as image data.

The imaging apparatus 960 includes an optical block 961, an imaging unit 962, a camera signal processing unit 963, an image data processing unit 964, a display unit 965, an external interface unit 966, a memory unit 967, a medium drive 968, an OSD unit 969, and a control unit 970. In addition, a user interface unit 971 is connected to the control unit 970. Furthermore, the image data processing unit 964, the external interface unit 966, the memory unit 967, the medium drive 968, the OSD unit 969, the control unit 970, and the like are connected through a bus 972.

The optical block 961 is configured by using a focus lens, a diaphragm mechanism, and the like. The optical block 961 forms an optical image of a subject on an imaging face of the imaging unit 962. The imaging unit 962 is configured by using a CCD or a CMOS image sensor, generates an electric signal in accordance with an optical image through photo-electric conversion, and supplies the electric signal to the camera signal processing unit 963.

The camera signal processing unit 963 performs various camera signal processes such as knee correction, gamma correction, and color correction for the electric signal supplied from the imaging unit 962. The camera signal processing unit 963 supplies the image data after the camera signal processing to the image data processing unit 964.

The image data processing unit 964 performs an encoding process and a multiplexing process for the image data supplied from the camera signal processing unit 963. The image data processing unit 964 supplies the encoded data generated by performing the encoding process and the multiplexing process to the external interface unit 966 or the medium drive 968. In addition, the image data processing unit 964 performs a separation process and a decoding process for the encoded data that is supplied from the external interface unit 966 or the medium drive 968. The image data processing unit 964 supplies the image data that is generated by performing the separation process and the decoding process to the display unit 965. In addition, the image data processing unit 964 supplies display data that is acquired by the process of supplying the image data supplied from the camera signal processing unit 963 to the display unit 965 or is acquired from the OSD unit 969 to the display unit 965 while being superimposed on the image data.

The OSD unit 969 generates display data of a menu screen, an icon, or the like that is formed from a symbol, a character, or a graphic and outputs the display data to the image data processing unit 964.

The external interface unit 966, for example, is configured by USB input/output terminals and the like and is connected to a printer in a case where an image is printed. In addition, a drive is connected to the external interface unit 966 as is necessary, a removable medium such as a magnetic disk or an optical disc is appropriately installed therein, and a computer program read from the removable medium is installed as is necessary. In addition, the external interface unit 966 includes a network interface that is connected to a predetermined network such as a LAN or the Internet. The control unit 970, for example, in accordance with an instruction supplied from the user interface unit 971, can read encoded data from the memory unit 967 and supply the encoded data from the external interface unit 966 to another device that is connected through the network. In addition, the control unit 970 can acquire the encoded data or the image data, which is supplied from another device through the network, through the external interface unit 966 and supply the data to the image data processing unit 964.

As the recording medium that is driven by the medium drive 968, for example, an arbitrary readable and writable removable medium such as a magnetic disk, a magneto-optical disk, an optical disc, or a semiconductor memory is used. In addition, the type of the recording medium as the removable medium is arbitrary and may be a tape device, a disk device, or a memory card. Furthermore, the recording medium may be a non-contact IC card, or the like.

In addition, the medium drive 968 and the recording medium may be integrated together and configured by a non-portable recording medium such as a built-in type hard disk drive or an SSD (Solid State Drive).

The control unit 970 is configured by a CPU, a memory, and the like. The memory stores various kinds of data that is necessary for a program executed by the CPU or the CPU to perform a process. The program that is stored in the memory is read out and executed by the CPU at predetermined timing such as start-up of the imaging apparatus 960. The CPU controls each unit such that the imaging apparatus 960 performs an operation according to a user's operation by executing the program.

In the imaging apparatus configured as above, the function of the decoding device (decoding method) according to this application is arranged in the image data processing unit 964. Accordingly, when decoded image data is generated by decoding encoded data recorded in the memory unit 967, the recording medium, or the like, multi-viewpoint images that are multiplexed in accordance with a mode having compatibility with an existing mode can be separated.

In addition, an embodiment of the present technology is not limited to the above-described embodiments, and various changes can be made therein in a range not departing from the concept of the present technology.

REFERENCE SIGNS LIST

50 Encoding device
59 Multiplexing unit
61 Compatible encoder
62 Auxiliary encoder
120 Decoding device
121 Separation unit
127 Image generating unit
131 Compatible decoder
132 Auxiliary decoder
140 Encoding device
151 Compatible encoder
152 Auxiliary encoder
170 Decoding device
171 Image generating unit
180 Encoding device
191 Compatible encoder
200 Decoding device
202 Image Generating Unit
211 Compatible Decoder

The invention claimed is:
1. An encoding device comprising:
circuitry configured to
    generate a base stream by encoding a base image,
    generate a second stream by encoding auxiliary images used when multi-viewpoint images are generated on the basis of the base image,
    generate a depth stream by encoding depth data that represents disparity of the base image or the auxiliary images,
    set the base stream, the second stream, and the depth stream as an access unit,
    insert a delimiter indicating a boundary between the base stream and the second stream, and
    insert a depth delimiter between a second stream of a previous access unit and the depth stream of the access unit, the depth delimiter indicating a beginning of the encoded depth data, and the depth delimiter being different than the delimiter between the base stream and the second stream.

2. The encoding device according to claim 1, wherein, when the base image is a two-viewpoint image, the base stream is formed by an image of one viewpoint out of the encoded base image, and the second stream is formed by an image of the other viewpoint and the encoded auxiliary images.

3. The encoding device according to claim 1, wherein the circuitry is further configured to insert an access unit delimiter indicating a boundary between access units at the beginning of the base image.

4. The encoding device according to claim 1, wherein the circuitry is configured to encode the base image according to advanced video coding (AVC) standard.

5. The encoding device according to claim 1, wherein the circuitry is configured to encode the base image and the auxiliary images according to multi-view video coding (MVC) standard.

6. The encoding device according to claim 1, wherein
the encoded depth data includes a first parallax image and a second parallax image, and
the circuitry is configured to insert a delimiter between the first parallax image and the second parallax image.

7. An encoding method to be performed by an encoding device, the encoding method comprising:
generating a base stream by encoding a base image;
generating a second stream by encoding auxiliary images used when multi-viewpoint images are generated on the basis of the base image;
generating a depth stream by encoding depth data that represents disparity of the base image or the auxiliary images;
setting the base stream, the second stream, and the depth stream as an access unit;
inserting a delimiter indicating a boundary between the base stream and the second stream; and
inserting a depth delimiter between a second stream of a previous access unit and the depth stream of the access unit, the depth delimiter indicating a beginning of the encoded depth data, and the depth delimiter being different than the delimiter between the base stream and the second stream.

8. The encoding method according to claim 7, wherein, when the base image is a two-viewpoint image, the base stream is formed by an image of one viewpoint out of the encoded base image, and the second stream is formed by an image of the other viewpoint and the encoded auxiliary images.

9. The encoding method according to claim 8, further comprising:
inserting an access unit delimiter indicating a boundary between access units at the beginning of the base image.

10. The encoding method according to claim 7, wherein the first generating encodes the base image according to advanced video coding (AVC) standard.

11. The encoding method according to claim 7, wherein generating the base stream and generating the second stream encode the base image and the auxiliary images according to multi-view video coding (MVC) standard.

12. A non-transitory computer-readable storage medium including computer executable instructions, wherein the instructions, when executed by a computer, cause the computer to perform an encoding method, the encoding method comprising:
generating a base stream by encoding a base image;
generating a second stream by encoding auxiliary images used when multi-viewpoint images are generated on the basis of the base image;
generating a depth stream by encoding depth data that represents disparity of the base image or the auxiliary images;
setting the base stream, the second stream, and the depth stream as an access unit;
inserting a delimiter indicating a boundary between the base stream and the second stream; and
inserting a depth delimiter between a second stream of a previous access unit and the depth stream of the access unit, the depth delimiter indicating a beginning of the encoded depth data, and the depth delimiter being different than the delimiter between the base stream and the second.

* * * * *